Dec. 4, 1962 M. ZISERMAN ETAL 3,066,865
ARBITRARY FUNCTION ANALOGUE-TO-DIGITAL CONVERTER
Filed Feb. 25, 1959 22 Sheets-Sheet 2

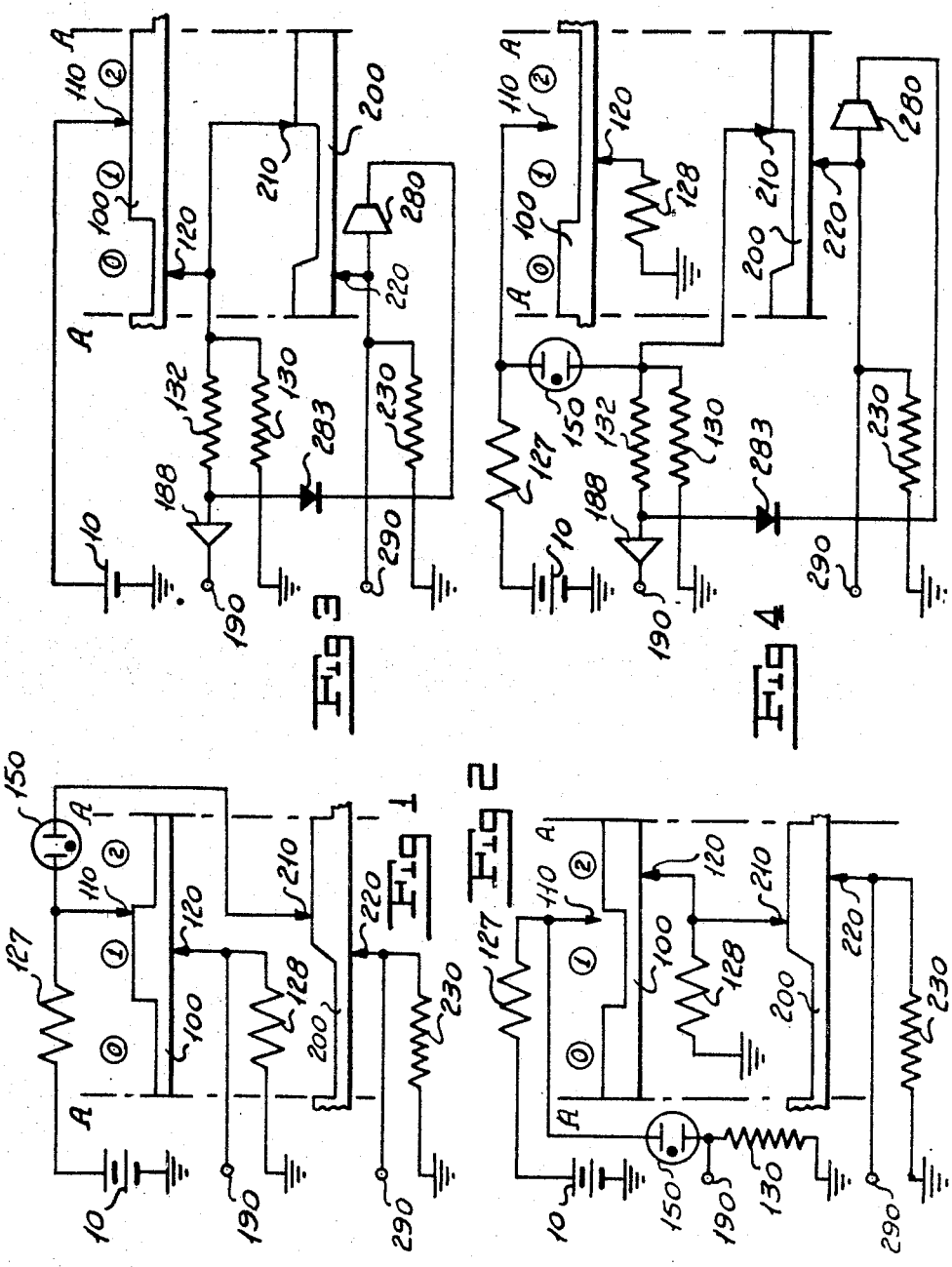

INVENTORS
MARTIN ZISERMAN
FRANK S. PRESTON
BY
Henry L. Shenier
ATTORNEY

Dec. 4, 1962 M. ZISERMAN ETAL 3,066,865
ARBITRARY FUNCTION ANALOGUE-TO-DIGITAL CONVERTER
Filed Feb. 25, 1959 22 Sheets-Sheet 3
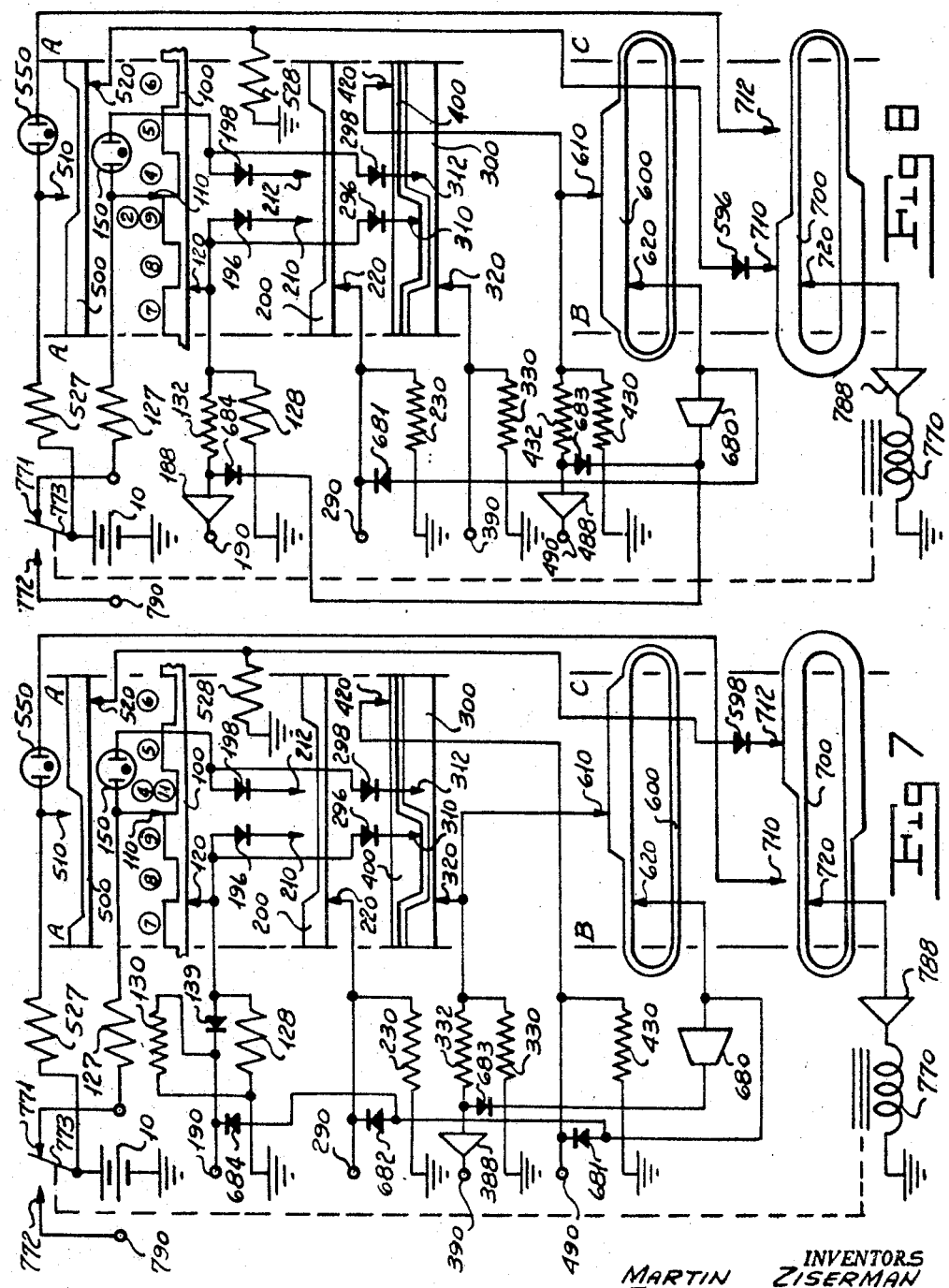
INVENTORS
MARTIN ZISERMAN
FRANK S. PRESTON
BY
Henry L. Shenier
ATTORNEY

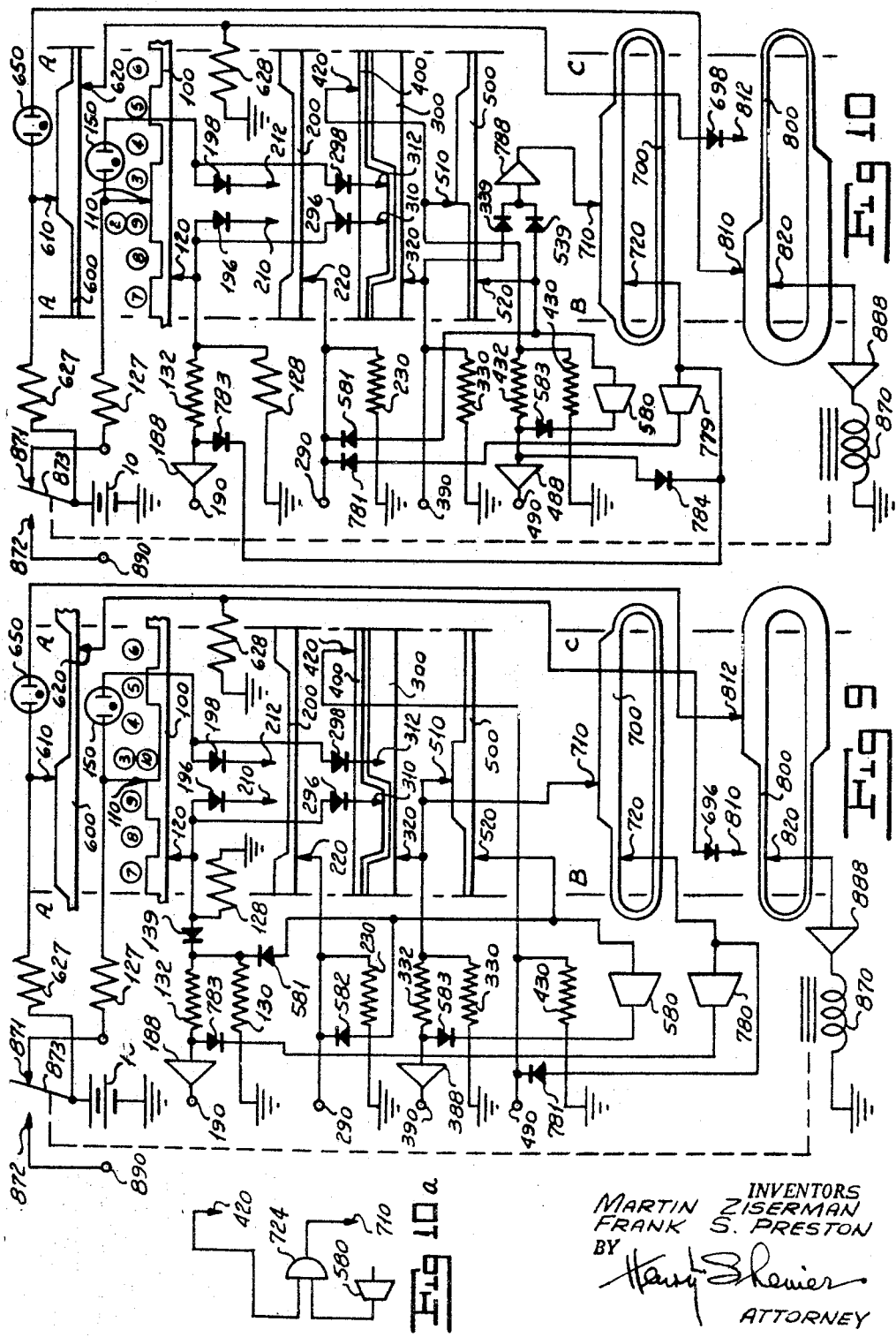

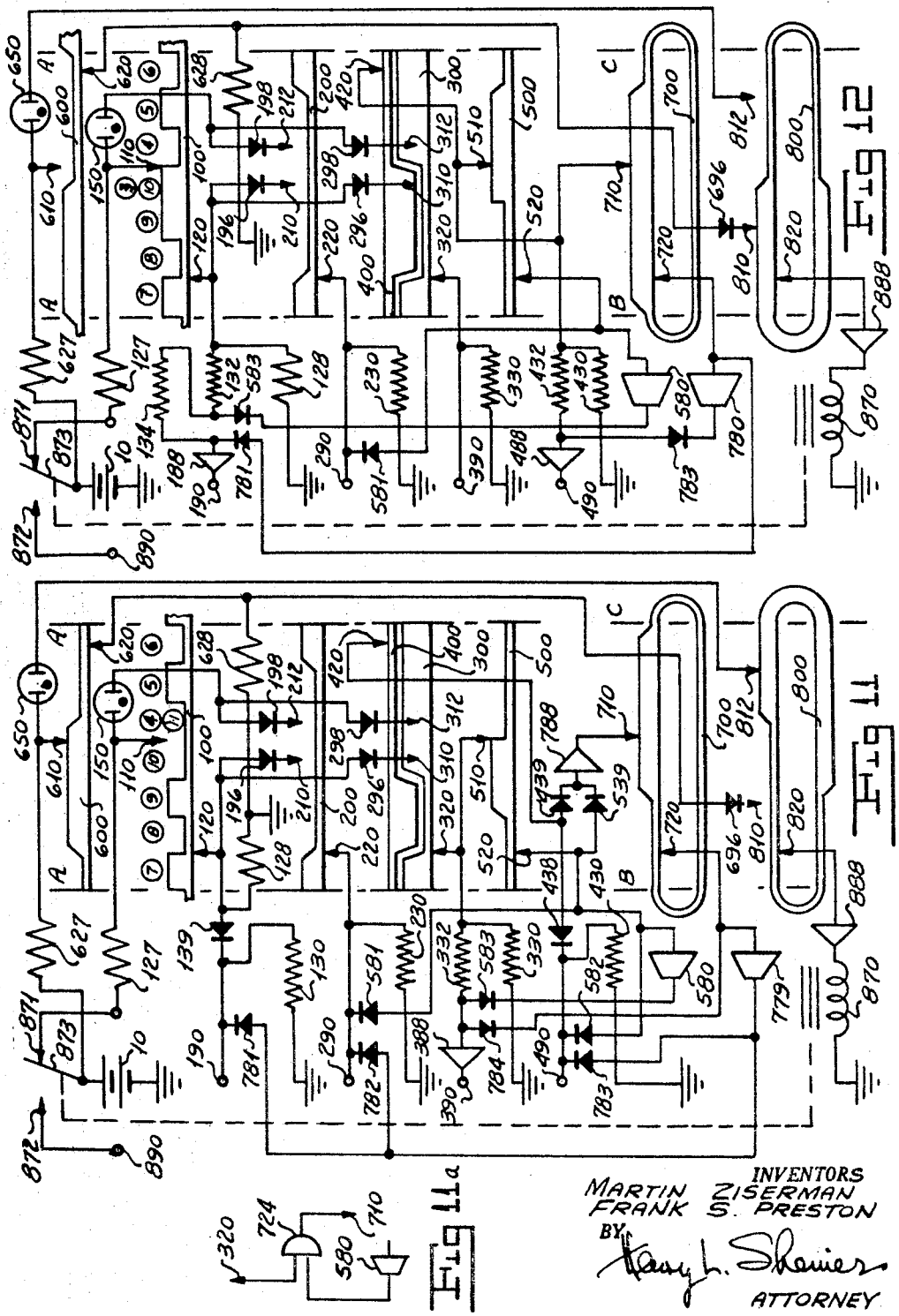

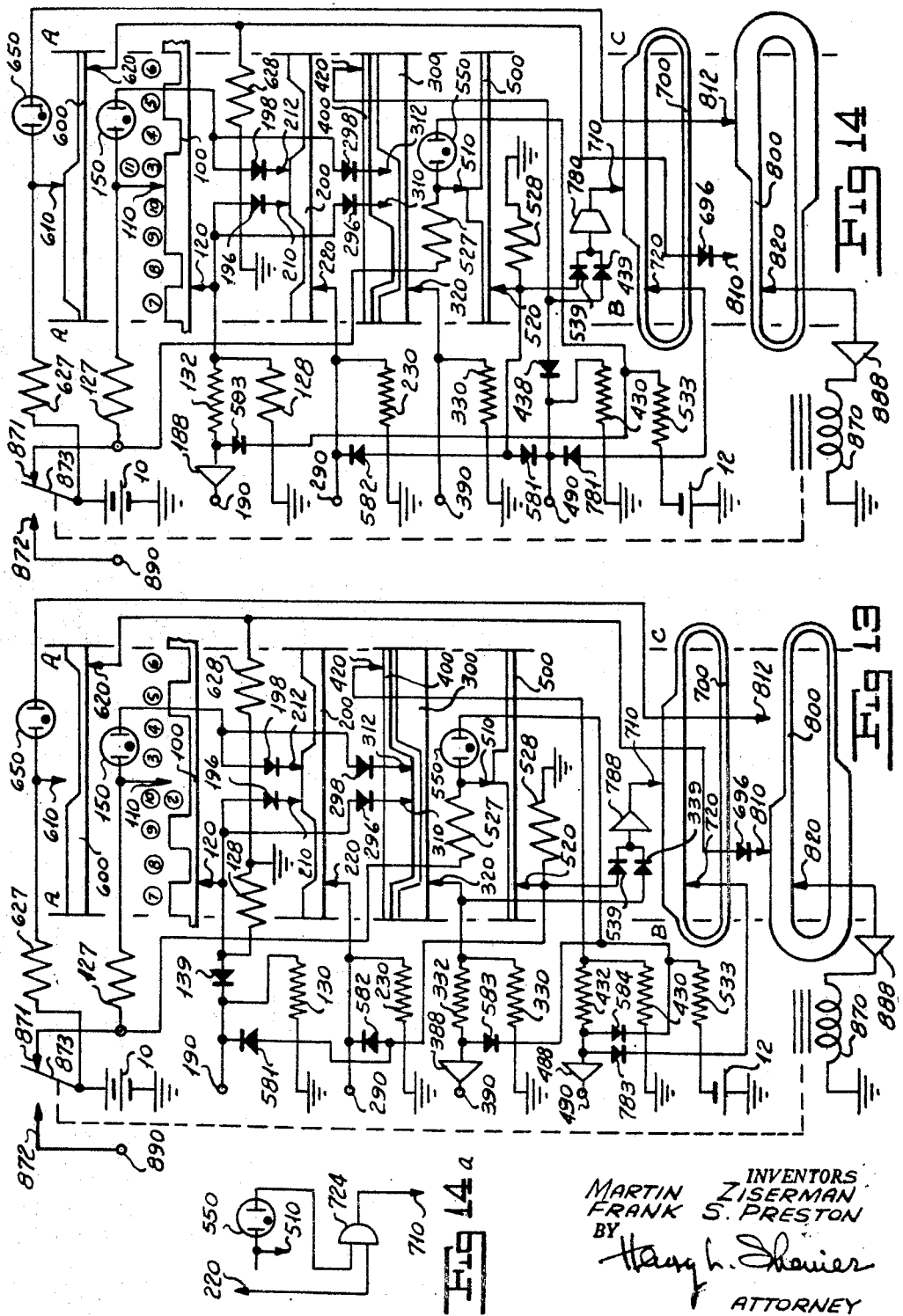

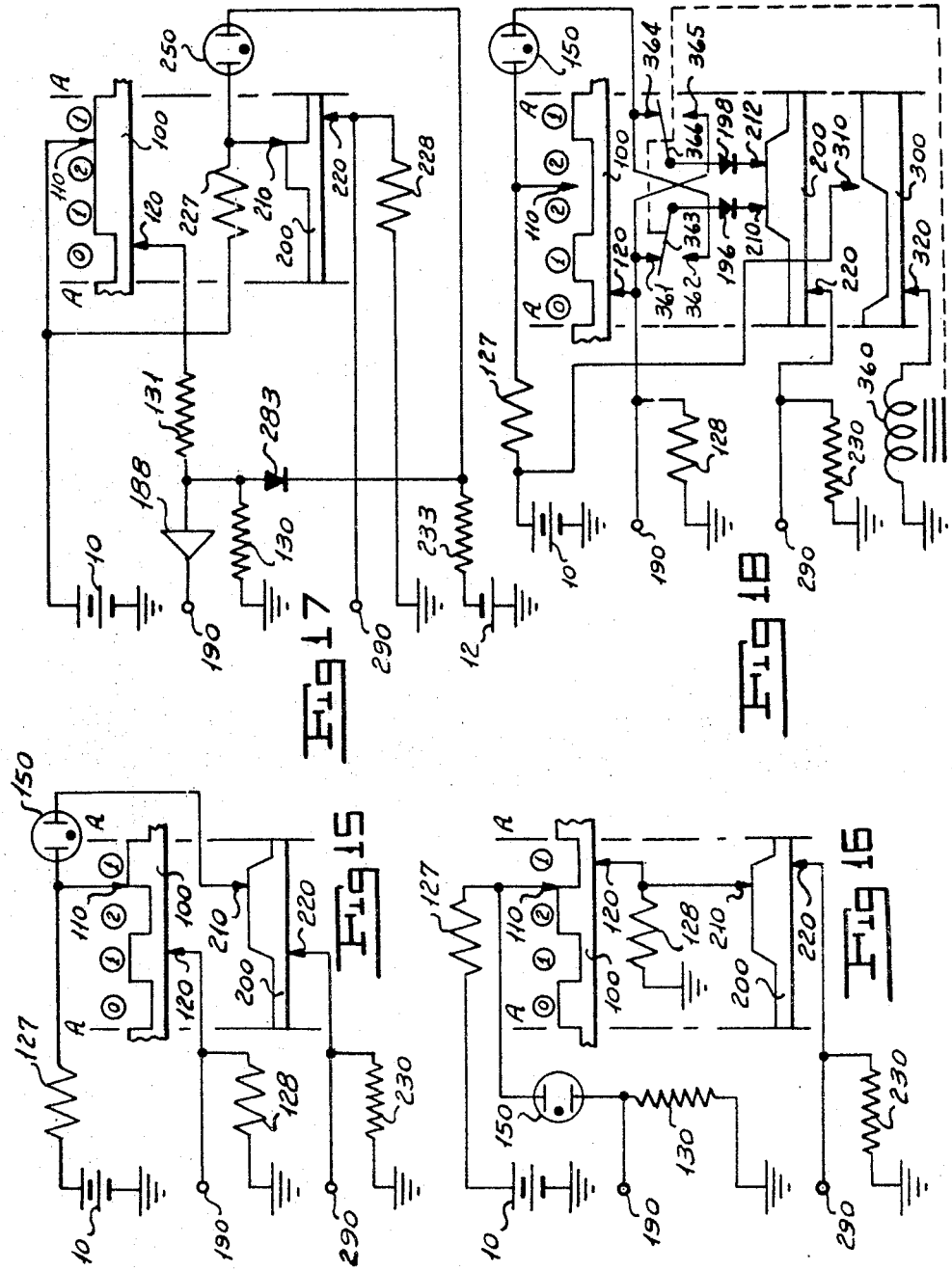

Dec. 4, 1962  M. ZISERMAN ETAL  3,066,865
ARBITRARY FUNCTION ANALOGUE-TO-DIGITAL CONVERTER
Filed Feb. 25, 1959  22 Sheets-Sheet 8

INVENTORS
MARTIN ZISERMAN
FRANK S. PRESTON
BY
ATTORNEY

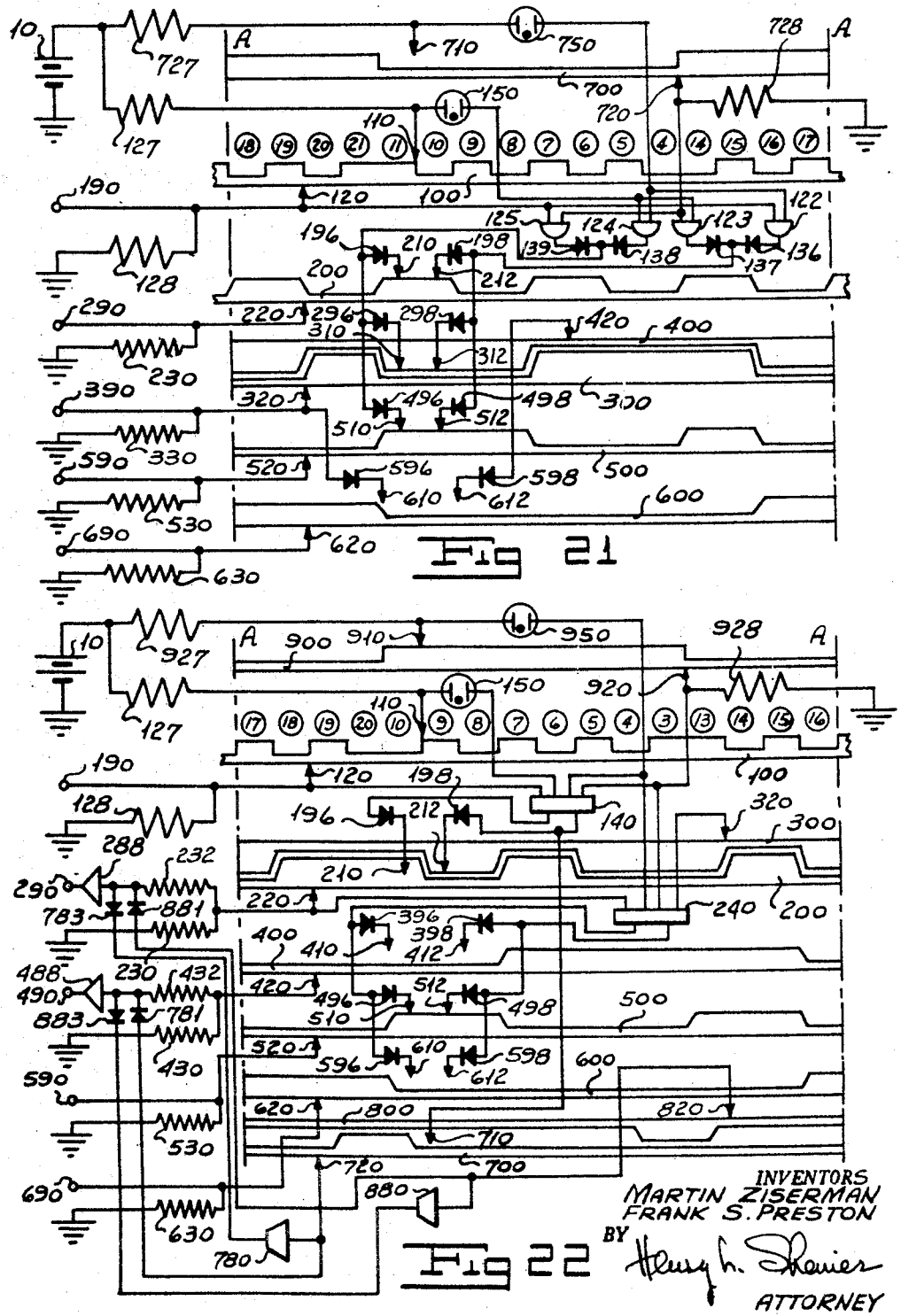

Dec. 4, 1962   M. ZISERMAN ETAL   3,066,865
ARBITRARY FUNCTION ANALOGUE-TO-DIGITAL CONVERTER
Filed Feb. 25, 1959   22 Sheets-Sheet 10
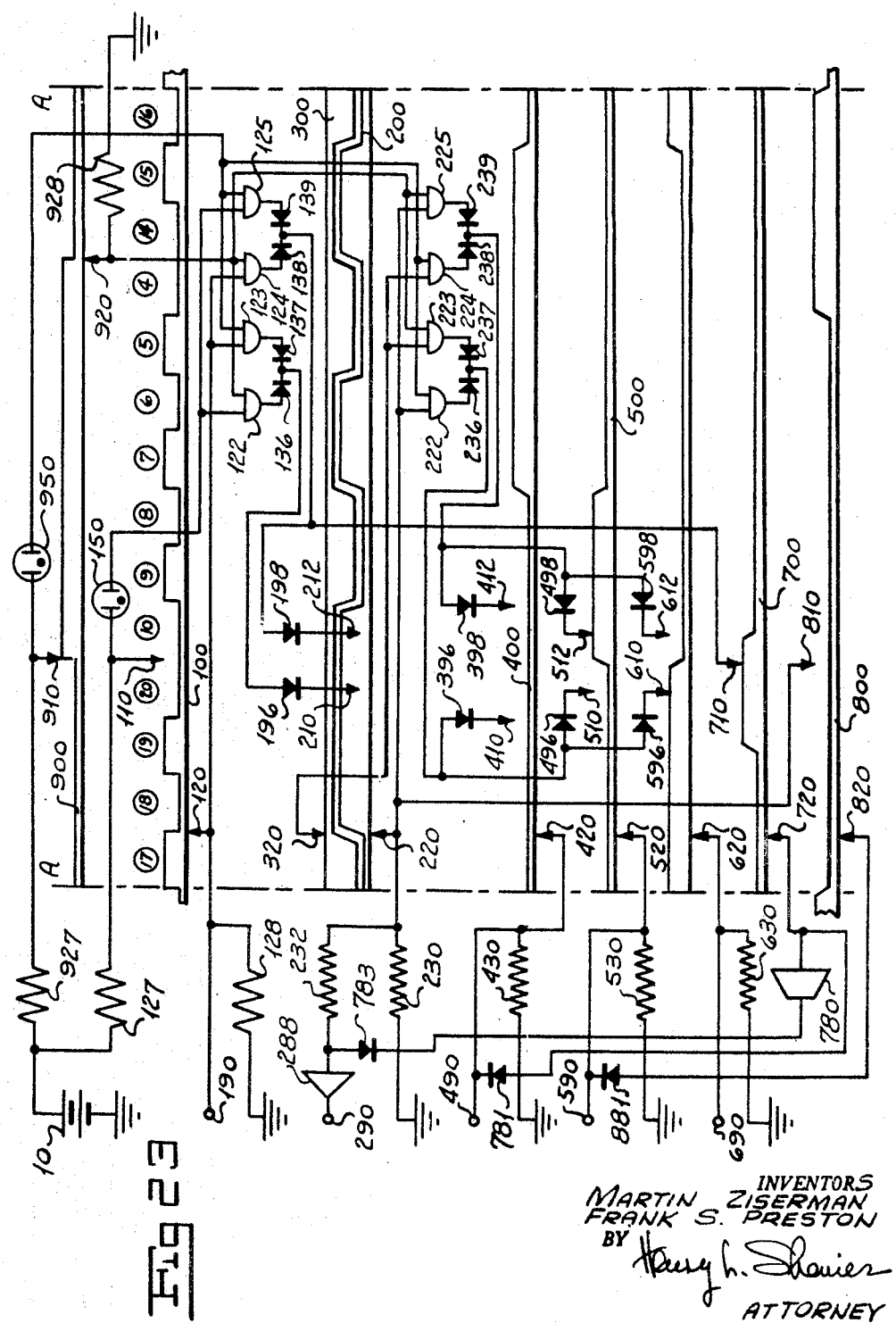
INVENTORS
MARTIN ZISERMAN
FRANK S. PRESTON
BY
ATTORNEY

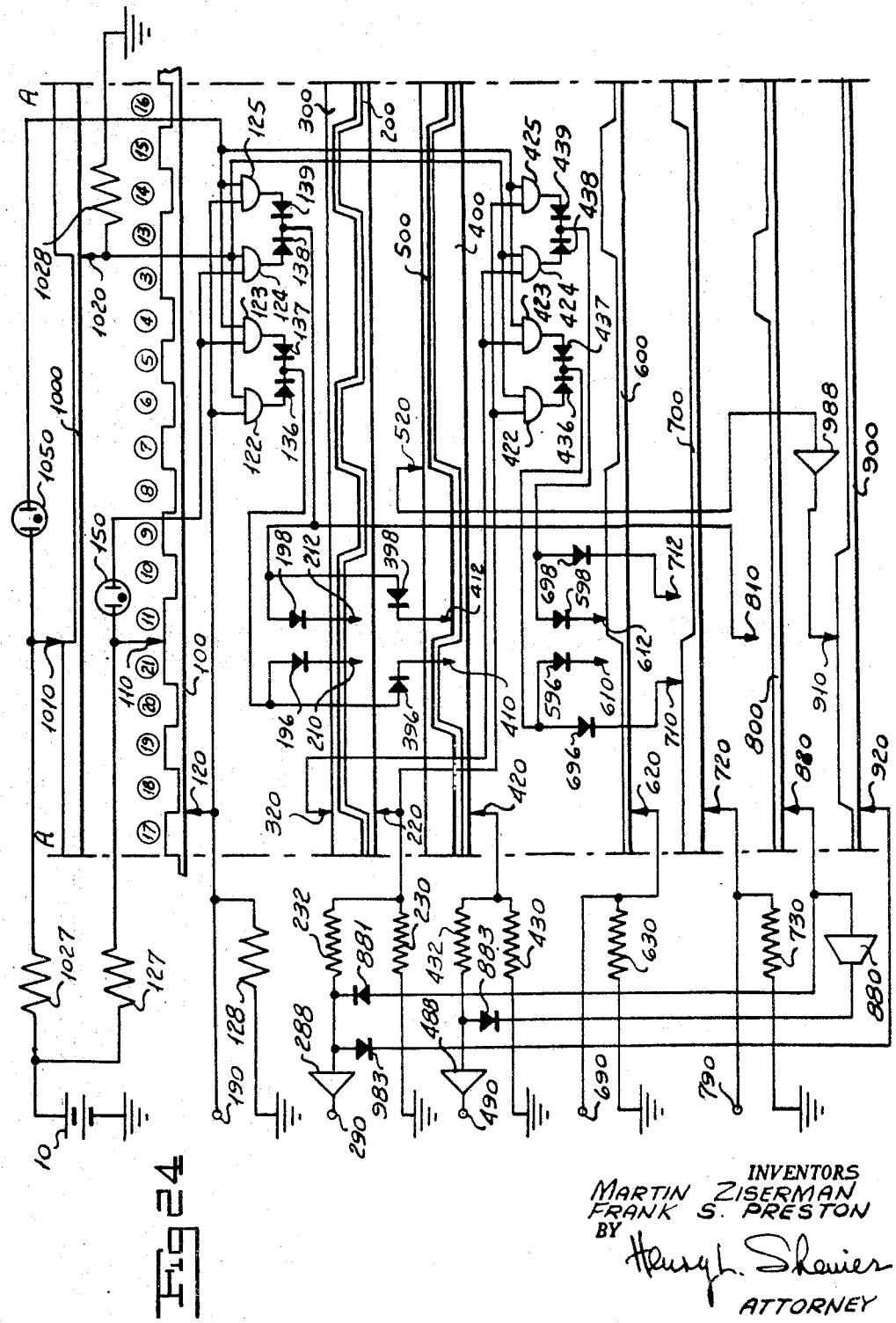

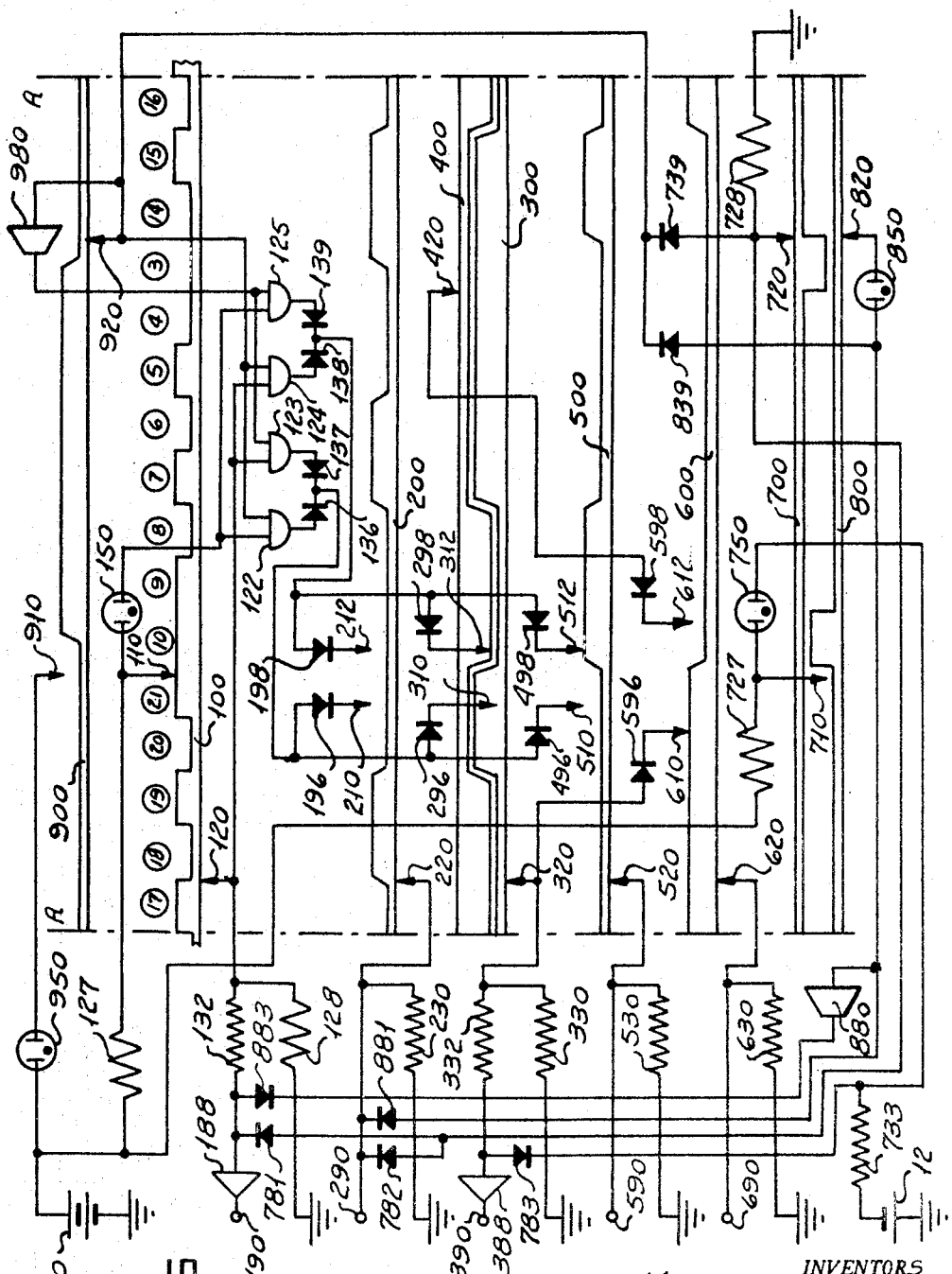

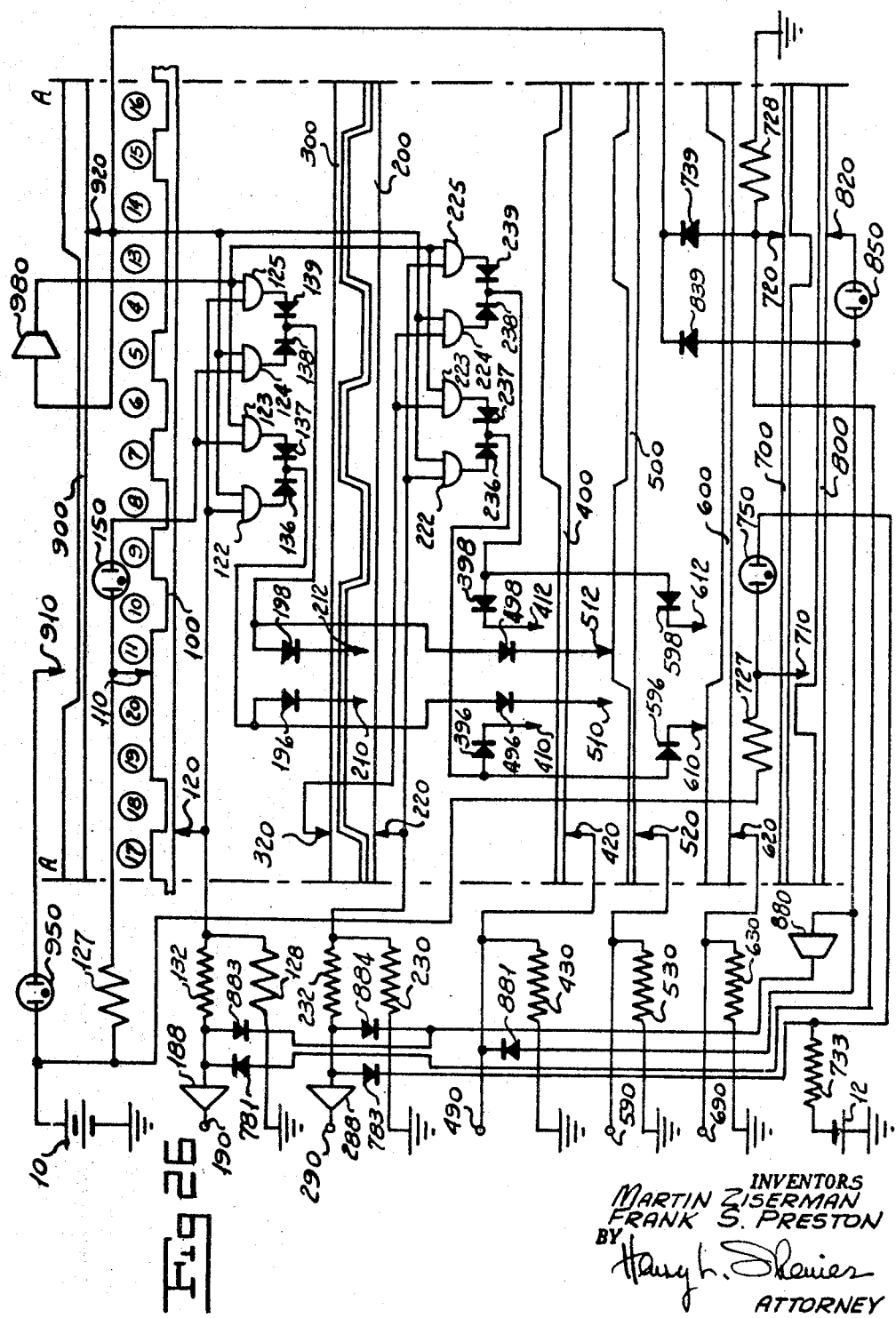

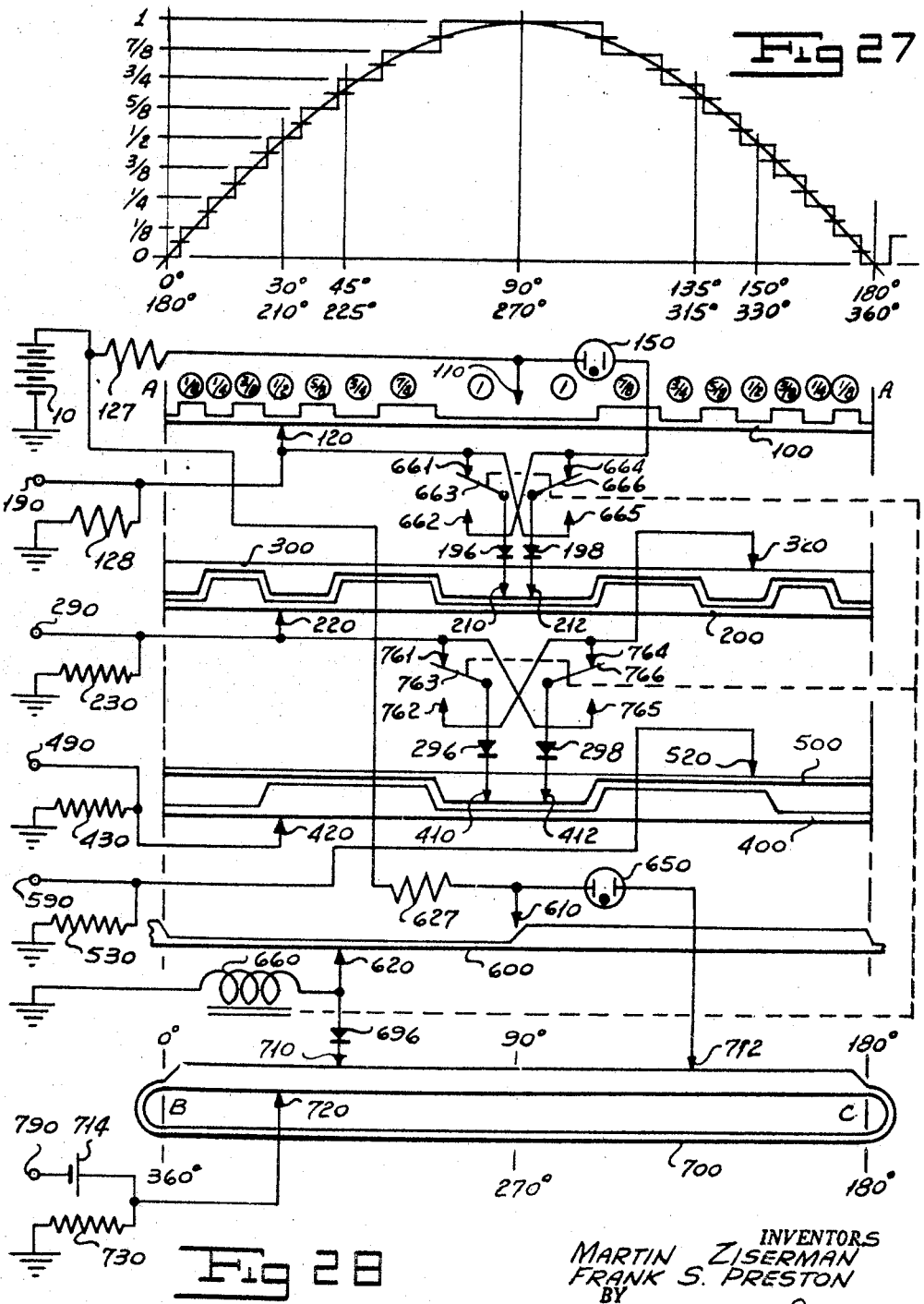

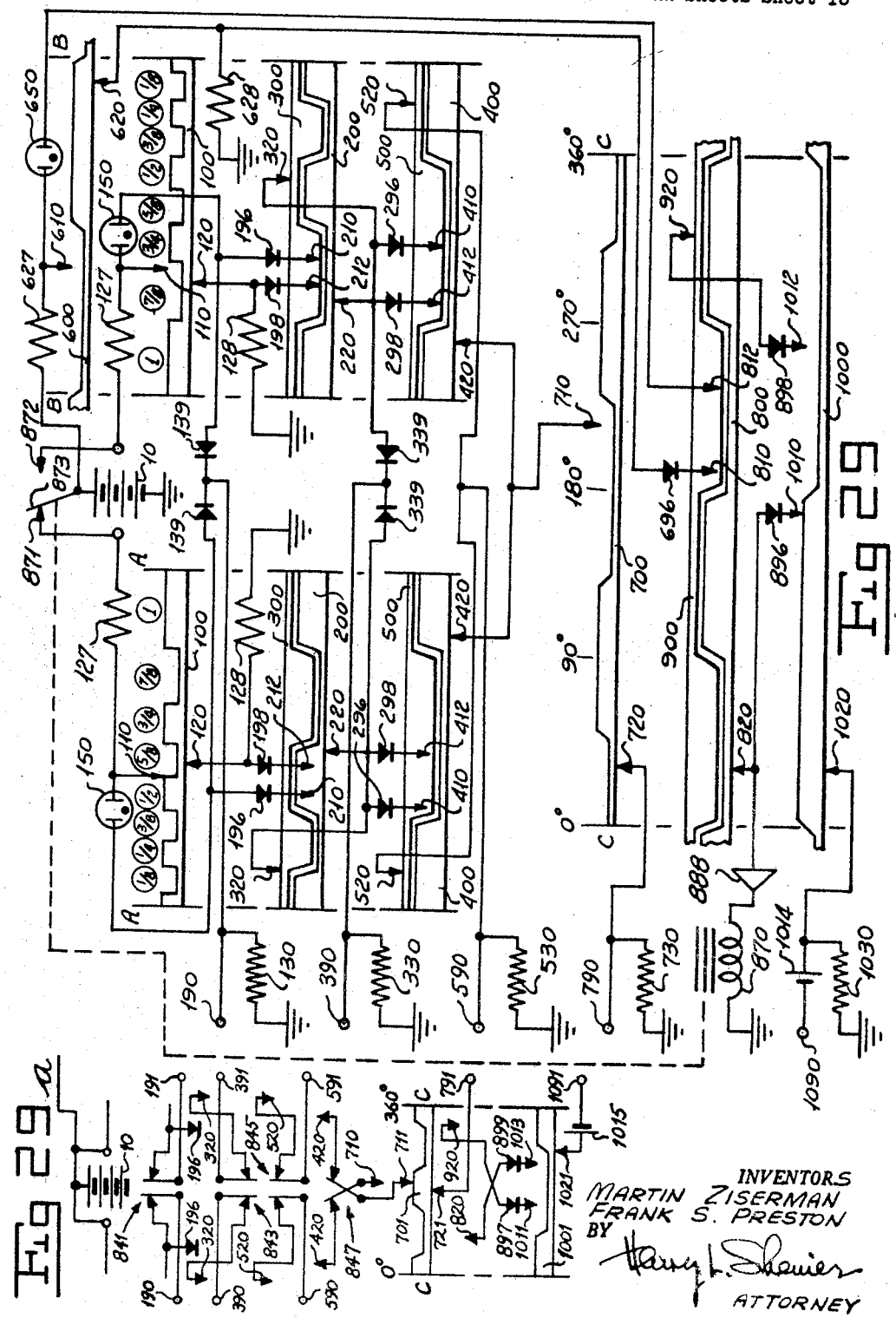

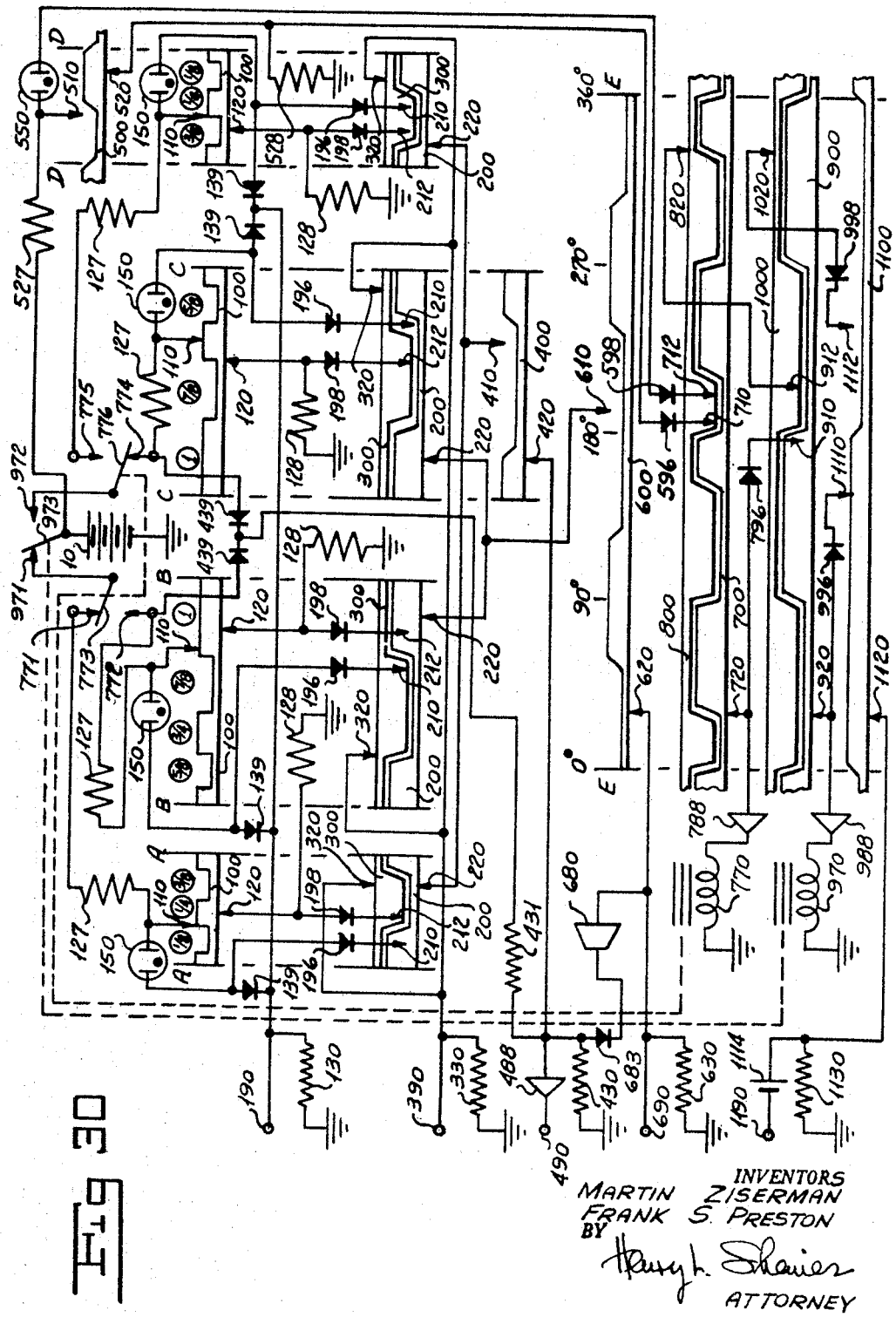

Dec. 4, 1962     M. ZISERMAN ETAL     3,066,865
ARBITRARY FUNCTION ANALOGUE-TO-DIGITAL CONVERTER
Filed Feb. 25, 1959     22 Sheets-Sheet 17

INVENTORS
MARTIN ZISERMAN
FRANK S. PRESTON
BY
ATTORNEY

Dec. 4, 1962 M. ZISERMAN ETAL 3,066,865
ARBITRARY FUNCTION ANALOGUE-TO-DIGITAL CONVERTER
Filed Feb. 25, 1959 22 Sheets-Sheet 18

INVENTORS
MARTIN ZISERMAN
FRANK S. PRESTON
BY
Harry L. Schenier
ATTORNEY

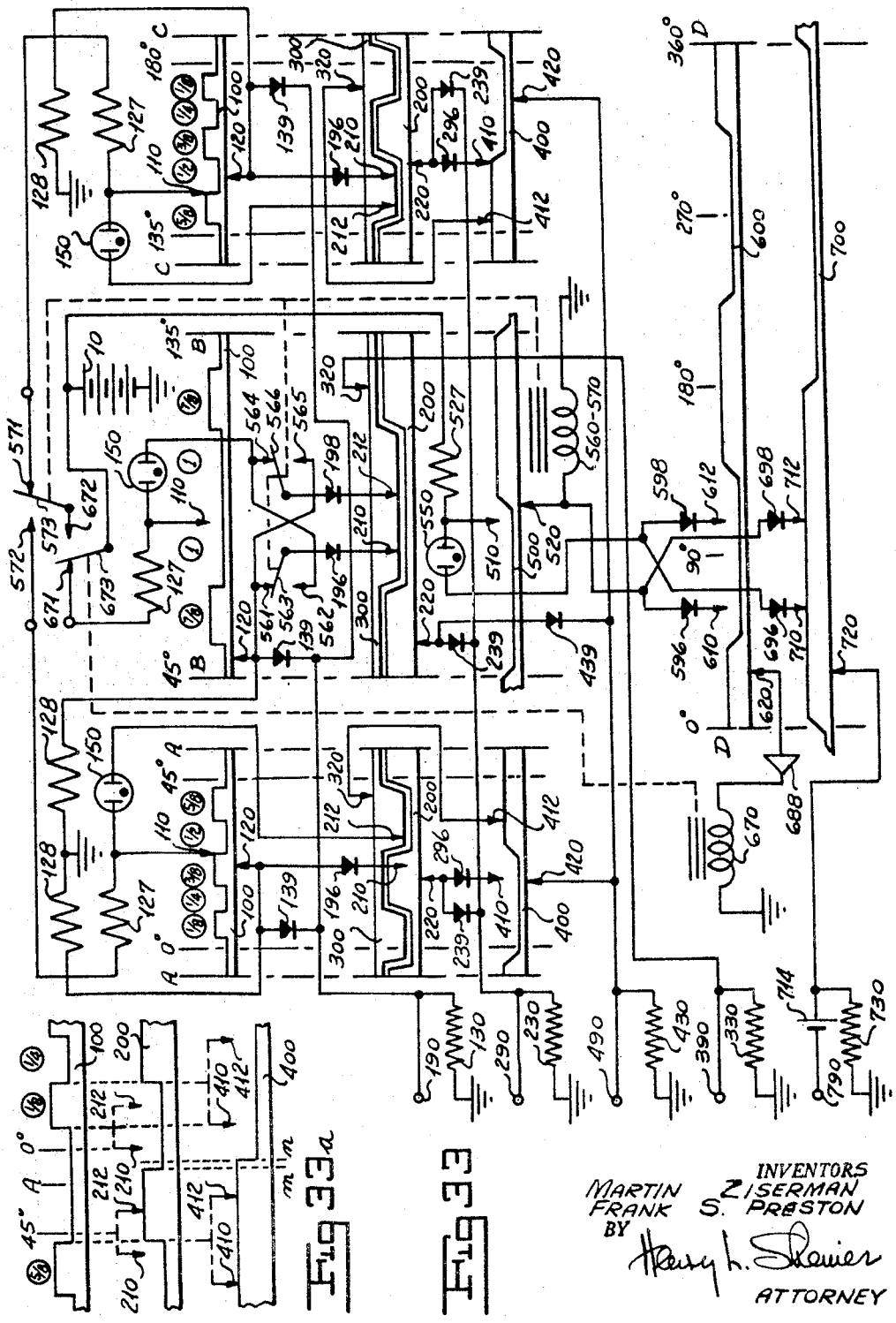

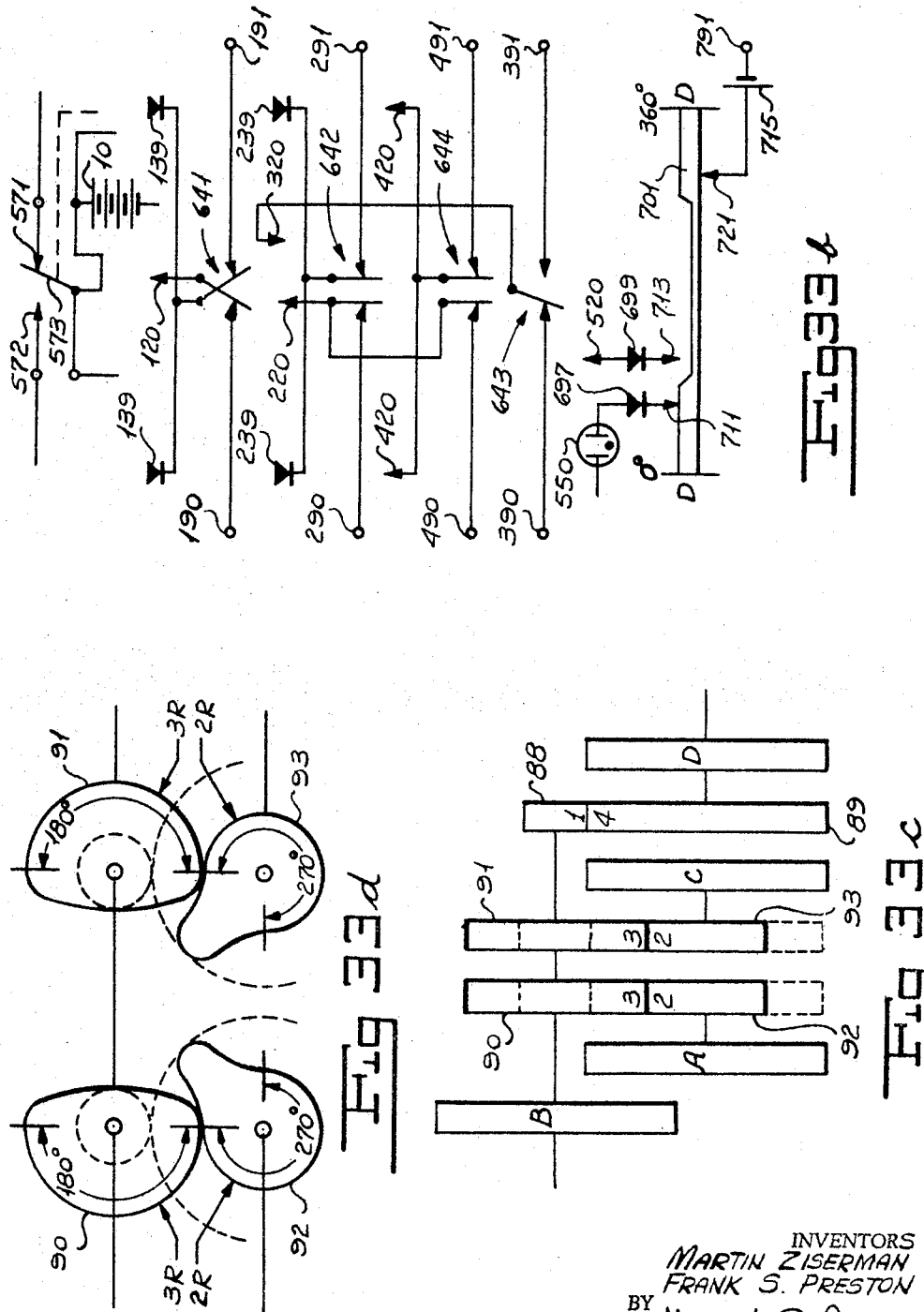

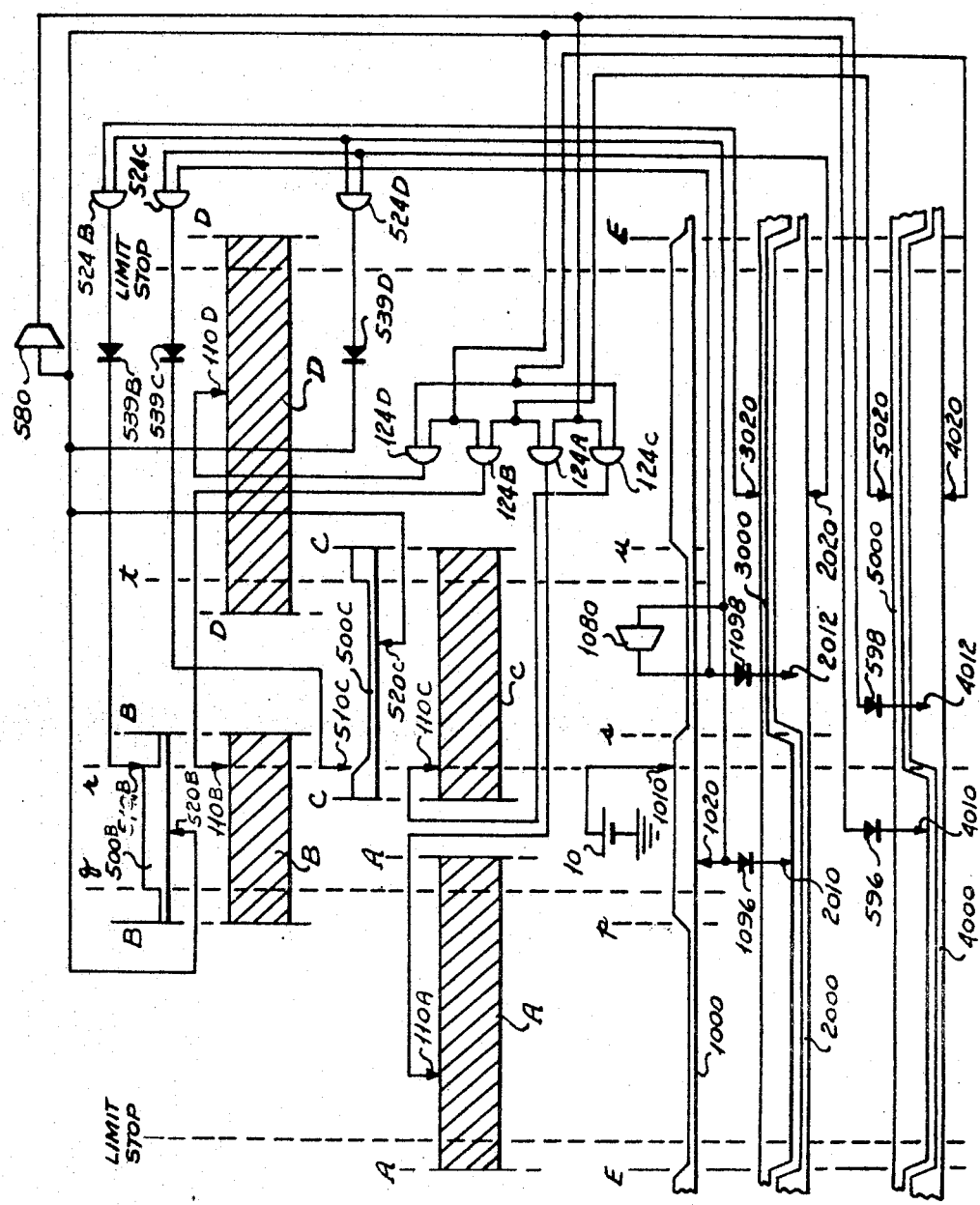

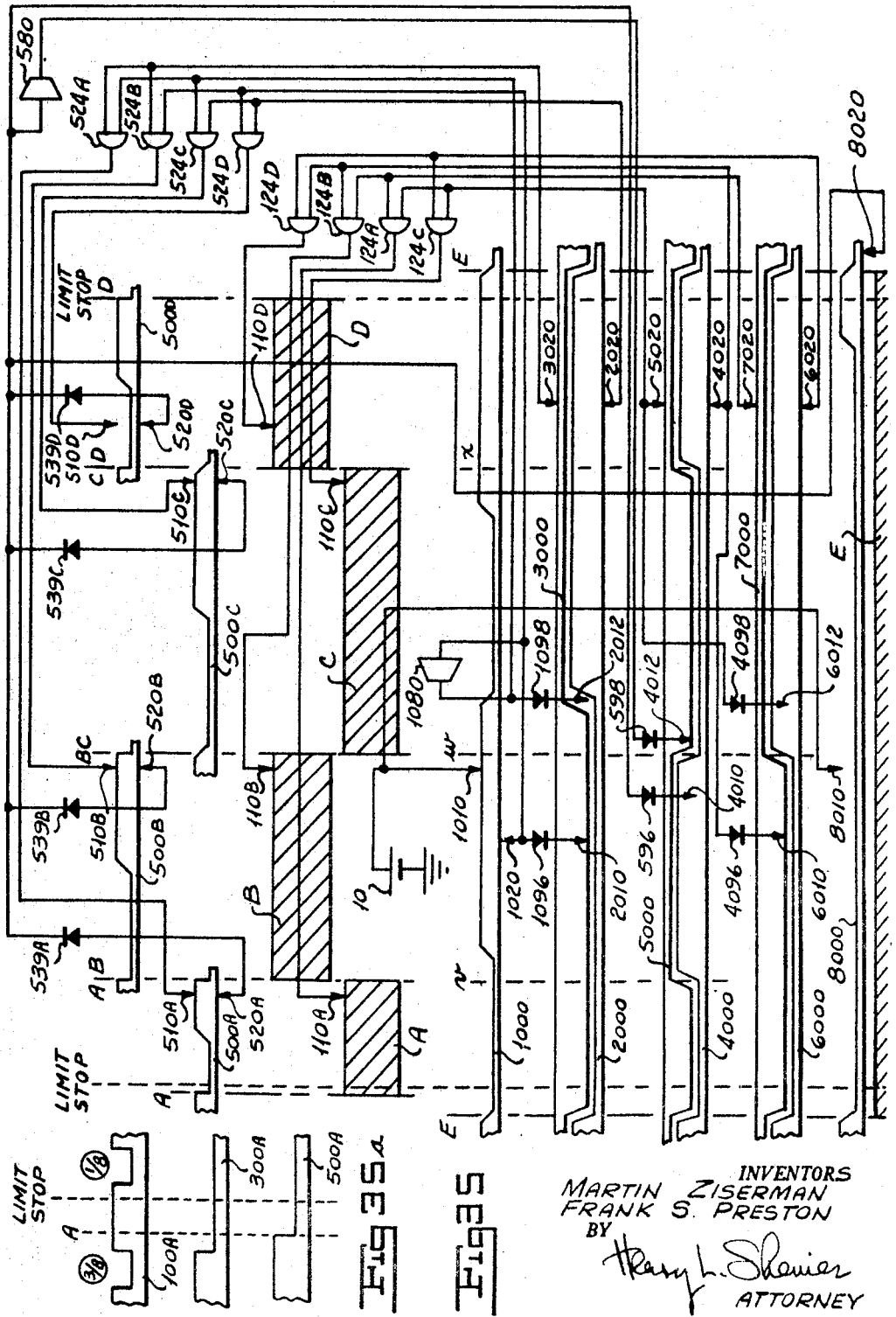

United States Patent Office 3,066,865
Patented Dec. 4, 1962

3,066,865
ARBITRARY FUNCTION ANALOGUE-TO-DIGITAL CONVERTER
Martin Ziserman, Hartsdale, and Frank S. Preston, Tarrytown, N.Y., assignors to United Aircraft Corporation, East Hartford, Conn., a corporation of Delaware
Filed Feb. 25, 1959, Ser. No. 795,372
39 Claims. (Cl. 235—154)

Our invention relates to analogue-to-digital converters and, more particularly, to converters for the production of a binary coded digital output as any desired function of relative motion.

The copending application of Jack B. Speller, Serial Number 464,774, filed October 26, 1954, now Patent No. 2,873,440, teaches the prevention of ambiguities in analogue-to-digital converters by the use of two inputs carrying signals which are complementary to one another, where the two inputs to any row or circle of conductive segments are derived directly from the two complementary output signals of the immediately preceding row or circle, and where the maximum count of a cyclical converter is limited to an integral power of the number "2." This derivation of complementary inputs from the two complementary outputs of the immediately preceding row or circle we have termed "cascading," and the allowable tolerances are doubled for each stage of cascading. A cyclical converter is one adapted to provide a jump, or discontinuous change in output representation, from a count greater than one to the count of zero. For example, the copending application of Jack B. Speller, when embodied in a cyclical configuration, is adapted to provide a jump or discontinuous change from the output representation of $2^n-1$, $n$ being 2, 3, 4, . . . , to the output representation of zero. The cyclical converted of Jack B. Speller, from another point of view, produces a triangular wave form rising from zero to the count of $2^n-1$ and then jumping to zero again, where the count again rises to repeat the same function. It was pointed out that this triangular wave form need not be a linear function, that is, the rising curve may be either concave from above or concave from below. If concave from above, rather than being linear, the function may follow a square law.

The copending application of Carl F. Schaefer and Jack B. Speller, Serial Number 562,438, filed January 31, 1956, now Patent No. 3,020,533, teaches the cascading taught in the Speller application with the addition that the two complementary inputs to certain rows or circles are derived directly from the two complementary outputs of some remote preceding row or circle. The cyclical maximum count shown in the Carl F. Schaefer et al. application may be any even number. For example, the converter of Carl F. Schaefer et al. is adapted to provide a discontinuous change or jump in output representation from the number "19" to the number "0." It will be noted that the number "19" is merely one less than the maximum count of "20" of such converter, "20" being merely an even number and not an integral power of number "2." The converter shown in the copending application of Carl F. Schaefer et al., is adapted to provide a function having a jump or discontinuous change in output representation between any large odd number and any small even number; for example, from the large odd number "19" to the small even number "6." In this respect it may be pointed out here that the count of "0" is in essence a small even number, and thus the cyclical converter which recycles to the count of "0" is merely another manner of expressing the fact that a converter is adapted to provide a discontinuous jump between nonadjacent large odd and small even numbers.

The copending application of Martin Ziserman, Serial Number 589,624, filed June 6, 1956, and now Patent No. 2,873,442, teaches cascading up to a certain row or circle, the derivation of the two complementary input signals to a subsequent row or circle from the two complementary output signals of some remote preceding row or circle, and subsequent cascading to provide a binary coded internally cyclic digital output in any even-ordered number system. The Ziserman application also teaches cascading up to a certain row or circle, the derivation of the two complementary input signals to some subsequent row from the two complementary output signals of a remote preceding row or circle, subsequent cascading, and the subsequent derivation of the two complementary input signals to a further subsequent row or circle from the two complementary output signals of a remote preceding row or circle which was subjected to subsequent cascading, in order to provide an externally cyclic converter yielding a binary coded digital output representation in any even-ordered-number system. The converter of Ziserman then provides jumps or discontinuities between large odd and non-adjacent small even numbers.

In each of the three aforementioned copending applications it was pointed out that where the count is a linear function, a linear representation, of relative movement or rotation, that a subsequent disk provided with a pattern may be reduction geared to rotate at a lower speed than that of the disk mounting the main converter pattern. There will be cascading between disks by the derivation of the two complementary input signals to the first circle mounted on the subsequent disk from the two complementary output signals of a circle mounted on the first disk; in order to provide an increased count. For in this interdisk cascading, for linear functions, the count will be increased by a factor; the count will be increased geometrically. In each of the three copending applications the count may be a nonlinear function of rotation, and this is permissible only so long as the converter pattern is provided on one and only one disk. It will be appreciated that it would be impossible to cascade between disks of a nonlinear converter. Therefore, none of the three aforementioned copending applications can provide a nonlinear count except on but a single disk.

Converters of the prior art, then can provide only functions containing discontinuities or jumps between non-adjacent large odd and small even counts; and, for non-linear counts, converters of the prior art are limited to but a single pattern disk.

One object of our invention is to provide an analogue to digital converter which provides a digital representation as any arbitrary predetermined function of displacement.

Another object of our invention is to provide an analogue to digital converter which produces an unambiguous output representation.

Still another object of our invention is to provide an analogue to digital converter with a high counting speed.

A still further object of our invention is to provide an analogue to digital converter for producing an unambiguous count as a function of displacement, where the function contains any type of discontinuity; that is, where the function jumps from any one count to any other nonadjacent count.

A still further object of our invention is to provide an analogue to digital converter which produces an unambiguous output representation as a function of displacement where the function is multiple valued; that is, where the function has a change in slope sign.

Another object of our invention is to provide an analogue to digital converter which provides an unambiguous output representation as a function of relative displacement where the function contains any discontinuity or jump between nonadjacent counts accompanied by a change in slope sign at the discontinuity.

Another object of our invention is to provide an analogue to digital converter which produces an unambiguous nonlinear count on a plurality of disks; that is, a converter providing a nonlinear count not limited to but a single pattern disk.

Other and further objects of our invention will appear from the following description.

In general our invention contemplates a first row or circle of conductive elements or segments mounted for movement with respect to a stationary housing, the length of the conductive segments perhaps corresponding to "1's" in the binary code, and the distance or nonconductive space between the elements perhaps corresponding to "0's" in the binary code. The lengths of and the spaces between the segments are varied according to the vagaries of the particular function which is to be represented. To an input brush mounted on the housing in such manner as to alternately contact the segments and spaces we apply an input excitation voltage. From the row or circle we obtain two complementary output signals, signals of opposite polarity or condition. These signals are applied to a second row or circle of conductive segments and nonconductive intersegmental spaces. The segments and spaces of the second circle may likewise represent "1's" and "0's" respectively in the binary code. The first circle provides the least significant digit and the second circle provides the next-to-least significant digit of the particular function to be represented. Usually there are half as many segments and spaces in the second circle as in the first, each segment "or" space of the second circle corresponding to one segment "and" one space of the first circle. Each transfer point of the second circle corresponds to a transfer point of the first circle; that is, whenever the count for second circle changes from "0" to "1" the count for the first circle changes from "1" to "0." Between each two transfer points of the second circle there lies a transfer point of the first circle. The two-to-one relationship of segments and spaces for the two circles in combination with the alternate stepping action of the two complementary input signals applied to the second circle operates to eliminate ambiguities so that when those transfer points of the first circle are reached which also correspond to transfer points of the second circle, the change in the complementary output signals of the first circle causes the output signal of the second circle to change simultaneously. Where the vagaries of the particular function to be represented do not permit of the necessary two-to-one segment and space relationship in a particular region of the function, we provide an auxiliary circle comprising a conductive segment whose two transfer points are not coincident, and do not correspond to any of the transfer points of the first circle. Only a single input signal is applied to the auxiliary circle. The output signal of the auxiliary circle is used to force, to artificially modify, the normal converter output representation into the correct converter output representation, or to make up any deficiencies in the requisite two-to-one segment and space relationship between the first and second circles by providing an extra alternation between the two complementary output signals, or to control the application of input excitation voltage to the first row or circle. It is by placing each transfer point of the auxiliary circle intermediate two predetermined transfer points of the first circle that we eliminate ambiguities, since at no time are the first and the auxiliary circles required to change their output simultaneously.

In the accompanying drawings which form part of the instant specification and which are to be read in conjunction therewith, and in which like reference numerals are used to indicate like parts in the various views:

FIGURE 1 is a developed schematic view of a converter which provides in the natural binary code by a first method a count containing a discontinuity or jump between large and small even numbers for the special case where the large even number is 2 and the small even number is 0.

FIGURE 2 is a developed schematic view of a converter which provides in the natural binary code by an inverse form of the first method a count containing a discontinuity or jump between large and small even numbers for the special case where the large even number is 2 and the small even number is 0.

FIGURE 3 is a developed schematic view of a converter which provides in the natural binary code by a second method a count containing a discontinuity or jump between large and small even numbers for the special case where the large even number is 2 and the small even number is 0.

FIGURE 4 is a developed schematic view of a converter which provides in the natural binary code by an inverse form of the second method a count containing a discontinuity or jump between large and small even numbers for the special case where the large even number is 2 and the small even number is 0.

Figure 5:
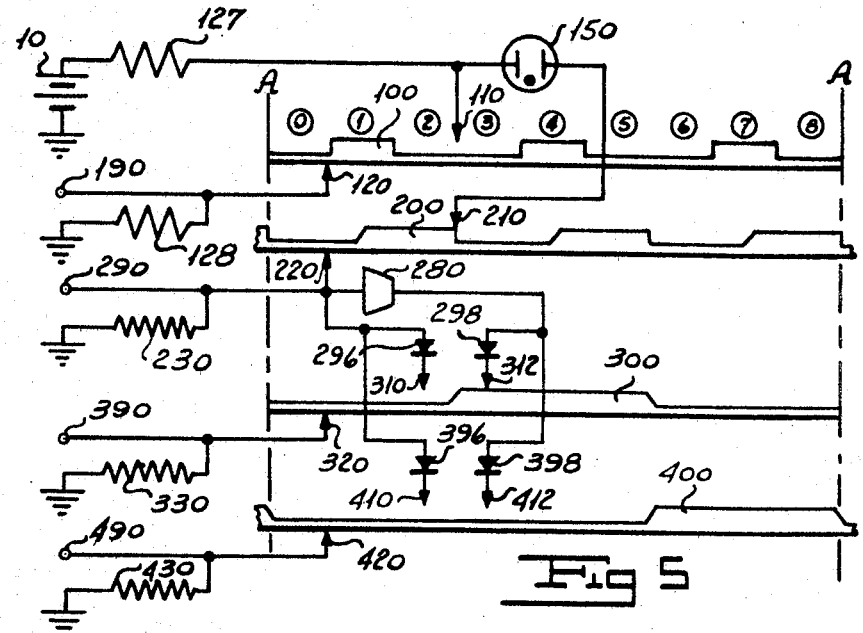
FIGURE 5 is a developed schematic view of an externally cyclic converter which provides by the first method a binary coded internally cyclic count in the special case of the ternary system.

FIGURE 7 is a developed schematic view of a converter which provides in the natural binary code a count containing a jump or discontinuity between a large odd number and a nonadjacent small even number as taught by Schaefer et al., and is furthermore a schematic view of a cyclic converter adapted to provide a nonlinear count on a plurality of disks or patterns where unambiguous interpattern switching is accomplished by the method of superextension of count, such that the count of the small even number also selectively represents a nonadjacent discontinuous superextended count.

FIGURE 8 is a developed schematic view of a converter which provides in the natural binary code a count containing a jump or discontinuity between a large odd number and a nonadjacent small even number as taught by Schaefer et al., and is furthermore a schematic view of a cyclic converter adapted to provide a nonlinear count on a plurality of disks or patterns where unambiguous interpattern switching is accomplished by the method of superextension of count, such that the count of the large odd number also selectively represents a nonadjacent discontinuous superextended count.

FIGURE 9 is a developed schematic view of a converter which provides in the natural binary code by the first method a discontinuity or jump between large and small odd numbers, and is furthermore a schematic view of a cyclic converter adapted to provide a nonlinear count on a plurality of disks or patterns where interpattern switching is accomplished by the method of superextension of count, such that the interval where the count is the small odd number also selectively represents an adjacent superextended count.

FIGURE 10 is a developed schematic view of a converter which provides in the natural binary code by the second method a count containing a jump or discontinuity between large and small odd numbers, and is furthermore a schematic view of a cyclic converter adapted to provide a nonlinear count on a plurality of disks or patterns where interpattern switching is accomplished by the method of superextension of count, such that the interval where the count is the large odd number also selectively represents an adjacent superextended count.

FIGURE 10a is a fragmentary schematic view showing the combination of alternate signals from those of FIGURE 10 to obtain a single signal to accomplish superextension of count.

FIGURE 11 is a developed schematic view of a converter which provides in the natural binary code by the first method a count containing a jump or discontinuity between large and small even numbers, and is furthermore a schematic view of a cyclic converter adapted to provide a nonlinear count on a plurality of disks or patterns where interpattern transfer is accomplished by the superextension of count, such that the interval where the count is the small even number also selectively represents an adjacent superextended count.

FIGURE 11a is a fragmentary schematic view showing a different combination of signals from those shown in FIGURE 11 to obtain a single signal to accomplish superextension of count.

FIGURE 12 is a developed schematic view of a converter which provides in the natural binary code by the second method a count containing a jump or discontinuity between large and small even numbers, and is furthermore a schematic view of a cyclic converter adapted to provide a nonlinear count on a plurality of disks or patterns where interpattern switching is accomplished by the superextension of count, such that the interval where the count is the large even number also selectively represents an adjacent superextended count.

FIGURE 13 is a developed schematic view of a converter which provides in the natural binary code by an adaptation of the first method a count containing a jump or discontinuity between a large even number and a nonadjacent small odd number, and is furthermore a schematic view of a cyclic converter adapted to provide a nonlinear count on a plurality of disks or patterns where interpattern switching is accomplished by the superextension of count, such that the interval where the count is the large even number also selectively represents an adjacent superextended count.

FIGURE 14 is a developed schematic view of a converter which provides in the natural binary code by an adaptation of the second method a count containing a jump or discontinuity between a large even number and a small odd number, and is furthermore a schematic view of a cyclic converter adapted to provide a nonlinear count on a plurality of disks or patterns where interpattern transfer is accomplished by the superextension of count, such that the interval where the count is the small odd number also selectively represents an adjacent superextended count.

FIGURE 14a is a fragmentary schematic view showing the combination of alternate signals from those of FIGURE 14 to obtain the single signal necessary for superextension of count.

FIGURE 15 is a developed schematic view of a converter which provides in the natural binary code by a special method a count containing any peak or local maximum and any dip or local minimum for the special case where the difference between the peak and the dip is two counts.

FIGURE 16 is a developed schematic view of a converter which provides in the natural binary code by an inverse form of the special method a count containing any peak or local maximum and any dip or local minimum for the special case where the difference between the peak and the dip is two counts.

FIGURE 17 is a developed schematic view of a converter which provides in the natural binary code by a second special method a count containing any peak or local maximum and any dip or local minimum for the special case where the difference between the peak and the dip is two counts.

FIGURE 18 is a developed schematic view of a converter which provides in the natural binary code by a general method a count containing either a local maximum at either an odd number or at a double interval length even number, or either a local minimum at either an even number or at a double interval length odd number, or both such odd or double interval even maximum and such even or double interval odd minimum.

Figure 19:
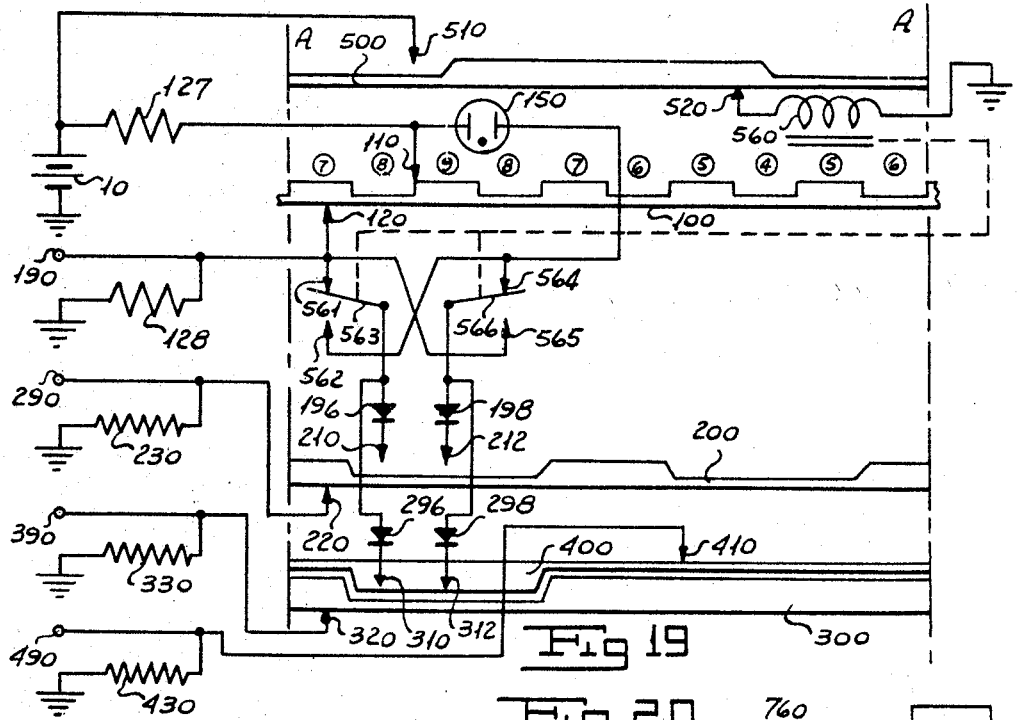

FIGURE 19 is a developed schematic view of a converter which provides in the natural binary code by the general method a count containing either a local maximum at either an odd number or at a double interval length even number, or either a local minimum at either an even number or at a double interval length odd number, or both such odd or double interval even maximum and such even or double interval odd minimum.

Figure 20:
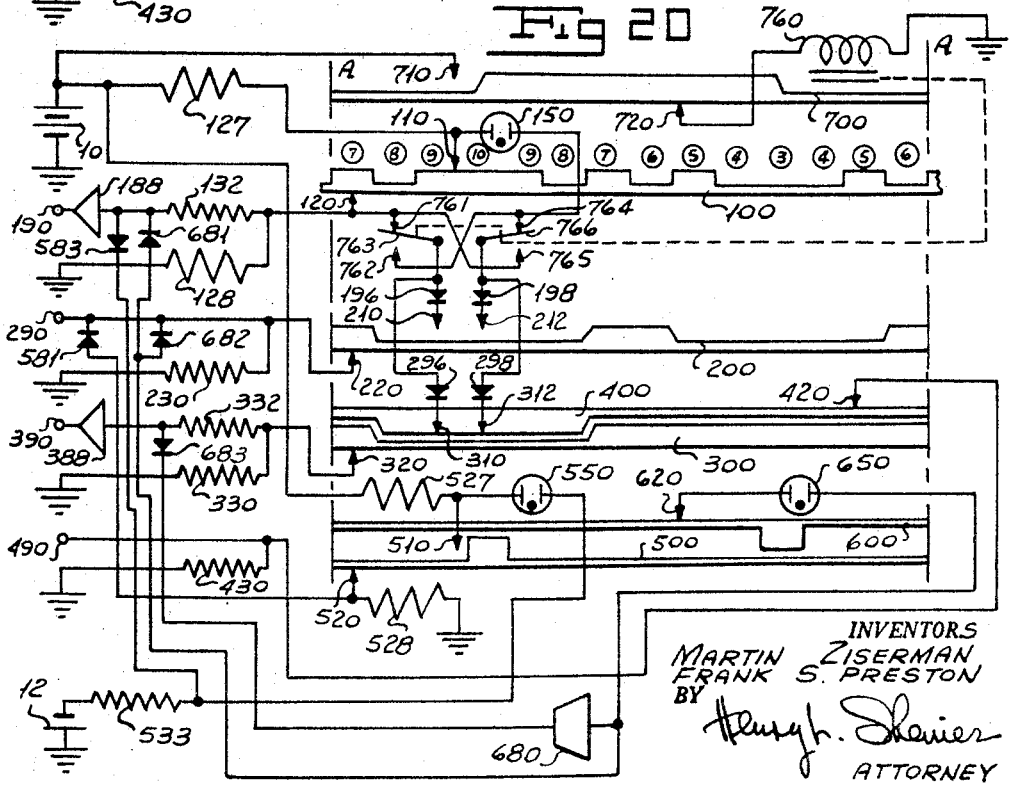

FIGURE 20 is a developed schematic view of a converter which provides in the natural binary code by a first adaptation of the general method a count containing either a peak or local maximum an even number, or either a dip or local minimum at an odd number, or both an even peak and an odd dip.

FIGURE 21 is a developed schematic view of a converter which provides in the natural binary code by a second adaptation of the general method a count containing either a jump or discontinuity between odd numbers accompanied by a change in slope sign at the discontinuity and constituting a local peak or maximum, or either a jump or discontinuity between even numbers accompanied by a change in slope sign at the discontinuity and constituting a local dip or minimum, or both such odd-odd discontinuous peak and such even-even discontinuous dip.

FIGURE 22 is a developed schematic view of a converter which provides in the natural binary code by a third adaptation of the general method a count containing either a jump or discontinuity between even numbers accompanied by a change in slope sign at the discontinuity, and constituting a local peak or maximum, or either a jump or discontinuity between odd numbers accompanied by a change in slope sign at the discontinuity and constituting a local dip or minimum, or both such even-even discontinuous peak and such odd-odd discontinuous dip.

FIGURE 23 is a developed schematic view of a converter which provides in the natural binary code by the third adaptation of the general method a count containing both a jump or discontinuity between even numbers accompanied by a change in slope sign at the discontinuity such as to constitute a local peak or maximum and also a jump or discontinuity between even numbers accompanied by a change in slope sign at the discontinuity such as to constitute a local dip or minimum.

FIGURE 24 is a developed schematic view of a converter which provides in the natural binary code by the third adaptation of the general method a count containing both a jump or discontinuity between odd numbers accompanied by a change in slope sign at the discontinuity such as to constitute a local peak or maximum and also a jump or discontinuity between odd numbers accompanied by a change in slope sign at the discontinuity such as to constitute a local dip or minimum.

FIGURE 25 is a developed schematic view of a converter which provides in the natural binary code, by the first method of the first adaptation of the general method, a count containing a jump or discontinuity between nonadjacent odd and even numbers accompanied by a change in slope sign at the discontinuity such as to constitute a local dip or minimum, and by the second method of the first adaptation of the general method, a count containing a jump or discontinuity between nonadjacent odd and even numbers accompanied by a change in slope sign at the discontinuity such as to constitute a local peak or maximum.

FIGURE 26 is a developed schematic view of a converter which provides in the natural binary code, as the converter of FIGURE 25, by the first method of the first adaptation of the general method, a count containing a jump or discontinuity between nonadjacent odd and even numbers accompanied by a change in slope sign at the discontinuity such as to constitute a local dip or minimum, and by the second method of the first adaptation of the general method, a count containing a jump or discontinuity between nonadjacent odd and even numbers accompanied by a change in slope sign at the discontinuity such as to constitute a local peak or maximum.

FIGURE 27 shows a step-wise incremental approximation to a sinusoidal function having a maximum value of 1 with a resolution of $2^{-3}$ or 1/8, where the error criterion is that the positive and negative errors are equal in each interval, the function changing at that value of the argument which corresponds to half the incremental change of the function such that the maximum positive or negative error is $2^{-4}$ or 1/16.

FIGURE 28 is a schematic view of a converter which provides in the natural binary code on a single pattern disk a cyclic periodic count representative of a sinusoidal function and is so placed under FIGURE 27 that the points of incremental change of function correspond to the transfer points between conductive segments and nonconductive intersegmental spaces of the converter pattern.

FIGURE 29 is a developed schematic view of a converter which provides in the natural binary code on two patterns a cyclic periodic count representative of a sinusoidal function where interpattern switching is accomplished by the superextension of count.

FIGURE 29a is a fragmentary developed schematic view showing interpattern switching alternative to that shown in FIGURE 29 to provide a resolver producing both the sine and cosine functions simultaneously.

FIGURE 30 is a developed schematic view of a converter which provides in the natural binary code on four patterns a cyclic periodic count representative of a sinusoidal function where interpattern switching is accomplished by the superextension of count.

Figure 31:
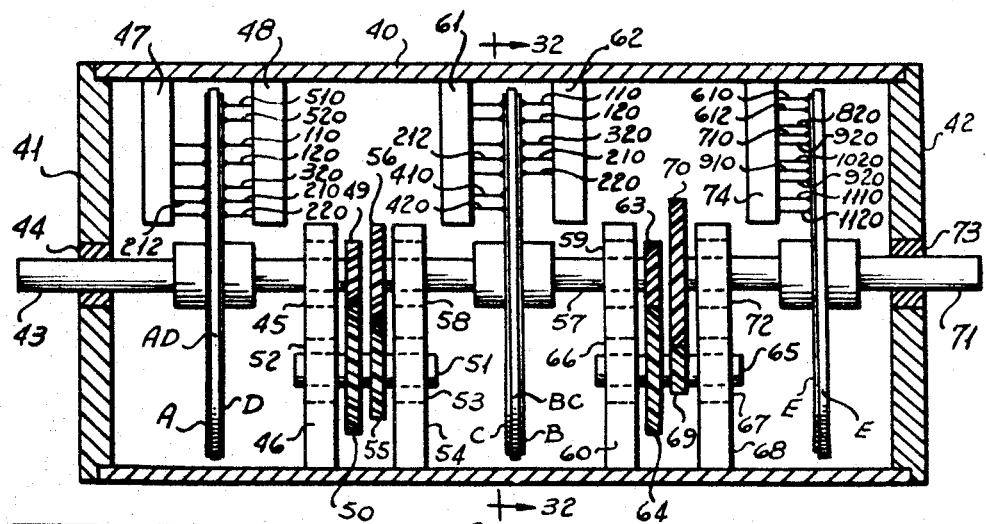

FIGURE 31 is a sectional view of the sinusiodal four-pattern converter of FIGURE 30.

Figure 32:
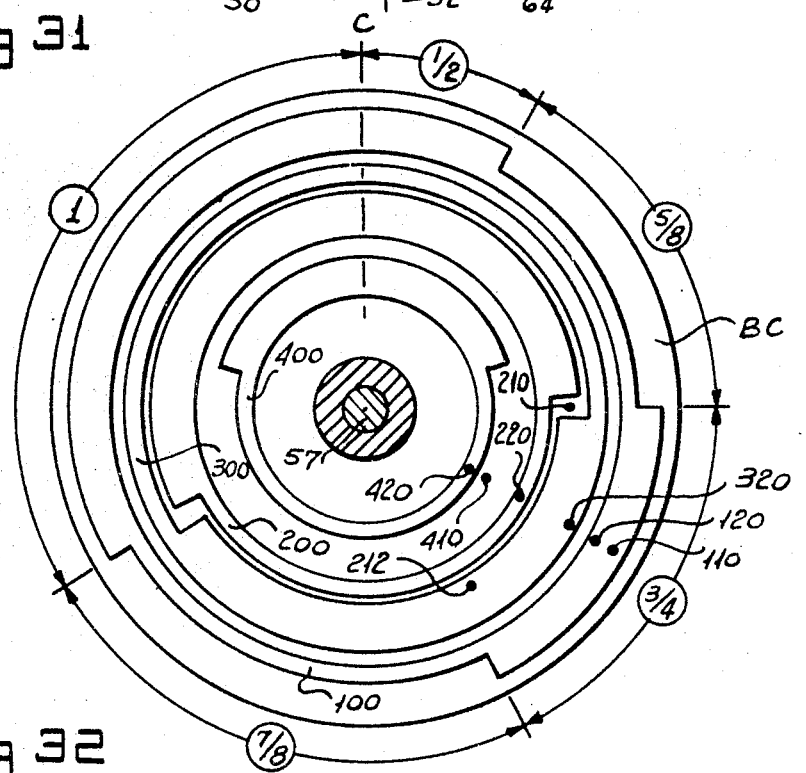

FIGURE 32 is a sectional view taken along the line 32—32 of FIGURE 31 showing the artwork of pattern C.

Figure 30A:
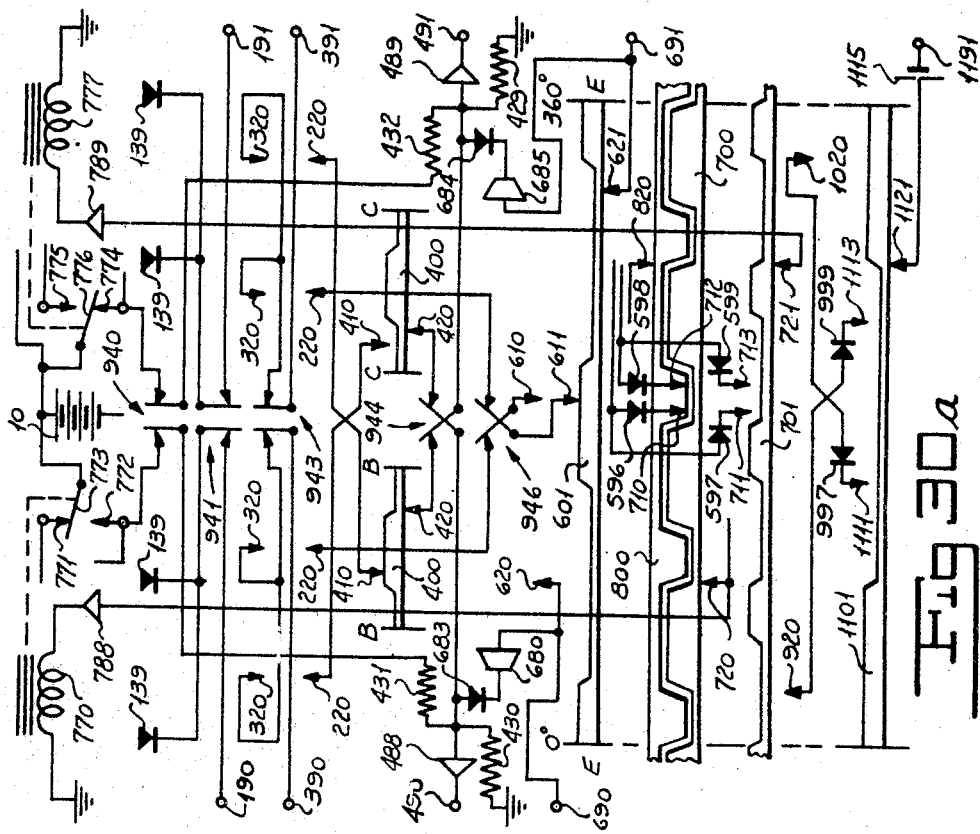

FIGURE 30a is a fragmentary developed schematic view showing interpattern switching alternative to that shown in FIGURE 30 to provide a resolver producing both the sine and cosine functions simultaneously.

Figure 31B:
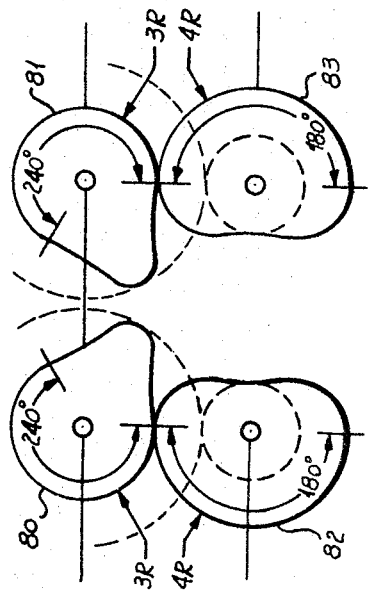
Figure 31A:
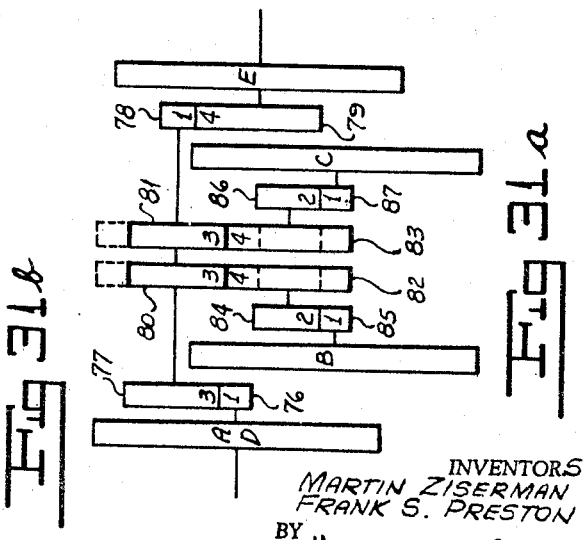

FIGURE 31a is a schematic view of the gearing for the resolver of FIGURE 30a.

FIGURE 31b is a fragmentary schematic view showing the alignment of the two pairs of nonlinear gears for the resolver of FIGURE 30a.

FIGURE 33 is a developed schematic view of a converter which provides in the natural binary code on three patterns a cyclic periodic count representative of a sinusoidal function where interpattern switching is accomplished by the abbreviation of patterns.

FIGURE 33a is a fragmentary schematic view of one of the abbreviated patterns of the converter of FIGURE 33 showing in detail the placement of transfer points within the inactive portion of the abbreviated patterns to maximize the allowable tolerances.

FIGURE 33b is a fragmentary developed schematic view showing interpattern switching alternative to that shown in FIGURE 33 to provide a resolver producing both the sine and cosine functions simultaneously.

FIGURE 33c is a schematic view of the gearing for the resolver of FIGURE 33b.

FIGURE 33d is a fragmentary schematic view showing the alignment of the two pairs of nonlinear gears for the resolver of FIGURE 33b.

FIGURE 34 is a developed schematic view of a noncyclic converter of limited rotation providing a nonperiodic count on four patterns where unambiguous interpattern switching is accomplished by the abbreviation of patterns and where interpattern switching is controlled by the generation of coarse and single-frequency fine interpattern switching signals.

FIGURE 35 is a developed schematic view of a noncyclic converter of limited rotation which provides a nonperiodic count on four patterns where unambiguous interpattern switching is accomplished by the superextension of count and where interpattern switching is controlled by the generation of coarse and double-frequency fine interpattern switching signals.

FIGURE 35a is a fragmentary schematic view of a pattern of FIGURE 35 adjacent a limit stop showing the prevention of ambiguities by allowing only semisuperextension of count.

In each of the drawings the encircled numbers represent the various digital representations or counts as the patterns move under the stationary brushes.

In each of the drawings, except as otherwise indicated, a segment having a vertical end indicates a critical transfer point, a transfer point where only small or no tolerances are allowable, a transfer point at which signals originate, while a segment having a slope or slanting end indicates a noncritical transfer point, a transfer point where larger tolerances are permitted, a transfer point at which are received signals originated elsewhere. The purpose of this differentation was not functional, but rather was for clarity and ease of understanding.

In speaking of numbers we shall always mean the absolute value of the number since the sign which is either plus or minus may easily be appended once the absolute value is provided; for example, a count which proceeds . . . 7, 6, 5, 4, . . . is for our purposes essentially the same as a count which proceeds . . . +7, −6, +5, −4, . . . . Furthermore, when speaking of "odd" or "even" numbers we mean more than merely integers and include fractions or rational numbers; for example: an output representation of 3/16 or $3\times 2^{-4}$ is for our purposes an "odd" number, while 4/32 or $4\times 2^{-5}$ is for our purposes an "even" number.

*Functions Containing Simple Discontinuities or Jumps Between Large and Small Even Numbers for the Special Case where the Large Even Number is 2 and the Small Even Number is 0*

Referring now to FIGURE 1, a source of input excitation voltage such as a battery 10 has its negative terminal grounded and its positive terminal connected through an input resistor 127 to a first circle input brush 110, stationarily disposed to alternately contact the conductive segment and nonconductive intersegmental space of a first circle 100. A first circle output brush 120 stationarily disposed to be always in electrical contact with the conductive segment of first circle 100 is connected to first circle output terminal 190 and through an input loading resistor 128 to ground. First circle input brush 110 is connected through a neon glow tube 150 to a single second circle input brush 210, stationarily disposed to alternately contact the segment and space of a second circle 200. Second circle output brush 220 is connected to an output terminal 290 and through a loading resistor 230 to ground. Circles 100 and 200 are concentrically mounted on a nonconductive disk not shown and the pattern is shown cut along line A and developed.

Input resistor 127 and input loading resistor 128 are of equal resistance values which are small when compared with that of loading resistor 230; and glow tube 150 sustains a voltage drop one-half the voltage of the input excitation battery 10. The effect of input resistor 127 and input loading resistor 128 and glow tube 150 combined with the action of input brush 110 in making and breaking contact with the segment of circle 100 is that of a passive flip-flop circuit to produce two output signals complementary to one another at first circle output brush 120 and at second circle input brush 210. When brush 110 lies in a nonconductive space, first circle output brush 120 rests at ground potential while brush 210 is at one-half of potential of battery 10 due to the voltage drop across glow tube 150. When brush 110 contacts the conductive segment of circle 100, output brush 120 rises to a potential substantially half that of input excitation battery 10 due to the two-to-one voltage dividing action of input resistor 127 and input loading resistor 128. While at the same time, input brush 210 drops to ground potential. The passive flip-flop circuit thus produces two complementary output signals of opposite polarity or condition.

The converter is shown in the ① interval adjacent the ①—② transfer point. In the ⓪ interval, first circle input brush 110 and second circle input brush 210 both lie in nonconductive spaces of respective circles 100 and 200 and no output signals are produced at terminals 190 and 290, both of which rest at ground potential representing "0's." At the ⓪—① transfer point brush 110 contacts the segment of circle 100 causing output terminal 190 to become positive and thereby represent a "1" for the least significant digit; and, at the same time, brush 210 drops to ground potential. Somewhere intermediate the ① interval, preferably in the center thereof, the single input brush 210 to the second circle 200 makes contact with the segment of circle 200; but, since brush 210 rests at ground, this does not affect the output of "0" at terminal 290. At the ①—② transfer point brush 110 breaks contact with the segment of circle 100 allowing output terminal 190 to drop to ground to thereby represent an "0" again. At the same time, input brush 210 becomes positive and since brush 210 now contacts the segment of circle 200, it causes output terminal 290 to become positive, thereby representing a "1" for the second-to-least significant digit. A "1" at terminal 290 represents a count of 2. At the ②—⓪ transfer point brush 210 breaks contact with the segment of circle 200 allowing output terminal 290 to return to ground to again represent "0."

It is seen then that the ⓪—① and the ①—② transfer points are governed and controlled by the ends of the segment of circle 100, while the ②—⓪ transfer point is controlled by one end of the segment of circle 200. The location of the other end of the segment of circle 200 is not critical and does not control a change in count or output representation and is preferably placed in the middle of the ① interval to allow a tolerance of ±1/2 the length of arc subtended by the segment of first circle 100.

Referring now to FIGURE 2, a source of input excitation voltage, battery 10, has its negative terminal grounded and its positive terminal connected through an input resistor 127 to a first circle input brush 110 stationarily disposed to alternately contact the conductive segment and nonconductive intersegmental space of a first circle 100. First circle input brush 110 is connected to one terminal of a neon glow tube 150. The other terminal of glow tube 150 is connected to first circle output terminal 190 and through a loading resistor 130 to ground. A first circle output brush 120 stationarily disposed to always be in electrical contact with the conductive segment of first circle 100 is connected through an input loading resistor 128 to ground. First circle output brush 120 is further connected to a second circle input brush 210 stationarily disposed to alternately contact the segment and space of a second circle 200. Second circle output brush 220 is connected to an output terminal 290 and through a loading resistor 230 to ground. Circles 100 and 200 are concentrically mounted on a nonconductive disk, not shown, and the pattern is shown cut along line A and developed.

The converter is shown in the ① interval adjacent the ①—② transfer point. In the ⓪ interval first circle input brush 110 contacts the conductive segment of first circle 100. Because of the two-to-one voltage dividing action of input resistor 127 and input loading resistor 128, first circle input brush 110 is at one-half the potential of input excitation battery 10. The voltage drop across glow tube 150 causes first circle output terminal 190 to rest at ground potential representing "0." Also during the ⓪ interval second circle input brush 210 lies in the nonconductive space of second circle 200 allowing second circle output terminal 290 to rest at ground representing "0." At the ⓪—① transfer point brush 110 breaks contact with the segment of circle 100, thus allowing first circle input brush 110 to rise to a potential substantially equal to that of battery 10, and causing first circle output terminal 190 to rise to a potential substantially one-half that of battery 10, thus representing a "1" for the least significant digit. When output terminal 190 becomes positive first circle output brush 120 and second circle input brush 210 both drop to ground potential. Intermediate the ① interval, preferably in the middle thereof, second circle input brush 210 contacts the segment of second circle 200; but, because brush 210 rests at ground potential, this does not affect the output of "0" which continues to appear at second circle output terminal 290. At the ①—② transfer point brush 110 contacts the segment of first circle 100 causing output terminal 190 to drop to ground, thereby representing a "0" again, and, at the same time, causing second circle input brush 210 to become positive. Since at the ①—② transfer point brush 210 contacts the segment of circle 200 output terminal 290 likewise becomes positive representing a "1" for the next-to-least significant digit which, in turn, represents the count of 2. At the ②—⓪ transfer point second circle input brush 210, carrying a signal, breaks contact with an end of the segment of second circle 200 allowing output terminal 290 to drop to ground and representing "0."

It is seen then that in FIGURE 2, as in FIGURE 1, the ⓪—① and the ①—② transfer points are controlled and determined by the ends of the segment of first circle 100, while the ②—⓪ transfer point is controlled by one end of the segment of circle 200. The location of the other end of the segment of circle 200 is not critical and does not control a change in count or output representation, and is preferably placed in the middle of the ① interval to allow a tolerance of ±1/2 the length of arc subtended by the intersegmental space of first circle 100.

FIGURES 1 and 2 are inverse forms of a first method. By "inverse forms" we mean that for the first circles 100 of FIGURE 1 and FIGURE 2, segments are replaced by spaces and spaces are replaced by segments, but the transfer points of inverse forms are coincident. Where segments and spaces are inverted, the sense of the two complementary outputs must be correspondingly inverted; that is, the direct output is replaced by the complementary output and the complementary output is replaced by the direct output.

Table 1-2 shows the outputs at terminals 190 and 290 for both FIGURE 1 and FIGURE 2 as the converter patterns are moved under the stationary brushes to successively occupy the intervals ⓪, ①, ② and ⓪ again.

| Interval | Output at Terminals | | Binary Count | Decimal Count |
|---|---|---|---|---|
| | 290 | 190 | | |
| ⓪ | 0 | 0 | 00 | 0 |
| ① | 0 | 1 | 01 | 1 |
| ② | 0→1 | 0 | 10 | 2 |
| ⓪ | 0 | 0 | 00 | 0 |

Table 1-2

Referring now to FIGURE 3, a source of input excitation voltage, battery 10, has its negative terminal grounded and its positive terminal connected to a first circle input brush 110 stationarily disposed to alternately contact the conductive segment and nonconductive intersegmental space of a first circle 100. A first circle output brush 120 stationarily disposed to always be in electrical contact with the conductive segment of circle 100 is connected through a loading resistor 130 to ground and through a summing resistor 132 to the input of a one-to-one buffer amplifier 188 the output of which is connected to first circle output terminal 190. First circle output brush 120 is further connected to a second circle input brush 210 stationarily disposed to alternately contact the segment and space of a second circle 200. A second circle output brush 220 is connected to an output terminal 290 and through a loading resistor 230 to ground. The second circle output brush 220 is further connected to the input of an inverting amplifier or flip-flop circuit 280, the output of which is connected backwardly through a crystal or diode 283 to the input of buffer amplifier 188. Circles 100 and 200 are concentrically mounted on a non-conducted disk, not shown, and the pattern is cut radially along line A and developed.

Buffer amplifier 188 is conveniently a one-to-one amplifier such as a grounded plate vacuum tube cathode follower or with equal advantage a grounded collector transistor emitter follower. The purpose of the buffer amplifier 188 is to provide a low output impedance at terminal 190 rather than the high output impedance of summing resistor 132.

Inverting amplifier or flip-flop or trigger circuit 280 is conveniently a positive feed-back or regenerative circuit well known to the art, or alternately, a grounded cathode single vacuum tube amplifier, or, with equal advantage, a grounded emitter single stage transistor amplifier. The output impedance of inverting amplifier or flip-flop circuit 280 in this instance need not be low and may be rather high, since it operates only upon the high impedance combination of summing resistor 132 and the input impedance of buffer amplifier 188; and the loading effect of these upon the output of inverting amplifier or trigger circuit 280 is substantially constant and independent of any load at output terminal 190. The input and output signals of inverting amplifier 280 comprises a pair of complementary signals produced by the action of an active flip-flop circuit.

The converter is shown at the ①—② transfer point. At the ⓪—① transfer point input brush 110 contacts the segment of circle 100 causing output brush 120 to become positive. The positive signal at brush 120 is coupled through summing resistor 132 to the input of buffer amplifier 188 and a substantially equal positive voltage is then produced at output terminal 190, thereby representing a "1" for the least significant digit. Brush 210 now carries a signal, but, since it lies in the space of circle 200, second circle output brush 220 continues to rest at ground. With output brush 220 at ground, inverting amplifier 280 produces a positive output voltage at least equal to that of input excitation battery 10 so that crystal 283 sustains either no or only an inverse voltage and cannot affect the signal appearing at the input of buffer amplifier 188. The back resistance of crystal 283 should be large compared with the resistance value of summing resistor 132. At the ①—② transfer point second circle input brush 210 contacts the segment of circle 200 causing output terminal 290 to become positive, thereby representing a "1" for the next-to-least significant digit which, in turn, represents the count of 2. The normal count of the convertor during the ② interval is 3 which is greater by 1 than the desired count of 2. However, the positive signal appearing at output terminal 290 and at the input of inverting amplifier 280 causes its output to drop to ground potential. The output of inverting amplifier 280 in dropping to ground carries with it the input to buffer amplifier 188 by virtue of the forward current now drawn by crystal 283 through summing resistor 132. With its input now resting at ground, the output of buffer amplifier 188 likewise drops to ground causing the output at terminal 190 to be modified from a "1" to a "0" thereby decreasing the normal count of 3 by 1 to the desired output representation of 2 during the ② interval. At the ②—⓪ transfer point input brush 110 breaks contact with the segment of first circle 100, thus allowing output brush 120 to drop to ground and with it input brush 210 and output brush 220. Output terminal 290 likewise drops to ground representing a "0." At the same time, the input of inverting amplifier 280 in dropping to ground potential causes its output to rise to a positive voltage at least equal to that of input excitation battery 10. Crystal 283 now sustains an inverse voltage equal to the output voltage of inverting amplifier 280. But the back resistance of crystal 283 being large compared with the resistance value of summing resistor 132, output terminal 190 continues to rest at ground, representing an "0." Intermediate the ②—⓪ and ⓪—① transfer points, that is, intermediate the ⓪ interval, preferably in the middle thereof, brush 210 breaks contact with the segment of second circle 200, but since input brush 210 and output brush 220 both rest at ground potential, this does not affect the "0" existing at output terminal 290.

It is seen then that the ⓪—① and ②—⓪ transfer points are controlled by the ends of the segment of circle 100, while the ①—② transfer point is controlled by one end of the segment of circle 200. The location of the other end of the segment of circle 200 is not critical and does not control a change in count or output representation and is preferably placed in the middle of the ⓪ interval to allow a tolerance of ±½ the length of arc subtended by the space of first circle 100.

Referring now to FIGURE 4 a source of input excitation voltage, battery 10, has its negative terminal grounded and its positive terminal connected through input resistor 127 to an input brush 110 stationarily disposed to alternately contact the segment and space of a first circle 100. A first circle output brush 120 is connected through an input loading resistor 128 to ground. First circle input brush 110 is connected to the positive terminal of a neon glow tube 150. The negative terminal of glow tube 150 is connected through a loading resistor 130 to ground and through a summing resistor 132 to the input of a buffer amplifier 188, the output of which is connected to terminal 190. The negative terminal of glow tube 150 is further connected to a second circle input brush disposed to alternately contact the segment and space of a second circle 200. Second circle output brush 220 is connected to the input of an inverting amplifier or flip-flop or trigger circuit 280 and to output terminal 290 and finally through a loading resistor 230 to ground. The output of inverting amplifier 280 is connected backwardly through a crystal 283 to the input of buffer amplifier 188. Circles 100 and 200 are concentrically mounted on a non-conductive disk, not shown, and the pattern is cut radially along line A and developed. In FIGURE 4, as in FIGURE 3, inverting amplifier 280 may have a high output impedance.

The converter is shown at the ①—② transfer point. At the ⓪—① transfer point input brush 110 breaks contact with the segment of first circle 100 causing output terminal 190 to become positive representing a "1" for the least significant digit and, at the same time, input brush 210 becomes positive. But output terminal 290 continues to rest at ground representing a "0" for the next-to-least significant digit, since brush 210 lies in the space of circle 200. The input of inverting amplifier or flip-flop circuit 280 likewise rests at ground potential causing its output to rise to a positive potential at least equal to that of brush 210 so that crystal 283 sustains either no voltage or only an inverse voltage. At the ①—② transfer point, brush 210, carrying a signal, contacts the segment of second circle 200 causing output terminal 290 to become positive representing a "1" for the next-to-least significant digit which, in turn, indicates a count of 2. The normal converter output represented during the ② interval is the count of 3 which is greater by 1 than the desired output representation of 2. The converter output must then accordingly be modified. When output terminal 290 becomes positive, the positive input of inverting amplifier 280 causes its output to drop to ground potential and carries with it the input of buffer amplifier 188 by virtue of the forward current drawn by crystal 283 through summing resistor 132. When the input of buffer amplifier 188 drops to ground, output terminal 190 likewise drops to ground potential, thereby changing the output representation at terminal 190 from "1" to a "0," thus modifying and decreasing the normal converter output representation of 3 by 1 to the desired count of 2 during the ② interval. At the ②—⓪ transfer point, input brush 110 contacts the segment of circle 100 casuing input brush 210 to drop to ground and allowing output terminal 290 and the input of inverting amplifier 280 to likewise drop to ground potential. The output of inverting amplifier 280 now rises to a positive potential, but it cannot affect the input of buffer amplifier 188 because of the blocking action of crystal 283, and, hence, both output terminals 190 and 290 rest at ground potential representing "0's." Intermediate the ②—⓪ and ⓪—① transfer points, that is, intermediate the ⓪ interval, preferably in the middle thereof, brush 210 resting at ground breaks contact with the segment of circle 200 but this does not affect the output of "0" at terminal 290.

It is seen then that in FIGURE 4, as in FIGURE 3, the ⓪—① and ②—⓪ transfer points are controlled by the ends of the segment of first circle 100 while the ⓪—① transfer point is controlled by one end of the segment of circle 200. The location of the other end of the segment of circle 200 is not critical and does not control a change in count or output representation and is preferably placed in the middle of the ⓪ interval to allow a tolerance of ±½ the length of arc subtended by the segment of first circle 100.

FIGURES 3 and 4 are inverse forms of a second method and it will be noted that in FIGURES 3 and 4 for first circles 100, segments are replaced by spaces and spaces are replaced by segments; and, correspondingly, direct outputs are replaced by complementary outputs. In FIGURES 3 and 4 for first circles 100, only the direct output was required, and pairs of complementary outputs were not needed for the first circles 100. Complementary outputs in FIGURES 3 and 4 were produced from second circles 200 by means of active flip-flop circuits 280.

Table 3-4 shows the outputs at terminal 290 and the modified outputs at terminal 190 for both normal and modified outputs at terminal 190 for both FIGURE 3 and FIGURE 4 as the converter patterns are moved under the stationary brushes to successively occupy the intervals ⓪, ①, ②, and ⓪ again.

| Interval | Output at Terminals | | Binary Count | Decimal Count |
|---|---|---|---|---|
| | 290 | 190 | | |
| ⓪ | 0 | 0 | 00 | 0 |
| ① | 0 | 1 | 01 | 1 |
| ② | 0→1 | 1→0 | 10 | 2 |
| ⓪ | 0 | 0 | 00 | 0 |

Table 3-4

Where there is a jump or discontinuity between a large odd number and a small even number, the solution may be had by the method taught by Schaefer et al. This jump or discontinuity might be termed "natural" since it does not require the use of our invention.

In FIGURES 1 through 4, omitting from consideration for the moment the circles 200, the patterns appear to have a natural count alternating between 0 and 1. In FIGURES 1 and 2, the patterns appear to provide a count which proceeds 1, 0, 0, 1. The patterns appear to provide a nonlinear count alternating between 0 and 1, where the count of 0 is of a double interval length. In FIGURES 3 and 4 the patterns appear to provide a count which proceeds 0, 1, 1, 0. The patterns appear to provide a nonlinear count alternating between 1 and 0 where the count of 1 is of double interval length. The patterns of FIGURES 1 through 4 appear to provide natural counts, but which are nonlinear, there being a count of double interval length, for FIGURES 1 and 2, the count of 0, and for FIGURES 3 and 4, the count of 1. When considering the effect of circles 200 in FIGURES 1 through 4, it is seen that a portion of the count which appears to be of double interval length is actually the count of 2. In FIGURES 1 and 2, a portion of the double interval length segment or space which appears to represent the count of 0 actually represents the count of 2. In FIGURES 3 and 4, a portion of the double interval length segment or space which appears to represent the count of 1 actually represents the count of 2. In the first method as embodied in FIGURES 1 and 2, only a portion of the double interval length segment or space represents the small even number which in this case is 0. In the second method as embodied in FIGURES 3 and 4, only a portion of the double interval length segment or space represents the count of the large odd number, which in this case is 1.

*Binary Coded Counts in Odd-Ordered Number Systems for the Special Case of the Ternary System*

Referring now to FIGURE 5, a source of input excitation voltage, battery 10, has its negative terminal grounded and its positive terminal connected through an input resistor 127 to an input brush 110 stationarily disposed to alternately contact the conductive segments and nonconductive spaces of a first circle 100. First circle output brush 120, stationarily disposed to always be in electrical contact with the segments of circle 100, is connected to first circle output terminal 190 and through an input loading resistor 128 to ground. First circle input brush 110 is connected through a neon glow tube 150 to second circle input brush 210 which is disposed to alternately contact the segments and spaces of second circle 200. A second circle output brush 220 is connected to second circle output terminal 290 and through a loading resistor 230 to ground. Second circle output brush 220 is also connecting to the input of an inverting amplifier, flip-flop circuit, or trigger circuit 280. Output brush 220 is further connected forwardly through a crystal 296 to one input brush 310 of a pair of input brushes 310 and 312 disposed to alternately contact the segment and space of a third circle 300. The output of flip-flop circuit 280 is connected forwardly through a crystal 298 to brush 312. Input brushes 310 and 312 are spaced apart a length of arc equal to one interval length of the nine equal interval lengths of circle 100. Third circle output brush 320 is connected to third circle output 390 and through loading resistor 330 to ground. Second circle output brush 220 is also connected forwardly through a crystal 396 to one input brush 410 of a pair of input brushes 410 and 412 disposed to alternately contact the segment and space of a fourth circle of segment 400. The output of trigger circuit 280 is also connected forwardly through a crystal 398 to brush 412. Brushes 410 and 412 are spaced apart a length of arc equal to that between brushes 310 and 312. Fourth circle output brush 420 is connected to fourth circle output terminal 490 and through a loading resistor 430 to ground. Circles 100 through 400 are concentrically mounted on a nonconductive disk, not shown, and the pattern is shown cut radially along line A and developed.

The inverting amplifier or flip-flop or trigger circuit 280 in this application should have a low output impedance since a load at output terminals 390 and 490 may require considerable current and may furthermore vary over a wide range of impedances. Inverting amplifier 280 then may conveniently consist of an inverting stage, the output of which is coupled to a cathode or emitter follower with overall negative feedback from the output of the follower to the input of the inverting stage. The input and output signals of inverting amplifier 280 comprise a pair of complementary output signals produced by the action of an active flip-flop circuit.

The operation of the converter of FIGURE 5 is similar to that of FIGURE 1 for circles 100 and 200. The ⓪—①, ①—②, ③—④, ④—⑤, ⑥—⑦, and ⑦—⑧ transfer points are controlled by the ends of the segments of first circle 100, while the transfer points ②—③, ⑤—⑥, and ⑧—⓪ are controlled by one end, the right-hand end, of the segments of circle 200. It will be seen that in the ternary system for a maximum count of nine, that is, a count from 0 to eight, the pattern for the first two circles 100 and 200 is repeated three times and thus is internally cyclic. The converter shown is also externally cyclic since the count jumps from 8 to 0 again without ambiguity. At the intermediate internal recycling transfer points ②—③ and ⑤—⑥ and also at the external recycling transfer point ⑧—⓪, it is necessary to obtain signals to transfer conduction between the pairs of input brushes to the subsequent circles 300 and 400. Because the segments of the second circle 200 control switching at all the recycling transfer points, the two complementary input signals to each of the subsequent circles 300 and 400 must be derived from two complementary output signals of second circle 200. Second circle output brush 200 provides the bit or direct output signal and in conjunction with inverting amplifier 280 also provides the complementary output signal. The non-critical left-hand ends of the three segments of second circle 200 lie intermediate, and preferably in the middle of, the ①, ④, and ⑦ intervals respectively. The output signals at terminals 190 and 290 provide in the natural binary code the least significant digit of the ternary count. The output signals at terminals 390 and 490 provide in the natural binary code the second-to-least significant ternary digit.

The converter is shown at the ②—③ transfer point, where, as the pattern moves to the left under the the stationary brushes or as the brushes move to the right relative to the pattern, second circle input brush 210, while carrying a signal, breaks contact with a segment of circle 200, allowing output brush 220 and second circle output terminal 290 to drop to ground to represent a "0." Conduction shifts from lagging third circle input brush 310 to leading third circle input brush 312, trigger circuit or inverting amplifier 280 producing a positive voltage, preferably equal to one-half that of input excitation battery 10. Brushes 310 and 312 symmetrically straddle a transfer point of circle 300, and, since brush 312 contacts the segment of circle 300 a "1" is produced at third circle output terminal 390. At the ④—⑤ transfer point, second circle output brush 220 becomes positive and in conjunction with active flip-flop circuit 280, causes conduction to shift from leading brush 312 to lagging brush 310; but, since both brushes contact the segments of circle 300, a "1" continues to appear at terminal 390. At the ⑤—⑥ transfer point conduction is shifted from lagging brushes 310 and 410 to leading brushes 312 and 412, both pairs of brushes symmetrically straddling transfer points of their respective circles 300 and 400, causing the output at terminal 390 to change from a "1" to a "0" and causing the output at terminal 490 to change from a "0" to a "1." At the ⑦—⑧ transfer point, conduction shifts from leading brush 412 to lagging brush 410, but since both brushes contact the segment of circle 400 a "1" continues to appear at terminal 490. At the ⑧—⓪ transfer point, conduction shifts from lagging brush 410 to leading brush 412, causing the output at terminal 490 to change from a "1" to a "0." At the ⓪—① transfer point, conduction shifts from leading brush 312 to lagging brush 310, thus conditioning the input brushes to circle 300 for unambiguous switching at the ②—③ transfer point again where the converter pattern has completed one full revolution.

Table 5 shows the output representations at terminals 190, 290, 390, and 490 for the converter of FIGURE 5 as the pattern is moved under the stationary brushes to successively occupy the intervals ⓪, ①, ②, ③, ④, ⑤, ⑥, ⑦, ⑧, and ⓪ again.

| Interval | Output at Terminal | | | | Ternary Count | Decimal Count |
|---|---|---|---|---|---|---|
| | 490 | 390 | 290 | 190 | | |
| ⓪ | 0 | 0 | 0 | 0 | 00 | 0 |
| ① | 0 | 0 | 0 | 1 | 01 | 1 |
| ② | 0 | 0 | 0→1 | 0 | 02 | 2 |
| ③ | 0 | 1 | 0 | 0 | 10 | 3 |
| ④ | 0 | 1 | 0 | 1 | 11 | 4 |
| ⑤ | 0 | 1 | 0→1 | 0 | 12 | 5 |
| ⑥ | 1 | 0 | 0 | 0 | 20 | 6 |
| ⑦ | 1 | 0 | 0 | 1 | 21 | 7 |
| ⑧ | 1 | 0 | 0→1 | 0 | 22 | 8 |
| ⓪ | 0 | 0 | 0 | 0 | 00 | 0 |

Table 5

Figure 6:
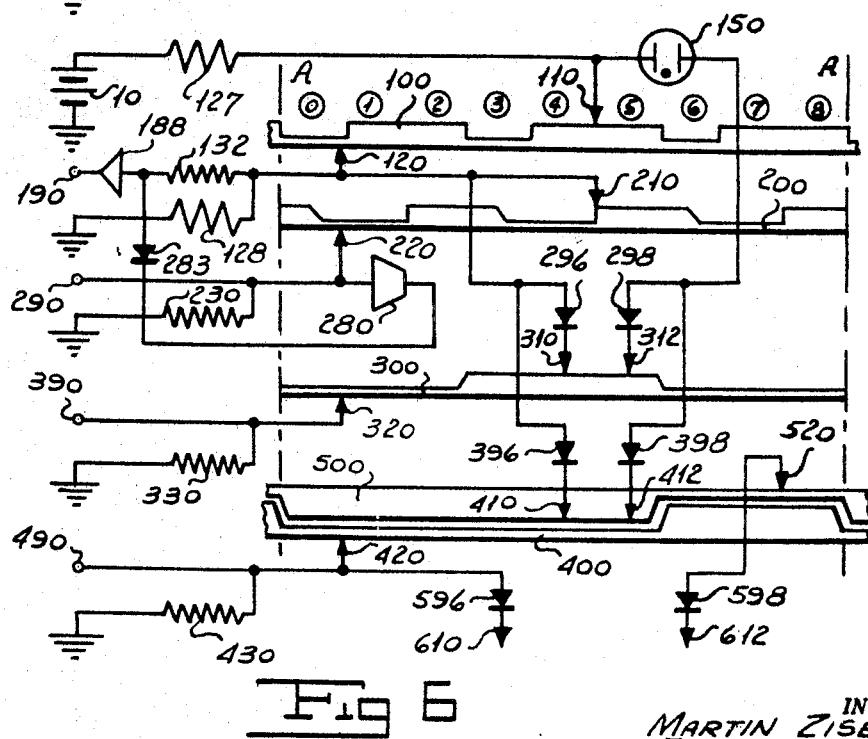
FIGURE 6 is a developed schematic view of an externally cyclic converter which provides by the second method a binary coded internally cyclic count in the special case of the ternary system.

Referring now to FIGURE 6, a source of input excitation voltage, battery 10, has its negative terminal grounded and its positive terminal connected through an input resistor 127 to an input brush 110, disposed to alternately contact the conductive segments and nonconductive spaces of a first circle 100. First circle output brush 120 is connected through a summing resistor 132 to the input of a one-to-one buffer amplifier 188 and through an input loading resistor 128 to ground. The output of buffer amplifier 188 is connected to first circle output terminal 190. First circle output brush 120 is also connected to an input brush 210, disposed to alternately contact the segments and spaces of a second circle 200. Second circle output brush 220 is connected to second circle output terminal 290 and through a loading resistor 230 to ground. Output brush 220 is further connected to the input of an inverting amplifier or active flip-flop circuit 280, the output of which is connected backwardly through a crystal 283 to the input of buffer amplifier 188. First circle output brush 120 is also connected forwardly through a crystal 296 to one input brush 310 of a pair of input brushes 310 and 312, disposed to alternately contact the segment and space of a third circle 300. First circle input brush 110 is connected to one terminal of a neon glow tube 150. The other terminal of glow tube 150 is connected forwardly through a crystal 298 to brush 312. Brushes 310 and 312 are spaced apart a length of arc equal to one interval length of the nine equal interval lengths of circle 100. Third circle output brush 320 is connected to third circle output terminal 390 and through a loading resistor 330 to ground. First circle output brush 120 is further connected forwardly through a crystal or rectifier 396 to one input brush 410 of a pair of input brushes 410 and 412, disposed to alternately contact the segment and space of a fourth circle 400. The other terminal of glow tube 150 is also connected forwardly through a crystal 398 to brush 412. Brushes 410 and 412 are spaced apart a length of arc equal to that between 310 and 312. Fourth circle output brush 420 is connected to fourth circle output terminal 490 and through a loading resistor 430 to ground. Intermeshing with fourth circle 400 is a fifth circle 500, the segment of circle 500 occupying the space of circle 400 and the space of circle 500 being occupied by the segment of circle 400. Brushes 410 and 412 simultaneously supply complementary input signals to both circles 400 and 500. Fourth circle output brush 420 is connected forwardly through a crystal 596 to one input brush 610 of a pair of complementary input brushes 610 and 612. Fifth circle output brush 520 is connected forwardly through a crystal 598 to brush 612. Circles 100 through 500 are concentrically mounted on a nonconductive disk, not shown, and the pattern is shown cut radially along line A and developed. In FIGURE 6, inverting amplifier or active flip-flop circuit 280 may have a high output impedance as in FIGURES 3 and 4.

The operation of the converter of FIGURE 6 is similar to that of FIGURE 3 for circles 100 and 200 and practically identical to that of FIGURE 5 for circles 300 and 400. The ⓪—①, ②—③, ③—④, ⑤—⑥, ⑥—⑦, and ⑧—⓪ transfer points are controlled by the ends of the segments of first circle 100, while the transfer points ①—②, ④—⑤, and ⑦—⑧ are controlled by one end, the left-hand end, of the segments of circle 200. It is seen that in the ternary system for a maximum count of nine, the pattern in the first two circles is repeated three times and thus is internally cyclic. The converter shown is also externally cyclic. The internal recycling transfer points ②—③, and ⑤—⑥, and also the external recycling transfer point ⑧—⓪, are all controlled by the segments of first circle 100, and, hence, the two complementary input signals to the subsequent circles 300 and 400 are derived from the two complementary output signals of first circle 100. The noncritical right-hand ends of the three segments of circle 200 lie intermediate and preferably in the middle of the ⓪, ③, and ⑥ intervals respectively. The output signals at terminals 190 and 290 provide in the natural binary code the least significant digit of the ternary count. The ouput signals at terminals 390 and 490 provide in the natural binary code the second-to-least significant ternary digit.

The converter is shown at the ④—⑤ transfer point where as the pattern moves to the left under the stationary brushes, or as may more easily be pictured, as the brushes move to the right relative to the pattern, second circle input brush 210, while carrying a signal, contacts the left-hand end of one of the segments of circle 200, causing output brush 220 to carry a signal, thereby producing a "1" at output terminal 290 and causing the output of inverting amplifier 280 to drop to ground, thereby causing the input of one-to-one buffer amplifier 188 to likewise drop to ground by virtue of the forward current through diode 283 and thereby modifying the normal output of "1" at terminal 190 to the desired output of "0" during the ⑤ interval. Lagging brushes 310 and 410 have been carrying signals at this point and continue to do so. At the ⑤—⑥ transfer point, conduction shifts to leading brushes 312 and 412, causing the output at terminal 390 to change from a "1" to a "0" and causing the output at terminal 490 to change from a "0" to a "1," and at the same time, causing conduction to shift from leading brush 612 to lagging brush 610. At the ⑥—⑦ transfer point, conduction shifts back to lagging brushes 310 and 410, but since both brushes 410 and 412 contact the segment of circle 400, the output at terminal 490 continues to be a "1." At the ⑦—⑧ transfer point, conduction shifts from lagging brush 410 to leading brush 412 with the result that the output at terminal 490 changes from a "1" to a "0" and with the result also that conduction shifts from lagging brush 610 to leading brush 612. We shall hereinafter point out the function of brushes 610 and 612 but let us here emphasize that at the ⑧—⓪ transfer point, which for the pattern of FIGURE 6, is the external recycling transfer point, conduction shifts from lagging brush 610 to leading brush 612. At the ⓪—① transfer point, conduction shifts to lagging brushes 310 and 410. At the ②—③ transfer point, conduction shifts to leading brush 312, causing the output at terminal 390 to change from a "0" to a "1." At the ③—④ transfer point, conduction shifts back to lagging brushes 310 and 410. We have now arrived at the ④—⑤ transfer point where the pattern of FIGURE 6 has completed one full revolution.

Table 6 shows the output representations at terminals 490, 390, and 290, and the normal and modified outputs at terminal 190 for FIGURE 6, as the converter pattern is moved under the stationary brushes to successively occupy the intervals ⓪, ①, ②, ③, ④, ⑤, ⑥, ⑦, ⑧, and ⓪ again.

| Interval | Outputs at Terminals | | | | Ternary Count | Decimal Count |
|---|---|---|---|---|---|---|
| | 490 | 390 | 290 | 190 | | |
| ⓪ | 0 | 0 | 0 | 0 | 00 | 0 |
| ① | 0 | 0 | 0 | 1 | 01 | 1 |
| ② | 0 | 0 | 0→1 | 1→0 | 02 | 2 |
| ③ | 0 | 1 | 0 | 0 | 10 | 3 |
| ④ | 0 | 1 | 0 | 1 | 11 | 4 |
| ⑤ | 0 | 1 | 0→1 | 1→0 | 12 | 5 |
| ⑥ | 1 | 0 | 0 | 0 | 20 | 6 |
| ⑦ | 1 | 0 | 0 | 1 | 21 | 7 |
| ⑧ | 1 | 0 | 0→1 | 1→0 | 22 | 8 |
| ⓪ | 0 | 0 | 0 | 0 | 00 | 0 |

Table 6

As taught by Ziserman, brushes 610 and 612 provide complementary input signals to the first circle of another pattern, not shown. This other pattern is reduction geared to rotate with the pattern of FIGURE 6, such that for three revolutions of the pattern disk of FIGURE 6, the other pattern disk rotates through only one revolution. The other pattern comprises two circles identical to circles 300 and 400 of both FIGURES 5 and 6. Cascading between pattern disks is provided by obtaining two complementary output signals from circle 400, by the provision in FIGURE 6 of intermeshing circle 500, and coupling the two complementary output signals to circles 300 and 400 of the outer reduction-geared pattern disk. Brushes 610 and 612, in contacting circle 300 of the other reduction-geared pattern disk, would have the same relative spacing as brushes 310 and 312 of FIGURES 5 and 6. For interdisk cascading, the count is increased geometrically by a factor, and the maximum count of the converter would be increased by a factor of three from the maximum count of nine to a maximum count of twenty-seven. This interdisk cascading obtains only where the count is linear. The output signals of circles 300 and 400 of the other reduction-geared pattern disk would provide in the natural binary code the third-to-least significant digit of the ternary count.

Accordingly, in FIGURE 6 where it is desired to cascade between disks and increase the count geometrically by a factor, the count is shown as being, and must necessarily be, linear.

In FIGURES 1 through 5, while we have shown the count to be linear for purposes of clarity in description and explanation, it will be appreciated by those skilled in the art that the count may, if desired, be made nonlinear.

*Functions Containing Simple Discontinuities or Jumps Between Large Odd and Non-Adjacent Small Even Numbers as Taught by Schaefer et al., and the Superextension of Count for Such Functions*

The superextension of count provides one interval which selectively represents two counts to permit of a tolerance for interpattern switching where the count is nonlinear and hence interpattern cascading cannot be effected. By superextension we mean to obtain the analogous effect of a spiral cam adapted to turn through slightly more than one complete revolution. To correlate this analogy, the effect of superextension might be produced by providing a spiral pattern combined with the mounting of the stationary brushes upon a lead screw geared to the shaft which rotates the pattern, thereby to move the brushes radially of the pattern to maintain them in constant relative contact with the spiral pattern. It will be appreciated that such an arrangement would be mechanically complex and would engender such problems as maintaining brush alignment during this radial movement. Referring now to FIGURE 7, a source of input excitation voltage, battery 10, has its negative terminal grounded. Superextension of count is employed to allow a tolerance for transferring between different patterns. Accordingly, the positive terminal of input battery 10 is connected to relay armature 773, which is operated by relay actuating winding 770. Armature 773, when relay winding 770 is unenergized, engages relay contact 771. When relay winding 770 is energized, armature 773 is drawn into engagement with relay contact 772. Relay contact 771 is connected through an input resistor 127 to an input brush 110, disposed to contact alternately the segments and spaces of a first circle 100. First circle output brush 120, which always makes electrical contact with the conductive segments of first circle 100, is connected forwardly through a crystal 139 to first circle output terminal 190 and through an input loading resistor 128 to ground. Terminal 190 is connected to ground by a loading resistor 130. Input brush 110 is connected to one terminal of a neon glow tube 150, which sustains a voltage drop preferably one-half that of battery 10. The other terminal of glow tube 150, which is the negative terminal thereof, is connected forwardly through a crystal 198 to one input brush 212 of a pair of input brushes 210 and 212, disposed to alternately contact the segment and space of a second circle 200. First circle output brush 120 is connected forwardly through a crystal 196 to input brush 210. Brushes 210 and 212 are spaced apart a length of arc equal to the shortest interval length, in this case, any one of the equal interval lengths of first circle 100. Second circle output brush 220 is connected to second circle output terminal 290 and through a loading resistor 230 to ground. First circle output brush 120 is also connected forwardly through a crystal 296 to one input brush 310 of a pair of input brushes 310 and 312, disposed to alternately contact the segment and space of a third circle 300. The negative terminal of glow tube 150 is connected forwardly through a crystal 298 to brush 312. Brushes 310 and 312 are spaced apart one interval length, as are brushes 212 and 210. Third circle output brush 320 is connected to ground through a loading resistor 330 and through a summing resistor 332 to the input of a one-to-one buffer amplifier 388. The output of amplifier 388 is connected to the third circle output terminal 390. A fourth circle 400, composed of one segment and one space, intermeshes with the segment and space of third circle 300, the segment of circle 400 occupying the space of circle 300 and the space of circle 400 being occupied by the segment of circle 300. Third circle input brushes 310 and 312 concomitantly provide inputs to both circles 300 and 400. Fourth circle output brush 420 is connected to fourth circle output terminal 490 and to ground through a loading resistor 430. The positive terminal of input battery 10 is connected through an input resistor 527 to an input brush 510, disposed to alternately contact the equal segment and space of a fifth circle 500. Each of circles 100, 200, 300, 400, and 500 are concentrically mounted on a first disk, disk A, which is shown cut radially along line A and developed. A second disk, disk B—C, is geared to the first disk A by speed reduction gearing such that the ratio of the angular movement of the first to the angular movement of the second disk is an integer equal to two. Second disk B—C rotates at a speed equal to one-half that of the first disk A. The rotation of the second disk B—C is then of a lower periodicity than that of the first disk A. Third circle output brush 320 is connected to an input brush 610, disposed to contact alternately the segment and space of a sixth circle 600, which is mounted on the second disk B—C. Sixth circle output brush 620 is connected forwardly through a crystal 681 to fourth circle output terminal 490, and forwardly through a crystal 682 to second circle output terminal 290, and forwardly through a crystal 684 to first circle output terminal 190, and also to the input of an inverting amplifier or trigger circuit 680. The output of inverting amplifier 680 is connected backwardly through a crystal 683 to the input of buffer amplifier 388. Fifth circle input brush 510 is connected through a glow tube 550 to one input brush 710 of a pair of input brushes 710 and 712, disposed to alternately contact the equal segment and space of a seventh circle 700, which is concentrically mounted with circle 600 on second disk B—C. Fifth circle output brush 520 is connected to ground through an input loading resistor 528, and forwardly through a crystal 598 to input brush 712. Brushes 710 and 712 are spaced apart three interval lengths of circle 100, and have therefore a spacing of one-half the length of the segment or space of circle 700. Seventh circle output brush 720 is connected to the input of what may conveniently be a one-to-one buffer amplifier 788. The output of amplifier 788 is connected to one terminal of relay actuating winding 770, the other terminal of which is grounded. Relay contact 772 is connected to a terminal 790. In FIGURE 7, inverting amplifier 680 may have a high output impedance as in FIGURES 3, 4, and 6.

The operation of the converter, neglecting the superextension effect of circle 500 of pattern disk A and of circles 600 and 700 of pattern disk B—C, is conventional as taught by Schaefer et al. The converter is shown at the ⑨—④ recycling transfer point where the count has a natural discontinuity or jump between the large odd number 9 and the small even number 4. As the pattern moves to the left with respect to the brushes or as the brushes move to the right relative to pattern A, first circle input brush 110 breaks contact with a segment of first circle 100, causing conduction to be transferred from brush 310 to brush 312, with the result that the output representation changes from 9 to 4. The count then proceeds conventionally through the ④, ⑤, ⑥, ⑦, ⑧, and ⑨ intervals to again arrive at the ⑨—④ recycling transfer point. It will be appreciated that where it is not desired to effect superextension of count the following components are not required: input resistor 527, input brush 510, circle 500, output brush 520, glow tube 550, input loading resistor 528, input brush 610, circle 600, output brush 620, input brushes 710 and 712, crystal 598, circle 700, output brush 720, inverting amplifier 680, crystals 681 and 682 and 683 and 684, crystal 139, loading resistor 130, summing resistor 332, buffer amplifier 388, buffer amplifier 788, relay actuating winding 770, relay contacts 771 and 772, relay armature 773, pattern disk B—C, and the two-to-one reduction gearing associated with pattern disk B—C.

In operation of the converter of FIGURE 7, where it is desired to effect superextension, at the ⑨—⑪ transfer point, as shown, as the brushes move to the right relative to patterns A and B—C, first circle input brush 110 breaks contact with a segment of a first circle 100, causing conduction to be transferred from brush 210 to 212 and from brush 310 to 312, causing the normal output to change from a 9 to a 4 by allowing brush 120 to return to ground potential, permitting brush 220 to remain at ground potential, causing third circle output brush 320 to rise to a positive potential, and allowing fourth circle output brush 420 to drop to ground potential. The normal output representation of 4 must be artificially modified to the desired count of 11. At this point brush 610 engages the segment of sixth circle 600, and the signal now at output brush 320 causes sixth circle output brush 620 to rise to a positive potential, which potential is impressed upon output terminals 490, 290, and 190 through crystals 681, 682, and 684 respectively, thus increasing the normal count of 4 by 11 to the count of 15 which is still 4 greater than the desired count of 11. However, the positive potential at brush 620 causes the positive output of inverting amplifier 680 to drop to ground potential which draws the input of amplifier 388 down to ground through crystal 683. With its input now resting at ground, amplifier 388 causes the output at terminal 390 to change from a "1" to a "0," thus decreasing the count of 15 by 4 to the desired superextended count of 11. Crystal 139 prevents the low impedance of input loading resistor 128 from being presented to the modification signal at terminal 190 originating at output brush 620 and coupled through crystal 684. Somewhere intermediate the ⑪ interval, fifth circle input brush 510 contacts the segment of fifth circle 500, causing conduction to shift from seventh circle input brush 710 to brush 712. A signal is thereby produced at seventh circle ouput terminal 720 which, through amplifier 788, energizes relay actuating winding 770. Buffer amplifier 788 prevents the low impedance of relay winding 770 from loading the signal at output brush 720. Armature 773 is drawn into engagement with relay contact 772, breaking engagement with contact 771. Terminal 790 supplies the input excitation voltage to another pattern X which is not shown here in FIGURE 7. The disengagement of armature 773 with contact 771 removes the excitation voltage from circle 100, causing the outputs at terminals 190, 290, 390, and 490 to drop to ground potential. At this point pattern X, which now receives input excitation voltage, produces and continues the count of 11 which formerly was produced by pattern A and circle 600 of pattern B—C. The outputs of patterns X and A are connected in parallel with such blocking crystals as may be required to prevent feeding spurious signals to unenergized pattern A. As rotation is continued through the remainder of the ⑪ interval and through the ⑤ and ⑥ intervals and half the ⑦ interval, seventh circle input brush 712 remains energized and, since it remains in contact with the segment of seventh circle 700, continued to energize relay winding 770, armature 773 remaining in engagement with contact 772 and out of engagement with contact 771. The segment and space of circle 500 should preferably be of equal lengths of arc to allow of the greatest possible tolerance. Consequently, the segment of circle 500 will occupy three interval lengths and the space three interval lengths. Since one end of the segment lies intermediate the ⑪ interval, and the total number of intervals being six, and all equal in this case, the other end of the segment of circle 500 will lie intermediate the ⑦ interval. So then, intermediate the ⑦ interval brush 510 breaks contact with the segment of circle 500, causing conduction to shift from brush 712 to brush 710. At this point, however, both brushes 710 and 712 now engage the segment of seventh circle 700. Seventh circle output brush 720 still carries a positive voltage and continues to energize relay winding 770, with the result that armature 773 remains in engagement with contact 772. It will be noted that no blocking crystal is needed between glow tube 550 and brush 710, since glow tube 550 presents the essentially infinite impedance of a backwardly biased crystal so long as its firing voltage is not exceeded. Through the remainder of the ⑦ interval and through the ⑧ and ⑨ intervals and half of the ④ interval, fifth circle input brush 510 remains in the space of fifth circle 500, and seventh circle input brush 710 remains in contact with the segment of seventh circle 700, causing armature 773 to remain in engagement with relay contact 772. Output terminal 790, then, remains energized. Intermediate the ④ interval, which one revolution previous of pattern disk A was selectively the ⑪ interval, fifth circle input brush 510 contacts the segment of fifth circle 500. At this point intermediate the ④ interval, brushes 710 and 712 symmetrically straddle the transfer point on the lower part of seventh circle 700. At this point the input excitation voltage at output terminal 790 to pattern X causes an output representation of 4. When brush 510 makes contact with the segment of circle 500, conduction is transferred from brush 710, which contacts the segment of seventh circle 700, to brush 712, which lies in the space of seventh circle 700. Seventh circle output brush 720 loses its signal and causes, through amplifier 788, relay winding 770 to become unenergized. Armature 773 returns to engagement with contact 771 and disengages contact 772, reapplying the excitation voltage to first circle 100 of pattern A and removing the excitation voltage from the other pattern X, which, at this point, was providing an output representation of 4. Sixth circle input brush 610 at this point lies in the space of the lower half of sixth circle 600 and does not contact the segment of sixth circle 600 and does not affect or modify the normal converter output representation. The converter output at terminals 190, 290, 390, and 490 is now a 4. The count of 4, which was commenced on pattern X energized by output terminal 790, is continued on pattern A. Throughout the remainder of the ④ interval and through the ⑤ and ⑥ intervals and half the ⑦ interval, the count proceeds conventionally. Intermediate the ⑦ interval brush 510 breaks contact with the segment of fifth circle 500, transferring conduction from brush 712 back to brush 710. But, since, at this point, both brushes lie in the space of seventh circle 700, relay winding 770 remains unenergized and armature 773 remains in engagement with contact 771. At the ⑦—⑧ transfer point conduction is shifted from brush 310 to brush 312, allowing third circle output brush 320 and sixth circle input brush 610 to drop to ground potential. At the ⑨—⑪ transfer point, brush 610 will become positive again. So then, intermediate the ⑧ and ⑨ intervals, or intermediate the ⑦—⑧ and ⑨—⑪ transfer points, preferably in the middle or at the ⑧—⑨ transfer point, sixth circle input brush 610 makes contact with the segment of sixth circle 600; but, since brush 610 is unenergized, sixth circle output brush 620 is not affected and remains at ground potential. At the ⑨—⑪ transfer point, then, brush 610 becomes positive, as has been explained before, causing modification of the normal converter output of 4 to the desired output representation of 11. The length of the segment of circle 600 is not critical. As has been explained, one end corresponds to the ⑧—⑨ transfer point and the other end must lie beyond that point intermediate the ⑪ interval where the input excitation is removed from first circle 100 of pattern A. We have shown the other end of circle 600 as corresponding to the ⑥—⑦ transfer point. It will be appreciated that the optimum placement, the placement to maximize and evenly split the tolerances of the other end of the segment of circle 600 is correspondent to the middle of the ⑦ interval. This would mean that the segment is lengthened and carried around to the lower half of circle 600 so that the other end lies half an interval length distant from line C.

While pattern A is unenergized and pattern X receives input excitation voltage, the count need not proceed as it does on pattern A. The only limitation on pattern X is that it contain one interval which selectively represents the counts of 11 and 4. For example, when pattern X is energized the count might proceed 11, 3, 2, 1, 2, 3, 4, or the count might alternately proceed 11, 12, 13, 14, 7, 6, 5, 4, or the count might proceed 11, 9, 8, 7, 6, 5, 4, as for pattern A, but with a nonlinear count for pattern X.

Table 7S shows the normal and modified outputs at terminals 190, 290, 390, and 490 for the converter of FIGURE 7 in providing a superextended count as patterns A and B—C move under the stationary brushes to successively occupy the intervals ⑤, ⑥, ⑦, ⑧, ⑨, ⑪, . . . ④, and ⑤ again.

212 have a spacing equal to the minimum interval length, or in this case any interval length, of first circle 100.

| Interval | Outputs at Terminal | | | | Binary Count | Decimal Count |
|---|---|---|---|---|---|---|
| | 490 | 390 | 290 | 190 | | |
| ⑧ | 1 | 0 | 0 | 0 | 1000 | 8 |
| ⑨ | 1 | 0 | 0 | 1 | 1001 | 9 |
| ⑪ ④ | 0→1 | 1→0 | 0→1 | 0→1 | 1011 | 11 |
| ⑪ ④ | 0 | 1 | 0 | 0 | 0100 | 4 |
| ⑤ | 0 | 1 | 0 | 1 | 0101 | 5 |
| ⑥ | 0 | 1 | 1 | 0 | 0110 | 6 |
| ⑦ | 0 | 1 | 1 | 1 | 0111 | 7 |
| ⑧ | 1 | 0 | 0 | 0 | 1000 | 8 |

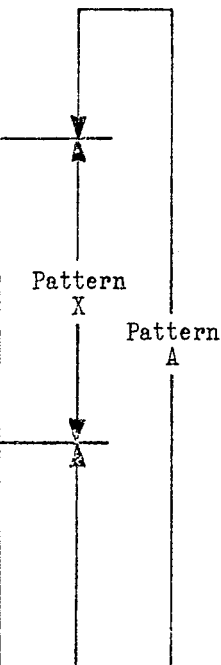

Table 7S

It will be noted that the superextension takes place adjacent the discontinuity at the ⑨—④ transfer point, the ④ interval selectively representing the count of 11. It will be further noted that the superextended count of 11 is a nonadjacent discontinuous representation, the count proceeding . . . 8, 9, 11 . . . . As will be obvious to those skilled in the art the superextended representation may be made any desired count; for example, 10, or 8, or even 23. Also obvious to those skilled in the art is the fact that superextension may take place in any one given interval and need not occur adjacent the ⑨—① discontinuity; for example, interpattern switching may be made to occur during the ⑧ interval by repositioning circle 500 so that an end of the segment lies intermediate the ⑧ interval and correspondingly realigning circle 700 and by supplying the single signal to input brush 610 from output brush 420 rather than from brush 320 and realigning circle 600.

Referring now to FIGURE 8, a source of input excitation potential, battery 10, has its negative terminal grounded and its positive terminal connected to an armature 773 controlled by a relay actuating winding 770. Armature 773 may engage either of double throw relay contacts 771 or 772. With relay actuating winding 770 unenergized armature 773 normally engages relay contact 771. Contact 771 is connected through an input resistor 127 to an input brush 110 disposed to alternately contact the segments and spaces of a first circle 100. First circle output brush 120 is connected to ground through an input loading resistor 128 and is connected through a summing resistor 132 to the input of a one-to-one buffer amplifier 188, the output of which is connected to terminal 190. First circle input brush 110 is connected to one terminal of a neon glow tube 150. The other terminal, the negative terminal of glow tube 150, is connected forwardly through a crystal 198 to one input brush 212 of a pair of input brushes 210 and 212 positioned to alternately contact the segment and space of a second circle 200. Second circle input brushes 210 and 212 have a spacing equal to the minimum interval length, or in this case any interval length, of first circle 100.

First circle output brush 120 is connected forwardly through crystal 196 to second circle input brush 210. Second circle output brush 220 is connected to second circle output terminal 290 and to ground through loading resistor 230. First circle output brush 120 is also connected forwardly through a crystal 296 to one input brush 310 of a pair of input brushes 310 and 312 positioned to contact alternately the segment and space of a third circle 300. Brushes 310 and 312 have the same spacing as brushes 210 and 212. The negative terminal of glow tube 150 is connected forwardly through a crystal 298 to brush 312. Third circle output brush 320 is connected to third circle output terminal 390 and to ground through a loading resistor 330. Intermeshing with third circle 300 is a fourth circle 400, the segment of circle 400 occupying the space of circle 300 and the space of circle 400 being occupied by the segment of circle 300. Third circle input brushes 310 and 312 simultaneously provide complementary input signals to both the third and fourth circles 300 and 400. Fourth circle output brush 420 is connected through a summing resistor 432 to the input of a one-to-one buffer amplifier 488 and through a loading resistor 430 to ground. The output of amplifier 488 is connected to fourth circle output terminal 490. The positive terminal of input battery 10 is connected through an input resistor 527 to an input brush 510, disposed to contact alternately the equal segment and space of a fifth circle 500. Fifth circle output brush 520 is connected to ground through an input loading resistor 528. Circles 100, 200, 300, 400, and 500 are all concentrically mounted on a first disk A which is shown cut radially along line A and developed. A second disk B—C is geared to the first disk A such that second disk B—C rotates at only one-half the speed of first disk A. Two revolutions of the first disk A cause only one revolution of the second disk B—C. A sixth circle 600 and a seventh circle 700 are concentrically mounted on the second disk B—C. Fourth circle output brush 420 is connected to an input brush 610 disposed to alternately contact the segment and space of sixth circle 600. Sixth circle output brush 620 is connected forwardly through a crystal 681 to second circle output terminal 290. Sixth circle output brush 620 is also connected to the input of an inverting amplifier or trigger or flip-flop circuit 680. The output of trigger circuit 680 is connected backwardly through crystals 683 and 684 to the inputs of amplifiers 488 and 188 respectively. Fifth circle output brush 520 is also connected forwardly through a crystal 596 to one input brush 710 of a pair of input brushes 710 and 712, disposed to alternately contact the segment and space of seventh circle 700. Fifth circle input brush 510 is connected through a neon glow tube 550 to seventh circle input brush 712. Brushes 710 and 712 are spaced apart a length of arc equal to half the length of the segment or half the length of the space of circle 700, the segment of circle 700 being equal to the space. Seventh circle output brush 720 is connected to the input of a buffer amplifier 788. The output of amplifier 788 is connected to one terminal of relay actuating winding 770, the other terminal of which is grounded. Relay contact 772 is connected to a terminal 790. In FIGURE 8, inverting amplifier may have a high output impedance as in FIGURES 3, 4, 6, and 7.

The operation of the converter, neglecting the superextension effect of circle 500 of pattern disk A and of circles 600 and 700 of pattern disk B—C, is conventional as taught by Schaefer et al. The converter is shown at the ⑨—④ recycling transfer point where the count has a natural jump or discontinuity between the large odd number 9 and the small even number 4. As the brushes move to the right with respect to the pattern disk A, first circle brush 110 breaks contact with a segment of circle 100 causing the output representation to change from a 9 to a 4. The count proceeds conventionally through the ④, ⑤, ⑥, ⑦, ⑧, and ⑨ intervals to again arrive at the ⑨—④ recycling transfer point. It will be appreciated that where it is not desired to effect superextension of count the following components are not required: input resistor 527, input brush 510, circle 500, output brush 520, glow tube 550, input loading resistor 528, input brush 610, circle 600, output brush 620, input brushes 710 and 712, crystal 596, circle 700, output brush 720, inverting amplifier 680, crystals 681 and 683 and 684, summing resistors 132 and 432, buffer amplifier 188 and 488, buffer amplifier 788, relay actuating winding 770, relay contacts 771 and 772, relay armature 773, pattern disk B—C, and the two-to-one reduction gearing associated with pattern disk B—C.

Table 7-8 shows the normal output representations at terminals 190, 290, 390, and 490 for the converters of both FIGURE 7 and FIGURE 8, neglecting the superextension effect of circles 500, 600, and 700, as the pattern disk A moves under the stationary brushes to successively occupy the intervals ⑤, ⑥, ⑦, ⑧, ⑨, ④, and ⑤ again.

| Interval | Outputs at Terminals | | | | Binary Count | Decimal Count |
|---|---|---|---|---|---|---|
| | 490 | 390 | 290 | 190 | | |
| ⑤ | 0 | 1 | 0 | 1 | 0101 | 5 |
| ⑥ | 0 | 1 | 1 | 0 | 0110 | 6 |
| ⑦ | 0 | 1 | 1 | 1 | 0111 | 7 |
| ⑧ | 1 | 0 | 0 | 0 | 1000 | 8 |
| ⑨ | 1 | 0 | 0 | 1 | 1001 | 9 |
| ④ | 0 | 1 | 0 | 0 | 0100 | 4 |
| ⑤ | 0 | 1 | 0 | 1 | 0101 | 5 |

Table 7-8

In operation of the converter of FIGURE 8 where it is desired to effect superextension, at the ④—② transfer point, as shown, as the brushes move to the left relative to patterns A and B—C, first circle input brush 110 makes contact with a segment of circle 100. This causes conduction to shift from brush 312 to brush 310 with the result that the normal output representation changes from a 4 to a 9. The normal output representation of 9 must be artificially modified to the desired count of 2. At this point brush 610 engages the segment of circle 600 and the signal now at output brush 420, by reason that brush 310 which carries a signal contacts the segment of circle 400, causes sixth circle output brush 620 to likewise carry a signal. This signal is impressed through crystal 681 upon output terminal 290, thus increasing the count of 9 by 2 to the count of 11 which is 9 greater than the desired count of 2. However, the signal at output brush 620 is impressed on the input of inverting amplifier 680 causing its output to drop to ground potential and carrying with it the inputs to buffer amplifiers 188 and 488 by virtue of the current now drawn through crystals 684 and 683 respectively. Output terminals 190 and 490 both change from "1's" to "0's" thereby decreasing the count of 11 by 9 to the desired count of 2. Somewhere intermediate the ② interval fifth circle input brush 510 contacts the segment of fifth circle 500 causing conduction to shift from seventh circle input brush 712 to brush 710. Since brush 710 now contacts the segment of circle 700, a signal is thereby produced at seventh circle output terminal 720 which, through amplifier 788, energizes relay actuating winding 770. Armature 773 is drawn from its normal engagement with contact 771 into engagement with relay contact 772. Terminal 790 supplies the input excitation voltage to another pattern X which is not shown here in FIGURE 8. The disengagement of armature 773 with relay contact 771 removes the input excitation voltage from circle 100 causing the outputs at terminals 190, 290, 390, and 490 to drop to ground potential. At this point pattern X, which now receives input excitation voltage, produces and continues the count of 2 which formerly was produced by pattern disk A and circle 600 of pattern disk B—C. The outputs of patterns X and A are connected in parallel with such blocking crystals as may be required to prevent feeding spurious signals to unenergized pattern A. As rotation is continued through the remainder of the ② interval and through the ③, ⑦, ⑥, ⑤, and ④ intervals, and through a portion of the ⑨ interval, relay actuating winding 770 remains energized and pattern X continues to be supplied with input excitation voltage, while the outputs of pattern A remain at ground. Of course, intermediate the ⑨ interval where brush 510 breaks contact with the segment of the fifth circle 500, conduction shifts from brush 710 back to brush 712, but since both brushes 710 and 712 contact the segment of circle 700, output brush 720 continues to carry a signal. It will be noted that no blocking crystal is needed between glow tube 550 and input brush 712, since glow tube 550 itself presents the high impedance of a backwardly biased crystal so long as its firing voltage is not exceeded. Intermediate the ⑨ interval, which one revolution previous of pattern disk A was selectively the ② interval, fifth circle input brush 510 contacts the segment of fifth circle 500. At this point intermediate the ⑨ interval, brushes 710 and 712 symmetrically straddle the transfer point on the lower part of the seventh circle 700. The input excitation voltage at output terminal 790 to pattern X causes an output representation of 9. When brush 510 makes contact with the segment of circle 500, conduction is shifted from brush 710 to brush 712 which now lies in the space of the seventh circle 700. Seventh circle output brush 720 loses its signal and causes, through amplifier 788, relay winding 770 to become unenergized. Armature 773 returns to engagement with contact 771 and disengages relay contact 772, reapplying the input excitation voltage to first circle 100 of pattern A and removing the input excitation from the other pattern X which at this point was providing an output representation of 9. Sixth circle input brush 610 at this point lies in the space on the lower half of sixth circle 600 and does not contact the segment of circle 600 and hence does not modify the normal converter output representation of 9. The count of 9 which was commenced on pattern X, energized by terminal 790, is continued on pattern A. The count proceeds conventionally through the remainder of the ⑨ interval and through the ⑧ interval. At the ⑧—⑦ transfer point conduction shifts from brush 312 to brush 310, and hence brush 610 drops to ground. At the ④—② transfer point, brush 610 will become positive again. So then, intermediate the ⑦, ⑥, ⑤, and ④ intervals, intermediate the ⑧—⑦ and ④—② transfer points, preferably in the middle, at the ⑥—⑤ transfer point, sixth circle input brush 610 contacts the segment of circle 600; but since brush 610 is at ground, output brush 620 is not affected and continues to carry no signal. At the ④—② transfer point then brush 610 becomes positive and as has been explained before causes modification of the normal converter output of 9 to the desired output representation of 2. The length of the segment of circle 600 is not critical. As has been explained, one end corresponds to the ⑥—⑤ transfer point and the other end must lie beyond that point intermediate the ② interval where the input excitation voltage is removed from circle 100 of pattern A. We have shown the other end of circle 600 as corresponding to the ⑦—⑥ transfer point. It will be appreciated that the optimum placement, the placement to maximize and evenly split the allowable tolerances of the other end of the segment of circle 600 is correspondent to the middle of the ⑥ interval. This would mean that the segment is lengthened and carried around to the lower half of circle 600 so that the other end lies half an interval length distant from line B.

While pattern A is unenergized and pattern X receives input excitation voltage, the count need not proceed as it does on pattern A. The only limitation on pattern X is that it contain one interval which selectively represents the counts of 9 and 2. For example, when pattern X is energized, the count might proceed: 2, 1, 0, 1, 2, 3, 6, 7, 8, and 9, or the count might proceed: 2, 4, 5, 6, 7, 8, and 9, as for pattern A, but with a nonlinear count for pattern X.

Table 8S shows the normal outputs at terminal 390 and the normal and modified outputs at terminals 490, 290, and 190 for the converter of FIGURE 8 in providing a superextended count as patterns A and B—C move under the stationary brushes to successively occupy the intervals ⑤, ⑥, ⑦, ⑧, ⑨, . . . , ②, ④, and ⑤ again.

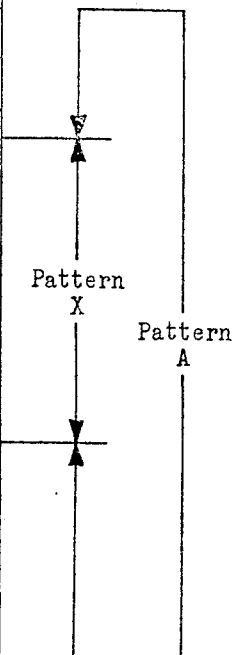

Table 8S

It will be noted that superextension takes place adjacent the discontinuity at the ⑨—④ transfer point, the ⑨ interval selectively representing the count of 2. It will be further noted that the superextended count of 2 is a nonadjacent discontinuous representation, the count proceeding . . . 5, 4, 2, . . . . As will be obvious to those skilled in the art, the superextended representation may be made any desired count, for example, 3, or 5, or even 17. Also obvious to those skilled in the art is the fact that superextension may be made to take place in any one given interval and need not occur adjacent the ⑨—④ discontinuity; for example, interpattern switching may be made to occur during the ⑦ interval by repositioning circle 500 so that an end of the segment lies intermediate the ⑦ interval and correspondingly realigning circle 700, and by supplying the single signal to input brush 610 from output brush 320, rather than from brush 420, and realigning circle 600.

*Functions Containing Simple Discontinuities or Jumps Between Large and Small Odd Numbers, and the Superextension of Count for Such Functions*

Referring now to FIGURE 9, a source of input excitation voltage, battery 10, has its negative terminal grounded and its positive terminal connected to an armature 873 operated by a relay actuating winding 870. Armature 873 normally engages relay contact 871 when winding 870 is not energized. If winding 870 is energized, armature 873 engages contact 872, which is connected to terminal 890. Contact 871 is connected through an input resistor 127 to an input brush 110, disposed to alternately contact the segments and spaces of a first circle 100. First circle output brush 120 is connected to the anode of a crystal 139 and through an input loading resistor 128 to ground. The cathode of crystal 139 is connected through a summing resistor 132 to the input of a one-to-one buffer amplifier 188 and through a loading resistor 130 to ground. The output of amplifier 188 is connected to first circle output terminal 190. The first circle output brush 120 is also connected forwardly through a crystal 196 to one input brush 210 of a pair of input brushes 210 and 212 spaced apart one segment or interval length of circle 100 and disposed to alternately contact the segment and space of a second circle 200. First circle input brush 110 is connected to one terminal of a neon glow tube 150. The other terminal of glow tube 150, which is the negative terminal thereof, is connected forwardly through a crystal 198 to the other input brush 212 of second circle 200. Second circle output brush 220 is connected to second circle output terminal 290 and through a loading resistor 230 to ground. First circle output brush 120 is further connected forwardly through a crystal 296 to one input brush 310 of a pair of input brushes 310 and 312 disposed to alternately contact the segment and space of a third circle 300. The spacing between brush 310 and brush 312 is the same as between brushes 210 and 212. The negative terminal of glow tube 150 is also connected forwardly through a crystal 298 to input brush 312. Third circle output brush 320 is connected through a summing resistor 332 to the input of a buffer amplifier 388, the output of which is connected to third circle output terminal 390. Third circle output brush 320 is also connected to ground through a loading resistor 330. A fourth circle 400 intermeshes with third circle 300, such that the segment of fourth circle 400 occupies the space of third circle 300 and the space of fourth circle 400 is occupied by the segment of third circle 300. Fourth circle output brush 420 is connected to fourth circle output terminal 490 and through a loading resistor 430 to ground. Input brushes 310 and 312 simultaneously provide complementary input signals to both the third and fourth circles 300 and 400. Third circle output brush 320 is connected to a single input brush 510, disposed to contact alternately the segment and space of a fifth circle 500. Fifth circle output brush 520 is connetced forwardly through a crystal 582 to second circle output terminal 290 and forwardly through a crystal 581 to the cathode of diode 139. Fifth circle output brush 520 is also connected to the input of an inverting amplifier or trigger circuit 580, whose output is connected backwardly through a crystal 583 to the input to amplifier 388. The positive terminal of input excitation battery 10 is connected through an input resistor 627 to an input brush 610, disposed to alternately contact the equal segment and space of a sixth circle 600. Sixth circle output brush 620 is connected through an input loading resistor 628 to ground. Each of circles 100 through 600 is mounted on a first disk A, which is cut radially along line A and developed. A second disk B—C, reduction geared to the first disk A such that two revolutions of the first disk A are required for one revolution of the second disk B—C, is provided with concentric circles 700 and 800. Third circle output brush 320 is connected to an input brush 710, disposed to alternately contact the segment and space of seventh circle 700. Seventh circle output brush 720 is connected forwardly through a crystal 781 to the fourth circle output terminal 490. Seventh circle output brush 720 is also connected to the input of an inverting amplifier or trigger circuit 780, the output of which is connected backwardly through a crystal 783 to the input of amplifier 188. Sixth circle input brush 610 is connected through a neon glow tube 650 to one input brush 812 of a pair of input brushes 810 and 812, disposed to alternately contact the equal segment and space of eighth circle 800. Sixth circle output brush 620 is connected forwardly through a crystal 696 to brush 810. Brushes 810 and 812 are spaced apart a distance equal to one-half the segment length of eighth circle 800. Eighth circle output brush 820 is connected to the input of buffer amplifier 888. The output of amplifier 888 is connected to one terminal of relay actuating winding 870, the other terminal of which is grounded. In FIGURE 9, inverting amplifiers 580 and 780 may have high output impedances.

The operation of the converter of FIGURE 9, neglecting the superextension effect of circle 600 of pattern A and of circles 700 and 800 of pattern B—C is somewhat similar to that of FIGURES 1 and 2. The converter is shown at the ⑨—③ recycling transfer point where the count has a jump or discontinuity between the large and small odd numbers 9 and 3. As the brushes move to the right relative to pattern A, first circle input brush 110 breaks contact with a segment of circle 100 and enters the double interval length space thereof. The normal converter output representation then changes from a 9 to a 4, but we desire that the count be 3. At this point conduction is shifted from brush 310 to brush 312 which latter brush contacts the segment of circle 300 causing output brush 320 to carry a signal. This signal appears at output brush 520 since brush 510 contacts the segment of fifth circle 500. The signal at output brush 520 is impressed forwardly through crystals 581 and 582 causing the outputs at terminals 190 and 290 to change from "0's" to "1's" thereby increasing the normal converter output representation of 4 by 3 to the count of 7 which is 4 greater than the desired count of 3. Crystal 139 prevents input loading resistor 128 from being presented to the modification signal at brush 520 which is coupled through crystal 581. When brush 520 becomes positive the signal then impressed on the input to inverting amplifier 580 causes its output to drop to ground thereby carrying with it the input of buffer amplifier 388 and causing the output at terminal 390 to change from its normal "1" to "0" to decrease the count of 7 by 4 to the desired count of 3 during the ③ interval. At the ③—④ transfer point, brush 510 breaks contact with the segment of circle 500 permitting output brush 520 to return to ground and allowing the normal converter output representation of 4 to appear at terminals 190 through 490 by virtue of the absence of any modification signal at fifth circle output brush 520. The count proceeds conventionally through the ④, ⑤, ⑥, and ⑦ intervals. At the ⑦—⑧ transfer point, conduction shifts from brush 310 to brush 312 allowing output brush 320 and brush 510 to drop to ground. When the ⑨—③ transfer point is reached, brushes 320 and 510 will again become positive. Thus intermediate the ⑦—⑧ and ⑨—③ transfer points, that is, intermediate the ⑧—⑨ intervals, preferably in the middle thereof or at the ⑧—⑨ transfer point, brush 510 engages the segment of circle 500. But because brush 510 rests at ground, there is no modification effect produced, since output brush 520 continues to rest at ground carrying no signal. It will be appreciated that where it is not desired to effect superextension of count, the following components are not required: input resistor 627, input brush 610, circle 600, output brush 620, input loading resistor 628, glow tube 650, input brush 710, circle 700, output brush 720, inverting amplifier 780, crystals 781 and 783, summing resistor 132, buffer amplifier 188, input brushes 810 and 812, crystals 696, circle 800, output brush 820, buffer amplifier 888, relay actuating winding 870, relay armature 873, relay contacts 871 and 872, pattern disk B—C, and the two-to-one reduction gearing associated with pattern disk B—C.

Table 9 shows the normal output representations at terminal 490 and the normal and modified output representations at terminals 390, 290, and 190, for the converter of FIGURE 9, neglecting the superextension effect of circles 600, 700, and 800, as pattern disk A moves under the stationary brushes to successively occupy the intervals ⑤, ⑥, ⑦, ⑧, ⑨, ③, ④, and ⑤ again.

| Interval | Output at Terminals | | | | Binary Count | Decimal Count |
|---|---|---|---|---|---|---|
| | 490 | 390 | 290 | 190 | | |
| ⑤ | 0 | 1 | 0 | 1 | 0101 | 5 |
| ⑥ | 0 | 1 | 1 | 0 | 0110 | 6 |
| ⑦ | 0 | 1 | 1 | 1 | 0111 | 7 |
| ⑧ | 1 | 0 | 0 | 0 | 1000 | 8 |
| ⑨ | 1 | 0 | 0 | 1 | 1001 | 9 |
| ③ | 0 | 1→0 | 0→1 | 0→1 | 0011 | 3 |
| ④ | 0 | 1 | 0 | 0 | 0100 | 4 |
| ⑤ | 0 | 1 | 0 | 1 | 0101 | 5 |

Table 9

In FIGURE 9 neglecting the superextension effect of circles 600, 700, and 800, and omitting from consideration for the moment circle 500, the pattern appears to have the natural jump or discontinuity between 9 and 4, where however the space which represents the count of 4 is of double interval length. Circle 500 artificially modifies the normal converter output representation so that a portion of the double interval length space which appears to represent the count of 4 may actually represent the count of 3. In the first method, as embodied in FIGURES 1, 2, and 9, only a portion of the double interval length space or segment, depending on whether an inverse form is used, actually represents the count of the small even number, which for FIGURE 9 is the number 4.

In operation of the converter of FIGURE 9, where it is desired to effect superextension at the ⑨—⑩ transfer point, as shown, as the brushes move to the right relative to patterns A and B—C, first circle input brush 110 breaks contact with a segment of first circle 100 and enters the double interval length space thereof. The modified converter output representation of 3 must then be further modified, doubly modified, into the superextended count of 10. The signal at output brush 320 appears at output brush 720, since brush 710 contacts the segment of circle 700. This signal at output brush 720 is impressed through crystal 781 upon output terminal 490, thus increasing the count of 3 by 8 to the count of 11 which is one greater than the desired output representation of 10. Accordingly, the positive signal at brush 720 causes the output of inverting amplifier 780 to drop to ground carrying with it the input of buffer amplifier 188 with the result that the output at terminal 190 changes from a "1" to a "0" thus decreasing the count of 11 by 1 to the desired count of 10 during the superextended ⑩ interval. Beginning at output brush 120, we see that during the ⑩ interval the normal converter output representation at terminal 190 would be a "0." The output of circle 500 modifies this "0" to a "1," but the output of circle 700 remodifies the "1" back to the original "0" again. The input to amplifier 188 is then the result of a double modification of the signal at output brush 120. Somewhere intermediate the ⑩ interval brush 610 breaks contact with the segment of circle 600 causing conduction to shift from brush 810 to brush 812. Since brush 812 now contacts the segment of circle 800, a signal is thereby produced at output brush 820, which through amplifier 888 energizes relay actuating winding 870. Armature 870 is drawn from its normal engagement with contact 871 into engagement with relay contact 872. Terminal 890 supplies the input excitation voltage to pattern X which is not shown here in FIGURE 9. The disengagement of armature 873 with contact 871 removes the input excitation voltage from circle 100 causing the converter outputs at terminals 190 through 490 to drop to ground potential. At this point, pattern X, which now receives input excitation voltage, produces and continues the count of 10 which formerly was produced by pattern disk A and circle 700 of pattern disk B—C. Corresponding outputs of patterns A and X are connected in parallel with such blocking crystals as may be required to prevent feeding spurious signals to unenergized pattern A. As rotation is continued through the remainder of the ⑩ interval and through the ④, ⑤, ⑥, ⑦, ⑧, ⑨, and through a portion of the ③ interval, relay actuating winding 870 remains energized and pattern X continues to be supplied with input excitation voltage, while the outputs of patterns A remain at ground. Of course, at the ⑥—⑦ transfer point where brush 610 contacts the segment of circle 600, conduction shifts from brush 812 back to brush 810, but since both brushes 810 and 812 contact the segment of circle 800, output brush 820 continues to carry a signal and relay winding 870 remains energized. It will be noted that no blocking crystal is provided between the glow tube 650 and brush 812 since glow tube 650 itself presents the high impedance of a backwardly biased crystal so long as its firing voltage is not exceeded. Intermediate the ③ interval, which one revolution previous of pattern disk A was selectively the ⑩ interval, sixth circle input brush 610 breaks contact with the segment of sixth circle 600. At this point intermediate the ③ interval, brushes 810 and 812 symmetrically straddle the transfer point on the lower half of eighth circle 800. The input excitation voltage at terminal 890 to pattern X causes an output representation of 3. When brush 610 breaks contact, conduction is shifted from brush 810 to brush 812 which latter brush now lies in the space of eighth circle 800. Eighth circle output brush 820 loses its signal and amplifier 888, with no more signal now applied, no longer energizes relay winding 870. Armature 873 breaks engagement with relay contact 872 and returns to engagement with relay contact 871, removing input excitation voltage from pattern X and reapplying input excitation voltage to first circle 100 of pattern A. Seventh circle input brush 710 at this point lies in the space on the lower half of seventh circle 700 and does not contact the segment of circle 700 and hence does not doubly modify the modified converter output representation of 3. The count of 3 which was commenced on pattern X energized by terminal 890 is continued on pattern A. The count proceeds conventionally through the remainder of the ③ interval and through the ④, ⑤, ⑥, and ⑦ intervals. At the ⑦—⑧ transfer point, conduction shifts from brush 310 to brush 312 allowing output brush 320 and input brushes 510 and 710 to drop to ground. When the ⑨—⑩ transfer point is reached, brushes 320, 510, and 710 will again become positive. For the very same reason that one end, the noncritical end, of the segment of circle 500 is placed intermediate the ⑦—⑧ and ⑨—③ transfer points or at the ⑧—⑨ transfer point, we also place one end of the segment of circle 700 at the ⑧—⑨ transfer point since both brushes 510 and 710 are connected to the same output brush 320. At the ⑧—⑨ transfer point, both brushes 510 and 710 contact the segments of their respective circles 500 and 700, but since both brushes rest at ground there is no modification or superextension effect produced at either of output brushes 520 or 720 respectively. At the ⑨—⑩ transfer point, conduction shifts from brush 310 to brush 312 causing output brush 320 to carry a signal which, as has been explained before, causes output brush 520 to modify the normal converter output of 4 into the count of 3, and also causes the output at brush 720 to superextend the count of 3 into the count of 10. The length of the segment of circle 700 is not critical. As has been explained one end corresponds to the ⑧—⑨ transfer point, and the other end must lie beyond that point intermediate the ⑩ interval where the input excitation voltage is removed from circle 100 of pattern A. We have shown the other end of the segment of circle 700 as corresponding to the ⑥—⑦ transfer point and this is the optimum placement; this is the placement to maximize and evenly split the allowable tolerances.

While pattern A is unenergized and pattern X receives input excitation voltage, the count need not proceed as it does on pattern A and in most applications will not. The only limitation on pattern X is that it contain one interval which selectively represents the counts of 10 and 3.

Table 9S shows the normal and modified outputs at terminals 290, 390, and 490, and the normal and doubly modified outputs at terminal 190 for the converter of FIGURE 9 in providing a superextended count as pattern disks A and B—C move under the stationary brushes to successively occupy the intervals ⑤, ⑥, ⑦, ⑧, ⑨, ⑩, . . . ③, ④, and ⑤ again.

| Interval | Outputs at Terminal | | | | Binary Count | Decimal Count |
|---|---|---|---|---|---|---|
| | 490 | 390 | 290 | 190 | | |
| ⑦ | 0 | 1 | 1 | 1 | 0111 | 7 |
| ⑧ | 1 | 0 | 0 | 0 | 1000 | 8 |
| ⑨ | 1 | 0 | 0 | 1 | 1001 | 9 |
| ⑩ ③ | 0→1 | 1→0 | 0→1 | 0→1→0 | 1010 | 10 |
| ⑩ ③ | 0 | 1→0 | 0→1 | 0→1 | 0011 | 3 |
| ④ | 0 | 1 | 0 | 0 | 0100 | 4 |
| ⑤ | 0 | 1 | 0 | 1 | 0101 | 5 |
| ⑥ | 0 | 1 | 1 | 0 | 0110 | 6 |
| ⑦ | 0 | 1 | 1 | 1 | 0111 | 7 |

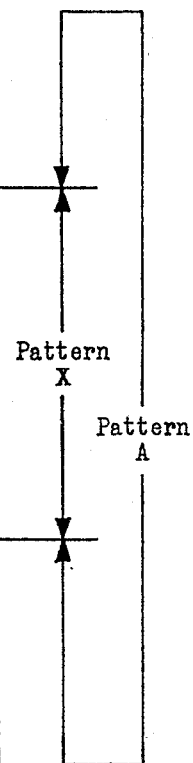

Table 9S

It will be noted that superextension takes place adjacent the discontinuity at the ⑨—③ transfer point, the ③ interval selectively representing the count of 10. It will be further noted that the superextended count of 10 is an adjacent representation, the count proceeding . . . 8, 9, 10. . . . As will be obvious to those skilled in the art, the superextended representation may be made any desired count. Also apparent to those skilled in the art is the fact that superextension may be made to take place in any one given interval and need not occur adjacent the ⑨—③ discontinuity. We have shown superextension to take place during an interval where the normal converter output representation must be artificially modified, namely the ③ interval, and thus there arose the occasion for double modification. Were superextension made to occur during say the ⑤ or ⑥ interval, the need for double modification would, of course, not have arisen.

Referring now to FIGURE 10, a source of input excitation voltage, battery 10, has its negative terminal grounded and its positive terminal connected to an armature 873, which is controlled by a relay actuating coil 870. Armature 873 normally engages relay contact 871 of a pair of double throw contacts 871 and 872. Relay contact 872 is connected to an output terminal 890. Relay contact 871 is connected through an input loading resistor 127 to an input brush 110, disposed to alternately contact the segments and spaces of a first circle 100. First circle output brush 120 is connected through a summing resistor 132 to the input of a one-to-one buffer amplifier 188, whose output is connected to first circle output terminal 190. Output brush 120 is also connected to ground through an input loading resistor 128. First circle output brush 120 is connected forwardly through a crystal 196 to one input brush 210 of a pair of input brushes 210 and 212, spaced apart a distance equal to an interval length of circle 100, and disposed to alternately contact the segment and space of a second circle 200. First circle input brush 110 is connected to one terminal of a neon glow tube 150. The other terminal of glow tube 150, the negative terminal, is connected forwardly through a crystal 198 to brush 212. A second circle output brush 220 is connected to second circle output terminal 290 and through a loading resistor 230 to ground. First circle output brush 120 is also connected forwardly through a crystal 296 to one input brush 310 of a pair of input brushes 310 and 312, having a spacing equal to that between brushes 210 and 212, and disposed to alternately contact the segment and space of a third circle 300. The negative terminal of glow tube 150 is also connected forwardly through a crystal 298 to brush 312. Third circle output brush 320 is connected to third circle output terminal 390 and through a loading resistor 330 to ground. Intermeshing with third circle 300 is a fourth circle 400, the segment of fourth circle 400 occupying the space of third circle 300 and the space of fourth circle 400 being occupied by the segment of third circle 300. Third circle input brushes 310 and 312 simultaneously provide complementary input signals to the third and fourth circles 300 and 400. Fourth circle output brush 420 is connected through a summing resistor 432 to the input of a buffer amplifier 488, whose output is connected to fourth circle output terminal 490. Fourth circle output brush 420 is also connected through a loading resistor 430 to ground. Fourth circle output brush 420 is further connected to an input brush 510, stationarily disposed to alternately contact the segment and space of a fifth circle 500. Fifth circle output brush 520 is connected forwardly through a crystal 581 to second circle output terminal 290, and also to the input of an inverting amplifier or trigger circuit 580. The output of trigger circuit 580 is connected backwardly through a crystal 583 to the input to amplifier 488. The positive terminal to input battery 10 is connected through an input resistor 627 to an input brush 610, disposed to alternately contact the equal segment and space of a sixth circle 600. Sixth circle output brush 620 is connected through an input loading resistor 628 to ground. Circles 100 through 600 are all concentrically mounted on a first disk A, which is cut radially along the line A and developed. A second disk, B—C, is coupled by speed-reduction gearing to first disk A, such that two revolutions of disk A cause only one revolution of disk B—C. Mounted concentrically on disk B—C are a seventh circle 700 and an eighth circle 800. Third circle output brush 320 is connected forwardly through a crystal 339 to the input of a buffer amplifier 788. Fifth circle output brush 520 is connected forwardly through a crystal 539 to the input to amplifier 788. The output of amplifier 788 is connected to an input brush 710, disposed to alternately contact the segment and space of seventh circle 700. Seventh circle output brush 720 is connected backwardly through crystals 784 and 783 to the inputs to amplifier 488 and 188 respectively. Brush 720 is also connected to the input of inverting amplifier or trigger circuit 779. The output of positively biased trigger circuit 779 is connected forwardly through a crystal 781 to second circle output terminal 290. Sixth circle output brush 620 is connected forwardly through a crystal 698 to one input brush 812 of a pair of input brushes 810 and 812, disposed to alternately contact the equal segment and space of eighth circle 800. Sixth circle input brush 610 is connected through a neon glow tube 650 to brush 810. Brushes 810 and 812 are spaced apart half the segment length of circle 800. Eighth circle output brush 820 is connected to the input of buffer amplifier 888. The output of amplifier 888 is connected to one terminal of the relay actuating winding 870, the other terminal of which is grounded. Inverting amplifier 580 may have a high output impedance, but biased inverting amplifier 779 should have a low output impedance since it operates directly on output terminal 290.

Biased inverting amplifier or flip-flop circuit 779 is similar to inverting amplifier 580 except that biased inverting amplifier 779 has its input normally biased to a positive potential equal to half that of battery 10, while inverting amplifier 580 has its input normally resting at ground potential. Thus biased inverting amplifier 779 with its input normally biased positive produces an output which normally rests at ground, while inverting amplifier 580 produces a normal output which is at a positive potential.

The operation of the converter of FIGURE 10, neglecting the superextension effect of circle 600 of pattern disk A and of circles 700 and 800 of pattern disk B—C, is somewhat similar to that of FIGURES 3 and 4. The converter is shown at the ⑨—③ recycling transfer point where the count has a jump or discontinuity between the large and small odd numbers 9 and 3. As the brushes move to the right relative to pattern A, first circle input brush 110 lies in the middle of the double interval length segment of circle 100 and hence cannot control a change in output representation. The normal converter output representation while brush 110 contacts the double interval length segment of circle 100 is 9. However, at the ⑨—③ transfer point, brush 510 contacts the segment of circle 500, and, since brush 510 carries a signal, the effect will be to modify the normal converter representation of 9 into the desired output representation of 3 during the ③ interval. The signal now appearing at fifth circle output brush 520 is impressed through crystal 581 upon output terminal 290, modifying the output from its normal "0" to an "1" thus increasing the count of 9 by 2 to the count of 11 which is still greater by 8 than the desired count of 3. The signal at brush 520 is, however, impressed upon the input of inverting amplifier 580 the output of which then drops to ground potential and carries with it the input of buffer amplifier 488. The output at terminal 490 is then modified from its normal "1" to a "0," thus decreasing the count of 11 by 8 to the desired output representation of 3 during the ③ interval. At the ③—④ transfer point, conduction shifts from brush 310 to brush 312 and brushes 420 and 510 then drop to ground potential as does the modification signal at brush 520. The normal converter output representation of 4 is thus permitted to appear at the output terminals 190 through 490. The count proceeds conventionally through the ④, ⑤, ⑥, ⑦, ⑧, and ⑨ intervals where the converter, having completed one full revolution, arrives again at the ⑨—③ transfer point. Brush 510, as has been explained, drops to ground potential at the ③—④ transfer point and will not become positive again until the ⑦—⑧ transfer point is reached. Hence, intermediate the ③—④ and ⑦—⑧ transfer point, that is, intermediate the ④, ⑤, ⑥, and ⑦ intervals, preferably in the middle thereof, or at the ⑤—⑥ transfer point, brush 510 breaks contact with the noncritical end of fifth circle 500, but since at this point brush 510 rests at ground, this does not affect the normal converter outputs. It will be appreciated that where it is not desired to effect superextension of count, the following components are not required: input resistor 627, input brush 610, circle 600, output brush 620, input loading resistor 628, glow tube 650, crystals 339 and 539, buffer amplifier 788, input brush 710, circle 700, output brush 720, positively biased inverting amplifier 779, crystals 783 and 784 and 781, summing resistor 132, buffer amplifier 188, input brushes 810 and 812, crystal 698, circle 800, output brush 820, buffer amplifier 888, relay winding 870, armature 873, relay contacts 871 and 872, pattern disk B—C, and the two-to-one reduction gearing associated with pattern disk B—C.

Table 10 shows the normal output representations at terminals 190 and 390 and the normal and modified output representations at terminals 290 and 490 for the converter of FIGURE 10, neglecting the superextension effect of circles 600, 700, and 800, as pattern disk A moves under the stationary brushes to successively occupy the intervals ⑤, ⑥, ⑦, ⑧, ⑨, ③, ④, and ⑤ again.

| Interval | Outputs at Terminal | | | | Binary Count | Decimal Count |
|---|---|---|---|---|---|---|
| | 490 | 390 | 290 | 190 | | |
| ⑤ | 0 | 1 | 0 | 1 | 0101 | 5 |
| ⑥ | 0 | 1 | 1 | 0 | 0110 | 6 |
| ⑦ | 0 | 1 | 1 | 1 | 0111 | 7 |
| ⑧ | 1 | 0 | 0 | 0 | 1000 | 8 |
| ⑨ | 1 | 0 | 0 | 1 | 1001 | 9 |
| ③ | 1→0 | 0 | 0→1 | 1 | 0011 | 3 |
| ④ | 0 | 1 | 0 | 0 | 0100 | 4 |
| ⑤ | 0 | 1 | 0 | 1 | 0101 | 5 |

Table 10

In FIGURE 10, neglecting the superextension effect of circles 600, 700, and 800, and omitting from consideration for the moment circle 500, the pattern appears to have the natural jump or discontinuity between 9 and 4, where however the segment which represents the count of 9 is of double interval length. Circle 500 artificially modifies the normal converter output representation so that a portion of the double interval length segment which appears to represent the count of 9 may actually represent the count of 3. In the second method as embodied in FIGURES 3, 4, and 10, only a portion of the double interval length segment or space, depending on whether an inverse form is used, actually represents the count of the large odd number which for FIGURE 10 is the number 9.

In operation of the converter of FIGURE 10, where it is desired to effect superextension, at the ③—② transfer point, as shown, as the brushes move to the left relative to patterns A and B—C, fifth circle input brush 510, carrying a signal, breaks contact with the critical end of the segment of circle 500. Output brush 520 then loses its signal and drops to ground. Output brush 320 at this point rests at ground. With no signal through either crystal 339 or crystal 539 now applied to the input of amplifier 788, its output now drops to ground. Since input brush 710 contacts the segment of circle 700, output brush 720 also drops to ground potential. When seventh circle output brush 720 drops to ground, the normal converter output representation of 9 will be superextended into the count of 2. It will be remembered that normally brush 720 is positive by virtue of its connection to the positively biased input of biased inverting amplifier 779. With brush 720 now at ground, the inputs of amplifiers 188 and 488 likewise drop to ground by virtue of the current now drawn through crystals 783 and 784, respectively. The outputs at terminals 190 and 490 are modified from "1's" to "0's" thus decreasing the count of 9 by 9 to the count of 0 which is 2 less than the desired count of 2. When the input to biased inverting amplifier 779 is drawn down to ground potential, its output rises to a positive potential preferably equal to one-half that of input battery 10. This positive voltage is coupled through crystal 781 and changes the output at terminal 290 from a "0" to a "1," thus increasing the count of 0 by 2 to the desired count of 2 during the ② interval. Somewhere intermediate the ② interval, sixth circle input brush 610 breaks contact with the segment of circle 600, causing conduction to shift from brush 812 to 810. Brush 810 contacts the segment of circle 800, causing output brush 820 to carry a signal, resulting in the energization of relay winding 870 by amplifier 888. Relay armature 873 disengages contact 871, removing the excitation voltage from first circle 100, and engages contact 872, thereby applying the excitation voltage to terminal 890 and thence to the first circle of pattern X, which is not shown here in FIGURE 10. Pattern X at this point produces and continues the count of 2 which formerly was produced by pattern disk A and circle 700 of pattern disk B—C. Corresponding output of patterns X and A are connected in parallel with such blocking crystals as may be required to prevent unwanted cross-feeding of signals. As disk A makes a complete revolution from the point intermediate the ② interval to the interpattern switching point intermediate the ⑨ interval, armature 873 remains in engagement with contact 872. Conduction, in the meantime, at the ⑥—⑤ transfer point, shifts from brush 810 back to brush 812 when sixth circle input brush 610 contacts the segment of circle 600. No blocking crystal is needed between glow tube 650 and brush 810 since glow tube 650 provides a high impedance when its firing potential is not exceeded. Intermediate the ⑨ interval, which one revolution previous of pattern A was selectively the ② interval, brushes 810 and 812 symmetrically straddle the transfer point on the lower half of circle 800; and, when brush 610 breaks contact with the segment of circle 600, conduction is shifted from brush 812, which contacts the segment of circle 800, to brush 810, which lies in the intersegmental space. Output brush 820 no longer carries a signal, causing, through amplifier 888, relay actuating winding 870 to now become de-energized. Armature 873 returns to engagement with contact 871, reapplying excitation voltage to first circle 100 of pattern A. The other pattern X energized from terminal 890, at this point should have been producing an output representation of 9. Pattern A now continues this count of 9. Seventh circle input brush 710 now rests in the space on the lower half of circle 700 and does not modify this count of 9 into the count of 2. The count proceeds conventionally through the remaining portion of the ⑨ interval and through the ⑧, ⑦, and ⑥ intervals to the ⑥—⑤ transfer point where brush 510 contacts the segment of circle 500. Fifth circle input brush 510 and fourth circle output brush 420 have been resting at ground and will rest at ground through the ⑦, ⑥, ⑤ and ④ intervals. Intermediate this interval, preferably in the middle thereof, or at the ⑥—⑤ transfer point, as has been described, is the non-critical end of the segment of circle 500. The other critical end of the segment of circle 500 corresponds to and controls the ③—② transfer point. So then, when brush 510 contacts the segment of circle 500 at the ⑥—⑤ transfer point, no effect is produced since brush 510 rests at ground potential. The count now proceeds conventionally through the ⑤ and ④ intervals to the ④—③ transfer point, where first circle input brush 110 makes contact with the double length segment of circle 100. Normally the count produced would be a 9, but conduction is now shifted from brush 312, which contacts the segment of circle 300, to brush 310, which contacts the segment of circle 400. Fourth circle output brush 420 now carries a signal, applying it through input brush 510 to the segment of circle 500. Fifth circle output brush 520, which now carries a signal, applies the signal through crystal 581 to second circle output terminal 290, changing its output from a "0" to a "1," thus increasing the count of 9 by 2 to the count of 11, which is 8 greater than the desired count of 3. At the same time, however, the signal at brush 520 causes the output of inverting amplifier 580 to drop from its normal positive potential down to ground potential, drawing with it the input to amplifier 488 by virtue of the forward current through crystal 583. With its input now resting at ground, amplifier 488 causes the fourth circle output terminal 490 to change from a "1" to a "0," reducing the count of 11 by 8 into the desired count of 3.

It will be observed that two inputs are provided to amplifier 788. It is possible to supply only one input to amplifier 788, namely, the input from fifth circle output brush 520, but then the right-hand end of the segment of circle 700 would have to be placed at the midpoint of the ③ interval, allowing a tolerance of only ±1/2 an interval length. What is important is that seventh circle input brush 710 carry a signal when it contacts the segment of seventh circle 700. We have greatly increased the tolerances by using an "or" circuit including crystals 539 and 339. It is seen that third circle output brush 320 carries a signal through the ⑦, ⑥, ⑤, and ① interval, and fifth circle output brush 520 carries a signal only during the ③ interval. At the ④—③ transfer point the signal carried is shifted from brush 320 to brush 520, but no matter which of brushes 320 or 520 carries a signal, it is applied through one of crystals 539 or 339 to the input to amplifier 788, and seventh circle input brush 710 carries a signal through the ⑦, ⑥, ⑤, ④, and ③ intervals. Consequently, intermediate this interval, or intermediate the ⑧—⑦ and ③—② transfer points, preferably in the center thereof, to equalize the tolerances on both sides, or at the midpoint of the ⑤ interval, we place one end, the right-hand end of the segment of circle 700. This allows a tolerance of ±2½ interval lengths, or five times the tolerance were brush 520 to be directly connected to amplifier 788. It will be appreciated that the tolerances otherwise might well become critical because of backlash and other nonlinearities in the reduction gearing between pattern disks A and B—C. The other end of the segment of circle 700 must be carried beyond that point intermediate the ② interval where armature 873 disengages contact 871, removing the excitation voltage. We have shown the other end, the left-hand end, of the segment of circle 700 to be at the ⑦—⑧ transfer point, but its placement is not critical, since, for a whole revolution of disk A, which is one-half a revolution of disk B—C, there is no input excitation voltage because armature 873 engages contact 872. The optimum placement is at the ⑥—⑤ transfer point, which would mean that the left-hand end of the segment of circle 700 should be carried around to the lower half of circle 700 so as to lie one interval length distant from line B.

At the midpoint of the ⑤ interval, then, input brush 710 contacts the segment of seventh circle 700. But since at this point brush 710 carries a signal, it does not affect the normally positive-biased signal at seventh circle output brush 720. At the ④—③ transfer point, output brush 320 drops to ground, but output brush 520 becomes positive. Hence at the ④—③ transfer point there is a switching between "or" circuit inputs from a signal through crystal 339 to a signal through crystal 539, but input brush 710 continues to carry a signal. At the ③—② transfer point, brush 510, carrying a signal, breaks contact with the critical end of the segment of circle 500, and output brush 520 drops to ground. No signal is impressed through either of "or" circuit crystals 539 or 339 to the input of amplifier 728. Hence input brush 710 drops to ground, drawing output brush 720 down to ground potential, and consequently modifies the normal count of 9 into the superextended output representation of 2, as has been previously described.

While pattern A is unenergized and pattern X receives input excitation voltage, the count need not proceed as it does on pattern A and in most applications will not. The only limitation for pattern X is that it contain one interval which selectively represents the counts of 9 and 2.

Table 10S shows the normal outputs at terminal 390 and the normal and modified output at terminals 190, 290, and 490 for the converter of FIGURE 10 in providing a superextended count as pattern disks A and B—C move under the stationary brushes to successively occupy the intervals ⑤, ⑥, ⑦, ⑧, ⑨, ..., ②, ③, ④, and ⑤ again.

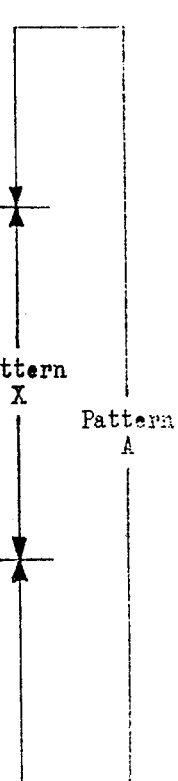

| Interval | Outputs at Terminal | | | | Binary Count | Decimal Count |
|---|---|---|---|---|---|---|
| | 490 | 390 | 290 | 190 | | |
| ⑥ | 0 | 1 | 1 | 0 | 0110 | 6 |
| ⑦ | 0 | 1 | 1 | 1 | 0111 | 7 |
| ⑧ | 1 | 0 | 0 | 0 | 1000 | 8 |
| ⑨ ② | 1 | 0 | 0 | 1 | 1001 | 9 |
| ⑨ ② | 1→0 | 0 | 0→1 | 1→0 | 0010 | 2 |
| ③ | 1→0 | 0 | 0→1 | 1 | 0011 | 3 |
| ④ | 0 | 1 | 0 | 0 | 0100 | 4 |
| ⑤ | 0 | 1 | 0 | 1 | 0101 | 5 |
| ⑥ | 0 | 1 | 1 | 0 | 0110 | 6 |

Table 10S

It will be noted that superextension takes place adjacent the discontinuity at the ⑨—③ transfer point, the ⑨ interval selectively representing the count of 2. It will be further noted that the superextended count of 2 is an adjacent representation, the count proceeding ... 4, 3, 2, .... As will be obvious to those skilled in the art the superextended representation may be any desired count. Also apparent to those skilled in the art is the fact that superextension may be made to take place in any one given interval and need not occur adjacent the ⑨—③ discontinuity. It is because superextension has been made to take place during the ⑨ interval that the occasion arose for deriving the single input signal to seventh circle 700 from a combination of two signals, one of which includes an output signal of fifth circle 500.

Referring now to FIGURE 10a, which should be read in conjunction with FIGURE 10, the output of inverting amplifier 580 in addition to being connected backwardly through crystal 583 to the input of buffer amplifier 483, as shown in FIGURE 10, is also, as shown in FIGURE 10a, connected to one of the two inputs of an "and" circuit 724. Output brush 420 in addition to the connection shown in FIGURE 10 is also, as shown in FIGURE 10a, connected to the other input of "and" circuit 724.

The "and" circuit 724 of FIGURE 10a is a substitution for "or" circuit crystals 339 and 539 and for buffer amplifier 788 of FIGURE 10. Consequently when "and" circuit 724 is employed, the following components shown in FIGURE 10 are not required: "or" circuit crystal 339 and 539 and buffer amplifier 788. The output of "and" circuit 724 is connected to seventh circle input brush 710.

The output of "and" circuit 724 remains at ground unless both its inputs are positive. Only if both inputs to "and" circuit 724 are positive does its output rise to a positive potential. Accordingly, "and" circuit 724 may conveniently comprise an n-p-n transistor, one input being connected to the collector, the other input being connected through a high impedance resistor to the base, and the output being connected to the emitter. The emitter cannot become positive unless the collector is made positive, but even then, if the base is at ground potential, the transistor is cut off and cannot conduct unless the base is also made positive. If the collector rests at ground and the base is made positive, the high impedance resistor between the input and the base prevents the output at the emitter from rising any appreciable voltage above ground. Alternatively, "and" circuit 724 may be any other circuit well known to the art.

The polarities chosen for "and" circuit 724 also necessitate one other change in FIGURE 10 from the configuration shown. When "and" circuit 724 is substituted in FIGURE 10, the normal condition for output brush 720 must be that it rest at ground rather than being positively biased by virtue of its connection to biased inverting amplifier 779. Accordingly, biased inverting amplifier 779 must be omitted and output brush 720 connected directly to the anode of diode 781. An inverting amplifier 780, not shown in FIGURE 10, must be provided between output brush 720 and the cathodes of crystal 783 and 784. This inverting amplifier 780 may have a high output impedance.

The input of "and" circuit 724, which is derived from the output of inverting amplifier 580 is positive during all intervals except the ③ interval during which interval it rests at ground. The input to "and" circuit 724 which is derived from output brush 420 is positive only during the ③ interval and during that portion of the ② interval where brush 610 remains in contact with the segment of circle 600, brush 610 breaking contact with the segment of circle 600 somewhere intermediate the ② interval. The two inputs to "and" circuit 724 are then positive only during that portion of the ② interval where first circle 100 receives input excitation voltage from relay contact 871. At the ④—③ transfer point the input to "and" circuit 724 from brush 420 becomes positive, but at the same time the other input to "and" circuit 724 from the output of inverting amplifier 580 drops to ground. At the ③—② transfer point, brush 510, carrying a signal, breaks contact with the segment of circle 500, allowing the input of inverting amplifier 580 to drop to ground and causing its output to become positive. At the ③—② transfer point, then, both inputs to "and" circuit 724 are positive and brush 710 then carries a signal. Since input brush 710 at this point contacts the segment of seventh circle 700, output brush 720 carries a signal which is conducted forwardly through crystal 781 to output terminal 290. The positive signal now at brush 720 is impressed on the input of inverting amplifier 780, not shown, the output of which drops to ground carrying with it the inputs of buffer amplifiers 188 and 488 by virtue of the forward current now drawn through crystals 783 and 784 respectively. Thus the count of 9 is modified to the superextended representation of 2 during the ② interval.

*Functions Containing Simple Discontinuities or Jumps Between Large and Small Even Numbers, and the Superextension of Count for Such Functions*

Referring now to FIGURE 11, a source of input excitation voltage, battery 10, has its negative terminal grounded. The positive terminal of battery 10 is connected to an armature 873 operated by relay actuating winding 870. Armature 873 normally engages relay contact 871 of a pair of double throw contacts 871 and 872. Relay contact 872 is connected to a terminal 890. Relay contact 871 is connected through an input resistor 127 to an input brush 110, disposed to alternately contact the segments and intersegmental spaces of a first circle 100. First circle output brush 120 is connected through an input loading resistor 128 to ground and to the anode of a diode or crystal 139. The cathode of crystal 139 is connected to first circle output terminal 190 and through a loading resistor 130 to ground. First circle input brush 110 is connected to one terminal of a neon glow tube 150. The other terminal of glow tube 150, the negative terminal, is connected forwardly through a crystal 198 to one input brush 212 of a pair of input brushes 210 and 212, disposed to alternately contact the segment and space of a second circle 200. Brushes 210 and 212 are spaced apart a distance equal to one interval length of circle 100. First circle output brush 120 is connected forwardly through a crystal 196 to brush 212. Second circle output brush 220 is connected to second circle output terminal 290 and to ground through a loading resistor 230. First circle output brush 120 is also connected forwardly through a crystal 296 to one input brush 310 of a pair of input brushes 310 and 312, disposed to alternately contact the segment and space of a third circle 300. Brushes 310 and 312 have the same spacing as brushes 210 and 212. The negative terminal of glow tube 150 is connected forwardly through a crystal 298 to brush 312. Third circle output brush 320 is connected to ground through a loading resistor 330 and to the input of a one-to-one amplifier 388 through a summing resistor 332. The output of amplifier 388 is connected to third circle output terminal 390. Intermeshing with third circle 300 is a fourth circle 400, the segment thereof occupying the space of third circle 300 and the space of circle 400 being occupied by the segment of circle 300. Input brushes 310 and 312 simultaneously provide complementary input signals to both the third and fourth circles 300 and 400. Fourth circle output brush 420 is connected through a crystal 438 to fourth circle output terminal 490. Output terminal 490 is connected to ground through a loading resistor 430. Third circle output brush 320 is also connected to an input brush 510, disposed to alternately contact the segment and space of a fifth circle 500. Fifth circle output brush 520 is connected forwardly through a crystal 581 to second circle output terminal 290 and forwardly through a crystal 582 to fourth circle output terminal 490. Fifth circle output brush 520 is also connected to the input of an inverting amplifier or trigger circuit 580, whose input normally rests at ground potential and whose output normally rests at a positive potential preferably equal to one-half that of input excitation battery 10. The output of inverting amplifier 580 is connected backwardly through a crystal 583 to the input of amplifier 388. The positive terminal of input battery 10 is connected through an input resistor 627 to an input brush 610, disposed to alternately contact the equal segment and space of a sixth circle 600. Sixth circle output brush 620 is connected to ground through an input loading resistor 628. Circles 100 through 600 are concentrically mounted on a first disk A, which is shown cut radially along line A and developed. Geared to the first disk A is a second disk B—C, such that two revolutions of disk A are required for one revolution of disk B—C. Mounted concentrically on disk B—C are a seventh circle 700 and an eighth circle 800. It can be seen then that the arc length of circles 700 and 800 is twice that of circles 100 through 600 mounted on disk A by reason of a two-to-one gear ratio between the two disks. Fifth circle output brush 520 is connected forwardly through a crystal 539 to the input of a one-to-one amplifier 788. Fourth circle output brush 420 is connected forwardly through a crystal 439 to the input of amplifier 788. Crystals 539 and 439 comprise an "or" circuit to the input of amplifier 788. The output of amplifier 788 is connected to an input brush 710, disposed to alternately contact the segment and space of the seventh circle 700. Seventh circle output brush 720 is connected backwardly through a crystal 784 to the input of amplifier 388 and is connected to the input of a biased inverting amplifier or trigger circuit 779, whose input normally is at a positive potential of half that of battery 10 and whose output normally rests at ground. Biased trigger circuit 779 is identical to the amplifier or trigger circuit 779 shown in FIGURE 10. The output of biased inverting amplifier 779 is connected forwardly through crystals 781, 782, and 783 to output terminals 190, 290, and 490, respectively. Sixth circle input brush 610 is connected through a neon glow tube 650 to one input brush 812 of a pair of input brushes 810 and 812, disposed to alternately contact the equal segment and space of eighth circle 800. Brushes 810 and 812 are spaced apart a distance equal to one-half the length of the segment or space of eighth circle 800. Sixth circle output brush 620 is connected forwardly through a crystal 696 to brush 810. Eighth circle output brush 820 is connected to the input of a one-to-one buffer amplifier 888. The output of amplifier 888 is connected to one terminal of relay actuating winding 870, the other terminal of winding 870 being grounded. Inverting amplifier 580 may have a high output impedance, but biased inverting amplifier 779 should have a low output impedance since it operates directly on output terminals 490, 290, and 190.

The operation of the converter of FIGURE 11, neglecting the superextension effect of circle 600 of pattern disk A and of circles 700 and 800 of pattern disk B—C is similar to that of FIGURES 1 and 2. The converter is shown at the ④—⑩ recycling transfer point where the count has a jump or discontinuity between the large and small even numbers 10 and 4. As the brushes move to the left relative to pattern A, first circle input brush 110 lies in the middle of the intersegmental space of double length of circle 100 and hence cannot control a change in the converter output representation. The normal converter output representation while brush 110 lies in the double interval length space of circle 100 is 4. However, at the ④—⑩ transfer point, brush 510 contacts the segment of circle 100 and, since brush 510 carries the signal, the effect will be to modify the normal converter representation of 4 into the desired output representation of 10 during the ⑩ interval. The signal now appearing at fifth circle output brush 520 is impressed forwardly through crystals 581 and 582 upon output terminals 290 and 490, thus modifying them from "0's" to "1's" and thereby increasing the count of 4 by 10 to the count of 14 which is 4 greater than the desired output representation of 10. The signal at brush 520 is, however, impressed upon the input of inverting amplifier 580, the output of which drops to ground carrying with it the input of buffer amplifier 388, thus modifying the output at terminal 390 from a "1" to a "0" and decreasing the count of 14 by 4 to the desired output representation of 10 during the ⑩ interval. At the ⑩—⑨ transfer point, conduction shifts from brush 312 which contacts the segment of circle 300 to brush 310 which contacts the segment of circle 400. Output brush 320 no longer carries a signal and consequently fifth circle input and output brushes 510 and 520 drop to ground potential. With brush 520 now resting at ground, the normal output converter representation of 9 is allowed to appear at terminals 190 through 490. The count proceeds conventionally through the ⑨, ⑧, ⑦, ⑥, ⑤, and ④ intervals where the converter, having completed one full revolution, arrives again at the ④—⑩ transfer point. Brush 510, as has been explained, drops to ground potential at the ⑩—⑨ transfer point and does not become positive again until the ⑧—⑦ transfer point is reached. Hence, intermediate the ⑩—⑨ and ⑧—⑦ transfer points, intermediate the ⑨ and ⑧ intervals, preferably in the middle thereof, or at the ⑨—⑧ transfer point, brush 510 breaks contact with the noncritical end of fifth circle 500. But, since at this ⑨—⑧ transfer point brush 510 rests at ground, no effect is produced upon the normal converter outputs. It will be appreciated that where it is not desired to effect superextension of count, the following components are not required: input resistor 627, input brush 610, circle 600, output brush 620, input loading resistor 628, glow tube 650, input brushes 810 and 812, crystal 696, circle 800, output brush 820, buffer amplifier 888, relay actuating winding 870, armature 873, relay contacts 871 and 872, crystals 439 and 539, crystal 438, buffer amplifier 788, input brush 710, circle 700, output brush 720, crystal 784, biased inverting amplifier 779, crystals 781, 782, and 783, pattern disk B—C and the two-to-one reduction gearing associated with pattern disk B—C.

Table 11 shows the normal output representations at terminal 190 and the normal and modified converter output representations at terminals 290, 390, and 490, for the converter of FIGURE 11, neglecting the superextension effect of circles 600, 700, and 800, as pattern disk A moves under the stationary brushes to successively occupy the intervals ⑥, ⑦, ⑧, ⑨, ⑩, ④, ⑤, and ⑥ again.

| Interval | Outputs at Terminal | | | | Binary Count | Decimal Count |
|---|---|---|---|---|---|---|
| | 490 | 390 | 290 | 190 | | |
| ⑥ | 0 | 1 | 1 | 0 | 0110 | 6 |
| ⑦ | 0 | 1 | 1 | 1 | 0111 | 7 |
| ⑧ | 1 | 0 | 0 | 0 | 1000 | 8 |
| ⑨ | 1 | 0 | 0 | 1 | 1001 | 9 |
| ⑩ | 0→1 | 1→0 | 0→1 | 0 | 1010 | 10 |
| ④ | 0 | 1 | 0 | 0 | 0100 | 4 |
| ⑤ | 0 | 1 | 0 | 1 | 0101 | 5 |
| ⑥ | 0 | 1 | 1 | 0 | 0110 | 6 |

Table 11

In FIGURE 11, neglecting the superextension effect of circles 600, 700, and 800, and omitting from consideration for the moment circle 500, the pattern appears to have the natural jump or discontinuity between 9 and 4, where, however, the segment which represents the count of 4 is of double interval length. Circle 500 artificially modifies the normal converter output representation so that a portion of the double interval length space which appears to represent the count of 4 may actually represent the count of 10. In the first method as embodied in FIGURES 1, 2, 9, and 11, only a portion of the double interval length space or a segment, depending on whether an inverse form is used, actually represents the count of the small even number, which for FIGURE 11 is the number 4.

In operation of the converter of FIGURE 11 where it is desired to effect superextension at the ⑩—⑨ transfer point, as shown, as the brushes move to the right relative to patterns A and B—C, fifth circle input brush carrying a signal, breaks contact with the critical end of the segment of circle 500 allowing output brush 520 to drop to ground potential. Brush 420 has rested at ground since the ⑨—⑩ transfer point, and consequently no signal is applied through either of "or" circuit crystals 439 or 539 to the input of amplifier 788. The outputs of amplifier 788 and brush 710 then drop to ground, and, since brush 710 contacts the segment of circle 700, output brush 720 is drawn down to ground potential and carries with it the input to amplifier 388 by virtue of the forward current now drawn through crystal 784. Thus the superextension signal at brush 720 changes the output at terminal 390 from a "1" to a "0," thereby decreasing the normal output representation of 4 by 4 to the count of 0. However, when the input of biased inverting amplifier 779 is forced to ground, its output becomes positive and impresses a signal through crystals 783, 782, and 781 upon output terminals 490, 290, and 190 respectively, thus increasing the count of 0 by 11 to the desired output representation of 11 during the superextended ⑪ interval. Crystal 139 prevents the low impedance of input loading resistor 128 from being presented to the modification signal at terminal 190 through crystal 781 originating from biased inverting amplifier 779. Somewhere intermediate the ⑪ interval, sixth circle input brush 610 breaks contact with the segment of circle 600 causing conduction to shift from brush 810 to brush 812. Brush 812 contacts the segment of circle 800 causing output brush 820 to carry a signal and resulting in the energization of relay winding 870 by amplifier 888. Relay armature 873 disengages contact 871, removing input excitation voltage from first circle 100, and engages contact 872, applying input excitation voltage to terminal 890 and thence to the first circle of another pattern X which is not shown here in FIGURE 11. Pattern X at this point produces and continues the count of 11 which formerly was produced by pattern disk A and circle 700 of pattern disk B—C. Corresponding outputs of patterns X and A are connected in parallel with such blocking crystals as may be required to prevent unwanted cross-feeding of signals. As pattern disk A makes a complete revolution from the interpattern switching point intermediate the ⑪ interval to the interpattern switching point intermediate the ④ interval, armature 873 remains in engagement with relay contact 872. Conduction in the meantime has, of course, at the ⑦—⑧ transfer point, shifted from brush 812 back to brush 810 when sixth circle input brush 610 contacts the segment of circle 600, but since at the ⑦—⑧ transfer point both brushes 810 and 812 contact the segment of circle 800, relay winding 870 continues to remain unenergized. It will be noted that no blocking crystal is needed between glow tube 650 and eighth circle input brush 812 since glow tube 650 of itself provides a high impedance as long as its breakdown voltage is not exceeded. Intermediate the ④ interval, which one revolution previous of pattern A was selectively the ⑪ interval, brushes 810 and 812 symmetrically straddle the transfer point on the lower half of circle 800, and, when brush 610 breaks contact with the segment of circle 600, conduction is shifted from brush 810 which contacts the segment of circle 800 to brush 812 which lies in the intersegmental space of circle 800. Output brush 820 no longer carries a signal and amplifier 888 no longer energizes relay winding 870. Armature 873 disengages contact 872 and returns to engagement with relay contact 871, thus removing input excitation voltage from pattern X, which at this point was producing a count of 4, and again applying input excitation voltage to first circle 100 of pattern A, which at this point produces and continues the count of 4 begun on pattern X. Seventh circle input brush 710 now rests in the space on the lower half of circle 700 and hence cannot modify the normal count of 4. The count proceeds conventionally through the ④, ⑤, ⑥, ⑦, and ⑧ intervals. At the ⑧—⑨ transfer point, brush 510 engages the noncritical end of the segment of circle 500, but, as has been previously explained, this does not affect the normal outputs since brush 510 carries no signal. The count proceeds normally through the ⑨ interval. At the ⑨—⑩ transfer point, the normal count of 4 is modified to the desired output representation of 10 as has been previously described.

Suppose for the moment that fifth circle output brush 520 were directly connected to the input of buffer amplifier 788, and that it were the only input to buffer amplifier 788, the input through "or" circuit crystal 439 being eliminated. It is seen that brush 520 carries a signal only during the ⑩ interval. The placement of the left-hand end of the segment of circle 700 under the supposed circumstances would then have to be intermediate the ⑩ interval, preferably in the middle thereof, thereby allowing a tolerance of only ±1/2 an interval length. This tolerance may well be too small considering that there is a two-to-one gear reduction between pattern disks B—C and A which may have backlash and other nonlinearities. The purpose of providing an "or" circuit comprising crystals 439 and 539 to the input of one-to-one amplifier 788 is to increase this tolerance. Fourth circle output brush 420 carries a signal during the ⑧ and ⑨ intervals while fifth circle output brush 520 carries a signal during the ⑩ intervals. Intermediate the ⑧, ⑨, and ⑩ intervals then, intermediate the ⑦—⑧ and ⑩—⑪ transfer points, preferably in the middle thereof or at the midpoint of the ⑨ interval, we place the left-hand end of the segment of circle 700, thus allowing a tolerance of ±1½ interval lengths or three times the former tolerance under the supposed circumstances were brush 520 to be directly connected to amplifier 788. The right-hand end of the segment of circle 700 must be carried beyond that point intermediate the ⑪ interval where armature 873 disengages contact 871, removing the input excitation voltage. We have shown the other end to be at the ⑥—⑦ transfer point. The optimum placement is, however, at the ⑦—⑧ transfer point which would mean that a right-hand end of the segment of circle 700 would be carrying around to the lower half of circle 700 so as to lie one interval length distant from line C. At the ⑨—⑩ transfer point, the signal applied to the input of amplifier 788 is shifted from brush 420 to brush 520 but no matter which of brushes 420 or 520 carries the signal, it is applied through one of crystals 539 or 439 to the input of amplifier 788 and seventh circle input brush 710 carries a signal through the ⑧, ⑨, and ⑩ intervals.

At the mid-point of the ⑨ interval, then, input brush 710 contacts the segment of circle 700, but since at this point brush 710 carries a signal, it does not affect the normally positive-biased signal at seventh circle output brush 720. At the ⑨—⑩ transfer point, output brush 420 drops to ground but output brush 520 becomes positive. At the ⑨—⑩ transfer point, then, there occurs a switching between "or" circuit inputs from a signal through crystal 439 to a signal through crystal 539, but input brush 710 continues to carry a signal. At the ⑩—⑪ transfer point, brush 510 carrying a signal, breaks contact with the critical end of the segment of circle 500 and output brush 500 drops to ground. No signal is impressed through either of "or" circuit crystals 539 or 439 to the input of amplifier 788. Input brush 710 drops to ground forcing output brush 720 to ground potential and consequently modifying the normal count of 4 into the superextended output representation of 11 as has been previously described. The superextension signal at brush 720 causes the output at terminal 490 to change from a "0" to a "1." This superextension signal at brush 720 occurs only when both inputs to amplifier 788 rest at ground. Crystal 438 prevents the signal at output terminal 490 from being impressed through crystal 439 upon the input of amplifier 788. It will be appreciated that crystal 438 prevents the regeneration of signals around what would otherwise be a closed loop including crystal 439, amplifier 788, input brush 710, circle 700, output brush 720, biased inverting amplifier 779, crystal 783 and back to crystal 439. Crystal 438 opens this loop and prevents an unstable oscillation between "0" and "1" at output terminal 490 during the superextended ⑪ interval.

While pattern A is unenergized and pattern X receives input excitation voltage, the count will not usually proceed as it does on pattern A. The only limitation for pattern X is that it contain one interval which selectively represents the counts of 11 and 4.

Table 11S shows the normal and modified outputs at terminals 190, 290, 390, and 490 for the converter of FIGURE 11 in providing a superextended count as pattern disks A and B—C move under the stationary brushes to successively occupy the intervals ⑥, ⑦, ⑧, ⑨, ⑩, ⑪, . . . , ④, ⑤, and ⑥ again.

| Interval | Outputs at Terminal | | | | Binary Count | Decimal Count |
|---|---|---|---|---|---|---|
| | 490 | 390 | 290 | 190 | | |
| ⑧ | 1 | 0 | 0 | 0 | 1000 | 8 |
| ⑨ | 1 | 0 | 0 | 1 | 1001 | 9 |
| ⑩ | 0→1 | 1→0 | 0→1 | 0 | 1010 | 10 |
| ⑪ ④ | 0→1 | 1→0 | 0→1 | 0→1 | 1011 | 11 |
| ⑪ ④ | 0 | 1 | 0 | 0 | 0100 | 4 |
| ⑤ | 0 | 1 | 0 | 1 | 0101 | 5 |
| ⑥ | 0 | 1 | 1 | 0 | 0110 | 6 |
| ⑦ | 0 | 1 | 1 | 1 | 0111 | 7 |
| ⑧ | 1 | 0 | 0 | 0 | 1000 | 8 |

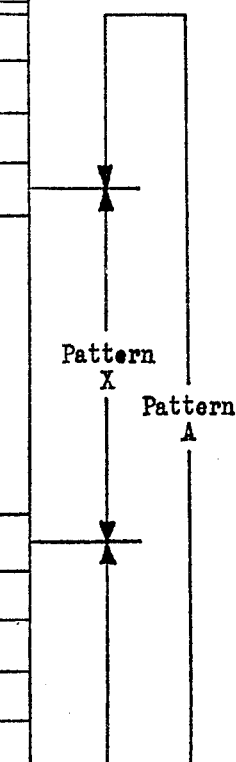

Pattern X

Pattern A

Table 11S

It will be noted that superextension takes place adjacent the discontinuity at the ⑩—④ transfer point, the ④ interval selectively representing the count of 11. It will be further noted that the superextended count of 11 is an adjacent representation, the count proceeding . . . 9, 10, 11, . . . As is apparent to those skilled in the art, the superextended representation may be any desired count. Also apparent to those skilled in the art is the fact that superextension may be made to take place in any one given interval and need not occur adjacent the ⑩—④ discontinuity. It is because superextension has been made to take place during the ④ interval that the occasion arose for deriving the single input signal to seventh circle 700 from a combination of two signals one of which includes an output signal at fifth circle 500.

Referring now to FIGURE 11a, which should be read in conjunction with FIGURE 11, the output of inverting amplifier 580 in addition to the connections shown in FIGURE 11, is also, as shown in FIGURE 11a, connected to one of the two inputs to an "and" circuit 724. Output brush 320 in addition to the connections shown in FIGURE 11, is also, as shown in FIGURE 11a, connected to the other input of "and" circuit 724. The "and" circuit 724 of FIGURE 11a is a substitution, an alternative configuration, for "or" circuit crystals 439 and 539 and for buffer amplifier 788 of FIGURE 11. Consequently, when the "and" circuit 724 of FIGURE 11a is employed, the following components shown in FIGURE 11 are not required: "or" circuit crystals 539 and 439, and buffer amplifier 788. The output of "and" circuit 724 is connected to seventh circle input brush 710.

When "and" circuit 724 is substituted in FIGURE 11, the normal condition for output brush 720 must be that it rest at ground rather than being positively biased by virtue of its connection to biased inverting amplifier 779. This necessitates other changes in FIGURE 11 from the configuration shown. Biased inverting amplifier 779 must be omitted, and output brush 720 must be connected directly to the anode of diode 781, 782, and 783. An inverting amplifier 780, not shown in FIGURE 11, must be provided between output brush 720 and the cathode of diode 784. This inverting amplifier 780 may have a high output impedance.

When "and" circuit 724 is substituted in FIGURE 11, crystal 438 may be omitted and output brush 420 connected directly to output terminal 490, since output brush 420 does not provide either of the inputs to "and" circuit 724, and the modified signal at output terminal 490 causes no deleterious feed-back effect.

That input of "and" circuit 724 which is derived from the output of inverting amplifier 580 is positive during all intervals except the ⑩ interval during which interval it rests at ground. That input to "and" circuit 724 which is derived from output brush 320 is positive only during the ⑩ interval and during that portion of the ⑪ interval where brush 610 remains in contact with the segment of circle 600, brush 610 breaking contact with the segment of circle 600 somewhere intermediate the ⑪ interval. The two inputs to "and" circuit 724 are then positive only during that portion of the ⑪ interval where first circle 100 receives input excitation voltage from relay contact 871. At the ⑨—⑩ transfer point, conduction shifts from brush 310 to brush 312 and output brush 320 becomes positive since brush 312 contacts the segment of circle 300, but at the ⑨—⑩ transfer point, output brush 520 becomes positive and the output of inverting amplifier 580 which supplies the other input to "and" circuit 724 drops to ground. At the ⑩—⑪ transfer point where brush 510 breaks contact with the segment of circle 500, the output of inverting amplifier 580 becomes positive. At the ⑩—⑪ transfer point, then, both inputs to "and" circuit 724 are positive, thus causing brush 710 to carry a signal. Since input brush 710 at this point contacts the segment of seventh circle 700, output brush 720 carries a superextension signal which is conducted forwardly through crystals 783, 782, and 781 to output terminals 490, 290, and 190 respectively. The positive signal now at brush 720 is impressed on the input of the inverting amplifier 780, not shown, the output of which drops to ground carrying with it the input to buffer amplifier 388 by virtue of the forward current now drawn through crystal 784. Thus the count of 4 is modified to the superextended representation of 11 during the ⑪ interval.

Referring now to FIGURE 12, a source of input excitation voltage, battery 10, has its negative terminal grounded. The positive terminal of battery 10 is connected to an armature 873 controlled by a relay actuating winding 870. When relay actuating winding 870 is unenergized, armature 873 normally engages one relay contact 871 of a pair of double-throw relay contacts 871 and 872. Relay contact 872 is connected to a terminal 890. Relay contact 871 is connected through an input resistor 127 to an input brush 110, stationarily disposed to alternately contact the segments and intersegmental spaces of a first circle 100. First circle output brush 120, stationarily disposed to always be in electrical connection with the conducting segments of circle 100, is connected to ground through an input loading resistor 128 and series sequentially through summing resistors 132 and 134 to the input of a one-to-one amplifier 188, the output of which is connected to first circle output terminal 190. First circle input brush 110 is connected to one terminal of a neon glow tube 150. The other terminal of glow tube 150, the negative terminal, is connected forwardly through a crystal 198 to one input brush 212 of a pair of input brushes 210 and 212, spaced apart one interval length and stationarily disposed to alternately contact the segment and space of a second circle 200. First circle output brush 120 is conneced forwardly through a crystal 196 to brush 210. Second circle output brush 220 is connected to second circle output terminal 290 and to ground through a loading resistor 230. First circle output brush 120 is also connected forwardly through a crystal 296 to one input brush 310 of a pair of input brushes 310 and 312 also spaced apart one interval length and disposed to alternately contact the segment and space of a third circle 300. The negative terminal of glow tube 150 is forwardly connected through a crystal 298 to brush 312. Third circle output brush 320 is connected to third circle output terminal 390 and through a loading resistor 330 to ground. Intermeshing with third circle 300 is a fourth circle 400, the segment of which occupies the space of circle 300 and whose intersegmental space is occupied by the segment of circle 300. Third circle input brushes 310 and 312 concomitantly provide complementary input signals to both the third circle 300 and the fourth circle 400. Fourth circle output brush 420 is connected through a loading resisting 430 to ground and through a summing resistor 432 to the input of a one-to-one amplifier 488. The output of amplifier 488 is connected to fourth circle output terminal 490. Fourth circle output brush 420 is also connected to an input brush 510, disposed to alternately contact the segment and space of a fifth circle 500. Fifth circle output brush 520 is connected forwardly through a crystal 581 to second circle output terminal 290 and is connected to the input of an inverting amplifier or trigger circuit 580. The output of trigger circuit 580 is connected backwardly through a crystal 583 to the junction of series connected summing resistors 132 and 134. The positive terminal of input battery 10 is connected through an input resistor 627 to an input brush 610, disposed to alternately contact the equal segment and space of a sixth circle 600. Sixth circle output brush 620 is connected to ground through an input loading resistor 628. Circles 100 through 600 are mounted concentrically on a first disk A, which is shown cut radially along line A and developed. A second disk B—C is reduction geared to rotate with disk A such that for one revolution of disk A, second disk B—C rotates through only one-half a revolution. Mounted concentrically on second disk B—C are circles 700 and 800. Fourth circle output brush 420 is connected to an input brush 710, disposed to alternately contact the segment and intersegmental space of seventh circle 700. Seventh circle output brush 720 is connected forwardly through a crystal 781 to the input of amplifier 188 and is also connected to the input of an inverting amplifier or trigger circuit 780, the normally positive output of which is connected backwardly through a crystal 783 to the input of amplifier 488. Sixth circle input brush 610 is connected through a glow tube 650 to one input brush 812 of a pair of input brushes 810 and 812 spaced apart half the length of the segment of circle 800 and disposed to alternately contact the equal segment and space of the eighth circle 800. Sixth circle output brush 620 is connected forwardly through a crystal 696 to brush 810. Eighth circle output brush 820 is connected to the input of what may conveniently be a one-to-one amplifier 888. The output of amplifier 888 is connected to one terminal of relay actuating winding 870, the other terminal of which is grounded. Inverting amplifiers 580 and 780 may have high output impedances.

The operation of the converter of FIGURE 12, neglecting the superextension effect of circle 600 of pattern A and of circles 700 and 800 of pattern B—C, is similar to that of FIGURES 3 and 4. The converter is shown at the ④—⑩ recycling transfer point where the count has a discontinuity or jump between the large and small even numbers 10 and 4. As the brushes move to the left relative to pattern A, first circle input brush 110 contacts the double interval length segment of first circle 100. The normal converter output representation then changes from 4 to 9, which representation of 9 must be modified to the desired count of 10. At the ④—⑩ transfer point, conduction shifts from brush 312 to brush 310 which contacts the segment of fourth circle 400. Output brush 420 carries a signal, and, since brush 510 now contacts the segment of fifth circle 500, output brush 520 now carries a modification signal which is impressed forwardly through crystal 581 upon output terminal 290, modifying it from a "0" to a "1," thereby increasing the count of 9 by 2 to the count of 11 which is 1 greater than the desired output representation of 10. The positive signal at brush 520 is, however, impressed on the input of inverting amplifier 580, the output of which drops to ground, thereby drawing the junction of summing resistors 132 and 134 down to ground by virtue of the forward current through crystal 583 passing through summing resistor 132. The input of buffer amplifier 188 likewise drops to ground because of the resistive coupling through summing resistor 134 and the output at terminal 190 is modified from a "1" to a "0," thus decreasing the count of 11 by 1 to the desired output representation of 10 during the ⑩ interval. At the ⑩—⑨ transfer point, input brush 510 carrying a signal breaks contact with the critical end of the segment of circle 500. Output brush 520 no longer carries a modification signal. The normal output representation of 9 is allowed to appear at terminals 190 through 490 during the ⑨ interval. The count proceeds conventionally through the ⑨ and ⑧ intervals. At the ⑧—⑦ transfer point, conduction shifts from brush 312 to brush 310 and output brush 420 and input brush 510 drop to ground potential. The count proceeds conventionally through the ⑦ and ⑥ intervals. When the ④—⑩ transfer point will be reached, output brush 420 and input brush 510 will again become positive. Intermediate the ⑦, ⑥, ⑤, and ④ intervals, intermediate the ⑧—⑦ and ④—⑩ transfer points, preferably in the middle thereof, or at the ⑥—⑤ transfer point, input brush 510 contacts the noncritical end of the segment of circle 500. But, since at the ⑥—⑤ transfer point brush 510 carries no signal, no modification effect is produced upon the normal converter output signals. The count proceeds conventionally through the ⑤ and ④ intervals to again arrive at the ④—⑩ recycling transfer point where pattern A has completed one full revolution. It will be appreciated that where it is not desired to effect superextension of count the following components may be eliminated: input resistor 627, input brush 610, circle 600, output brush 620, input loading resistor 628, neon glow tube 650, crystal 616, complementary input brushes 810 and 812, circle 800, output brush 820, buffer ampliger 888, relay actuating winding 870, armature 873, relay contacts 871 and 872, input brush 710, circle 700, output brush 720, inverting amplifier 780, crystals 783 and 781, summing resistor 432, buffer amplifier 488, pattern disk B—C, and the two-to-one reduction gearing associated with pattern disk B—C. Also summing resistor 134 may be eliminated and the anode of diode 538 connected directly to the input of buffer amplifier 188.

Table 12 shows the normal output representations at the terminals 490 and 390 and the normal and modified output representations at terminals 290 and 190 for the converter of FIGURE 12, neglecting the superextension effect of circles 600, 700, and 800, as pattern disk A moves under the stationary brushes to successively occupy the intervals ⑥, ⑦, ⑧, ⑨, ⑩, and ④, ⑤, ⑥, again.

| Interval | Outputs at Terminal | | | | Binary Count | Decimal Count |
|---|---|---|---|---|---|---|
| | 490 | 390 | 290 | 190 | | |
| ⑥ | 0 | 1 | 1 | 0 | 0110 | 6 |
| ⑦ | 0 | 1 | 1 | 1 | 0111 | 7 |
| ⑧ | 1 | 0 | 0 | 0 | 1000 | 8 |
| ⑨ | 1 | 0 | 0 | 1 | 1001 | 9 |
| ⑩ | 1 | 0 | 0→1 | 1→0 | 1010 | 10 |
| ④ | 0 | 1 | 0 | 0 | 0100 | 4 |
| ⑤ | 0 | 1 | 0 | 1 | 0101 | 5 |
| ⑥ | 0 | 1 | 1 | 0 | 0110 | 6 |

Table 12

In FIGURE 12, neglecting the superextension effect of circles 600, 700, and 800, and omitting from consideration for the moment circle 500, the pattern appears to have the natural jump or discontinuity between the large odd number 9 and the small even number 4 where, however, the segment which represents the count of 9 is of double interval length. Circle 500 artificially modifies the normal converter output representation so that a portion of the double interval length segment which appears to represent the count of 9 may actually represent the count of 10. In the second method as embodied in FIGURES 3, 4, and 10, only a portion of the double interval length segment or space, depending on whether an inverse form is used, actually represents the count of the large odd number which for FIGURE 12 is the number 9.

In operation of the converter of FIGURE 12 where it is desired to effect superextension of count at the ④—③ transfer point, as shown, as the brushes move to the left relative to the patterns A and B—C, first circle input brush 110 contacts the double interval length segment of first circle 100. As has been explained, the normal converter output representation of 9 is modified to an output representation of 10. But we desire that this output representation of 10 be further modified, doubly modified into the superextended output representation of 3. At the ④—③ transfer point, output brush 420 becomes positive and since brush 710 contacts the segment of circle 700, the positive signal at output brush 420 and input brush 710 causes output brush 720 to carry a modification signal which is impressed forwardly through crystal 781 upon the input of buffer amplifier 188, thus increasing the count of 10 by 1 to the count of 11 which is 8 greater than the desired superextended representation of 3. The positive signal at output brush 720 causes the output of inverting amplifier 780 to drop to ground potential, carrying with it the input to buffer amplifier 488 by virtue of the forward current now drawn through crystal 783, thus changing the output at terminal 490 from a "1" to a "0" and thereby reducing the count of 11 by 8 to the desired superextended representation of 3. It is seen that the input to amplifier 188 is the result of a double modification of the signal appearing at first circle output brush 120. During the ⑩ interval the normal converter output representation at terminal 190 would be a "0." The output of circle 500 modifies this "0" to a "1" but the output of circle 700 remodifies the "1" back to the original "0" again. In FIGURE 12, proceeding from output brush 120 to first circle output terminal 190, during the superextended ③ interval, the signals are: "1"—"0"—"1." It may be noted that the double modification here in FIGURE 12 is the inverse of that shown in FIGURE 9, since in FIGURE 9 the signals, proceeding from output brush 120 to terminal 190 during the superextended ⑩ interval, are: "0"—"1"—"0." Returning now to consideration of FIGURE 12, somewhere intermediate the ③ interval, input brush 610 contacts the segment of circle 600 causing conduction to shift from brush 812 to brush 810. Because brush 810 now contacts the segment of circle 800, an interpattern transfer signal is thereby produced at output brush 820 which through amplifier 888 energizes relay actuating winding 870. Armature 873 is drawn from its normal engagement with relay contact 871 into engagement with relay contact 872. Terminal 890 supplies the input excitation voltage to a pattern X which is not shown here in FIGURE 12. The disengagement of armature 873 with relay contact 871 removes the input excitation voltage from circle 100 causing the converter outputs to drop to ground potential. At this point, pattern X which now receives input excitation voltage, produces and continues the count of 3 which formerly was produced by pattern disk A and circle 700 of pattern disk B—C. Corresponding outputs of patterns A and X are connected in parallel with such blocking crystals as may be required to prevent unwanted cross-feeding of signals from an energized pattern to a pattern whose outputs rest at ground. As pattern A rotates through the remainder of the ③ interval and completes one revolution, returning to a point intermediate the ⑩ interval, pattern X continues to receive input excitation voltage while the outputs of pattern A remain at ground. Of course, at the ⑦—⑥ transfer point where brush 610 breaks contact with the segment of circle 600, conduction shifts from brush 810 back to brush 812, but since both brushes 810 and 812 contact the segment of circle 800, output brush 820 continues to carry a signal and relay winding 870 remain energized. It will be noted that no blocking crystal need be provided between glow tube 650 and brush 812. Intermediate the ⑩ interval, which one revolution previous of pattern A was selectively the ③ interval, sixth circle input brush 610 contacts the segment of circle 600 causing conduction to shift from brush 812 to brush 810. Brushes 810 and 812 at this point symmetrically straddle the transfer point on the lower half of circle 800 and since brush 810 lies in the intersegmental space of circle 800, output brush 820 loses its signal with the result that amplifier 888 no longer energizes relay winding 870. Armature 873 disengages contact 872 and returns to its normal engagement with relay contact 871. Pattern X at this point was producing a count of 10. At the interpattern switching point intermediate the ⑩ interval when first circle 100 receives input excitation voltage, pattern A produces and continues the count of 10 formerly produced by pattern X. Seventh circle input brush 710 at this point lies in the space on the lower half of seventh circle 700 and no superextension signal is produced at output brush 720, thus an output representation of 10 is permitted to appear at terminals 190 through 490. At the ⑩—⑨ transfer point, brush 510 carrying a signal breaks contact with the critical end of the segment of circle 500, thus permitting the normal converter output representation of 9 as has been previously described. The count proceeds conventionally through the ⑨, ⑧, ⑦, ⑥, ⑤, and ④ intervals. Since output brush 420 supplies both the modification signal input to brush 510 and the superextension signal input to brush 710 for the very same reason that the noncritical end of the segment of circle 500 is placed at the ⑥—⑤ transfer point, the right-hand end of the segment of circle 700 is also placed at the ⑥—⑤ transfer point. Meanwhile then at the ⑥—⑤ transfer point, brush 710 contacts the segment of circle 700, but since at this point brush 710 rests at ground, no superextension effect is produced at the output terminals. At the ④—③ transfer point brush 420 becomes positive and produces a modification signal at output brush 520 and a superextension signal at output brush 720, as has been previously described. The converter thus completes a full cycle which requires two revolutions of pattern disk A, while, at the same time, pattern disk B—C performs one revolution. The length of the segment of circle 700 is not critical. As has been explained, one end corresponds to the ⑥—⑤ transfer point and the left-hand end must lie beyond that point intermediate the ③ interval where the input excitation is removed from circle 100 of pattern A. We have shown the left-hand end of the segment of circle 700 as corresponding to the ⑦—⑥ transfer point and this is the optimum placement to maximize and evenly split the allowable tolerances.

While pattern A is unenergized and pattern X receives input excitation voltage the count need not, and in most applications will not, proceed at is does on pattern A. It is only required that pattern X contain one interval which selectively represents the counts of 10 and 3.

Table 12S shows the normal outputs at terminal 390, the normal and modified outputs at terminals 490 and 290 and the normal and doubly modified outputs at terminal 190 for the converter of FIGURE 12 in providing a superextended count as pattern disks A and B—C move under the stationary brushes to successively occupy the intervals ⑤, ⑥, ⑦, ⑧, ⑨, ⑩, . . . , ③, ④, and ⑤ again.

| Interval | Outputs at Terminal | | | | Binary Count | Decimal Count |
|---|---|---|---|---|---|---|
| | 490 | 390 | 290 | 190 | | |
| ⑦ | 0 | 1 | 1 | 1 | 0111 | 7 |
| ⑧ | 1 | 0 | 0 | 0 | 1000 | 8 |
| ⑨ | 1 | 0 | 0 | 1 | 1001 | 9 |
| ⑩ ③ | 1 | 0 | 0→1 | 1→0 | 1010 | 10 |
| ⑩ ③ | 1→0 | 0 | 0→1 | 1→0→1 | 0011 | 3 |
| ④ | 0 | 1 | 0 | 0 | 0100 | 4 |
| ⑤ | 0 | 1 | 0 | 1 | 0101 | 5 |
| ⑥ | 0 | 1 | 1 | 0 | 0110 | 6 |
| ⑦ | 0 | 1 | 1 | 1 | 0111 | 7 |

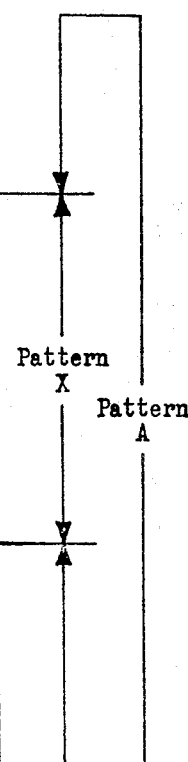

Table 12S

It will be noted that superextension takes place adjacent the discontinuity at the ⑩—④ transfer point, the ⑩ interval selectively representing the count of 3. It will be further noted that the superextended count of 3 is an adjacent representation, the count proceeding . . . 5, 4, 3, . . . As will be obvious to those skilled in the art the superextended representation may be made any desired count. Also apparent to those skilled in the art is the fact that superextension may be made to take place in any one given interval and need not occur adjacent the ④—⑩ discontinuity. We have shown superextension to take place during an interval where the normal converter output representation must be artificially modified, namely the ⑩ interval and thus there arose the occasion for double modification. Were superextension made to occur during any interval other than the ⑩ interval, the need for double modification would, of course, not have arisen.

Let us now summarize what is shown in FIGURES 7, 8, 9, 10, 11, and 12 and add a few generalizations which we have discovered.

Where there is a jump or discontinuity between a large odd number and a nonadjacent small even number, as in FIGURES 7 and 8, the solution may be had by the method taught in the copending application of Carl F. Schaefer et al. This jump or discontinuity will be termed "natural," since it does not involve an additional circle having at least one segment with a noncoincident transfer point and provided with only a single input signal. However, where it is desired to superextend the count requiring any one interval to selectively represent a different and superextended count, then this invention must be practiced by the provision of an additional circle, circle 600 in FIGURES 7 and 8, upon an additional pattern disk, pattern disk B—C, reduction geared to rotate with the main converter pattern, pattern A, such that the additional disk B—C has a lower periodicity. Only a single input signal is coupled to the additional circle, circle 600, and this signal is derived ultimately from one of the two complementary output signals of the first circle 100 of the main converter pattern A. The output signal of the circle 600 mounted on the additional pattern disk B—C modifies the normal output signals of pattern A during the superextended interval. Neither end of the segment of the additional circle 600 is a critical end.

There are two methods of solution to the problem of a discontinuity or jump between large and small odd numbers. In the first method as embodied in FIGURE 9, the pattern appears to have the natural jump from a large odd number to a small even number, but the space (or segment, if an inverse form is used) which appears to represent the small even number is of double interval length so that a portion thereof may be artificially modified to actually represent the small odd number. An additional circle, circle 500 in FIGURE 9, mounted on the main converter pattern disk A has the critical end of its segment positioned intermediate the double interval length space which appears to represent a small even number, and controls the transfer point between the two portions of the double interval length space. The segment extends at least through the interval representing the small odd number and beyond the transfer point between the large and small odd number. The other end of the segment of the additional circle 500 is a noncritical end. Only a single input signal is coupled to the additional circle 500 and this signal is derived ultimately from one of the two complementary output signals of the first circle 100. The output signal from additional circle 500 modifies the normal converter output signals during the interval of the small odd number which for FIGURE 9 is the count of 3. Where it is also desired to superextend the count such that one interval must selectively represent the superextended count, then a second additional circle, circle 700, must be mounted upon another pattern disk, disk B—C, reduction geared to rotate with the main converter pattern disk A. Only a single input signal is coupled to the second additional circle 700 and this signal is derived ultimately from one of the two complementary output signals of the first circle 100. Neither end of the segment of second additional circle 700 is a critical end. The output signal of the second additional circle 700 mounted on the reduction-geared pattern disk B—C modifies the normal output signals of pattern A during the superextended interval. Where the interval of the small odd number is the superextended interval then the occasion for double modification may arise. In FIGURE 9 the interval of the small odd number 3 is subjected to superextension and the occasion for double modification arises for the output signal at terminal 190 because for the first method the interval of the small odd number is an artificially produced representation. Were any other interval than the interval of the small odd number to be subjected to superextension the occasion for double modification would not have arisen. Were superextension made to occur during the interval of the large odd number, the count of 9 of FIGURE 9, to the representation of S, the count proceeding . . . 4, 3, 3, . . . , the converter outputs would be subjected to only simple modification, and the single input signal to the second additional circle 700 would be derived from output brush 420 rather than from output brush 320.

In the second method of solution to the problem of a discontinuity or jump between large and small odd numbers, as embodied in FIGURE 10, the pattern appears to have a natural jump or discontinuity from a large odd number to a small even number, but the segment (or space, if an inverse form is used) which appears to represent the large odd number is of double interval length so that a portion thereof may be artificially modified to actually represent the small odd number. An additional circle, circle 500 in FIGURE 10, mounted on the main converter pattern disk A has the critical end of its segment positioned intermediate the double interval length segment which appears to represent the large odd number and controls the transfer point between the two portions of the double interval length segment. The segment extends at least through the interval representing the small odd number and beyond the transfer point between the small odd number and the small even number. The other end of the segment of circle 500 is a noncritical end and may correspond to a transfer point of the first circle 100 or it may lie intermediate two particular transfer points of first circle 100. Only a single input signal is coupled to the additional circle 500 and this is derived ultimately from one of the two complementary output signals of the first circle 100. The output signal from the additional circle 500 modifies the normal converter output representation during the interval of the small odd number which for FIGURE 10 is the count of 3. Where it is also desired to superextend the count such that one interval must selectively represent the superextended count, then a second additional circle, circle 700, must be mounted upon another pattern disk B—C reduction geared to rotate with the main converter pattern A. Only a single input signal is coupled to the second additional circle 700 and this signal is derived ultimately from one of the two complementary output signals of the first circle 100. Neither end of the segment of the second additional circle 700 is a critical end. The output signal of the second additional circle 700 mounted on the reduction-geared pattern disk B—C, modifies the normal output signals of pattern A during the superextended interval. Where the interval of the large odd number is the superextended interval, then the occasion may arise for the derivation of the single signal to the second additional circle 700 from a combination of two signals, one of which is the output signal of the first additional circle 500 and the other of which is a signal derived ultimately from one of the two complementary output signals of the first circle 100, in order to increase the allowable tolerances which might otherwise become critical due to backlash and other nonlinearities in the reduction gearing between the two pattern disks. Were the interval of the small odd number to be subjected to superextension, then the occasion for double modification might arise since the interval of the small odd number is an artifically produced representation.

There are two methods of solution to the problem of a discontinuity or jump between large and small even numbers. In the first method as embodied in FIGURES 1, 2, 5, and 11, the pattern appears to have a natural jump or discontinuity from a large even number to a small even number, but where the space (or segment if an inverse form is used) which appears to represent the small even number is of double interval length so that a portion thereof may be artificially modified to actually represent the large even number. An additional circle, circle 200 in FIGURES 1, 2, and 5, and circle 500 in FIGURE 11, mounted on the main converter pattern disk, has the critical end of its segment positioned intermediate the double interval length space which appears to reprsent the small even number and controls the transfer point between the two portions of the double interval length space. The segment extends at least through the interval representing the large even number and beyond the transfer point between the large even number and the large odd number. The other end of the segment of the additional circle is a noncritical end. Only a single input signal is coupled to the additional circle and this signal is derived ultimately from one of the two complementary output signals of the first circle 100. In FIGURES 1, 2, and 5, this signal is derived directly from one of the two complementary output signals of the first circle 100 while in FIGURE 11 the signal is not derived directly but rather ultimately from one of the two complementary output signals of the first circle 100. The output signal from the additional circle modifies the normal converter output representation during the interval of the large even number which for FIGURES 1, 2, and 5 is the count of 2 and for FIGURE 11 is the count of 10. Where, as in FIGURE 11, it is also desired to superextend the count such that one interval must selectively represent the superextended count, then a second additional circle, circle 700, must be mounted upon another pattern disk, disk B—C, reduction geared to rotate with the main converter pattern A. Only a single input signal is coupled to the second additional circle 700 and this signal is derived ultimately from one of the two complementary output signals of the first circle 100. Neither end of the segment of the second additional circle is a critical end. The output signal of the second additional circle mounted on the reduction-geared pattern disk modifies the normal output signals of pattern A during the superextended interval. Where the interval of the small even number is the superextended interval, then the occasion might arise for the derivation of the single signal to the second additional circle from a combination of two signals, one of which is an output signal of the first additional circle and the other of which is derived ultimately from one of the two complementary output signals of the first circle 100, in order to increase the allowable tolerances which otherwise might become critical because of backlash and other nonlinearities in the reduction gearing between two pattern disks. Were superextension made to occur during the interval of the large even number, the count of 10 for FIGURE 11, then the occasion for double modification might arise since the interval of the large even number is an artificially produced representation.

In the second method of solution to the problem of a discontinuity or jump between large and small even numbers as embodied in FIGURES 3, 4, 6, and 12, the pattern appears to have the natural jump from a large odd number to a small even number, but where the segment (or space if an inverse form is used) which appears to represent the large odd number is of double interval length so that a portion thereof may be artificially modified to actually represent the large even number. An additional circle, circle 200 in FIGURES 3, 4, and 6 and circle 500 in FIGURE 12, mounted on the main converter pattern disk, has the critical end of its segment positioned intermediate the double interval length segment which appears to represent the large odd number and controls the transfer point between the large odd number and the large even number, both of which intervals are subtended by the double interval length segment. The segment extends at least through the interval representing the large even number and beyond the transfer point between the large and small even numbers. The other end of the segment of the additional circle is a noncritical end and may lie either correspondent to or intermediate to particular transfer points of the first circle 100. Only a single input signal is coupled to the additional circle and this signal is derived ultimately from one of the two complementary output signals of the first circle 100. In FIGURES 3, 4, and 6, this single signal is derived directly from one of the two complementary output signals of the first circle 100 while in FIGURE 12 it is not derived directly but rather ultimately from one of the two complementary output signals of first circle 100. The output signal from the additional circle modifies the normal converter output representation during the interval of the large even number, which for FIGURES 3, 4, and 6 is the count of 2 and for FIGURE 12 is the count of 10. Where, as in FIGURE 12, it is also desired to superextend the count such that one interval must selectively represent the superextended count, then a second additional circle, circle 700, must be mounted upon another pattern disk, disk B—C, reduction geared to rotate with the main converter pattern disk A. Only a single input signal is coupled to the second additional circle 700 and this signal is derived ultimately from one of the two complementary output signals of first circle 100. Neither end of the segment of the second additional circle is a critical end. The output signal of the second additional circle mounted on the reduction-geared pattern disk modifies the normal output signals of pattern A during the superextended interval. Where the interval of the large even number is subjected to superextension, then the occasion for double modification may arise. In FIGURE 12, the interval of the large even number 10 is subjected to superextension and the occasion for double modification arises for the output signal at terminal 190 because for the second method the interval of the large even number is an artificially produced representation. Were any interval other than the interval of the large even number to be subjected to superextension, the occasion for double modification would not have arisen. Were superextension made to occur during the interval of the small even number, the count of 4 for FIGURE 12, to the representation of S, the count proceeding ... 9, 10, S, ..., the converter outputs would be subjected to only simple modification and the single input signal to the second additional circle 700 would be derived from output brush 320 rather than from output brush 420.

In FIGURES 7 through 12 we have thus far pointed out in detail superextension occurring adjacent the discontinuities but have only generally indicated that any interval may properly be subjected to superextension. Suppose that in FIGURES 7 through 12 superextension is made to occur adjacent either the ⑧—⑨, or the ④—⑤, or the ⑥—⑦ transfer points. It will be appreciated that the single signal to the first additional circle, circle 600, in FIGURES 7 and 8, and the single input signal to the second additional circle, circle 700 of FIGURES 9 through 12, must be derived directly rather than ultimately from one or the other of the two complementary output signals of the first circles 100 according as the superextended interval is one or the other of the two intervals adjacent a particular one of the supposed transfer points. It will be further appreciated that the tolerances are small and that, because of backlash and other nonlinearities in the reduction gearing, it may be necessary to derive the single signal to the superextension circle, circle 600 in FIGURES 7 and 8, and circle 700 in FIGURES 9 through 12, from a combination of two signals, one of which is an output signal of the first circle 100, rather than an output signal of the first additional circle 500 as in FIGURES 10 and 11, and the other of which is a signal derived ultimately from one of the two complementary output signals of the first circle 100.

Suppose in FIGURE 9 that superextension is made to occur adjacent the ③—④ transfer point, it will be appreciated that the single input signal to the second additional circle 700 must be derived from an output signal of the first additional circle 500. It will be further appreciated that it may be necessary, considering backlash and other nonlinearities in the reduction gearing, to derive the single input signal to the second additional circle 700 from a combination of two signals one of which is an output signal of the first additional circle 500 and the other of which is derived ultimately from one of the two output signals of the first circle 100.

Suppose in FIGURE 12 that superextension is made to occur adjacent the ⑨—⑩ transfer point. It will be appreciated that the single input signal to the second additional circle 700 must be derived from an output signal of the first additional circle. It will be further appreciated that because of backlash and other nonlinearities in the reduction gearing, which might otherwise become critical, the allowable tolerances may be increased by deriving the single input signal to the second additional circle 700 from a combination of two signals one of which is an output signal of the first additional circle 500, and the other of which is derived ultimately from one of the two complementary output signals of the first circle 100.

In FIGURES 7 through 12 we have shown all intervals to be of equal length so that in FIGURES 9 through 12 the double interval length segment or space may be easily seen. It will be appreciated, however, that the converters of FIGURES 7 through 12 are all adapted to provide nonlinear counts with corresponding variation in the lengths of the segments and spaces.

*Functions Containing Simple Discontinuities or Jumps Between Large Even and Nonadjacent Small Odd Numbers, and the Superextension of Count for Such Functions*

Referring now to FIGURE 13, a source of input excitation voltage, battery 10, has its negative terminal grounded and its positive terminal connected to a relay armature 873 controlled by relay actuating winding 870. Armature 873 normally engages relay contact 871 of a pair of double throw relay contacts 871 and 872. Relay contact 872 is connected to a terminal 890. Relay contact 871 is connected through an input resistor 127 to an input brush 110, disposed to alternately contact the segments and intersegmental spaces of a first circle 100. First circle output brush 120 is connected to ground through an input loading resistor 128, and forwardly through a crystal 139 to the first circle output terminal 190. Output terminal 190 is connected to ground through a loading resistor 130. First circle input brush 110 is connected to one terminal of a neon glow tube 150. The other terminal of neon glow tube 150, the negative terminal thereof, is connected forwardly through a crystal 198 to one input brush 212 of a pair of input brushes 210 and 212, spaced apart one interval length of circle 100 and stationarily disposed to alternately contact the segments and spaces of a second circle 200. First circle output brush 120 is connected forwardly through a crystal 196 to second circle input brush 210. Second circle output brush 220 is connected to second circle output terminal 290, and to ground through a loading resistor 230. First circle output brush 120 is connected forwardly through a crystal 296 to one input brush 310 of a pair of input brushes 310 and 312 having a spacing equal to that between brushes 210 and 212 and stationarily disposed to alternately contact the segment and space of a third circle 300. The negative terminal of glow tube 150 is connected forwardly through a crystal 298 to brush 312. Third circle output brush 320 is connected through a summing resistor 332 to the input of a one-to-one amplifier 388, the output of which is connected to third circle output terminal 390. Output brush 320 is also connected to ground through a loading resistor 330. Intermeshing with third circle 300 is a fourth circle 400, the segment of fourth circle 400 occupying the space of third circle 300 and the space of fourth circle 400 being occupied by the segment of third circle 300. Third circle input brushes 310 and 312 concomitantly provide complementary input signals to both circles 300 and 400. Fourth circle output brush 420 is connected through a summing resistor 432 to the input of a one-to-one amplifier 488, and through a loading resistor 430 to ground. The output of amplifier 488 is connected to fourth circle output terminal 490. Relay contact 871 is also connected through an input resistor 527 to an input brush 510, disposed to alternately contact the segment and intersegmental space of a fifth circle 500. Fifth circle output brush 520 is connected to ground through an input loading resistor 528, and forwardly through crystals 581 and 582 to first and second output terminals 190 and 290, respectively. Fifth circle input brush 510 is connected to one terminal of a neon glow tube 550. The other terminal of glow tube 550, the negative terminal, is connected backwardly through crystals 583 and 584 to the inputs to amplifiers 388 and 488, respectively, and is also connected through a loading resistor 533 to the negative terminal of another battery 12, which has its positive terminal grounded. The positive terminal of input excitation battery 10 is connected through an input resistor 627 to an input brush 610, disposed to alternately contact the equal segment and intersegmental space of a sixth circle 600. Sixth circle output brush 620 is connected to ground through an input loading resistor 628. Circles 100 through 600 are concentrically mounted on a first nonconductive disk A, which is shown cut radially along line A and developed. Upon a second disk B—C, which is reduction geared to rotate with first disk A such that one revolution of disk A causes only half a revolution of second disk B—C, are concentrically mounted a seventh circle 700 and an eighth circle 800. Fifth circle output brush 520 is connected forwardly through an "or" circuit crystal 539 to the input of a one-to-one amplifier 788. Third circle output brush 320 is connected forwardly through an "or" circuit crystal 339 to the input of amplifier 788. Crystals 339 and 539 comprise an "or" circuit to the input of amplifier 788. The output of amplifier 788 is connected to an input brush 710, stationarily disposed to alternately contact the segment and intersegmental space of the seventh circle 700. Seventh circle output brush 720 is connected backwardly through a crystal 783 to the input of amplifier 488. Sixth circle input brush 610 is connected through a neon glow tube 650 to one input brush 812 of a pair of input brushes 810 and 812, spaced apart half a segment length of circle 800 and stationarily disposed to alternately contact the equal segment and intersegmental space of the eighth circle 800. Sixth circle output brush 620 is connected forwardly through a crystal 696 to the input brush 810. Eighth circle output brush 820 is connected to the input of what may conveniently be a one-to-one amplifier 888. The output of amplifier 888 is connected to one terminal of relay actuating winding 870, the other terminal of which is grounded.

Assuming that battery 12 supplies a negative voltage equal to half the positive voltage of input excitation battery 10, then loading resistor 533 should have a resistance value somewhat less than that of summing resistors 432 or 332 so that when either of third or fourth circle output brushes 320 or 420 carries a signal of approximately one-half the voltage of input battery 10, the negative terminal of glow tube 550, disregarding for the moment any current through glow tube 550, would rest below ground potential by virtue of the voltage dividing action of summing resistors 332 or 432 in conjunction with loading resistor 533. But since, when the negative terminal of glow tube 550 rests below ground, the breakdown voltage is exceeded, some current will pass through glow tube 550 and then through loading resistor 533. The glow tube 550 regulates and brings the negative terminal of glow tube 550 up to ground potential. It will be noted that output brushes 320 and 420 cannot both be positive at the same time.

A discontinuity or jump between nonadjacent large even and small odd numbers, as in FIGURES 13 and 14, is the inverse of the natural discontinuity or jump between nonadjacent large odd and small even numbers, as in FIGURES 7 and 8, and hence as an intuitive matter it might be expected that the solutions of FIGURES 13 and 14 are different from any of those previously shown.

The operation of the converter of FIGURE 13, neglecting the superextension effect of circle 600 of pattern A and of circles 700 and 800 of pattern B—C is different from that of the converters of any of the preceding figures. The converter is shown at the ⑩—③ recycling transfer point where the count has a jump between the large even number 10 and the small odd number 3. As the brushes move to the right relative to pattern A, first circle input brush 110 lies intermediate the triple interval length space of first circle 100 and hence cannot control a change in output representation. However, fifth circle input brush 510 at the ⑩—③ transfer point contacts a critical end of the segment of circle 500. Output brush 520 now carries a signal which is impressed forwardly through crystal 581 upon output terminal 190, modifying it from its normal "0" to a "1," thereby increasing the count of 10 by 1 to the count of 11 which is greater by 8 than the desired output representation of 3. Crystal 139 prevents the low impedance of input loading resistor 128 from being presented to the modification signal at output brush 520. At the same time the signal at output brush 520 is impressed forwardly through crystal 582 upon output terminal 290 thereby ensuring that a "1" appears at output terminal 290. Output terminal 290 then carries a signal for two reasons either of which is sufficient; first, because of the signal at output brush 220 by reason that brush 212 which carries a signal contacts a segment of circle 200, and secondly, because output brush 520 carries a signal. However, when output brush 520 becomes positive, the negative terminal of glow tube 550 drops to ground potential and carries with it the input to amplifier 488 by virtue of the forward current now drawn through crystal 584. The output at terminal 490 is modified from its normal "1" to a "0," thus decreasing the count of 11 by 8 to the desired output representation of 3. The ground potential now existing at the negative terminal glow tube 550 ensures, through crystal 583, that a "0" appears at output terminal 390. Output terminal 390 then rests at ground for two reasons, either of which is sufficient; firstly, because output brush 320 rests at ground by reason that brush 312 which carries a signal does not contact a segment of circle 300, and secondly, because of the ground potential existing at the negative terminal of glow tube 550. Just before first circle input brush 110 reaches the mid-point of the ③ interval, the normal converter output representation still being 10, leading brush 312 which carries a signal, breaks contact with the segment of circle 300 and enters the small clearance gap which separates the segments of circles 300 and 400. Output brush 420 loses its signal and drops to ground potential. At this point a "0" appears at output terminal 490 for two reasons, either of which is sufficient; firstly, because output brush 420 rests at ground by reason that brush 312 which carries a signal has broken contact with the segment of circle 400, and secondly, because of the ground potential existing at the negative terminal of glow tube 550. When first circle input brush 110 reaches the mid-point of the ③ interval, leading brush 212 which carries a signal breaks contact with a segment of circle 200. Normally output brush 220 and output terminal 290 would drop to ground potential. However, a "1" continues to appear at terminal 290 because of the modification signal at output brush 520 which is coupled forwardly through crystal 582. Output terminal 290 now represents a "1" only because brush 520 carries a signal, since brush 212 has broken contact with a segment of circle 200. Just after first circle input brush 110 reaches the mid-point of the ③ interval, leading brush 312 which carries a signal moves from the small clearance gap between the segments of circles 300 and 400 and contacts the segment of circle 300. The normal converter output representation is now a 4, since output brush 320 now carries a signal. However, a "0" continues to appear at output terminal 390 because of the modification produced by the ground potential appearing at the negative terminal of glow tube 550 which permits forward current through crystal 583. Output terminal 390 now represents a "0" only because of the ground potential existing at the negative terminal of glow tube 550. At the ③—④ transfer point, first circle input brush 110 still lies intermediate the triple interval length space of circle 100 and remains ineffective to provide a change in output representation. However, at the ③—④ transfer point, brush 510 breaks contact with the other critical end of the segment of circle 500. All modification signals from circle 500 are removed and the normal converter output representation of 4 originating at output brush 320 is allowed to appear at output terminal 390. The count proceeds conventionally through the ④, ⑤, ⑥, ⑦, ⑧, ⑨, and ⑩ intervals to again revive at the ⑩—③ recycling transfer point where pattern disk A has completed one full revolution. During the first half of the ③ interval there is an overlapping at terminals 290 and 390 of the normal converter output signals and the modification signals from circle 500. During the second half of the ③ interval at terminals 290 and 390 there is merely a modification by circle 500 of the normal converter output signals. During the first half of the ③ interval at terminal 490 there is merely a modification by circle 500 of the normal converter output signal. During the second half of the ③ interval at terminal 490 there is an overlapping of the normal converter output signal and a modification signal from circle 500. It will be appreciated that where it is not desired to effect superextension of count the following components are not required: input resistor 627, input brush 610, circle 600, output brush 620, input loading resistor 628, glow tube 650, crystal 696, complementary input brushes 810 and 812, circle 800, output brush 820, buffer amplifier 888, relay actuating winding 870, relay armature 873, relay contacts 871 and 872, crystals 339 and 539, amplifier 788, input brush 710, circle 700, output brush 720, crystal 783, pattern disk B—C, and the two-to-one reduction gearing associated with pattern disk B—C.

Table 13 shows the normal and modified converter output representations at terminal 190 and the overlapping normal and modified converter output representations at terminals 290, 390, and 490 for the converter of FIGURE 13, neglecting the superextension effect of circles 600, 700, and 800, as pattern disk A moves under the stationary brushes to successively occupy the intervals ⑥, ⑦, ⑧, ⑨, ⑩, ③, ④, ⑤, and ⑥ again.

| Interval | Outputs at Terminal | | | | Binary Count | Decimal Count |
|---|---|---|---|---|---|---|
| | 490 | 390 | 290 | 190 | | |
| ⑥ | 0 | 1 | 1 | 0 | 0110 | 6 |
| ⑦ | 0 | 1 | 1 | 1 | 0111 | 7 |
| ⑧ | 1 | 0 | 0 | 0 | 1000 | 8 |
| ⑨ | 1 | 0 | 0 | 1 | 1001 | 9 |
| ⑩ | 1 | 0 | 1 | 0 | 1010 | 10 |
| ③ | 1→0 / 0→ | 0→0 / 1→ | 1→1 / 0→ | 0→1 | 0011 | 3 |
| ④ | 0 | 1 | 0 | 0 | 0100 | 4 |
| ⑤ | 0 | 1 | 0 | 1 | 0101 | 5 |
| ⑥ | 0 | 1 | 1 | 0 | 0110 | 6 |

Table 13

In FIGURE 13, neglecting the superextension effect of circles 600, 700, and 800, and omitting from consideration for the moment circle 500, the pattern appears to have an ambiguous jump between the large and small even numbers 10 and 4, the ambiguity presenting itself at what appears to be the ⑩—④ transfer point, where however the space which subtends the counts of 10 and 4 is of triple interval length. Circle 500, having a segment both ends of which are critical, artificially modifies the normally ambiguous converter output representation so that an inner portion of the triple interval length space on either side of the ambiguity may actually represent the count of 3, and the ambiguity is not permitted to appear at the output terminals. In the adaptation of the first method as embodied in FIGURE 13 only the outer portions of the triple interval length space actually represent the counts of the large and small even numbers, which for FIGURE 13 are the numbers 10 and 4.

In operation of the converter of FIGURE 13, where it is desired to effect superextension of count at the ③—② transfer point, as shown, as the brushes move to the left relative to patterns A and B—C, fifth circle input brush 510 breaks contact with one of the critical ends of the segment of circle 500, thus removing all modification signals and allowing the normal converter output representation of 10 to appear. However, we desire that the count be superextended such that the ⑩ interval selectively represent the count of 2. At the ③—② transfer point, third circle output brush 320 rests at ground and there is no signal to amplifier 788 through "or" circuit crystal 339. When brush 510 breaks contact with the segment of circle 500, fifth circle output brush 520 drops to ground, thereby removing the signal formerly applied to amplifier 788 through "or" circuit crystal 539. With no input through either of "or" circuit crystals 339 or 539 to amplifier 788, its output likewise drops to ground. Since brush 710 contacts the segment of circle 700, output brush 720 is forcibly drawn to ground potential and carries with it the input of buffer amplifier 488 by virtue of the forward current now drawn through crystal 783. The superextension signal at seventh circle output brush 720 modifies the output at terminal 490 from its normal "1" to a "0," thus decreasing the normal count of 10 by 8 to the desired superextended output representation of 2. Somewhere intermediate the ② interval sixth circle input brush 610 contacts the segment of circle 600 causing conduction to shift from brush 812 to brush 810, which brushes symmetrically straddle a transfer point of circle 800. Output brush 820 now carries a signal which through amplifier 888 energizes relay actuating winding 870. Relay armature 873 is drawn from its normal engagement with relay contact 871, removing input excitation voltage from first circle 100, and engages relay contact 872 thereby applying input excitation voltage to terminal 890 and thence to the first circle of another pattern X which is not shown here in FIGURE 13. Pattern X as this point produces and continues the count of 2 which formerly was produced by pattern disk A and circle 700 of pattern disk B—C. Corresponding outputs of patterns X and A are connected in parallel with such blocking crystals as may be required to prevent undesired cross-feeding of signals. As pattern disk A makes a complete revolution from the interpattern switching point intermediate the ② interval to the interpattern switching point intermediate the ⑩ interval, armature 873 remains in engagement with relay contact 872. Conduction in the meantime at the mid-point of the ⑥ interval shifts from brush 810 back to brush 812 when sixth circle input brush 610 breaks contact with the segment of circle 600. No blocking crystal is needed between glow tube 650 and brush 812 since glow tube 650 itself provides a high impedance so long as its firing voltage is not exceeded. Intermediate the ⑩ interval which one revolution previous of pattern A was selectively the ② interval, brushes 810 and 812 symmetrically straddle the transfer point on the lower half of circle 800. When brush 610 contacts the segment of circle 600, conduction is shifted from brush 812 which contacts the segment of circle 800 to brush 810 which lies in the intersegmental space thereof. Output brush 820 no longer carries a signal, and amplifier 888 no longer energizes relay winding 870. Armature 873 returns to engagement with relay contact 871 removing the input excitation voltage from pattern X, which at this point should produce a count of 10, and reapplying input excitation voltage to first circle 100 of pattern A. Pattern A now produces and continues the count of 10 begun on pattern X. Seventh circle input brush 710 now rests in the space on the lower half of circle 700 and cannot modify or superextend the count of 10 into the count of 2 at this point. The count proceeds conventionally through the remaining portion of the ⑩ interval and through the ⑨, ⑧, ⑦, ⑥, ⑤, and ④ intervals. At the ④—③ transfer point brush 510 contacts the other critical end of the segment of circle 500, thus modifying the normally ambiguous converter output representations during the ③ interval to the count of 3 as has been previously described.

Suppose for the moment that fifth circle output brush 520 were directly connected to the input of buffer amplifier 788 and that the input through "or" circuit crystal 339 were eliminated. It is seen then that brush 520 carries a signal only during the ③ interval. The placement of the right-hand end of the segment of circle 700 under the supposed circumstances would then be intermediate the ③ interval, preferably in the middle thereof, thereby allowing a tolerance of only ±1/2 an interval length. This tolerance may well be too small considering the two-to-one reduction gearing between patterns A and B—C with its associated backlash and other nonlinearities. By providing an "or" circuit comprising crystals 539 and 339 to the input of amplifier 788, we may increase this small tolerance. Third circle output brush 320 carries a signal through the ⑦, ⑥, ⑤, and ④ intervals and through half the ③ interval, while fifth circle output brush 520 carries a signal during the ③ interval. Intermediate the ⑦, ⑥, ⑤, ④, and ③ intervals, intermediate the ⑧—⑦ and ③—② transfer points, preferably in the middle thereof, or at the midpoint of the ⑤ interval, we place the right-hand end of the segment of circle 700, thus allowing a tolerance of ±2½ interval lengths or five times the tolerance under the supposed circumstances were brush 520 directly connected to the input of amplifier 788. The left-hand end of the segment of circle 700 must be carried beyond that point intermediate the ② interval where interpattern switching occurs by reason that brush 610 contacts the segment of circle 600. We have shown the left-hand end to be at the ⑦—⑥ transfer point corresponding to line B. The optimum placement, however, is at the mid-point of the ⑥ interval which would mean that the left-hand end of the segment of circle 700 should be extended by half an interval length and carried around to the lower half of circle 700 so as to lie half an interval length distant from line B.

At the mid-point of the ⑤ interval then, input brush 710 contacts the segment of circle 700 but since at this point brush 710 carries a signal it cannot affect the signal at output terminal 490. At the ④—③ transfer point, output brush 520 becomes positive. From the ④—③ transfer point to the mid-point of the ③ interval there is an overlapping of signals at the input to buffer amplifier 788 through both of "or" circuit crystals 339 and 539. Adjacent the mid-point of the ③ interval, brush 312 carrying a signal breaks contact with the segment of circle 300, and a signal is no longer applied through "or" circuit crystal 339. The signal at brush 520 is, however, still applied through "or" circuit crystal 539 and the output of buffer amplifier 788 continues positive. At the ③—② transfer point, brush 510 breaks contact with the segment of circle 500, and no signal is applied through either of "or" circuit crystals 339 or 539. Input brush 710 now drops to ground and consequently modifies the signal at terminal 490 to produce the desired superextended output representation of 2, as has been previously described.

While pattern A is unenergized and pattern X receives input excitation voltage, the count need not, and usually will not, proceed as it does on pattern A. The only limitation is that pattern X contain one interval which selectively represents the counts of 10 and 2.

Table 13S shows the normal and modified outputs at terminal 190 and the overlapping normal and modified outputs at terminals 290, 390, and 490 for the converter in FIGURE 13, in providing a superextended count as pattern disks A and B—C move under the stationary brushes to successively occupy the intervals ⑥, ⑦, ⑧, ⑨, ⑩, ..., ②, ③, ④, ⑤, and ⑥ again.

grounded and its positive terminal connected to a relay armature 873, which is controlled by a relay actuating winding 870. Relay armature 873 normally engages one relay contact 871 of a pair of double throw relay contacts 871 and 872. Contact 872 is connected to a terminal 890. Contact 871 is connected through an input resistor 127 to an input brush 110, stationarily disposed to alternately contact the conductive segments and nonconductive intersegmental spaces of a first circle 100. A first circle output brush 120, which is stationarily disposed to always be electrically coupled to the conductive segments of first circle 100, is connected through a summing resistor 132 to the input of a one-to-one amplifier 188, and through an input loading resistor 128 to ground. The output of amplifier 188 is connected to first circle output

| Interval | Outputs at Terminal | | | | Binary Count | Decimal Count |
|---|---|---|---|---|---|---|
| | 490 | 390 | 290 | 190 | | |
| ⑦ | 0 | 1 | 1 | 1 | 0111 | 7 |
| ⑧ | 1 | 0 | 0 | 0 | 1000 | 8 |
| ⑨ | 1 | 0 | 0 | 1 | 1001 | 9 |
| ⑩ ② | 1 | 0 | 1 | 0 | 1010 | 10 |
| ⑩ ② | 1→0 | 0 | 1 | 0 | 0010 | 2 |
| ③ | 1→0 / 0→0 | 0→0 / 1→0 | 1→1 / 0→1 | 0→1 | 0011 | 3 |
| ④ | 0 | 1 | 0 | 0 | 0100 | 4 |
| ⑤ | 0 | 1 | 0 | 1 | 0101 | 5 |
| ⑥ | 0 | 1 | 1 | 0 | 0110 | 6 |
| ⑦ | 0 | 1 | 1 | 1 | 0111 | 7 |

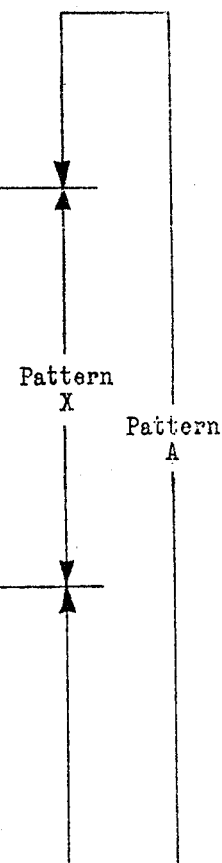

Table 13S

It will be noted that superextension takes place adjacent the discontinuity at the ⑩—③ transfer point, the ⑩ interval selectively representing the count of 2. It will be further noted that the superextended count of 2 is an adjacent representation, the count proceeding ... 4, 3, 2, .... As is apparent to those skilled in the art the superextended representation may be made any desired count. Also apparent to those skilled in the art is the fact that superextension may be made to take place in any one given interval and need not occur adjacent the ⑩—③ discontinuity. It is because superextension has been made to take place during the ⑩ interval that the occasion arose for deriving the signal input signal to seventh circle 700 from a combination of two signals one of which is an output signal of fifth circle 500.

Referring now to FIGURE 14, a source of input excitation voltage, battery 10, has its negative terminal terminal 190. First circle input brush 110 is connected to one terminal of a neon glow tube 150, which sustains a voltage preferably equal to one-half that of input battery 10. The other terminal of glow tube 150, the negative terminal thereof, is connected forwardly through a crystal 198 to one input brush 212 of a pair of input brushes 210 and 212, stationarily disposed to alternately contact the segments and spaces of a second circle 200. Brushes 210 and 212 have a spacing equal to the minimum interval length of circle 100. Since we have shown all interval lengths of circle 100 to be equal, the count is linear and the spacing between brushes 210 and 212 is then that of any interval length of circle 100. First circle output brush 120 is connected forwardly through a crystal 196 to brush 210. Second circle output brush 220 is connected to second circle output terminal 290, and to ground through a loading resistor 230. First circle output brush 120 is connected forwardly through a crystal 296 to one input brush 310 of a pair of input brushes 310 and 312, having a spacing equal to that between brushes 210 and 212, and stationarily disposed to alternately contact the segment and intersegmental space of a third circle 300. The negative terminal of glow tube 150 is connected forwardly through a crystal 298 to brush 312. Third circle output brush 320 is connected to third circle output terminal 390 and to ground through a loading resistor 330. Partially intermeshing with third circle 300 is a fourth circle 400. The segment of fourth circle 400 occupies the ⑧ and ⑨ intervals, while the space of circle 300 occupies the ⑧, ⑨, ⑩, and ③ intervals, so that the segment of circle 400 occupies only part of the space of circle 300 and the space of circle 400 is occupied only partly by the segment of circle 300. Brushes 310 and 312 concomitantly provide complementary input signals to both the third circle 300 and the fourth circle 400. Fourth circle output brush 420 is connected forwardly through a crystal 438 to fourth circle output terminal 490. Output terminal 490 is connected to ground through a loading resistor 430. Relay contact 871 is also connected through an input resistor 527 to an input brush 510 disposed to alternately contact the segment and intersegmental space of a fifth circle 500. Fifth circle output brush 520 is connected to ground through an input loading resistor 528, and forwardly through crystals 582 and 581 to output terminals 290 and 490, respectively. Fifth circle input brush 510 is connected to one terminal of a neon glow tube 550. The other terminal of glow tube 550, the negative terminal thereof, is connected backwardly through a crystal 583 to the input of amplifier 188, and through a loading resistor 533 to the negative terminal of another battery 12, having its positive terminal grounded. The positive terminal of input battery 10 is connected through an input resistor 627 to an input brush 610, disposed to alternately contact the equal segment and intersegmental space of a sixth circle 600. Sixth circle output brush 620 is connected to ground through an input loading resistor 628. Circles 100 through 600 are concentrically mounted on a first disk A, which is shown cut radially along line A and developed. Upon a second disk B—C, reduction geared to rotate with disk A such that one revolution of disk A produces only one-half a revolution of disk B—C, are concentrically mounted a seventh circle 700 and an eighth circle 800. Fifth circle output brush 520 is connected forwardly through a crystal 539 to the input of an inverting amplifier or trigger or flip-flop circuit 780. Fourth circle output brush 420 is connected forwardly through a crystal 439 to the input of inverting amplifier 780. Crystals 539 and 439 comprise an "or" circuit to the input to amplifier 780. The output of inverting amplifier 780 is connected to an input brush 710, disposed to alternately contact the conductive segment and nonconductive intersegmental space of the seventh circle 700. Seventh circle output brush 720 is connected forwardly through a crystal 781 to fourth circle output terminal 490. Sixth circle input brush 610 is connected through a neon glow tube 650 to one input brush 812 of a pair of input brushes 810 and 812, disposed to alternately contact the equal segment and space of the eighth circle 800. Sixth circle output brush 620 is connected forwardly through a crystal 696 to brush 810. Brushes 810 and 812 are spaced apart one-half the segment length, or one-half the length of the intersegmental space of circle 800. Eighth circle output brush 820 is connected to the input of what may conveniently be a one-to-one amplifier 888. The output of amplifier 888 is connected to one terminal of relay actuating winding 870, other terminal of which is grounded.

Assuming that battery 12 supplies a negative potential which is one-half the positive potential of input excitation battery 10, then loading resistor 533 should have a resistance value somewhat less than that of summing resistor 132 so that, neglecting any current through glow tube 550, when first circle output brush 120 carries a positive signal of substantially one-half that of input excitation battery 10, the voltage dividing action of summing resistor 132 and loading resistor 533 will cause the negative terminal of glow tube 550 to rest below ground potential. This will cause the voltage across glow tube 550 to exceed breakdown voltage, causing current to flow through glow tube 550 and loading resistor 533, and resulting in the regulation of glow tube 550 with its negative terminal resting substantially at ground potential. Inverting amplifier 780 should here have a low output impedance since it operates directly on output terminal 490.

The operation of the converter of FIGURE 14, neglecting the superextension effect of circle 600 of pattern A and of circles 700 and 800 of pattern B—C, is similar to that of FIGURE 13. The converter is shown at the ③—⑩ recycling transfer point where the count has a jump between the small odd number 3 and the large even number 10. As the brushes move to the left relative to pattern A, first circle input brush 110 lies intermediate the triple interval length segment of first circle 100 and, hence, cannot control a change in output representation. However, fifth circle input brush 510 at the ③—⑩ transfer point contacts a critical end of the segment of circle 500. Output brush 520 now carries a signal which is impressed forwardly through crystal 581 upon output terminal 490 modifying it from its normal "0" to a "1," thereby increasing the normal count of 3 by 8 to the count of 11 which is greater by 1 than the desired output representation of 10. At the same time the signal at output brush 520 is impressed forwardly through crystal 582 upon output terminal 290, thereby ensuring that a "1" appears at terminal 290. Output terminal 290 then carries a signal for two reasons, either of which is sufficient; firstly, because of the signal at output brush 220 by reason that brush 210 which carries a signal contacts a segment of circle 200, and secondly, because output brush 520 carries a signal. However, when output brush 520 becomes positive, the negative terminal of glow tube 550 drops to ground potential and carries with it the input to amplifier 188 by virtue of the forward current now drawn through crystal 583. The output at terminal 190 is modified from its normal "1" to a "0," thus decreasing the count of 11 by 1 to the desired output representation of 10. When first circle input brush 110 reaches the region about the mid-point of the ③ interval, the normal converter output representation still being 3, leading brush 210 carrying a signal breaks contact with the segment of circle 200, and within the same region leading brush 310 carrying a signal contacts the segment of circle 400. The normal converter output representation would now be 9, but, because of the modification signals of circle 500, a 10 continues to appear at the output terminals. A "1" continues to appear at output terminal 290 but only because of the modification signal at output brush 520, since brush 210 carrying a signal has broken contact with a segment of circle 200. Output terminal 490 now carries a signal for two reasons, either of which is sufficient; firstly, because of the signal at output brush 420 by reason that brush 310 which carries a signal has contacted the segment of circle 400, and secondly, because output brush 520 carries a signal. At the ⑩—⑨ transfer point, first circle input brush 110 still lies intermediate the triple interval length segment of first circle 100 and remains ineffective to provide a change in output representation. However, at the ⑩—⑨ transfer point, input brush 510 breaks contact with the other critical end of the segment of circle 500. All modification signals from circle 500 are removed and the normal converter output representation of 9 is allowed to appear at the converter output terminals. The count proceeds conventionally through the ⑨, ⑧, ⑦, ⑥, ⑤, ④, and ③ intervals to again arrive at the ③—⑩ recycling transfer point where pattern disk A has completed one full revolution. During the first half of the ⑩ interval there is an overlapping at terminal 290 of the normal converter output signal and the modification signal from circle 500. During the second half of the ⑩ interval at terminal 290 there is merely a modification by circle 500 of the normal converter output signal. During the first half of the ⑩ interval at terminal 490 there is merely a modification by circle 500 of the normal converter output signal. During the second half of the ⑩ interval at terminal 490 there is an overlapping of the normal converter output signal and a modification signal from circle 500. It will be appreciated that where it is not desired to effect superextension of count the following components are not required: input resistor 627, input brush 610, circle 600, output brush 620, input loading resistor 628, glow tube 650, crystal 696, input brushes 810 and 812, circle 800, output brush 820, buffer amplifier 888, relay actuating winding 870, relay armature 873, relay contacts 871 and 872, crystals 439 and 539, inverting amplifier 780, input brush 710, circle 700, output brush 720, crystal 781, crystal 438, pattern disk B—C, and the two-to-one reduction gearing associated with pattern disk B—C.

Table 14 shows the normal converter output representations at terminal 390, the normal and modified converter output representations at terminal 190, and the overlapping normal and modified converter output representations at terminal 490 and 290 for the converter of FIGURE 14, neglecting the superextension effect of circles 600, 700, and 800, as pattern disk A moves under the stationary brushes to successively occupy the intervals ⑥, ⑦, ⑧, ⑨, ⑩, ③, ④, ⑤, and ⑥ again.

| Interval | Outputs at Terminal | | | | Binary Count | Decimal Count |
|---|---|---|---|---|---|---|
| | 490 | 390 | 290 | 190 | | |
| ⑥ | 0 | 1 | 1 | 0 | 0110 | 6 |
| ⑦ | 0 | 1 | 1 | 1 | 0111 | 7 |
| ⑧ | 1 | 0 | 0 | 0 | 1000 | 8 |
| ⑨ | 1 | 0 | 0 | 1 | 1001 | 9 |
| ⑩ | 1→1 / 0→1 | 0 | 0→1 / 1→1 | 1→0 | 1010 | 10 |
| ③ | 0 | 0 | 1 | 1 | 0011 | 3 |
| ④ | 0 | 1 | 0 | 0 | 0100 | 4 |
| ⑤ | 0 | 1 | 0 | 1 | 0101 | 5 |
| ⑥ | 0 | 1 | 1 | 0 | 0110 | 6 |

Table 14

In FIGURE 14, neglecting the superextension effect of circles 600, 700, and 800, and omitting from consideration for the moment circle 500, the pattern appears to have an ambiguous jump between the large and small odd numbers 9 and 3, the ambiguity presenting itself at what appears to be the ⑨—③ transfer point, where however the segment which subtends the counts of 9 and 3 is of triple interval length. Circle 500, having a segment both ends of which are critical, artificially modifies the normally ambiguous converter output representation so that an inner portion of the triple interval length segment on either side of the ambiguity may actually represent the count of 10, and the ambiguity is not permitted to appear at the output terminals. In the adaptation of the second method as embodied in FIGURE 14, only the outer portions of the triple interval length segment actually represent the counts of the large and the small odd numbers, which for FIGURE 14 are the numbers 9 and 3.

In operation of the converter of FIGURE 14 where it is desired to effect superextension of count at the ⑩—⑪ transfer point, as shown, as the brushes move to the right relative to patterns A and B—C, the fifth circle input brush 510 breaks contact with one of the critical ends of the segment of circle 500, thus removing all modification signals and allowing the normal converter output representation of 3 to appear. However, we desire that the count be superextended such that the ③ interval selectively represents the count of 11. At the ⑩—⑪ transfer point fourth circle output brush 420 rests at ground, and there is no signal to inverting amplifier 780 through "or" circuit crystal 439. When brush 510 breaks contact with the segment of circle 500, fifth circle output brush 520 drops to ground thereby removing the signal formerly applied to inverting amplifier 780 through "or" circuit crystal 539. With no input through either of "or" circuit crystals 439 or 539 to inverting amplifier 780, its output becomes positive. Since brush 710 contacts the segment of circle 700, output brush 720 carries a signal which is impressed forwardly through crystal 781 upon output terminal 490. The superextension signal at seventh circle output brush 720 modifies the output at terminal 490 from its normal "0" to a "1," thus increasing the normal count of 3 by 8 to the desired superextended output representation of 11. Somewhere intermediate the ⑪ interval sixth circle input brush 610 breaks contact with the segment of circle 600 causing conduction to shift from brush 810 to brush 812, which brushes symmetrically straddle a transfer point of circle 800 with brush 812 contacting the segment thereof. Output brush 820 now carries a signal which, through amplifier 888, energizes relay actuating winding 870. Relay armature 873 is drawn from its normal engagement with relay contact 871, removing input excitation voltage from first circle 100 of pattern A, and engages relay contact 872, thereby applying input excitation voltage to terminal 890 and thence to the first circle of another pattern X which is no shown here in FIGURE 14. Pattern X produces and continues the count of 11 which formerly was produced by pattern disk A and circle 700 of pattern disk B—C. Corresponding outputs of patterns X and A are connected in parallel with such blocking crystals as may be required to prevent spurious signals from being fed back to the unexcited pattern. As pattern disk A makes a complete revolution from the interpattern switching point intermediate the ⑪ interval to the interpattern switching point intermediate the ③ interval, armature 873 remains in engagement with relay contact 872. Conduction in the meantime at the mid-point of the ⑦ interval shifs from brush 812 back to brush 810 when sixth circle input brush 610 contacts the segment of circle 600. No blocking crystal is needed between glow tube 650 and brush 812 since glow tube 650 itself provides the high impedance of a backwardly biased crystal so long at its firing voltage is not exceeded. Intermediate the ③ interval which one revolution previous of pattern disk A was selectively the ⑪ interval, brushes 810 and 812 symmetrically straddle the transfer point on the lower half of circle 800. When brush 610 breaks contact with the segment of circle 600, conduction is shifted from brush 810 to brush 812 which latter brush lies in the intersegmental space of circle 800. Output brush 820 no longer carries a signal and amplifier 888 no longer energizes relay winding 870. Armature 873 disengages relay contact 872, removing the input excitation voltage from pattern X which at this point should have been producing a count of 3, and again engages relay contact 871, reapplying input excitation voltage to first circle 100 of pattern A. Pattern A now produces and continues the count of 3 begun on pattern X. Since seventh circle input brush 710 now lies in the space on the lower half of circle 700, it cannot modify or superextend the count of 3 into the count of 11 at this point. The count proceeds conventionally through the remaining portion of the ③ interval and through the ④, ⑤, ⑥, ⑦, ⑧, and ⑨ intervals. At the ⑨—⑩ transfer point, brush 510 contacts the other critical end of the segment of circle 500, thus modifying the normally ambiguous converter output representations during the ⑧ interval to the count of 3, as has been previously described.

Suppose for the moment that fifth circle output brush 520 were directly connected to the input of inverting amplifier 780 and that the input through "or" circuit crystal 439 were eliminated. It is then seen that brush 520 carries a signal only during the ⑩ interval. The placement of the left-hand end of the segment of circle 700 under the supposed circumstances would then be intermediate the ⑩ interval, preferably in the middle thereof, thereby allowing a tolerance of only ±½ an interval length. This small tolerance may be increased by providing an "or" circuit comprising crystals 439 and 539 to the input of inverting amplifier 780. Fourth circle output brush 420 carries a signal through the ⑧ and ⑨ intervals and through half the ⑩ interval, while fifth circle output brush 520 carries a signal during the ⑩ interval. Intermediate the ⑧, ⑨, and ⑩ intervals, intermediate the ⑦—⑧ and ⑩—⑪ transfer points, preferably in the middle thereof, or at the mid-point of the ⑨ interval, we place the left-hand end of the segment of circle 700, thus allowing a tolerance of ±1½ interval lengths or three times the tolerance under the supposed circumstances were brush 520 directly connected to the input of inverting amplifier 780. The right-hand end of the segment of circle 700 must be carried beyond that point intermediate the ⑪ interval where interpattern switching occurs by reason that brush 610 breaks contact with the segment of circle 600. We have shown the right-hand end to be at the ⑥—⑦ transfer point corresponding to line C. The optimum placement, however, is at the midpoint of the ⑦ interval which would mean that the right-hand end of the segment of circle 700 should be extended by half an interval length and carried around to the lower half of the circle 700 so as to lie half an interval length distant from line C.

At the mid-point of the ⑨ interval then, input brush 710 contacts the segment of circle 700, but since at this point brush 710 rests at ground it cannot affect the signal at output terminal 490. At the ⑨—⑩ transfer point, output brush 520 becomes positive. From the ⑨—⑩ transfer point to the midpoint of the ⑩ interval there is an overlapping of signals at the input to inverting amplifier 780 through both of "or" circuit crystals 539 and 439. At the midpoint of the ⑩ interval, brush 310 carrying a signal breaks contact with the segment of circle 400, and a signal is no longer applied through "or" circuit crystal 439. The signal at brush 520 is, however, still applied through "or" circuit crystal 539, and the output of inverting amplifier 780 continues to rest at ground. At the ⑩—⑪ transfer point, brush 510 breaks contact with the segment of circle 500, and no signal is applied through either of "or" circuit crystals 539 or 439. Input brush 710 now becomes positive and consequently modifies the signal at output terminal 490 to produce the desired superextended output representation of 11, as has been previously described. The superextension signal at output brush 720 causes the output at terminal 490 to be modified from a "0" to a "1." This superextension signal at brush 720 occurs only when both inputs to inverting amplifier 780 rest at ground. Crystal 438 prevents the superextension signal at output terminal 490 from being impressed through crystal 439 upon the input of inverting amplifier 780. It will be appreciated that crystal 438 prevents the regeneration of signals around what would otherwise be a closed loop including crystal 439, inverting amplifier

| Interval | Outputs at Terminal | | | | Binary Count | Decimal Count |
|---|---|---|---|---|---|---|
| | 490 | 390 | 290 | 190 | | |
| ⑧ | 1 | 0 | 0 | 0 | 1000 | 8 |
| ⑨ | 1 | 0 | 0 | 1 | 1001 | 9 |
| ⑩ | 1→1 / 0→1 | 0 | 0→1 / 1→1 | 1→0 | 1010 | 10 |
| ⑪ ③ | 0→1 | 0 | 1 | 1 | 1011 | 11 |
| ⑪ ③ | 0 | 0 | 1 | 1 | 0011 | 3 |
| ④ | 0 | 1 | 0 | 0 | 0100 | 4 |
| ⑤ | 0 | 1 | 0 | 1 | 0101 | 5 |
| ⑥ | 0 | 1 | 1 | 0 | 0110 | 6 |
| ⑦ | 0 | 1 | 1 | 1 | 0111 | 7 |
| ⑧ | 1 | 0 | 0 | 0 | 1000 | 8 |

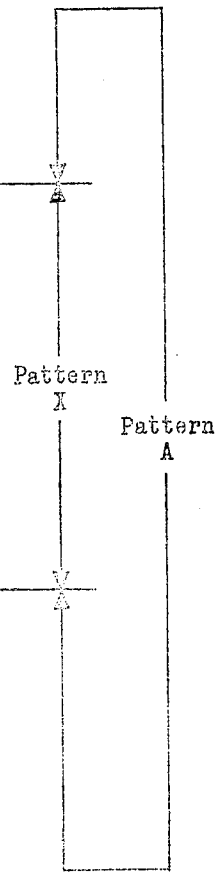

Table 14S 780, input brush 710, circle 700, output brush 720, crystal 781, and crystal 439 again. Crystal 438 opens this loop and prevents an unstable oscillation between "0" and "1" at output terminal 490 during the superextended ⑪ interval.

While pattern A is unenergized and pattern X receives input excitation voltage, the count need not, and usually will not, proceed as it does on pattern A. The only limitation is that pattern X contain one interval which selectively represents the counts of 11 and 3.

Table 14S, Col. 72, shows the normal outputs at terminal 390, and the normal and modified outputs at terminal 190, and the overlapping normal and modified outputs at terminals 490 and 290 for the converter of FIGURE 14 in providing a superextended count as pattern disks A and B—C move under the stationary brushes to successively occupy the intervals ⑥, ⑦, ⑧, ⑨, ⑩, ⑪, . . . , ③, ④, ⑤, and ⑥ again.

It will be noted that superextension takes place adjacent the discontinuity at the ⑩—③ transfer point, the ③ interval selectively representing the count of 11. It will be further noted that the superextended count of 11 is an adjacent representation, the count proceeding . . . , 9, 10, 11, . . . As is aparent to those skilled in the art the superextended representation may be made any desired count. Also apparent to those skilled in the art is the fact that superextension may be made to take place in any one given interval and need not occur adjacent the ⑩—③ discontinuity. It is because superextension has been made to take place during the ③ interval that the occasion arose for deriving the single input signal to seventh circle 700 from a combination of two signals one of which is an output signal of fifth circle 500.

Referring now to FIGURE 14a which should be read in conjunction with FIGURE 14, the negative terminal of glow tube 550, in addition to the connections shown in FIGURE 14 is also, as shown in FIGURE 14a, connected to one of the two inputs to an "and" circuit 724. Output brush 220 in addition to the connections shown in FIGURE 14, is also, as shown in FIGURE 14a, connected to the other input of "and" circuit 724. The "and" circuit 724 of FIGURE 14a is a substitution, an alternative configuration, for "or" circuit crystals 539 and 439 and for inverting amplifier 780 of FIGURE 14. Consequently, when "and" circuit 724 of FIGURE 14a is employed, the following components shown in FIGURE 14 are not required: "or" circuit crystals 539 and 439 and inverting amplifier 780. The output of "and" circuit 724 is connected to seventh circle input brush 710.

When "and" circuit 724 is substituted in FIGURE 14, crystal 438 may be omitted and output brush 420 connected directly to output terminal 490, since output brush 420 does not provide either of the inputs to "and" circuit 724 and the superextension signal at output terminal 490 causes no deleterious feed-back effect.

That input of "and" circuit 724 which is derived from the negative terminal of glow tube 550 is positive during all intervals except the ⑩ interval, when it rests at ground. That input to "and" circuit 724 which is derived from output brush 220 is positive from the midpoint of the ⑩ interval to that intermediate point of the ⑪ interval where brush 610 breaks contact with the segment of circle 600. The two inputs to "and" circuit 724 are then positive only during that portion of the ⑪ interval where first circle 100 receives input excitation voltage from relay contact 871. At the ⑨—⑩ transfer point the negative terminal of glow tube 550 drops to ground and from the ⑨—⑩ transfer point to the mid-point of the ⑩ interval neither input to "and" circuit 724 is positive. At the midpoint of the ⑩ interval output brush 220 becomes positive, but the negative terminal of glow tube 550 continues to rest at ground. At the ⑩—⑪ transfer point brush 510 breaks contact with the segment of circle 500 and the negative terminal of glow tube 550 becomes positive. At the ⑩—⑪ transfer point then, both inputs to "and" circuit 724 are positive thus causing brush 710 to carry a signal. Since input brush 710 at this point contacts the segment of seventh circle 700 output brush 720 carries a superextension signal which is impressed forwardly through crystal 781 upon output terminal 490. Thus, the normal count of 3 is modified to the desired superextended representation of 11 during the ⑪ interval.

Let us summarize what is shown in FIGURES 13 and 14 and add a few generalizations which we have discovered.

Where there is a discontinuity or jump between a large even number and a nonadjacent small odd number, the solution must be had by an adaptation of either the first method or the second method, since such jump or discontinuity is the inverse of a natural jump or discontinuity.

In the adaptation of the first method as embodied in FIGURE 13, the pattern appears to have an ambiguous jump between large and small even numbers, where, however, the space (or segment if an inverse form is used) which appears to subtend the large and small even numbers comprising the ambiguous jump is of triple interval length so that an inner portion thereof on either side of the ambiguity may be artificially modified to actually represent the small odd number. An additional circle, circle 500 in FIGURE 13, mounted on the main converter pattern disk A has the two critical ends of its segment positioned intermediate the triple interval length space and on either side of the discontinuity, one end controlling the transfer point between the large even and the nonadjacent small odd number, and the other end controlling the other transfer point defining the interval of the small odd number. Only a single input signal is coupled to the additional circle, and this signal is derived directly from the input excitation voltage. The output signal of the additional circle modifies the normally ambiguous converter output representation during the interval of the small odd number. The output signal of one circle must be modified during a portion of the interval of the small odd number, the normal output signal of this circle and the modification signal merely overlapping during the remaining portion of this interval. The output signal of the first circle, circle 100, must always be modified during the interval of the small odd number.

Where it is also desired to superextend the count such that one interval must selectively represent the superextended count, then a second additional circle 700 must be mounted upon another pattern disk B—C, reduction geared to rotate with the main converter pattern disk, pattern disk A. Only a single input signal is coupled to the second additional circle 700, and this signal is derived either ultimately from one of two complementary output signals of the first circle 100 or directly from the output signal of the first additional circle 500. Neither end of the segment of the second additional circle 700 is a critical end. The output signal of the second additional circle 700 mounted on the reduction geared pattern disk B—C, modifies the normal output signals of pattern A during the superextended interval. Where the interval of the large even number is the superextended interval, then the occasion may arise for the derivation of the single signal to the second additional circle 700 from a combination of two signals, one of which is the output signal of the first additional circle 500 and the other of which is a signal derived ultimately from one of the two complementary output signals of the first circle 100, in order to increase the allowable tolerances which might otherwise become critical due to such nonlinearities as backlash in the reduction gearing between the two pattern disks. Were the interval of the small odd number to be subjected to superextension, then the occasion for double modification might arise, since the interval of the small odd number is an artificially produced representation, and the single input signal to the second additional circle 700 would be derived directly from the output signal of the first additional circle 500.

In the adaptation of the second method as embodied in FIGURE 14, the pattern appears to have an ambiguous jump between large and small odd numbers, where, however, the segment (or space if an inverse form is used) which appears to subtend the large and small odd numbers comprising the ambiguous jump is of triple interval length so that an inner portion thereof on either side of the ambiguity may be artificially modified to actually represent the large even number. An additional circle 500 in FIGURE 14 mounted on the main converter pattern disk A has the two critical ends of its segment positioned intermediate the triple interval length segment and on either side of the discontinuity, one end controlling the transfer point between the small odd number and the nonadjacent large even number, and the other end controlling the other transfer point defining the interval of the large even number. Only a single input signal is coupled to the additional circle, and this signal is derived directly from the input excitation voltage. The output signal of the additional circle modifies the normally ambiguous converter output representation during the interval of the large even number. The output signal of one circle must be modified during a portion of the interval of the large even number, the normal output signal of this circle and the modification signal merely overlapping during the remaining portion of this interval. The output signal of the first circle 100 must always be modified during the interval of the large even number.

Where it is also desired to superextend the count such that one interval must selectively represent the superextended count, then a second additional circle 700 must be mounted upon another pattern disk B—C reduction geared to rotate with the main converter pattern disk A. Only a single input signal is coupled to the second additional circle 700, and this signal is derived either ultimately from one of the two complementary output signals of the first circle 100 or directly from the output signal of the second additional circle 500. Neither end of the segment of the second additional circle 700 is a critical end. The output signal of the second additional circle 700 mounted on a reduction geared pattern disk B—C modifies the normal output signals of the main converter pattern A during the superextended interval. Where the interval of the small odd number is the superextended interval, then the occasion may arise for the derivation of the single signal to the second additional circle 700 from a combination of two signals, one of which is the output signal of the first additional circle 500 and the other of which is a signal derived ultimately from one of the two complementary output signals of the first circle 100, in order to provide increased tolerances which might otherwise become critical because of the reduction gearing between the two pattern disks. Were the interval of the large even number to be subjected to superextension, then the occasion for double modification might arise, since the interval of the large even number is an artificially produced representation, and the single input signal to the second additional circle 700 would be derived directly from the output signal of the first additional circle 500.

In FIGURES 13 and 14 we have thus far pointed out in detail superextension occurring adjacent the discontinuities, but have only generally indicated that any interval may properly be subjected to superextension. Suppose that in FIGURES 13 and 14 superextension is made to occur adjacent either the ⑧—⑨, or the ④—⑤, or the ⑥—⑦ transfer points. It will be appreciated that the single signal to the second additional circle, circle 700, must be derived directly, rather than ultimately, from one or the other of the two complementary output signals of the first circles 100 according as the superextended interval is one or the other of the two intervals adjacent a particular one of the supposed transfer points. It will be further appreciated that the occasion may arise for deriving the single signal to the second additional circle, circle 700, from a combination of two signals, one of which is an output signal of the first circle 100, rather than an output signal of the first additional circle 500, and the other of which is a signal derived ultimately from one of the two complementary output signals of the first circle 100, in order to increase the tolerances which might otherwise become critical because of the reduction gearing between the two pattern disks.

Suppose in FIGURE 13 that superextension is made to occur adjacent the ③—④ transfer point. It will be appreciated that the single input signal to the second additional circle 700 must be derived from an output signal of the first additional circle 500. It will be further appreciated that it may be necessary considering backlash and other non-linearities in the reduction gearing, to derive the single input signal to the second additional circle from a combination of two signals, one of which is an output signal of the first additional circle 500 and the other of which is a signal derived ultimately from one of the two complementary output signals of the first circle 100.

Suppose in FIGURE 14 that superextension is made to occur adjacent the ⑨—⑩ transfer point. It will be appreciated that the single input signal of the second additional circle 700 must be derived from an output signal of the first additional circle 500. It will be further appreciated that the allowable tolerances which, because of backlash and other nonlinearities in the reduction gearing, might otherwise become critical, may be increased by deriving the single input signal to the second additional circle 700 from a combination of two signals, one of which is an output signal of the first additional circle 500 and the other of which is a signal derived ultimately from one of the two complementary output signals of the first circle 100.

In FIGURES 13 and 14 we have shown all intervals to be of equal length so that the triple interval length segment or space may be easily seen. It will be appreciated, however, that the converters of FIGURES 13 and 14 are both adapted to provide nonlinear counts with corresponding variation in the lengths of the segments and spaces.

Where a nonlinear function is to be represented, the count or resolution may be increased by the provision of another pattern. However, it is not possible to cascade between the pattern disks where the count is nonlinear. Each pattern must provide its own least significant digit. Each pattern must produce output signals independently of any other pattern. Superextension of count is one method of patching between two independent patterns so that when interpattern switching occurs, the same output representation is provided unchanged. For this inter pattern transfer, for non-linear functions, the count or resolution is increased arithmetically or proportionally to the number of pattern disks (assuming the disks are of substantially the same diameter or circumferential length of arc), rather than geometrically by a factor where the count is linear and interdisk cascading possible.

Where a non-linear function is to be represented on a plurality of independent pattern disks and the function is periodic, then the converter must be externally cyclic, and the rotation of each pattern disk must be integrally divisible into the period.

In each of FIGURES 7 through 14 the period is one revolution of pattern disk B—C or two revolutions of pattern disk A. Pattern X in each of these figures must concomitantly rotate through two revolutions, since the segment and space of circle 700 in FIGURES 7 and 8 and of circle 800 in FIGURES 9 through 14 are shown equal. Accordingly, pattern X may be mounted on the same shaft as, or on the other side of, pattern disk A. The rotation of each of patterns A and X is then integrally divisible into the period of the function.

In the externally cyclic converters of FIGURES 7 through 14 the interpattern switching signal is derived from a circle, circle 700 in FIGURES 7 and 8 and circle 800 in FIGURES 9 through 14, mounted on a pattern disk B—C which rotates through exactly one revolution during the period of the function. It will be appreciated that instead of providing two complementary input signals to the aforesaid circles, as shown, we might provide a single input signal derived directly from the input excitation voltage. However, this would halve the allowable tolerances for interpattern transfer and might cause them to become critical because of backlash and other non-linearities in the reduction gearing between pattern disk B—C and patterns A and X. Since for externally cyclic converters, the rotation of each pattern disk is integrally divisible into the period, we may maximize the interpattern transfer tolerance by providing two complementary input signals, as shown, to the aforesaid circles. These two complementary input signals are derived from a circle, circle 500 in FIGURES 7 and 8 and circle 600 in FIGURES 9 through 14, mounted on the pattern disk of highest periodicity, which is either pattern A or pattern X since patterns A and X have equal periodicity. The allowable tolerance for interpattern transfer is thereby doubled.

While in FIGURES 7 through 14 we have shown interpattern transfer to be effectuated by electromechanical relays, those skilled in the art will appreciate that purely electronic switching devices may be used instead. High speed relays, at this writing, are available with a response lag of less than half a millisecond. Assuming that all intervals are of about the same length and that an interpattern transfer signal occurs adjacent the midpoint of the superextended interval, then switching must be completed within half an interval length to avoid a momentary ambiguity at the first subsequent transfer point. The maximum counting rate for present relays for interpattern switching is thus greater than 1000 counts per second. If brush contact is maintained at higher counting rates, then recourse may be had to purely electronic switching to decrease the response lag by a factor of over 1000 to a fraction of a microsecond. It will be noted that interpattern switching need not be instantaneous, since the same output representation is provided unchanged, thus allowing a response lag tolerance before a momentary ambiguity occurs at the next transfer point.

*Simple Changes in Slope Sign and Discontinuities Accompanied by Changes in Slope Sign at the Discontinuities by the Method of Interpattern Transfer*

If pattern X in FIGURE 9 is pattern A of FIGURE 12 or if pattern X of FIGURE 12 is pattern A of FIGURE 9, then we may produce an externally cyclic count proceeding 7, 8, 9, 10, 9, 8, 7, 6, 5, 4, 3, 4, 5, 6, and 7 again, having a local peak or maximum at 10 and a local dip or minimum at 3. The function is multiple valued, having simple changes in slope sign at the counts of 10 and 3 where interpattern transfer occurs.

If pattern X of FIGURE 7 is pattern A of FIGURE 11 or if pattern X of FIGURE 11 is pattern A of FIGURE 7, then we may produce an externally cyclic count proceeding 7, 8, 9, 11, 10, 9, 8, 7, 6, 5, 4, 5, 6, and 7 again, having a local dip or minimum at 4 with a simple change in slope sign and having a jump or discontinuity between 9 and 11 accompanied by a change in slope sign at the discontinuity and constituting a local peak or maximum.

If pattern X of FIGURE 8 is pattern A of FIGURE 10 or if pattern X of FIGURE 10 is pattern A of FIGURE 8, then we may produce an externally cyclic count proceeding 7, 8, 9, 8, 7, 6, 5, 4, 2, 3, 4, 5, 6, and 7 again, having a local peak or maximum at the count of 9 with a simple change in slope sign and having a jump or discontinuity between 2 and 4 accompanied by a change in slope sign at the discontinuity and constituting a local dip or minimum.

Suppose in FIGURE 9 that the superextended count is 11 rather than 10 as shown. This would require the elimination of the following components: inverting amplifier 780 crystal 783, summing resistor 132, and buffer amplifier 188, the junction of the cathodes of crystals 581 and 139 being directly connected to output terminal 190. The elimination of these components causes the count during the superextended interval to be increased by one, thereby increasing the superextended representation from 10 to 11. Now if pattern X of FIGURE 9 as thus altered is pattern A of FIGURE 14 or if pattern X of FIGURE 14 is the altered pattern A of FIGURE 9, then we may produce an externally cyclic count proceeding 7, 8, 9, 11, 10, 9, 8, 7, 6, 5, 4, 3, 4, 5, 6, and 7 again, having a local dip or minimum at the count of 3 with a simple change in slope sign and having a discontinuity between 9 and 11 accompanied by a change in slope sign at the discontinuity and constituting a local peak or maximum.

Suppose in FIGURE 12 that the superextended count is 2 rather than 3 as shown. This would require the elimination of the following components: crystal 781 and summing resistor 134, the junction of the anode of crystal 583 and summing resistor 132 being directly connected to the input of buffer amplifier 188. The elimination of these components causes the count during the superextended interval to be decreased by one, thereby decreasing the superextending representation from 3 to 2. Now if pattern X of FIGURE 12 as thus altered is pattern A of FIGURE 13 or if pattern X of FIGURE 13 is the altered pattern A of FIGURE 12, then we may produce an externally cyclic count proceeding 7, 8, 9, 10, 9, 8, 7, 6, 5, 4, 3, 2, 4, 5, 6, and 7 again, having a local peak or maximum at the count of 10 with a simple change in slope sign and having a discontinuity between 2 and 4 accompanied by a change in slope sign at the discontinuity and constituting a local dip or minimum.

Of course in each case the particular superextension circle associated with pattern X must also be mounted on pattern disk B—C. Hence, for interpattern transfer between patterns A and X, pattern disk B—C will mount three circles, the superextension circle for pattern A and the interpattern switching circle, as shown in FIGURES 7 through 14, and also a superextension circle for pattern X.

For converters of limited rotation which produce non-cyclic, non-periodic functions, there is no limitation on the rotation of any pattern disk, and all functions may be produced by interpattern transfer between patterns containing only a simple discontinuity as the patterns of FIGURES 7 through 14.

However, for cyclic, periodic functions, the method of interpattern transfer between patterns containing only simple discontinuities is workable only if the local peaks, the local dips, and the discontinuities accompanied by changes in slope sign are so spaced apart that the separation distance is integrally divisible into the period, because of the limitation that the rotation of each pattern be integrally divisible into the period.

*Multiple-Valued Functions Containing Simple Changes in Slope Sign for the Special Case Where the Difference Between the Local Maximum and Local Minimum is Two Counts*

Referring now to FIGURE 15, a source of input excitation voltage, battery 10, has its negative terminal grounded and its positive terminal connected through an input resistor 127 to an input brush 110 stationarily disposed to alternately contact the conductive segments and non-conductive intersegmental spaces of a first circle 100. First circle output brush 120, stationarily disposed to always be in electrical contact with the segments of circle 100, is connected to first circle output terminal 190 and through an input loading resistor 128 to ground. First circle input brush 110 is connected through a neon glow tube 150 to an input brush 210 stationarily disposed to alternately contact the segment and space of a second circle 200. Second circle output brush 220 is connected to second circle output terminal 290 and through a loading resistor 230 to ground. Circles 100 and 200 are concentrically mounted on a non-conductive disk, not shown, and the pattern is shown cut radially along line A and developed.

In operation, all transfer points are controlled by the segments of first circle 100, the converter being shown at the ②—① transfer point. At the ⓪—① transfer point, brush 110 makes contact with a segment of circle 100, causing a "1" to appear at output terminal 190 and causing second circle input brush 210 to drop to ground potential. Intermediate the ① interval, preferably in the middle thereof, brush 210, at ground potential, engages one of the non-critical ends of the segment of second circle 200; but this does not affect the "0" which continues to appear at second circle output terminal 290. At the ①—② transfer point brush 110 breaks contact with a segment of first circle 100, allowing output terminal 190 to return to ground to represent a "0". At the same time, brush 210 rises in potential, carrying with it second circle output brush 220, since brush 210 now lies well in engagement with the segment of circle 200, and causing a "1" to be represented at second circle output terminal 290. At the ②—① transfer point brush 110 makes contact with the other segment of circle 100, resulting in a "1" at output terminal 190 and permitting a "0" to now appear at output terminal 290, since brush 210 now drops to ground. Intermediate the other ① interval, preferably in the middle therof, brush 210 breaks contact with the other non-critical end of the segment of circle 200; but since, in this interval, brush 210 and output terminal 290 rest at ground potential, there is no effect. At the ①—⓪ transfer point brush 110 breaks contact with the other segment of circle 100, permitting a "0" at output terminal 190. Brush 210 now rises to a positive potential, but since it has already broken contact with the segment of circle 200, output terminal 290 remains at ground to represent a "0".

It is seen that all transfer points are controlled by the segments of first circle 100, and that neither of the ends of the segment of second circle 200 is critical.

Referring now to FIGURE 16, a source of input excitation voltage, battery 10, has its negative terminal grounded and its positive terminal connected through an input resistor 127 to an input brush 110 stationarily disposed to alternately contact the segments and spaces of a first circle 100. Input brush 110 is connected through a neon glow tube 150 to first circle output terminal 190, which is grounded through a loading resistor 130. First circle output brush 120 is connected to ground through an input loading resistor 128 and also to an input brush 210, disposed to alternately contact the segment and space of a second circle 200. Second circle output brush 220 is connected to second circle output terminal 290 and through a loading resistor 230 to ground. Circles 100 and 200 are concentrically mounted on a non-conductive disk, not shown, and the pattern is shown cut radially along line A and developed.

In operation, all transfer points are controlled by the segments of first circle 100, the converter being shown at the ②—① transfer point. At the ⓪—① transfer point first circle input brush 110 breaks contact with a segment of circle 100 causing the output at terminal 190 to change from "0" to a "1" and permitting output brush 120 and input brush 210 to drop to ground. Intermediate the ① interval, preferably in the middle thereof, brush 210 contacts one of the noncritical ends of the segment of circle 200. However, since second circle input brush 210 now rests at ground, this does not affect the output of "0" which continues to appear at second circle output terminal 290. At the ①—② transfer point brush 110 contacts the other segment of first circle 100 causing the output at terminal 190 to change from a "1" to a "0"

and at the same time causing second circle input brush 210 to carry a signal. Since brush 210 now lies well in engagement with the segment of second circle 200, output terminal 290 now carries a signal representing a "1." At the ②—① transfer point, brush 110 breaks contact with the other segment of circle 100 causing the output at terminal 190 to change from a "0" to a "1" and permitting input brush 210 to drop to ground. The output at terminal 290 thereby drops to ground to represent a "0." Intermediate the other ① interval, preferably in the middle thereof, second circle input brush 210 breaks contact with the other noncritical end of the segment of circle 200, since at this point brush 210 rests at ground, this does not affect the output of "0" at terminal 290. At the ①—⓪ transfer point brush 110 contacts the first segment of circle 100 causing the output at terminal 190 to drop to ground and represent a "0." Brush 210 now becomes positive, but since it has already broken contact with the segment of second circle 200, output terminal 290 remains at ground representing a "0."

It is seen that all transfer points are controlled by the segments of first circle 100, and that neither of the ends of the segment of second circle 200 is critical.

FIGURES 15 and 16 are inverse forms of a first special method. As has been previously explained, where segments are replaced by spaces, and spaces by segments, as for circles 100, then the direct output must be replaced by the complementary output, and the complementary output by the direct output.

Table 15–16 shows the outputs at terminals 190 and 290 for the converters of both FIGURES 15 and 16 as the converter patterns are moved under the stationary brushes to successively occupy the intervals ①, ②, ①, ⓪, and ① again.

| Interval | Output at Terminals | | Binary Count | Decimal Count |
|---|---|---|---|---|
| | 290 | 190 | | |
| ① | 0 | 1 | 01 | 1 |
| ② | 0→1 | 0 | 10 | 2 |
| ① | 0 | 1 | 01 | 1 |
| ⓪ | 0 | 0 | 00 | 0 |
| ① | 0 | 1 | 01 | 1 |

Table 15–16

Referring now to FIGURE 17, a source of input excitation voltage, battery 10, has its negative terminal grounded and its positive terminal connected to an input brush 110 stationarily disposed to alternately contact the segment and space of a first circle 100. First circle output brush 120, stationarily disposed to always be an electrical contact with the conductive segment of first circle 100 is connected serially through first a voltage dividing resistor 131 and then a loading resistor 130 to ground. The junction of resistors 130 and 131 is connected to the input of a one-to-one buffer amplifier 188, the output of which is connected to first circle output terminal 190. The positive terminal of input excitation battery 10 is connected through an input resistor 227 to an input brush 210 disposed to alternately contact the segment and space of a second circle 200. Second circle output brush 220 is connected to second circle output terminal 290 and through an input loading resistor 230 to ground. Second circle input brush 210 is connected to one terminal of a neon glow tube 250. The other terminal, the negative terminal, of neon glow tube 250 is connected backwardly through a crystal 283 to the input of buffer amplifier 188.

The negative terminal of glow tube 250 is also connected through a loading resistor 233 to the negative terminal of another source of potential, such as battery 12, which has its positive terminal grounded. Circles 100 and 200 are concentrically mounted on a nonconductive disk, and the pattern is shown cut radially along line A and developed.

Voltage dividing resistor 131 and loading resistor 130 should preferably have equal resistance values so that a "1" at terminal 190 will be represented by a positive voltage equal to substantially half that of input excitation battery 10. Assuming that battery 12 supplies a negative voltage equal to half the positive voltage of input excitation battery 10, then loading resistor 233 should have a resistance value somewhat less than half that of voltage dividing resistor 131 so that during the ② interval, when output brush 120 carries a signal equal to the voltage of input battery 10, the negative terminal of glow tube 250 would, neglecting any current through glow tube 250, rest slightly below ground by virtue of the voltage dividing action of resistors 131 and 233. The glow tube 250 regulates and passes sufficient current through loading resistor 233 to bring the negative terminal of glow tube 250 up to ground potential.

In operation at the ①—② transfer point, as shown, second circle input brush 210 contacts one of the critical ends of second circle 200, causing a "1" to appear at output terminal 290 and causing the negative terminal of glow tube 250 to drop to ground. Formerly the output at terminal 190 was positive, representing a "1." But the modification signal at the negative terminal of glow tube 250 causes the input to buffer amplifier 188 to drop to ground by virtue of the forward current now drawn through crystal 283. The output at terminal 190 is thereby modified from its normal "1" to a "0," thus decreasing the normal output representation of 3 by 1 to the desired output representation of 2 during the ② interval. At the ②—① transfer point second circle input brush 210 breaks contact with the other critical end of the segment of circle 200 permitting output terminal 290 to drop to ground and represent a "0" and removing the modification signal. The normal output of "1" then appears at terminal 190. At the ①—⓪ transfer point first circle input brush 110 breaks contact with the segment of circle 100, and the output at terminal 190 changes from a "1" to a "0." At the ⓪—① transfer point first circle input brush 110 contacts the segment of circle 200 causing the output at terminal 190 to change from a "0" to a "1."

It is seen that the ⓪—① and the ①—⓪ transfer points are controlled by the ends of the segment of the first circle 100 while the ①—② and the ②—① transfer points are controlled by the two critical ends of the segment of the second circle 200.

Table 17 shows the outputs at terminal 290 and the normal and modified outputs at terminal 190 for the converter of FIGURE 17 as the pattern is moved under the stationary brushes to successively occupy the intervals ①, ②, ①, ⓪, and ① again.

| Interval | Output at Terminals | | Binary Count | Decimal Count |
|---|---|---|---|---|
| | 290 | 190 | | |
| ① | 0 | 1 | 01 | 1 |
| ② | 0→1 | 1→0 | 10 | 2 |
| ① | 0 | 1 | 01 | 1 |
| ⓪ | 0 | 0 | 00 | 0 |
| ① | 0 | 1 | 01 | 1 |

Table 17

In FIGURES 15 through 17, omitting from consideration for the moment the circles 200, the patterns appear to provide a natural count alternating between 1 and 0. In FIGURES 15 and 16, which embody the first special method, the patterns appear to provide a linear count which proceeds 0, 1, 0, 1, and 0 again. In FIGURE 17, which embodies the second special method, the pattern appears to provide a nonlinear count which proceeds 0, 1, and 0 again, the count of 1 being of triple interval length. In the first special method, as FIGURES 15 and 16, the effect of the second circles 200 is to modify one of the counts which appear to be 0 into the desired count of 2. In the second special method, as FIGURE 17, the effect of the second circle 200 is to artificially modify the middle interval of the triple interval length count of what appears to be 1 into the desired count of 2.

In FIGURES 15 to 17, while we have shown the counts to be linear, it will be appreciated by those skilled in the art that the count may, if desired, be made nonlinear with corresponding variation in the lengths of the segments and spaces.

The first and second special methods may be used to provide other functions containing simple changes in slope sign where the difference between the local maximum and the local minimum is two counts.

Suppose it is desired to produce a count which proceeds 1, 2, 3, 2, and 1 again. This multiple-valued function has a local maximum at the count of 3 an a local minimum at the count of 1. The arrangement of segments and spaces for a converter to produce such function by the first special method is precisely as shown in FIGURE 16, but a few alterations in the connections are required. The junction of output brush 120, input brush 210, and input loading resistor 128 must be directly connected to output terminal 190. The negative terminal of glow tube 150, rather than being connected to output terminal 190, must instead be directly connected to the junction of output terminal 290 and loading resistor 230. Loading resistor 130 is not needed and this component may be eliminated. Output brush 220, rather than being directly connected to output terminal 290, must instead be connected forwardly through a crystal (which would have the reference character 281) to the junction of output terminal 290, loading resistor 230, and glow tube 150. The arrangement of segments and spaces for an inverse form of a converter to produce such function by the first special method is precisely as shown in FIGURE 15, but a few alterations in the connections are required. The junction of input brush 210 and glow tube 150 must be directly connected to output terminal 190. The junction of output brush 120 and input loading resistor 128, rather than being connected to output terminal 190 must instead be connected forwardly through a first crystal (which would have the reference character 139) to the junction of output terminal 290 and loading resistor 230. A high impedance loading resistor (which would have the reference character 130) may be connected between output terminal 190 and ground. Output brush 220, rather than being directly connected to output terminal 290, must instead be connected forwardly through a second crystal (which would have the reference character 281) to the junction of output terminal 290, loading resistor 230, and the first crystal (139). It will be noted that the altered converters of FIGURES 15 and 16 are inverse forms of the first special method and that, as usual, where segments are replaced by spaces, and spaces by segments, then the complementary output must be replaced by the direct output, and the direct output by the complementary output. The arrangement of segments and spaces for an inverse form of a converter to produce such function by the second special method is precisely as shown in FIGURE 17, but a few alterations in the connections are required. First circle input brush 110, rather than being connected to the positive terminal of input excitation battery 10, must instead be connected to the junction of second circle input brush 210, the input resistor, and the glow tube. Battery 12, loading resistor 233, crystal 283, voltage dividing resistor 131, and buffer amplifier 188 are not required components and may be eliminated. The ungrounded terminal of loading resistor 130 and the negative terminal of glow tube 250 must both be directly connected to output terminal 190. Output brush 220, rather than being connected to the junction of output terminal 290 and the input loading resistor, must instead be directly connected to output terminal 190. Output brush 120 rather than any of the connections shown, must instead be directly connected to the junction of output terminal 290 and the input loading resistor. For didactic reasons the reference character of the input resistor, 227, may be changed from 227 to 127, that of the glow tube, 250, from 250 to 150, and the reference character of the input loading resistor, 228, may be changed from 228 to 128. With these alterations for each of the converters of FIGURES 15 through 17, the ⓪ interval now become a ① interval, each of the ① intervals will now become a ② interval, and the ② interval will now become a ③ interval. Having thus renumbered the intervals, each of the altered converters of FIGURES 15 through 17 is now shown at the ③—② transfer point. For each of the altered converters of FIGURES 15 through 17, during the ① interval output terminal 190 will carry a signal representing a "1," while output terminal 290 will rest at ground representing a "0"; during each of the ② intervals output terminal 190 will rest at ground representing a "0" while output terminal 290 will carry a signal representing a "1"; and during the ③ interval both output terminal 190 and output terminal 290 will carry signals representing "1's." For each of the altered converters of FIGURES 15 and 16, intermediate of each of the ② intervals brush 210 will contact or break contact with the two non-critical ends of the segment of the second circle 200, but this will not affect the output of "1" which will continue to appear at output terminal 290. For each of the altered converters of FIGURES 15 and 16 at the ③—② and ②—③ transfer points there will be no change in the "1" which will continue to appear at output terminal 290; but during each of the ② intervals it will be the complementary output of the first circle 100 that will cause the "1" to appear at output terminal 290, while during the ③ interval it will be the modification signal at output brush 220 which will cause the "1" at output terminal 290. For the altered converter of FIGURE 17 at the ③—② and ②—③ transfer points brush 210 will contact or break contact with the two critical ends of the segment of second circle 200. In the altered converters of FIGURES 15 through 17 omitting from consideration for the moment the circles 200, the patterns appear to provide a natural count alternating between 1 and 2. In the first special method, as the altered converters of FIGURES 15 and 17, the count is linear, apparently proceeding 1, 2, 1, 2, and 1 again; and the effect of the second circles 200 is to modify one of the counts which appears to be 1 into the desired count of 3. In the inverse form of second special method, as the altered converter of FIGURE 17, the count is nonlinear, apparently proceeding 1, 2, and 1 again where the count of 2 is of triple interval length; and the effect of the second circle 200 is to modify the middle interval of what appears to be the triple interval length count of 2 into the desired count of 3. In the altered converter of FIGURE 15 the purpose of providing the first crystal (139) between the junction of input loading resistor 128 and output brush 120 and the junction of loading resistor 230, the second crystal (281), and output terminal 290 is to prevent the modification signal at output brush 220 during the ③ interval from seeing the low impedance of input loading resistor 128. In neither of the altered converters of FIGURES 16 and 17 is such crystal (139) needed, since the modification signal at output brush 220 sees only the high impedance of either loading resistor 230 in FIGURE 16 or loading resistor 130 in FIGURE 17, because of the essentially infinite impedance of glow tubes 150 when the breakdown voltage is not exceeded. The second crystal (281) in the altered converter of FIGURE 15 and the crystal (281) in the altered converter of FIGURE 16 prevent the signals representing "1's" at output terminals 290 during the ② intervals from being impressed upon output terminals 190 and creating ambiguities at the midpoints of the ② intervals where brushes 210 contact the noncritical ends of the segments of circles 200. In the altered converter of FIGURE 17 no such crystal (281) is needed since no ambiguity could occur. In the altered converter of FIGURE 17, input brush 210 is connected to the junction of input brush 110, the input resistor, and the glow tube, but it will be appreciated that input brush 210 may instead be connected to a center tap of input excitation battery 10. It will further be appreciated that the count of the altered converters of FIGURES 15 through 17 may, if desired, be made nonlinear with corresponding variation in the lengths of the segments and spaces.

*Multiple-Valued Functions Containing Simple Changes in Slope Sign Where There is Either a Local Maximum at Either an Odd Number or at a Double Interval Length Even Number, or Either a Local Minimum at Either an Even Number or at a Double Interval Length Odd Number, or Both Such Odd or Double Interval Even Maximum and Such Even or Double Interval Odd Minimum*

Referring now to FIGURE 18, a source of input excitation voltage, battery 10, has its negative terminal grounded and its positive terminal connected through an input resistor 127 to an input brush 110 disposed to alternately contact the segments and spaces of a first circle 100. First circle output brush 120, disposed to always be in contact with the segments of first circle 100 is connected to first circle output terminal 190 and through an input loading resistor 128 to ground. The positive terminal of battery 10 is also connected to an input brush 310, disposed to alternately contact the equal segment and space of a third circle 300. Third circle output brush 320 is connected to one terminal of a relay operating winding 360, the other terminal of which is grounded. Relay winding 360 controls the operation of double-pole, double-throw contacts connected as a reversing switch and comprising movable armatures 363 and 366 with respectively associated pairs of contacts 361 and 362 and also 364 and 365. First circle output brush 120 is connected to relay contacts 361 and 365. First circle input brush 110 is connected through a neon glow tube 150 to relay contacts 364 and 362. In the normally open position shown, when relay winding 360 is not energized, armatures 363 and 366 engage, respectively, contacts 361 and 364. Armature 363 is connected forwardly through a crystal 196 to one input brush 210 of a pair of input brushes 210 and 212 disposed to alternately contact the segment and space of a second circle 200. Armature 366 is connected forwardly through a crystal 198 to brush 212. Input brushes 210 and 212 are spaced apart a length of arc equal to one interval length. Second circle output brush 220 is connected to ground through a loading resistor 230 and to second circle output terminal 290. Circles 100 through 300 are concentrically mounted on a nonconductive disk, and the pattern is shown cut radially along line A and developed.

In operation at the mid-point of the double interval length ② interval, as shown, as the brushes move to the right relative to the pattern, third circle input brush 310 contacts one of the noncritical ends of the segment of circle 300, energizing relay winding 360, which in turn actuates the reversing switch, drawing armatures 363 and 366 from their normal engagement with respective contacts 361 and 364 into engagement with respective contacts 362 and 365, and causing conduction to shift from leading brush 212 to lagging brush 210. This extra alternation between brushes 210 and 212 intermediate the double interval length ② interval, preferably in the middle thereof, now conditions the converter for an unambiguous decreasing count. This extra brush alternation does not affect the "1" which continues to appear at output terminal 290, the same output representation being provided unchanged. At the ②—① transfer point, conduction shifts from lagging brush 210 to leading brush 212, which brushes symmetrically straddle a transfer point for the second circle 200, causing the output at terminal 290 to change from a "1" to a "0." At the ①—⓪ transfer point conduction shifts from leading brush 212 back to lagging brush 210. Intermediate the ①, ⓪, and ① intervals, preferably though not necessarily in the middle thereof, or at the midpoint of the ⓪ interval, brush 310 breaks contact with the other of the noncritical ends of the segment of circle 300, de-energizing relay winding 369, permitting armatures 363 and 366 to disengage respective contacts 362 and 365 and return to their normal engagement with respective contacts 361 and 364, and causing conduction to shift from lagging brush 210 to leading brush 212. This extra alternation between brushes 210 and 212 at the midpoint of the ⓪ interval now conditions the converter for an unambiguous increasing count. This extra brush alternation does not affect the "0" which continues to appear at output terminal 290, the same output representation being provided unchanged. At the ⓪—① transfer point, conduction shifts from leading brush 212 to lagging brush 210. At the ①—② transfer point, conduction shifts from lagging brush 210 to leading brush 212, which brushes symmetrically straddle a transfer point for the second circle 200, causing the output at terminal 290 to change from a "1" to a "0."

It is seen that in FIGURE 18 all transfer points are controlled by the ends of the segments of circle 100. The locations of the ends of the segment of circle 300 are not critical since they control no transfer points, but they should be preferably placed respectively at the midpoint of the ⓪ interval, the local minimum, and at the midpoint of the double interval length ② interval, the local maximum, where changes in slope sign occur, to maximize the allowable tolerances.

Table 18 shows the normal output representations at terminals 190 and 290 and the extra conditioning brush alternations at the local minimum of 0 and at the double interval length local maximum of 2, where changes in slope sign occur, for the converter of FIGURE 18 as pattern disk A moves under the stationary brushes to successively occupy the intervals ①, ②, ②, ①, ⓪, and ① again.

Referring now to FIGURE 19, a source of input excitation voltage, battery 10, has its negative terminal grounded and its positive terminal connected through an input resistor 127 to an input brush 110 stationarily disposed to alternately contact the segments and spaces of a first circle 100. A first circle output brush 120 is connected to first circle output terminal 190 and to ground through an input loading resistor 128. The positive terminal of input battery 10 is also connected to an input brush 510, disposed to alternately contact the equal segment and space of a circle 500. Output brush 520 of circle 500 is connected to one terminal of a relay actuating winding 560, the other terminal of which is grounded. Relay actuating winding 560 controls the operation of double-pole, double-throw relay contacts connected as a reversing switch and comprising movable armatures 563 and 566 and pairs of respectively associated relay contacts 561 and 562 and also 564 and 565. First circle output brush 120 is connected to contacts 561 and 565. First circle input brush 110 is connected through a neon glow tube 150 to relay contacts 564 and 562. In the normally open position shown, when relay operating winding 560 is unenergized, armatures 563 and 566 engage respective contacts 561 and 564. Armature 563 is connected forwardly through a crystal 196 to one input brush 210 of a pair of input brushes 210 and 212 disposed to alternately contact the segments and spaces of a second circle 200. Armature 566 is connected forwardly through a crystal 198 to input brush 212. Second circle output brush 220 is connected to second circle output terminal 290 and to ground through a loading resistor 230. Armature 563 is also connected forwardly through a crystal 296 to one input brush 310 of a pair of input brushes 310 and 312 disposed to alternately contact the segment and space of a third circle 300. Armature 566 is also connected forwardly through a crystal 298 to input brush 312. Pairs of input brushes 310 and 312 and also 210 and 212 are spaced apart a length of arc equal to one interval length. Intermeshing with third circle 300 is a fourth circle 400, the segment of circle 400 occupying the space of circle 300 and the space of circle 400 being occupied by the segment of circle 300. Input brushes 310 and 312 simultaneously provide input signals to both circles 300 and 400. Third circle output brush 320 is connected through a loading resistor 330 to ground and to third circle output terminal 390. Fourth circle output brush 400 is connected through a loading resistor 430 to ground and to fourth circle output terminal 490. Circles 100 through 500 are concentrically mounted on a nonconductive disk and the pattern is shown cut radially along line A and developed.

In operation at the ⑧—⑨ transfer point, as shown, as the brushes move to the right relative to the pattern, first circle input brush 110 contacts a segment

| Interval | Outputs at Terminal | | Binary Count | Decimal Count |
|---|---|---|---|---|
| | 290 | 190 | | |
| ① | 0 | 1 | 01 | 1 |
| ② | 1 | 0 | 10 | 2 |
| ② | 1 | 0 | 10 | 2 |
| ① | 0 | 1 | 01 | 1 |
| ⓪ | 0 | 0 | 00 | 0 |
| ① | 0 | 1 | 01 | 1 |

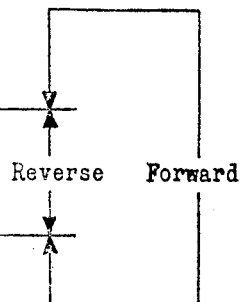

Reverse    Forward

Table 18 of circle 100, causing conduction to shift from leading brushes 212 and 312 to lagging brushes 210 and 310. Intermediate the ⑧, ⑨, and ⑧ intervals, preferably though not necessarily in the middle thereof, or at the midpoint of the ⑨ interval, brush 510 contacts one of the noncritical ends of the segment of circle 500, energizing relay winding 560, which in turn actuates the reversing switch, drawing armatures 563 and 566 from their normal engagement with respective contacts 561 and 564 into engagement with respective contacts 562 and 565, and causing conduction to shift from lagging brushes 210 and 310 to leading brushes 212 and 312. This extra alternation between the two pairs of input brushes at the midpoint of the ⑨ interval now conditions the converter for an unambiguous decreasing count. This extra brush alternation affects neither the "0's" at output terminals 290 and 390 nor the "1" at output terminal 490, the same output representation being provided unchanged. The count then proceeds conventionally as taught by Schaefer et al. through the remaining half of the ⑨ interval, through the ⑧, ⑦, ⑥, and ⑤ intervals, and through half of the ④ interval. Intermediate the ⑤, ④, and ⑤ intervals, preferably though not necessarily in the middle thereof, or at the mid-point of the ④ interval, brush 510 breaks contact with the other of the noncritical ends of the segment of circle 500, de-energizing relay winding 560, permitting armatures 563 and 566 to disengage respective contacts 562 and 565 and return to their normal engagement with respective contacts 561 and 564, and causing conduction to shift from lagging brushes 210 and 310 to leading brushes 212 and 312. This extra alternation between the pairs of input brushes at the mid-point of the ④ interval now conditions the converter for an unambiguous increasing count. This extra brush alternation affects neither the "0's" at output terminals 290 and 490 nor the "1" at output terminal 390, the same output representation being provided unchanged. The count proceeds conventionally, through the remaining half of the ④ interval and through the ⑤, ⑥, ⑦, and ⑧ intervals to again arrive at the ⑧—⑨ transfer point.

It is seen that in FIGURE 19 as in FIGURE 18 all transfer points are controlled by the ends of the segments of circle 100. The locations of the ends of the segment of circle 500 are not critical since they control no transfer points, but they should be preferably placed respectively at the mid-point of the ⑨ interval, the local maximum, and at the mid-point of the ④ interval, the local minimum, where changes in slope sign occur, to maximize the allowable tolerances.

Table 19 shows the normal output representations at terminals 190, 290, 390, and 490, and the extra conditioning brush alternations at the local maximum of 9 and the local minimum of 4, where changes in slope sign occur, as pattern disk A moves under the stationary brushes to successively occupy the intervals ⑦, ⑧, ⑨, ⑧, ⑦, ⑥, ⑤, ④, ⑤, ⑥, and ⑦ again.

| Interval | Outputs at Terminals | | | | Binary Count | Decimal Count |
|---|---|---|---|---|---|---|
| | 490 | 390 | 290 | 190 | | |
| ⑦ | 0 | 1 | 1 | 1 | 0111 | 7 |
| ⑧ | 1 | 0 | 0 | 0 | 1000 | 8 |
| ⑨ | 1 | 0 | 0 | 1 | 1001 | 9 |
| ⑧ | 1 | 0 | 0 | 0 | 1000 | 8 |
| ⑦ | 0 | 1 | 1 | 1 | 0111 | 7 |
| ⑥ | 0 | 1 | 1 | 0 | 0110 | 6 |
| ⑤ | 0 | 1 | 0 | 1 | 0101 | 5 |
| ④ | 0 | 1 | 0 | 0 | 0100 | 4 |
| ⑤ | 0 | 1 | 0 | 1 | 0101 | 5 |
| ⑥ | 0 | 1 | 1 | 0 | 0110 | 6 |
| ⑦ | 0 | 1 | 1 | 1 | 0111 | 7 |

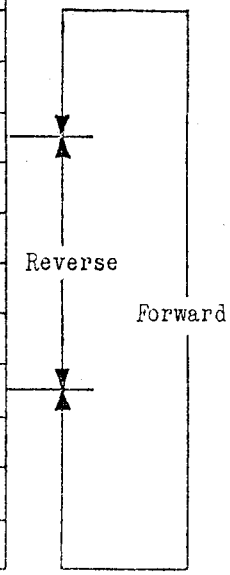

Table 19

In the converters of FIGURES 18 and 19, which embody the general method for producing functions having simple changes in slope sign, an extra brush alternation is provided for each of the pairs of complementary input brushes adjacent both the local maximum and minimum, where changes in slope sign occur, to condition the converter for an unambiguous count. The general method is always workable where a natural local maximum occurs at an odd number or where a natural local minimum occurs at an even number, as at the numbers 9 and 4 respectively, in the converter of FIGURE 19, and as at the number 0 in FIGURE 18. However, the general method is only workable for non-natural even maxima or odd minima if such are of double interval length. In the converter of FIGURE 18 the non-natural local maximum occurs at the even number 2 and the general method is workable only because this nonnatural even maximum of 2 is of double interval length.

In the converters of FIGURES 18 and 19 we have shown all intervals to be of equal length, but it will be appreciated that these converters are both adapted to provide nonlinear counts with corresponding variation in the lengths of the segments and spaces.

While in FIGURES 18 and 19 we have shown the extra brush alternations to be provided by electromechanical reversing switches, those skilled in the art will appreciate that purely electronic switching devices may be used instead. Assuming that all intervals are of about the same length and that a brush alternation signal occurs adjacent the mid-point of a count which is a local maximum or minimum and that the response lag of the reversing switch relay is less than half a millisecond, then in the converter of FIGURE 18 at the local maximum in the double interval length ② interval, switching must be completed within half an interval length to avoid a momentary ambiguity at the quarter positions in the double interval length ② interval; and the maximum counting rate for such relays in providing an extra brush alternation is thus, in this instance, greater than 1,000 counts per second. In the converter of FIGURE 18 at the local minimum in the ⓪ interval and in the converter of FIGURE 19 at both the maximum and minimum in the ⑨ and ④ intervals respectively, switching must be completed within one interval length to avoid a momentary ambiguity at the mid-points of the adjacent intervals; and the maximum counting rate for such relays in providing an extra brush alternation is thus, in these instances, greater than 2,000 counts per second. It will be noted that the extra conditioning brush alternations provided by the reversing switch need not be instantaneous since the same output representation is provided unchanged, thus allowing a response lag tolerance before a momentary ambiguity occurs, as the instance may be, at either the quarter positions of a non-natural double interval length even maximum or odd minimum or at the mid-points of the intervals adjacent a natural odd maximum or even minimum.

As will be appreciated by those skilled in the art, the converters of FIGURES 15 through 19 are all amenable to superextension of count for interpattern transfer. Suppose in FIGURE 19 that superextension is made to occur adjacent either of the ⑥—⑦ transfer points. It will be apparent that an additional circle, a superextension circle, must be mounted on a pattern disk reduction geared to rotate with the disk mounting circles 100 through 500, and that this superextension circle must be provided with a single input signal derived directly from one or the other of the two complementary output signals of first circle 100 according as the superextended interval is either the ⑥ interval or the ⑦ interval of the two intervals adjacent the supposed ⑥—⑦ transfer point. It will be further apparent that the tolerances, which might otherwise become critical, may be increased by deriving the single input signal to the superextension circle from a combination of two signals, one of which is an output signal of circle 100, and the other of which is a signal derived ultimately from one of the two complementary output signals of first circle 100.

*Multiple-Valued Functions Containing Simple Changes in Slope Sign Where There is Either a Local Maximum at an Even Number, or Either a Local Minimum at an Odd Number, or Both an Even Maximum and an Odd Minimum*

Referring now to FIGURE 20, a source of input excitation voltage, battery 10, having its negative terminal grounded, has its positive terminal connected through an input resistor 127 to an input brush 110, disposed to contact alternately the segments and spaces of a first circle 100. First circle output brush 120 is connected to the input of a one-to-one buffer amplifier 188 through a summing resistor 132 and to ground through an input loading resistor 128. The output of amplifier 188 is connected to first circle output terminal 190. The positive terminal of input excitation battery 10 is also connected to an input brush 710, disposed to contact alternately the equal segment and space of circle 700. Output brush 720 of circle 700 is connected to one terminal of a relay actuating winding 760, the other terminal of which is grounded. Relay winding 760 operates a pair of double-pole double-throw relay contacts connected as a reversing switch and comprising armatures 763 and 766 and pairs of respectively associated relay contacts 761 and 762 and also 764 and 765. First circle output brush 120 is connected to contacts 761 and 765. First circle input brush 110 is connected through a neon glow tube 150 to contacts 764 and 762. In the normally open position with relay winding 760 unenergized, armatures 763 and 766 engage respective contacts 761 and 764. Armature 763 is connected forwardly through a crystal 196 to one input brush 210 of a pair of input brushes 210 and 212 disposed to contact alternately the segments and spaces of a second circle 200. Armature 766 is connected forwardly through crystal 198 to input brush 212. Second circle output brush 220 is connected to second circle output terminal 290 and to ground through a loading resistor 230. Armature 763 is also connected forwardly through a crystal 296 to one input brush 310 of a pair of input brushes 310 and 312 disposed to alternately contact the segment and space of a third circle 300. Armature 766 is also connected forwardly through a crystal 298 to input brush 312. Pair of input brushes 310 and 312 and also 210 and 212 are spaced apart a length of arc equal to one interval length. The third circle output brush 320 is connected through a summing resistor 332 to the input of a one-to-one buffer amplifier 388 and through a loading resistor 330 to ground. The output of amplifier 388 is connected to third circle output terminal 390. Intermeshing with third circle 300 is a fourth circle 400, the segment of circle 400 occupying the space of circle 300 and the space of circle 400 being occupied by the segment of circle 300. Input brushes 310 and 312 simultaneously supply complementary input signals to both the third and fourth circles 300 and 400. Fourth circle output brush 420 is connected to fourth circle output terminal 490 and through a loading resistor 430 to ground. The positive terminal of input battery 10 is also connected through another input resistor 527 to an input brush 510, disposed to contact alternately the segment and space of a fifth circle 500. Fifth circle output brush 520 is connected to ground through an input loading resistor 528 and forwardly through a crystal 581 to second circle output terminal 290. Fifth circle input brush 510 is connected to one terminal of a neon glow tube 550. The other terminal of glow tube 550, the negative terminal, is connected through a loading resistor 533 to the negative terminal of another battery 12, the positive terminal of which is grounded. The negative terminal of glow tube 550 is also connected backwardly through a crystal 583 to the input of amplifier 188. A sixth circle 600, comprising one segment and one space, partially intermeshes with fifth circle 500, and also receives its input signal from brush 510. Sixth circle output brush 620 is connected to one terminal of a neon glow tube 650. The other terminal of glow tube 650, the negative terminal, is connected to the input of an inverting amplifier or flip-flop or trigger circuit 680. The output of inverting amplifier 680 is connected backwardly through a crystal 683 to the input of buffer amplifier 388. The negative terminal of glow tube 650 is also connected forwardly through a crystal 681 to the input of buffer amplifier 188 and forwardly through a crystal 682 to output terminal 290. Circles 100 through 700 are concentrically mounted on a nonconductive disk, and the pattern is shown cut radially along line A and developed. Flip-flop circuit 680 may here have a high output impedance.

Assuming that battery 12 supplies a negative voltage equal to half the positive voltage of input excitation battery 10, then loading resistor 533 should have a resistance value somewhat less than that of summing resistor 132 so that during the ⑩ interval when output brush 120 carries a signal equal to half the voltage of input battery 10, the negative terminal of glow tube 550 would, neglecting any current through glow tube 550, rest slightly below ground by virtue of the voltage dividing action of resistors 132 and 533. Glow tube 550 regulates, passing sufficient current through loading resistor 533 to bring the negative terminal of glow tube 550 up to ground potential.

In operation in the ⑨ interval adjacent the ⑨—⑩ transfer point, as shown, as the brushes move to the right relative to the pattern, at the ⑨—⑩ transfer point, first circle input brush 110 lies within the triple interval length segment of circle 100 and is hence ineffective to control a change in output representation; but, at the ⑨—⑩ transfer point input brush 510 contacts one of the critical ends of the segment of circle 500 causing output brush 520 to carry a signal and causing the negative terminal of glow tube 550 to drop to ground. The signal at output brush 520 is impressed forwardly through crystal 581 upon output terminal 290, increasing the normal count of 9 by 2 to the count of 11 which is one greater than the desired output representation of 10. The negative terminal of glow tube 550 in dropping to ground potential carries with it the input to buffer amplifier 188 by virtue of the forward current now drawn through crystal 583, thereby decreasing the count of 11 by 1 to the desired output representation of 10 during the ⑩ interval. Intermediate the ⑧, ⑨, ⑩, ⑨, and ⑧ intervals, preferably though not necessarily in the middle thereof, or at the midpoint of the ⑩ interval, input brush 710 contacts one of the noncritical ends of the segment of circle 700, energizing relay winding 760, which in turn actuates the reversing switch, drawing armatures 763 and 766 from their normal engagement with respective contacts 761 and 764 into engagement with respective contacts 762 and 765, and causing conduction to shift from lagging brushes 210 and 310 to leading brushes 212 and 312. This extra alternation between the two pairs of input brushes at the midpoint of the ⑩ interval now conditions the converter for an unambiguous decreasing count. This extra brush alternation does not affect the output signals at terminals 190 through 490, the same converter output representation being provided unchanged. At the ⑩—⑨ transfer point input brush 510 breaks contact with the other critical end of the segment of circle 500, removing the modification signals at output brush 520 and at the negative terminal of glow tube 550, and permitting the normal converter output representation of 9 to be provided. The count then proceeds conventionally as taught by Schaefer et al. through the ⑨, ⑧, ⑦, ⑥, ⑤, and ④ intervals. At the ④—③ transfer point brush 110 lies within the triple interval length space of circle 100 and is ineffective to control a change in output representation. However, at the ④—③ transfer point brush 510 contacts one of the critical ends of the segment of circle 600, causing the negative terminal of glow tube 650 to carry a signal which is impressed forwardly through crystals 631 and 632 upon the input of buffer amplifier 188 and upon output terminal 290 respectively, increasing the normal count of 4 by 3 to the count of 7 which is 4 greater than the desired output representation of 3. When the negative terminal of glow tube 650 becomes positive the output of trigger circuit 680 drops to ground potential drawing with it the input to buffer amplifier 388 because of the forward current now drawn through crystal 683, decreasing the count of 7 by 4 to the desired output representation of 3 during the ③ interval. Intermediate the ⑤, ④, ③, ④, and ⑤ intervals, preferably but not necessarily in the middle thereof, or at the midpoint of the ③ interval, brush 710 breaks contact with the other of the noncritical ends of the segment of circle 700, de-energizing relay winding 760, permitting armatures 763 and 766 to disengage respective contacts 762 and 765 and return to their normal engagement with respective contacts 761 and 764, and causing conduction to shift from lagging brushes 210 and 310 to leading brushes 212 and 312. This extra alternation between the pairs of input brushes at the midpoint of the ③ interval now conditions the converter for an unambiguous increasing count. This extra brush alternation does not affect the output signals at terminals 190 through 490, the same output representation being provided unchanged. At the ③—④ transfer point brush 510 breaks contact with the other critical end of the segment of circle 600, removing the modification signals at the negative terminal of glow tube 650 and at the output of trigger circuit 680, permitting the normal converter output representation of 4 to appear. The count then proceeds conventionally through the ④, ⑤, ⑥, ⑦, and ⑧ intervals to again arrive in the ⑨ interval adjacent the ⑨—⑩ transfer point.

It is seen that in FIGURE 20 not every transfer point is controlled by the ends of the segments of circle 100. The ⑨—⑩ and the ⑩—⑨ transfer points are controlled by the two critical ends of the segment of circle 500, and the ④—③ and the ③—④ transfer points are controlled by the two critical ends of the segment of circle 600. The locations of the ends of the segment of circle 700 are not critical since they control no transfer points but they should be preferably placed respectively at the midpoint of the ⑩ interval, the local maximum, and at the midpoint of the ③ interval, the local minimum, where changes in slope sign occur, to maximize the allowable tolerances.

Table 20, Col. 93, shows the normal output representations at terminal 490 and the normal and modified output representations at terminals 190, 290, and 390 and the extra conditioning brush alternations at the local maximum of 10 and the local minimum of 4, where changes in slope sign occur, for the converter of FIGURE 20 as pattern disk A moves under the stationary brushes to successively occupy the intervals ⑦, ⑧, ⑨, ⑩, ⑨, ⑧, ⑦, ⑥, ⑤, ④, ⑤, ⑥, and ⑦ again.

In the converter of FIGURE 20 which embodies the first adaptation of the general method for producing functions having simple changes in slope sign, omitting from consideration for the moment the circles 500 and 600, the pattern appears to provide a multiple-valued count having a triple interval length local maximum at the natural odd count of 9 and a triple interval local minimum at the natural even count of 4. The effect of circle 500 is to artificially modify the middle interval of what appears to be the triple interval length natural odd maximum of 9 into the non-natural even maximum of 10; and the effect of circle 600 is to artificially modify the middle interval of what appears to be the triple interval length natural even minimum of 4 into the non-natural odd minimum of 3. As is usual for multiple-valued functions having simple changes in slope sign, extra brush alternations are provided for each of the pairs of complementary input brushes adjacent the local maximum and minimum, where changes in slope sign occur, to condition the converter for an unambiguous count.

| Interval | Outputs at Terminal | | | | Binary Count | Decimal Count |
|---|---|---|---|---|---|---|
| | 490 | 390 | 290 | 190 | | |
| ⑦ | 0 | 1 | 1 | 1 | 0111 | 7 |
| ⑧ | 1 | 0 | 0 | 0 | 1000 | 8 |
| ⑨ | 1 | 0 | 0 | 1 | 1001 | 9 |
| ⑩ | 1 | 0 | 0→1 | 1→0 | 1010 | 10 |
| ⑨ | 1 | 0 | 0 | 1 | 1001 | 9 |
| ⑧ | 1 | 0 | 0 | 0 | 1000 | 8 |
| ⑦ | 0 | 1 | 1 | 1 | 0111 | 7 |
| ⑥ | 0 | 1 | 1 | 0 | 0110 | 6 |
| ⑤ | 0 | 1 | 0 | 1 | 0101 | 5 |
| ④ | 0 | 1 | 0 | 0 | 0100 | 4 |
| ③ | 0 | 1→0 | 0→1 | 0→1 | 0011 | 3 |
| ④ | 0 | 1 | 0 | 0 | 0100 | 4 |
| ⑤ | 0 | 1 | 0 | 1 | 0101 | 5 |
| ⑥ | 0 | 1 | 1 | 0 | 0110 | 6 |
| ⑦ | 0 | 1 | 1 | 1 | 0111 | 7 |

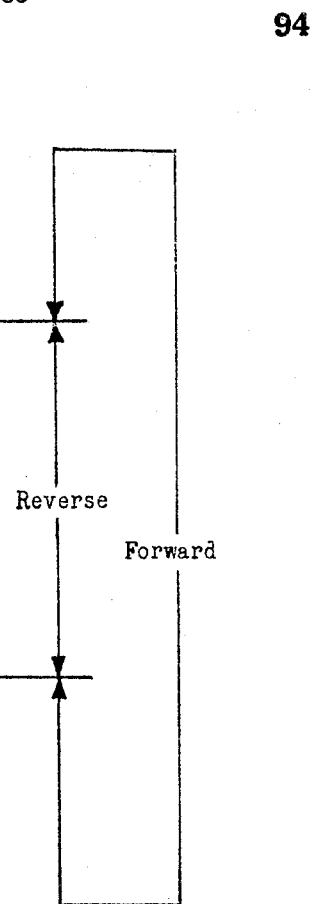

Table 20

In the converter of FIGURE 20 we have shown all intervals to be of equal length so that the triple interval length segment and space may be readily seen, but it will be appreciated that the converter of FIGURE 20 is adapted to provide a nonlinear count with corresponding variation of the lengths of the segments and spaces.

While in FIGURE 20 we have shown the extra brush alternations to be provided by electromechanical reversing switches, those skilled in the art will appreciate that purely electronic switching devices may be used instead. Assuming that all intervals are of about the same length and that a brush alternation signal occurs adjacent the mid-point of a count which is a local maximum or minimum and that the response lag of the reversing switch relay is less than half a millisecond, then for the converter of FIGURE 20 switching must be completed within two interval lengths to avoid a momentary ambiguity at the mid-points of the second adjacent intervals; and the maximum counting rate for such relays in providing an extra brush alternation in the first adaptation of the general method is thus greater than 4,000 counts per second. It will be noted that the extra conditioning brush alternations provided by the reversing switch need not be instantaneous since the same output representation is provided unchanged, thus allowing a response lag tolerance before a momentary ambiguity occurs at the mid-points of the second intervals adjacent a non-natural even maximum or odd minimum.

As will be appreciated by those skilled in the art, the converter of FIGURE 20, as well as those of FIGURES 15 through 19, is amenable to superextension of count for interpattern transfer. Suppose in FIGURE 20 that superextension is made to occur adjacent either of the ⑦—⑧ transfer points. It will be apparent that an additional circle, a superextension circle, must be mounted on a pattern disk reduction geared to rotate with the disk mounting circles 100 through 700, and that this super-extension circle must be provided with a single input signal derived from either the output signal of circle 300 or the output signal of circle 400 according as the superextended interval is either the ⑦ interval or the ⑧ interval of the two intervals adjacent the supposed ⑦—⑧ transfer point.

*Functions Containing Either a Discontinuity Between Odd Numbers Accompanied by a Change in Slope Sign Such as to Constitute a Local Maximum, or Either a Discontinuity Between Even Numbers Accompanied by a Change in Slope Sign Such as to Constitute a Local Minimum, or Both Such Odd-Odd Discontinuous Peak and Such Even-Even Discontinuous Dip*

Referring now to FIGURE 21, a source of input excitation voltage, battery 10, has its negative terminal grounded and its positive terminal connected through an input resistor 127 to an input brush 110 stationarily disposed to alternately contact the conductive segments and nonconductive intersegmental spaces of a first circle 100. First circle output brush 120, stationarily disposed to always be in electrical contact with the segments of first circle 100, is connected to first circle output terminal 190 and to ground through an input loading resistor 128. First circle output brush 120 is also connected to one input terminal of each of two "and" circuits 125 and 122. First circle input brush 110 is connected through a neon glow tube 150, which sustains a voltage drop preferably half that of input excitation battery 10, to one input terminal of each of two other "and" circuits 123 and 124. The positive terminal of input excitation battery 10 is also connected through an input resistor 727 to an input brush 710 disposed to alternately contact the segment and space of a circle 700. Output brush 720 of circle 700 is connected to ground through an input loading resistor 728. Output brush 720 is also connected to the other input terminal of each of "and" circuits 123 and 125. Input brush 710 is connected through a neon glow tube 750 to the other input terminal of each of "and" circuits 122 and 124. The outputs of "and" circuits 124 and 125 are combined, or summed, forwardly through respective crystals 138 and 139. The outputs of "and" circuits 122 and 123 are summed forwardly through respective crystals 136 and 137. The junction of the cathodes of diodes 138 and 139, at which appears the combination output signal of "and" circuits 124 and 125, is connected forwardly through a crystal 196 to one input brush 210 of a pair of input brushes 210 and 212 stationarily disposed to alternately contact the segments and spaces of a second circle 200. The junction of the cathodes of diodes 136 and 137, at which appears the combination output of "and" circuits 122 and 123, is connected forwardly through a crystal 198 to brush 212. Brushes 210 and 212 are spaced apart a length of arc equal to any of the equal interval lengths of circle 100. Second circle output brush 220, disposed to always be in electrical contact with the segments of circle 200, is connected to a second circle output terminal 290 and to ground through a loading resistor 230. The junction of crystals 138 and 139 is also connected forwardly through a crystal 296 to one input brush 310 of a pair of input brushes 310 and 312 disposed to alternately contact the segments and spaces of a third circle 300. The junction of crystals 136 and 137 is also connected forwardly through a crystal 298 to brush 312. Brushes 310 and 312 are spaced apart a length of arc equal to that between brushes 210 and 212. A third circle output brush 320 is connected to third circle output terminal 390 and to ground through a loading resistor 330. Intermeshing with third circle 300 is a fourth circle 400, the segments of circle 400 occupying the spaces of circle 300 and the spaces of circle 400 being occupied by the segments of circle 300. Brushes 310 and 312 simultaneously provide complementary input signals to both circles 300 and 400. The junction of crystals 138 and 139 is further connected forwardly through a crystal 496 to an input brush 510 of a pair of input brushes 510 and 512 disposed to alternately contact the segments and spaces of a fifth circle 500. The junction of crystals 136 and 137 is further connected forwardly through a crystal 498 to input brush 512. Brushes 510 and 512 are spaced apart a predetermined length of arc which also is equal to that between brushes 210 and 212. Fifth circle output brush 520 is connected to fifth circle output terminal 590 and to ground through a loading resistor 530. Third circle output brush 320 is connected forwardly through a crystal 596 to one input brush 610 of a pair of input brushes 610 and 612 disposed to alternately contact the segment and space of a sixth circle 600. Fourth circle output brush 420 is connected forwardly through a crystal 598 to brush 612. Brushes 610 and 612 have a spacing which is twice that between brushes 510 and 512 or between brushes 310 and 312 or between brushes 210 and 212, the spacing between brushes 610 and 612 being two interval lengths of arc. Sixth circle output brush 620 is connected to sixth circle output terminal 690 and to ground through a loading resistor 630. Circles 100 through 700 are concentrically mounted on a nonconductive disk and the pattern is shown cut radially along line A and developed.

In operation of the converter of FIGURE 21 at the ⑩—⑪ transfer point, as shown, as the brushes move to the left relative to the pattern, brush 110 contacts the double interval length segment of circle 100 causing conduction to shift from the negative terminal of glow tube 150 to first circle output brush 120. At this ⑩—⑪ transfer point brush 710 lies in the nonconductive space of circle 700 and a positive signal is thereby impressed through glow tube 750 to one input terminal of each of "and" circuits 124 and 122, which thereby activates them. The transfer of conduction from the negative terminal of glow tube 150 to first circle output brush 120 causes conduction to shift from "and" circuit 124 and "or" circuit crystal 138 to "and" circuit 122 and "or" circuit crystal 136 which, in turn, causes conduction to shift from leading brushes 210, 310, and 510 to lagging brushes 212, 312, and 512. At the ⑪—② transfer point first circle input brush 110 lies in the middle of the double interval length segment of circle 100 and hence cannot control a transfer point; but at this ⑪—② transfer point brush 710 contacts one of the critical ends of the segment of circle 700 causing conduction to shift from the negative terminal of glow tube 750 to output brush 720, deactivating "and" circuits 124 and 122 and activating "and" circuits 123 and 125 causing conduction to shift from "and" circuit 122 and crystal 136 to "and" circuit 125 and crystal 139 which, in turn, causes conduction to shift from lagging brushes 212, 312, and 512 to leading brushes 210, 310, and 510, which brushes symmetrically straddle transfer points of circles 200 through 500. The transfer of conduction from lagging brush 312 to leading brush 310 causes conduction to shift from the cascaded lagging brush 612 to the cascaded leading brush 610, which brushes symmetrically straddle a transfer point of circle 600. This extra brush alternation at the ⑪—② transfer point, controlled not by first circle 100 but rather by circle 700, not only causes a change in output representation but also conditions the converter for an unambiguous decreasing count. The count proceeds conventionally through the ②, ⑳, ⑲, ⑱, ⑰, ⑯, ⑮, and ⑭ intervals with conduction shifting back and forth between "and" circuits 123 and 125 and between respective "or" circuit crystals 137 and 139. At the ⑭—④ transfer point first circle input brush 110 lies in the middle of the double interval length space of circle 100 and cannot control a change in output representation; but at this ⑭—④ transfer point brush 710 breaks contact with the other of the critical ends of the segment of circle 700 causing conduction to shift from output brush 720 to the negative terminal of glow tube 750, deactivating "and" circuits 125 and 123 and reactivating "and" circuits 122 and 124, causing conduction to shift from "and" circuit 123 and crystal 137 to "and" circuit 124 and crystal 138, which, in turn, causes conduction to shift from lagging brushes 212, 312, and 512 to leading brushes 210, 310, and 510, which brushes symmetrically straddle transfer points of circles 200 through 500. This extra brush alternation at the ⑭—④ transfer point, controlled not by circle 100 but rather by circle 700, not only causes a change in output representation, but also conditions the converter for an unambiguous increasing count. The count proceeds conventionally through the ④, ⑤, ⑥, ⑦, ⑧, ⑨, and ⑩ intervals to again arrive at the ⑩—⑪ transfer point with conduction being shifted back and forth between "and" circuits 124 and 122 and between respectively associated "or" circuit crystals 138 and 136.

Table 21, Col. 97, shows the normal output representations at terminals 190, 290, 390, 590, and 690 and the extra conditioning brush alternations at the ②—⑪ transfer point, which constitutes an odd-odd discontinuous peak, and at the ④—⑭ transfer point, which constitutes an even-even discontinuous dip, for the converter of FIGURE 21 as pattern disk A moves under the stationary brushes to successively occupy the intervals ⑱, ⑲, ⑳, ㉑, ⑪, ⑩, ⑨, ⑧, ⑦, ⑥, ⑤, ④, ⑭, ⑮, ⑯, ⑰, and ⑱ again.

In the converter of FIGURE 21, which embodies the second adaptation of the general method for producing functions containing discontinuities between odd numbers accompanied by a change in slope sign such as to constitute a local maximum and functions containing discontinuities between even numbers accompanied by a change in slope sign such as to constitute a local minimum, an additional circle, circle 700, the ends of the segment of which are critical, not only controls the transfer point between the double interval length segment (or space if an inverse form is used) subtending the odd-odd discontinuous peak and between the double interval length space (or segment if an inverse form is used) subtending the even-even discontinuous dip, but also provides extra brush alternations at the discontinuities where changes in slope

| Interval | Outputs at Terminal | | | | | Binary Count | Decimal Count |
|---|---|---|---|---|---|---|---|
| | 690 | 590 | 390 | 290 | 190 | | |
| (18) | 1 | 0 | 0 | 1 | 0 | 10010 | 18 |
| (19) | 1 | 0 | 0 | 1 | 1 | 10011 | 19 |
| (20) | 1 | 0 | 1 | 0 | 0 | 10100 | 20 |
| (21) | 1 | 0 | 1 | 0 | 1 | 10101 | 21 |
| (11) | 0 | 1 | 0 | 1 | 1 | 01011 | 11 |
| (10) | 0 | 1 | 0 | 1 | 0 | 01010 | 10 |
| (9) | 0 | 1 | 0 | 0 | 1 | 01001 | 9 |
| (8) | 0 | 1 | 0 | 0 | 0 | 01000 | 8 |
| (7) | 0 | 0 | 1 | 1 | 1 | 00111 | 7 |
| (6) | 0 | 0 | 1 | 1 | 0 | 00110 | 6 |
| (5) | 0 | 0 | 1 | 0 | 1 | 00101 | 5 |
| (4) | 0 | 0 | 1 | 0 | 0 | 00100 | 4 |
| (14) | 0 | 1 | 1 | 1 | 0 | 01110 | 14 |
| (15) | 0 | 1 | 1 | 1 | 1 | 01111 | 15 |
| (16) | 1 | 0 | 0 | 0 | 0 | 10000 | 16 |
| (17) | 1 | 0 | 0 | 0 | 1 | 10001 | 17 |
| (18) | 1 | 0 | 0 | 1 | 0 | 10010 | 18 |

Table 21 sign occur to condition the converter for an unambiguous count.

It will be appreciated that the action of "and" circuits 122, 123, 124, and 125 in combination with respectively associated pairs of "or" circuit crystals 136 and 137 and also 138 and 139 is that of an electronic double-pole double-throw reversing switch analogous to the electromechanical relay actuated reversing switches of the converters of FIGURES 19 and 20. However in the converter of FIGURE 21 the actuations of the reversing switch also cause changes in output representation from the count of 21 to the count of 11 and also from the count of 4 to the count of 14. Since any response lag causes a momentary ambiguity, we consequently desire that the operation of the reversing switch be as nearly instantaneous as possible and have hence provided an electronic reversing switch which has a response lag of only a fraction of a microsecond rather than an electromechanical relay with its inherent response lag of about half a millisecond.

While in the converter of FIGURE 21 we have shown all intervals to be of equal length so that the double interval length segment (or space) subtending the odd-odd discontinuous peak and the double interval length space (or segment) subtending the even-even discontinuous dip may readily be seen, it will be apparent to those skilled in the art that the converter of FIGURE 21 is adapted to provide a nonlinear count with corresponding variation in the lengths of the segments and spaces.

As will be appreciated by those skilled in the art, the converter of FIGURE 21, as well as those of FIGURES 15 through 20, is amenable to superextension of count for interpattern transfer by the provision of an additional circle, a superextension circle, mounted on a pattern disk reduction geared to rotate with the disk mounting circles 100 through 700 and provided with a single input signal.

As taught by Speller, brush cascading is employed wherever possible to increase the allowable tolerances, each stage of cascading doubling the tolerances. In FIGURE 21, circle 600 is provided with complementary input signals from the complemental output signals of intermeshing circles 300 and 400, these signals being derived not directly but rather ultimately from the two complementary output signals of first circle 100. As is usual, this brush cascading doubles the allowable tolerances; and the spacing between brushes 610 and 612 is two interval lengths rather than only one interval length as for pairs of brushes 210 and 212, 310 and 312, and 510 and 512.

*Functions Containing Either a Discontinuity Between Even Numbers Accompanied by a Change in Slope Sign Such as to Constitute a Local Maximum, or Either a Discontinuity Between Odd Numbers Accompanied by a Change in Slope Sign Such as to Constitute a Local Minimum, or Both Such Even-Even Discontinuous Peak and Such Odd-Odd Discontinuous Dip*

Referring now to FIGURE 22, a source of input excitation voltage, battery 10, has its negative terminal grounded and its positive terminal connected through an input resistor 127 to an input brush 110 disposed to alternately contact the segments and spaces of a first circle 100. First circle output brush 120 is connected to first circle output terminal 190 and to ground through an input loading resistor 128. First circle output brush 120 is also connected to a first input terminal of a double-pole double-throw electronic reversing switch 140. Brush 110 is connected through a neon glow tube 150 to a second input terminal of electronic reversing switch 140. A first output terminal of electronic reversing switch 140 is connected forwardly through a crystal 196 to one input brush 210 of a pair of input brushes 210 and 212 disposed to alternately contact the segments and spaces of a second circle 200. A second output terminal of electronic reversing switch 140 is connected forwardly through a crystal 198 to brush 212. Brushes 210 and 212 are spaced apart a length of arc equal to any one of the equal interval lengths of circle 100. Intermeshing with circle 200 is a third circle 300, the segments of circle 300 occupying the spaces of circle 200 and the spaces of circle 300 being occupied by the segments of circle 200. Brushes 210 and 212 simultaneously provide complementary input signals to both circles 200 and 300. Second circle output brush 220 is connected to ground through a loading resistor 230 and to the input of a one-to-one amplifier 288 through a summing resistor 232. The output of amplifier 288 is connected to second circle output terminal 290. Output brush 220 is also connected to a first input terminal of an electronic reversing switch 240. Third circle output brush 320 is connected to a second input terminal of electronic reversing switch 240. A first output terminal of electronic reversing switch 240 is connected forwardly through a crystal 396 to one input brush 410 of a pair of input brushes 410 and 412 disposed to alternately contact the segment and space of a fourth circle 400. A second output terminal of electronic reversing switch 240 is connected forwardly through a crystal 398 to brush 412. Brushes 410 and 412 are spaced apart two interval lengths of arc, or twice the spacing between brushes 210 and 212. Fourth circle output brush 420 is connected to ground through a loading resistor 430 and to the input of a one-to-one amplifier 488 through a summing register 432. The output of amplifier 488 is connected to fourth circle output terminal 490. The first output terminal of electronic reversing switch 240 is also connected forwardly through a crystal 496 to one input brush 510 of a pair of input brushes 510 and 512 disposed to alternately contact the segments and spaces of a fifth circle 500. The second output terminal of electronic reversing switch 240 is also connected forwardly through a crystal 498 to brush 512. Brushes 510 and 512 are spaced apart one interval length of arc, a spacing equal to that between brushes 210 and 212. Fifth circle output brush 520 is connected to fifth circle output terminal 590 and to ground through a loading resistor 530. The first output terminal of electronic reversing switch 240 is further connected forwardly through a crystal 596 to one input brush 610 of a pair of input brushes 610 and 612 disposed to alternately contact the segment and space of a sixth circle 600. The second output terminal of electronic reversing switch 240 is further connected forwardly through a crystal 598 to brush 612. Brushes 610 and 612 are spaced apart a length of arc equal to that between pairs of brushes 510 and 512 and also 210 and 212. Sixth circle output brush 620 is connected to sixth circle output terminal 690 and to ground through a loading register 630. The second output terminal of electronic reversing switch 140 is also connected to an input brush 710 disposed to alternately contact the segment and space of a seventh circle 700. Seventh circle output brush 720 is connected to the input of an inverting amplifier or trigger circuit 780 and forwardly through a crystal 781 to the input of buffer amplifier 488. The output of inverting amplifier or trigger circuit 780 is connected backwardly through a crystal 783 to the input of buffer amplifier 288. Partially intermeshing with seventh circle 700 is an eighth circle 800, having one segment and one space. Brush 710 also supplies an input signal to circle 800. Eighth circle output brush 820 is connected to the input of an inverting amplifier or trigger circuit 880 and forwardly through a crystal 881 to the input of buffer amplifier 288. The output of inverting amplifier or trigger circuit 880 is connected backwardly through a crystal 883 to the input of buffer amplifier 488. The positive terminal of input excitation battery 10 is connected through an input resistor 927 to an input brush 910 disposed to alternately contact the segment and space of a ninth circle 900. Ninth circle output brush 920 is connected to ground through an input loading resistor 928 and to a third input terminal of each of electronic reversing switches 140 and 240. Brush 910 is connected through a neon glow tube 950 to a fourth input terminal of each of electronic reversing switches 140 and 240. Circles 100 through 900 are concentrically mounted on a nonconductive disk and the pattern is shown cut radially along line A and developed. The electronic reversing switches 140 and 240 may be of the type shown in FIGURE 21 or of any type known to the art.

In operation at the ⑨—⑩ transfer point, as shown, as the brushes move to the left relative to the pattern, first circle input brush 110 breaks contact with a segment and enters the double interval length space of circle 100 causing conduction to shift from output brush 120 to the negative terminal of glow tube 150. Reversing switch 140 now causes conduction to shift from lagging brush 212 to leading brush 210, which brushes symmetrically straddle transfer points of circles 300 and 400, which, in turn, causes conduction to shift from third circle output brush 320 to second circle output brush 220. Reversing switch 240 now causes conduction to shift from leading brushes 410, 510, and 610 to lagging brushes 412, 512, and 612. Intermediate the ⑩ interval, preferably though not necessarily in the middle thereof, input brush 710 contacts one of the noncritical ends of the segment of circle 700; but, since the second output terminal of reversing switch 140 and input brushes 212 and 710 all rest at ground, this does not affect the signal at output brush 720. At the ⑩—⑳ transfer point first circle input brush 110 lies in the middle of the double interval length space of circle 100 and is hence ineffective to cause a change in output representation. But at this ⑩—⑳ transfer point input brush 910 breaks contact with one of the critical ends of circle 900 causing conduction to shift from output brush 920 to the negative terminal of glow tube 950. Reversing switch 140 now causes conduction to shift from leading brush 210 to lagging brush 212; and reversing switch 240 now causes conduction to shift from lagging brushes 512 and 612 to leading brushes 510 and 610, which brushes symmetrically straddle transfer points of circles 500 and 600. The output representation changes from 10 to 18 which is 2 less than the desired output representation of 20. The shifting of conduction to brush 212 when the second output terminal of reversing switch 140 becomes positive also causes brush 710 to carry a signal. Since brush 710 now lies well in engagement with the segment of circle 700, a modification signal appears at output brush 720 which is impressed forwardly through crystal 781 to the input of buffer amplifier 488 causing the output at terminal 490 to be modified from a "0" to a "1," increasing the normal output representation of 18 by 4 to the count of 22 which is 2 greater than the desired output representation of 20. When output brush 720 becomes positive, the output of inverting amplifier 780 drops to ground, carrying with it the input to buffer amplifier 288 by virtue of the forward current now drawn through crystal 783, causing the output at terminal 290 to be modified from a "1" to a "0" and decreasing the count of 22 by 2 to the desired output representation of 20 during the ⑳ interval. The extra brush alternation at the ⑩—⑳ transfer point, controlled not by a segment of first circle 100 but rather by one of the critical ends of the segment of circle 900, not only causes a change in the normal output representation but also modifies this to the desired output representation and further conditions the converter for an unambiguous decreasing count. At the ⑳—⑲ transfer point conduction shifts from lagging brush 212 to leading brush 210 permitting input brush 710 to drop to ground, removing the modification signal at output brush 720, and permitting the normal converter output representation of 19 to appear at terminals 190 through 690. Intermediate the ⑲ interval, preferably though not necessarily in the middle thereof, brush 710, carrying no signal, breaks contact with the other of the noncritical ends of the segment of circle 700; but this does not affect the converter output representation. At the ⑲—⑱ transfer point conduction shifts from leading brush 210 to lagging brush 212, and input brush 710 becomes positive. But since brush 710 lies well out of engagement with the segment of circle 700 no modification signal could appear at output brush 720. The count proceeds conventionally through the ⑱, ⑰, ⑯, ⑮, and ⑭ intervals and through half of the ⑬ interval. At the ⑬—③ transfer point, preferably though not necessarily in the middle thereof, input brush 710 contacts one of the noncritical ends of the segment of circle 800. But since at this point brush 710 rests at ground, output brush 820 receives no modification signal. At the ⑬—③ transfer point first circle input brush 110 lies in the middle of the double interval length segment of circle 100 and is hence ineffective to control a change in output representation. But at this ⑬—③ transfer point input brush 910 contacts the other of the critical ends of the segment of circle 900, causing conduction to shift from the negative terminal of glow tube 950 to output brush 920. Reversing switch 140 now causes conduction to shift from leading brush 210 to lagging brush 212; and reversing switch 240 now causes conduction to shift from lagging brush 512 to leading brush 510, which brushes symmetrically straddle a transfer point of circle 500. The normal converter output representation is thus changed from 13 to 5 which is 2 greater than the desired output representation of 3. When conduction shifts to lagging brush 212, input brush 710 carries a signal. Since brush 710 now lies well in engagement with the segment of circle 800, output brush 820 now carries a modification signal which is impressed forwardly through crystal 881 upon the input of buffer amplifier 288, causing the output at terminal 290 to be modified from its normal "0" to a "1," increasing the normal count of 5 by 2 to the count of 7 which is 4 greater than the desired output representation of 3. When output brush 820 carries a signal, the output of inverting amplifier 880 drops to ground carrying with it an input of buffer amplifier 488 by virtue of the forward current now drawn through crystal 883. The output at terminal 490 is modified from its normal "1" to a "0," thus decreasing the count of 7 by 4 to the desired output representation of 3 during the ③ interval. This extra brush alternation at the ⑬—③ transfer point, controlled not by a segment of first circle 100 but rather by the other of the critical ends of the segment of circle 900, not only causes a change in the normal output representation but also modifies the normal output representation into the desired output representation and further conditions the converter for an unambiguous increasing count. At the ③—④ transfer point, first circle input brush 110 breaks contact with the double interval length segment of circle 100 subtending the odd-odd discontinuous dip, causing conduction to shift from lagging brush 212 to leading brush 210 and removing the signal from input brush 710. Output brush 820 no longer carries a modi-

| Interval | Outputs at Terminal | | | | | Binary Count | Decimal Count |
|---|---|---|---|---|---|---|---|
| | 690 | 590 | 490 | 290 | 190 | | |
| ⑰ | 1 | 0 | 0 | 0 | 1 | 10001 | 17 |
| ⑱ | 1 | 0 | 0 | 1 | 0 | 10010 | 18 |
| ⑲ | 1 | 0 | 0 | 1 | 1 | 10011 | 19 |
| ⑳ | 1 | 0 | 0→1 | 1→0 | 0 | 10100 | 20 |
| ⑩ | 0 | 1 | 0 | 1 | 0 | 01010 | 10 |
| ⑨ | 0 | 1 | 0 | 0 | 1 | 01001 | 9 |
| ⑧ | 0 | 1 | 0 | 0 | 0 | 01000 | 8 |
| ⑦ | 0 | 0 | 1 | 1 | 1 | 00111 | 7 |
| ⑥ | 0 | 0 | 1 | 1 | 0 | 00110 | 6 |
| ⑤ | 0 | 0 | 1 | 0 | 1 | 00101 | 5 |
| ④ | 0 | 0 | 1 | 0 | 0 | 00100 | 4 |
| ③ | 0 | 0 | 1→0 | 0→1 | 1 | 00011 | 3 |
| ⑬ | 0 | 1 | 1 | 0 | 1 | 01101 | 13 |
| ⑭ | 0 | 1 | 1 | 1 | 0 | 01110 | 14 |
| ⑮ | 0 | 1 | 1 | 1 | 1 | 01111 | 15 |
| ⑯ | 1 | 0 | 0 | 0 | 0 | 10000 | 16 |
| ⑰ | 1 | 0 | 0 | 0 | 1 | 10001 | 17 |

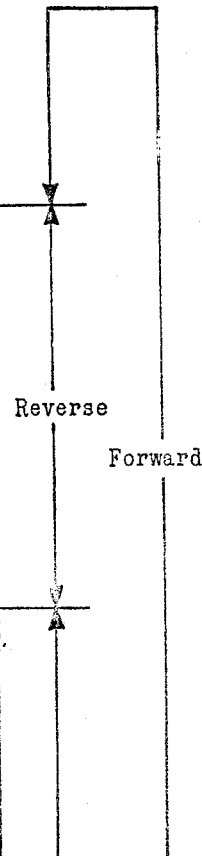

Table 22 fication signal and the normal converter output representation of 4 is permitted to appear at output terminals 190 through 690. Intermediate the ④ interval, preferably though not necessarily in the middle thereof, input brush 710 breaks contact with the other of the noncritical ends of the segment of circle 800; but, since brush 710 rests at ground, this does not affect the converter output representation. At the ④—⑤ transfer point conduction shifts from leading brush 210 to lagging brush 212, causing input brush 710 now to carry a signal. But since brush 710 now lies well out of engagement with the segment of circle 800, this cannot cause a modification signal at output brush 820 or affect the converter output representation. The count proceeds conventionally through the ⑤, ⑥, ⑦, ⑧, and ⑨ intervals to again arrive at the ⑨—⑩ transfer point. Inverting amplifiers 780 and 880 may here have a high output impedance.

Table 22, Col. 102, shows the normal output representations at terminals 190, 590, and 690 and the normal and modified output representations at terminals 290 and 490 and the extra conditioning brush alternations, which cause modification, at the ⑳—⑩ transfer point, which constitutes an even-even discontinuous peak, and at the ⑬—③ transfer point, which constitutes an odd-odd discontinuous dip, for the converter of FIGURE 22 as pattern A moves under the stationary brushes to successively occupy the intervals ⑱, ⑲, ⑳, ⑩, ⑨, ⑧, ⑦, ⑥, ⑤, ④, ③, ⑬, ⑭, ⑮, ⑯, ⑰, and ⑱ again.

In the converter of FIGURE 22, which embodies the third adaptation of the general method for producing functions containing a discontinuity between even numbers accompanied by a change in slope sign such as to constitute a local maximum and functions containing a discontinuity between odd numbers accompanied by a change in slope sign such as to constitute a local minimum, neglecting the effect of the modification circles 700 and 800, the count apparently proceeds 16, 17, 18, 19, 18, 10, 9, 8, 7, 6, 5, 4, 5, 13, 14, 15, and 16 again. Neglecting the effect of the modification circles 700 and 800 then, at the even-even discontinuous peak the count jumps between small and large even numbers where however the count of the large even number is apparently 2 less than desired; and at the odd-odd discontinuous dip the count jumps between large and small odd numbers where however the count of the small odd number is apparently 2 greater than desired. The effect of circle 700 is to artificially modify the count of the larger of the even numbers comprising the discontinuous peak, increasing it by 2, so that it actually represents the desired large even number. The effect of circle 800 is to artificially modify the count of the smaller of the odd numbers comprising the discontinuous dip, decreasing it by 2, so that it actually represents the desired small odd number. In FIGURE 22 at the even-even discontinuous peak the count apparently jumps from 10 to 18; and the effect of circle 700 is to artificially modify what appears to be the count of 18, increasing it by 2, so that it actually represents the desired count of 20. In FIGURE 22 at the odd-odd discontinuous dip the count apparently jumps from 13 to 5 and the effect of circle 800 is to artificially modify what appears to be the count of 5, decreasing it by 2, so that it actually represents the desired count of 3. An additional circle, circle 900 in FIGURE 22, having a segment both ends of which are critical, not only controls the transfer point between the two intervals of the double interval length space (or segment) subtending the even-even discontinuous peak and between the two intervals of the double interval length segment (or space) subtending the odd-odd discontinuous dip, but also causes the modification of the larger of the even numbers subtending the discontinuous peak and the modification of the smaller of the odd numbers subtending the discontinuous dip, and further provides extra brush alternations at the discontinuities where changes in slope sign occur to condition the converter for an unambiguous count.

In FIGURE 22 reversing switches 140 and 240 cause changes in output representation from the count of 20 to the count of 10 and also from the count of 13 to the count of 3. Since any response lag results in a momentary ambiguity, we desire that the operation of reversing switches 140 and 240 be as nearly instantaneous as possible. Accordingly we have provided electronic reversing switches to decrease the response lag to a fraction of a microsecond.

While in the converter of FIGURE 22 we have shown all intervals to be of equal length of arc so that the double interval length space (or segment) subtending the even-even discontinuous peak and the double interval length segment (or space) subtending the odd-odd discontinuous dip may readily be seen, it will be appreciated that the converter of FIGURE 22 is adapted to provide a nonlinear count with corresponding variation in the lengths of the segments and spaces.

As will be apparent to those skilled in the art, the converter of FIGURE 22 is amenable to superextension of count for interpattern transfer by the provision of an additional circle mounted on a pattern disk reduction geared to rotate with the disk mounting circles 100 through 900 and provided with a single input signal.

In the converter of FIGURE 22, at the ⑩—⑳ transfer point conduction shifts between brushes 210 and 212 in such manner that conduction is transferred from a *leading* brush to a *lagging* brush. It will be appreciated that the derivation of the complementary input signals to circles 500 and 600 directly from the two complementary output signals of first circle 100, appearing at the two output terminals of reversing switch 140, would cause ambiguities for the output signals of circles 500 and 600 since the ⑩—⑳ transfer point is also a transfer point for circles 500 and 600. At the ⑬—③ transfer point conduction shifts between brushes 210 and 212 in such fashion that conduction is transferred from a *leading* brush to a *lagging* brush. It will be appreciated that the derivation of the two complementary input signals to circle 500 directly from the two complementary output signals of circle 100, appearing at the two output terminals of reversing switch 140, would cause an ambiguity for the output signal of circle 500 since the ⑬—③ transfer point is also a transfer point for circle 500. In all prior converters cascading was used whenever possible in order to double the allowable tolerances for each stage of cascading. However, in the converter of FIGURE 22, at least one stage of cascading is necessary and this for the essential purpose of preventing ambiguities rather than doubling the tolerances. The usual benefit of cascading is apparent in the spacing of brushes 410 and 412, which is two interval lengths, thus doubling the tolerances, the usual concomitant of cascading. But for pairs of brushes 510 and 512 and also 610 and 612 the cascading afforded by reversing switch 240, at the output terminals of which appear the two complementary output signals of second circle 200, prevents ambiguities for circles 500 and 600; and the spacing between these pairs of brushes is only one interval length.

It is essential that the larger of the even numbers subtending the discontinuous peak be the modified representation. It is essential that the smaller of the odd numbers subtending the discontinuous dip be the modified representation. Since circles 200 and 300 control the action of reversing switch 240, it is essential that the transfer points for these circles are properly placed so that at the ⑩—⑳ and ⑬—③ transfer points conduction is shifted between pairs of brushes 510 and 512 and also 610 and 612 in such fashion that conduction is transferred from *lagging* brushes to *leading* brushes. It will be appreciated that the transfer points of circles 200 and 300 are properly placed only when it is the larger of the even numbers subtending the discontinuous peak and the smaller of odd numbers subtending the discontinuous dip that are the modified representations.

An odd-odd discontinuous peak and an even-even discontinuous dip, as in the converter of FIGURE 21 embodying the second adaptation of the general method, are natural discontinuities accompanied by changes in slope sign. An even-even discontinuous peak and an odd-odd discontinuous dip, as in the converter of FIGURE 22 embodying the third adaptation of the general method, are non-natural discontinuities accompanied by changes in slope sign.

*Functions Containing Both a Discontinuity Between Even Numbers Accompanied by a Change in Slope Sign at the Discontinuity Such as to Constitute a Local Maximum and Also a Discontinuity Between Even Numbers Accompanied by a Change in Slope Sign at the Discontinuity Such as to Constitute a Local Minimum*

Referring now to FIGURE 23, a source of input excitation voltage, battery 10, has its negative terminal grounded and its positive terminal connected through an input resistor 127 to an input brush 110 stationarily disposed to alternately contact the conductive segments and nonconductive spaces of a first circle 100. A first circle output brush 120 stationarily disposed to always be in electrical contact with the segments of circle 100 is connected to first circle output terminal 190 and to a ground through an input loading resistor 128. First circle output brush 120 is also connected to one input terminal of each of "and" circuits 122 and 124. First circle input brush 110 is connected through a neon glow tube 150 to one input terminal of each of "and" circuits 122 and 125. The outputs of "and" circuits 122 and 123 are combined forwardly through respective "or" circuit crystals 136 and 137. The junction of the cathodes of "or" circuit diodes 136 and 137, at which appears the combination output of "and" circuits 122 and 123, is connected forwardly through a crystal 196 to one input brush 210 of a pair of input brushes 210 and 212 disposed to alternately contact the segments and spaces of a second circle 200. The outputs of "and" circuits 124 and 125 are combined forwardly through respective "or" circuit crystals 138 and 139. The junction of the cathodes of "or" circuit diodes 138 and 139, at which appears the combination output of "and" circuits 124 and 125, is connected forwardly through a crystal 198 to brush 212. Brushes 210 and 212 are spaced apart a length of arc equal to one interval length of circle 100. Second circle output brush 220 is connected through a loading resistor 230 to ground and through a summing resistor 232 to the input of a one-to-one buffer amplifier 288, the output of which is connected to second output terminal 290. Intermeshing with second circle 200 is a third circle 300, the segments of circle 300 occupying the spaces of circle 200 and the spaces of circle 300 being occupied by the segments of circle 200. Brushes 210 and 212 simultaneously provide complementary input signals to both circle 200 and circle 300. Second circle output brush 220 is connected to one input terminal of each of "and" circuits 222 and 225. A third circle output brush 320 is connected to one input terminal of each of "and" circuits 223 and 224. The outputs of "and" circuits 222 and 223 are combined forwardly through respective "or" circuit crystals 236 and 237. The outputs of "and" circuits 224 and 225 are combined forwardly through respective "or" circuit crystals 238 and 239. The junction of the cathodes of "or" circuit diodes 236 and 237, at which appears the combination output of "and" circuits 222 and 223, is connected forwardly through a crystal 396 to one input brush 410 of a pair of input brushes 410 and 412 disposed to alternately contact the segment and space of a fourth circle 400. The junction of the cathodes of "or" circuit diodes 238 and 239, at which appears the combination output of "and" circuits 224 and 225, is connected forwardly through a crystal 398 to brush 412. Brushes 410 and 412 are spaced apart a length of arc equal to two interval lengths of circle 100 and thus have twice the spacing of brushes 210 and 212. Fourth circle output brush 420 is connected to fourth circle output terminal 490 and to ground through a loading resistor 430. The junction of the cathodes of "or" circuit crystals 236 and 237 is also connected forwardly through a crystal 496 to one input brush 510 of a pair of input brushes 510 and 512 disposed to alternately contact the segment and space of a fifth circle 500. The junction of the cathodes of "or" circuit crystals 238 and 239 is also connected forwardly through a crystal 498 to brush 512. Brushes 510 and 512 are spaced apart a length of arc equal to one interval length of circle 100 and thus have a spacing equal to that between brushes 210 and 212. Fifth circle output brush 520 is connected to fifth circle output terminal 590 and to ground through a loading resistor 530. The junction of the cathodes of "or" circuit diodes 236 and 237 is further connected forwardly through a crystal 596 to one input brush 610 of a pair of input brushes 610 and 612 disposed to alternately contact the segment and space of a sixth circle 600. The junction of the cathodes of "or" circuit diodes 238 and 239 is further connected forwardly through a crystal 598 to brush 612. Brushes 610 and 612 are likewise spaced apart a length of arc equal to one interval length. Sixth circle output brush 620 is connected to sixth circle output terminal 690 and to ground through a loading resistor 630. The junction of the cathodes of "or" circuit crystals 138 and 139 is finally connected to a single input brush 710 disposed to alternately contact the segment and space of a seventh circle 700. Seventh circle output brush 720 is connected forwardly through a crystal 781 to fourth circle output terminal 490 and is also connected to the input of an inverting amplifier or trigger circuit 780. The output of trigger circuit 780 is connected backwardly through a crystal 783 to the input of buffer amplifier 288. Second circle output brush 220 is also connected to a single input brush 810 disposed to alternately contact the segment and space of an eighth circle 800. Eighth circle output brush 820 is connected forwardly through a crystal 881 to fifth circle output terminal 590. The positive terminal of input excitation voltage battery 10 is also connected through an input resistor 927 to a single input brush 910 disposed to alternately contact the segment and space of a ninth circle 900. Ninth circle output brush 920 is connected to ground through an input loading resistor 928. Output brush 920 is further connected to the other input terminal of each of "and" circuits 122, 124, 223, and 225. Input brush 910 is connected through a neon glow tube 950 to the other input terminal of each of "and" circuits 123, 125, 222, and 224. Circles 100 through 900 are concentrically mounted on a nonconductive disk, and the pattern is shown cut radially along line A and developed. Trigger circuit 780 may here have a high output impedance.

In operation of the converter of FIGURE 23 at the ㉑—⑩ transfer point, as shown, first circle input brush 110 lies in the middle of one of the double interval length spaces of circle 100 and is hence ineffective to cause a change in output representation. However, at the ㉒—⑩ transfer point, as the brushes move to the right relative to pattern A, brush 910 contacts one of the critical ends of the segment of circle 900, causing conduction to shift from the negative terminal of glow tube 950 to output brush 920, deactivating "and" circuits 123, 125, 222, and 224, and activating "and" circuits 122, 124, 223, and 225. Conduction shifts from "and" circuit 125 and crystal 139 to "and" circuit 122 and crystal 136 which, in turn, causes conduction to shift from leading brush 212 to lagging brush 210. Since both brushes 210 and 212 contact the same segment of circle 200, no ambiguities are produced at second circle output terminal 290, and output brush 220 continues to carry a signal. Conduction is also shifted from "and" circuit 222 and crystal 236 to "and" circuit 225 and crystal 239. This causes conduction to shift from lagging brushes 510 and 610 to leading brushes 512 and 612, which brushes symmetrically straddle transfer points of their respective circles, causing an unambiguous change in output representation to the count of 10 as desired during the ⑩ interval. At this point brush 710 contacts the segment of circle 700. But because conduction has shifted from leading brush 212 to lagging brush 210, brush 710 no longer is positive; and a modification signal no longer appears at output brush 720. This extra brush alternation or reversal at the ⑳—⑩ transfer point, controlled not by a segment of first circle 100 but rather by one of the critical ends of the segment of circle 900, not only causes a change in the normal output representation but also controls the modification of the normal output representation and further conditions the converter for an unambiguous decreasing count. Intermediate the ⑩ interval, preferably in the middle thereof, brush 710, carrying no signal, breaks contact with one of the noncritical ends of the segment of circle 700; but this does not affect the output representation. At the ⑩—⑨ transfer point conduction shifts from lagging brush 210 to leading brush 212; and input brush 710 becomes positive. However, since brush 710 now lies well out of engagement with the segment of circle 700, no adverse modification signal can appear at output brush 720. The count proceeds conventionally through the ⑨, ⑧, ⑦, and ⑥ intervals with conduction shifting between "and" circuits 122 and 124 and between respectively associated "or" circuit crystals 136 and 138 and with conduction also shifting between "and" circuits 223 and 225 and between respectively associated "or" circuit crystals 237 and 239. At the ⑥—⑤ transfer point conduction shifts from lagging brush 210 to leading brush 212, which brushes symmetrically straddle transfer points of circles 200 and 300, causing conduction to shift from second circle output brush 220 to third circle output brush 320. Output brush 220 and input brush 810 will again become positive at the ④—⑭ transfer point. Intermediate the ⑥—⑤ and ④—⑭ transfer points, intermediate the ⑤ and ④ intervals, preferably in the middle thereof, or adjacent the ⑤—④ transfer point, brush 810 contacts one of the noncritical ends of the segment of circle 800. But, since adjacent this ⑤—④ transfer point brush 810 rests at ground, no adverse modification signal is produced at output brush 820. At the ④—⑭ transfer point first circle input brush 110 lies intermediate the other of the double interval length spaces of circle 100 and is hence ineffective to control a change in output representation. But at the ④—⑭ transfer point brush 910 breaks contact with the other of the critical ends of the segment of circle 900, causing conduction to shift from output brush 920 to the negative terminal of glow tube 950. Each of "and" circuits 122, 124, 223, and 225 is deactivated; and each of "and" circuits 123, 125, 222, and 224 is reactivated. Conduction is thereby shifted from "and" circuit 122 and crystal 136 to "and" circuit 125 and crystal 139. Conduction then shifts from lagging brush 210 to leading brush 212, which brushes symmetrically straddle transfer points of circles 200 and 300, which, in turn, causes conduction to shift from third circle output brush 320 to second circle output brush 220. The normal converter output representation then changes from the count of 4 to the count of 6 which is 8 less than the desired output representation of 14. When output brush 220 becomes positive, input brush 810 likewise carries a signal. Since brush 810 now lies well in engagement with the segment of circle 800, output brush 820 carries a modification signal which is impressed forwardly through crystal 881 upon output terminal 590, increasing the normal count of 6 by 8 to the desired output representation of 14 during the ⑭ interval. This extra brush alternation at the ④—⑭ transfer point, controlled not by a segment of first circle 100 but rather by the other of the critical ends of the segment of circle 900, not only causes a change in the normal output representation but also modifies the normal to the desired output representation and further conditions the converter for an unambiguous increasing count. It is seen then that at the ④—⑭ transfer point conduction shifts not only from output brush 920 to the negative terminal of glow tube 950 but also from output brush 320 to output brush 220. Conduction is thereby shifted from "and" circuit 223 and crystal 237 to "and" circuit 222 and crystal 236; but there is no shifting of conduction from lagging brushes 410, 510, and 610 to leading brushes 412, 512, and 612. At the ④—⑭ transfer point lagging brushes 410, 510, and 610 continue to carry signals. The reversal of both pairs of input signals to the input terminals of the electronic reversing switch comprising "and" circuits 222 through 225 and "or" circuit crystals 236 through 239 leaves the output signals unchanged. And indeed it is not desired that conduction shift from brush 410 to brush 412 at the ④—⑭ transfer point. Since leading brush 412 breaks contact with the segment of circle 400 before brush 110 reaches the ⑮—⑯ transfer point, an ambiguity would occur were leading brush 412 to carry a signal. At the ⑭—⑮ transfer point the normal output representation changes from the count of 6 to the count of 7 which is again 8 less than the desired output representation of 15. But, since output brush 220 and input brush 810 continue positive, output brush 820 continues to carry a modification signal which is still impressed forwardly through crystal 881 upon output terminal 590, again increasing by 8 the normal count of 7 to the desired output representation of 15 during the ⑮ interval. The modification signal controlled by the extra brush alternation at the ④—⑭ transfer point then modifies the normal converter output representation during not merely one interval but during two contiguous intervals, there being a double interval length modification of the normal converter output representation. At the ⑮—⑯ transfer point, conduction shifts from lagging brush 210 to leading brush 212, which brushes symmetrically straddle transfer points of circles 200 and 300, causing conduction to be transferred from output brush 220 to output brush 320. Brush 810 no longer carries a signal; and a modification signal no longer appears at output brush 820. The shifting of conduction from brush 220 to brush 320 causes conduction to be transferred from lagging brushes 410 and 610 to leading brushes 412 and 612, which brushes symmetrically straddle transfer points of circles 400 and 600, causing an unambiguous change in the normal output representation from the count of 7 to the count of 16. Output brush 220 will again become positive at the ⑰—⑱ transfer point. Intermediate the ⑮—⑯ and ⑰—⑱ transfer points, intermediate the ⑯ and ⑰ intervals, preferably in the middle thereof, or adjacent the ⑯—⑰ transfer point, brush 810, carrying no signal, breaks contact with the other of the noncritical ends of the segment of circle 800; but this does not affect the converter output representation. At the ⑰—⑱ transfer point conduction shifts from lagging brush 210 to leading brush 212, causing conduction to be transferred from output brush 320 to output brush 220 and input brush 810. Since brush 810 now lies well out of engagement with the segment of circle 800, no adverse modification signal can appear at output brush 820. At the ⑱—⑲ transfer point, conduction shifts from leading brush 212 to lagging brush 210; and input brush 710 thus drops to ground. Intermediate the ⑲ interval, preferably in the middle thereof, brush 710, carrying no signal, contacts the other of the noncritical ends of the segment of circle 700; but this does not affect the converter output representation. At the ⑲—⑳ transfer point, conduction shifts to leading brush 212 and seventh circle input brush 710; and the normal converter output representation changes from 19 to 18, which is 2 less than the desired output representation of 20. But since brush 710 now lies well in engagement with the segment of circle 700, output brush 720 carries a modification signal which is impressed forwardly through crystal 781 upon output terminal 490, increasing the normal count of 18 by 4 to the count of 22 which is 2 greater than the desired output representation of 20. But when output brush 720 becomes positive, the output of trigger circuit 780 drops to ground carrying with it the input to buffer amplifier 288 by virtue of the forward current now drawn through crystal 783, modifying the output at terminal 290 from its normal "1" to a "0" and decreasing the count of 22 by 2 to the desired output representation of 20 during the ⑳ interval. At the ⑳—⑩ transfer point again, brush 710 drops to ground, removing the modification signal at output brush 720, and permitting the normal converter output representation of 10 during the ⑩ interval, as has been previously described. The operation of the converter of FIGURE 23 for intervals about the ⑳—⑩ transfer point, comprising a non-natural even-even discontinuous peak, is thus precisely the same as that of the converter of FIGURE 22 about the same transfer point. But it will be noted that the operation of the converter of FIGURE 23 for intervals about the ④—⑭ transfer point, ordinarily comprising a natural even-even discontinuous dip, is not the same as that of the converter of FIGURE 21 about the same transfer point.

In the converter of FIGURE 23 the necessity of providing a stage of cascading for the essential purpose of eliminating ambiguities adjacent the non-natural ⑳—⑩ discontinuous peak occasions subsidiary problems for what would ordinarily be the natural ④—⑭ discontinuous dip. To prevent ambiguities at the non-natural ⑳—⑩ discontinuous peak in the converters of FIGURES 22 and 23 it is necessary to derive the two complementary input signals to circle 500 from the two complementary output signals of circles 200 and 300 which appear at the output terminals of an electronic reversing switch.

subtends the ⑭ and ⑮ intervals; but in the converter of FIGURE 23 no segment of circle 500 subtends the ⑭ and ⑮ intervals. This segment of circle 500 in the converter of FIGURE 23 has been omitted for two considerations: firstly, because of the necessity of cascading for the essential purpose of eliminating ambiguities, there is no transfer of conduction from lagging brush 510 to leading brush 512 at the ④—⑭ transfer point; and secondly, because such omitted segment would be the same length as the segment of circle 200 and the space of circle 300 subtending the ⑭ and ⑮ intervals, there would not be the necessary two-to-one relationship between the segments and spaces of circles 200 and 500 to eliminate ambiguities by the conventional alternate stepping action of the pair of complementary input signals. The effect of the omitted segment of circle 500 is supplied by the double interval length modification signal at output brush 820 coupled to output terminal 590 in conjunction with the derivation of the input signal at brush 810 from second circle output brush 220.

Table 23 shows the normal output representations at terminals 190 and 690 and the normal and modified output representations at terminals 290 and 490 and the normal and double interval length modified output representations at terminal 590 and the extra brush reversing alternation, causing modification, at the ⑳—⑩ transfer point, which constitutes a non-natural even-even discontinuous peak, and the extra brush reversing alternation, causing double interval length modification, at the ④—⑭ transfer point, which would ordinarily constitute a natural even-even discontinuous dip, for the converter of FIGURE 23 as pattern A moves under the stationary brushes to successively occupy the intervals ⑱, ⑲, ⑳, ⑩, ⑨, ⑧, ⑦, ⑥, ⑤, ④, ⑭, ⑮, ⑯, ⑰, and ⑱ again.

| Interval | Outputs at Terminal | | | | | Binary Count | Decimal Count |
|---|---|---|---|---|---|---|---|
| | 690 | 590 | 490 | 290 | 190 | | |
| ⑱ | 1 | 0 | 0 | 1 | 0 | 10010 | 18 |
| ⑲ | 1 | 0 | 0 | 1 | 1 | 10011 | 19 |
| ⑳ | 1 | 0 | 0→1 | 1→0 | 0 | 10100 | 20 |
| ⑩ | 0 | 1 | 0 | 1 | 0 | 01010 | 10 |
| ⑨ | 0 | 1 | 0 | 0 | 1 | 01001 | 9 |
| ⑧ | 0 | 1 | 0 | 0 | 0 | 01000 | 8 |
| ⑦ | 0 | 0 | 1 | 1 | 1 | 00111 | 7 |
| ⑥ | 0 | 0 | 1 | 1 | 0 | 00110 | 6 |
| ⑤ | 0 | 0 | 1 | 0 | 1 | 00101 | 5 |
| ④ | 0 | 0 | 1 | 0 | 0 | 00100 | 4 |
| ⑭ | 0 | 0→1 | 1 | 1 | 0 | 01110 | 14 |
| ⑮ | 0 | 0→1 | 1 | 1 | 1 | 01111 | 15 |
| ⑯ | 1 | 0 | 0 | 0 | 0 | 10000 | 16 |
| ⑰ | 1 | 0 | 0 | 0 | 1 | 10001 | 17 |
| ⑱ | 1 | 0 | 0 | 1 | 0 | 10010 | 18 |

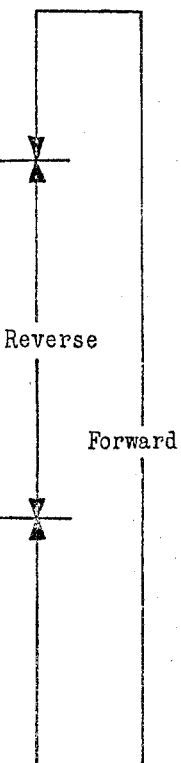

Table 23

In the converter of FIGURE 21 in the region of the natural ④—⑭ discontinuous dip, a segment of circle 500

In the converter of FIGURE 23 which embodies the third adaptation of the general method for producing functions containing both natural and non-natural discontinuities accompanied by changes in slope sign, neglecting the effect of the modification circles 700 and 800, the count apparently proceeds 17, 18, 19, 18, 10, 9, 8, 7, 6, 5, 4, 6, 7, 16, and 17 again. Neglecting the effect of the modification circle 700, as is usual at a non-natural even-even discontinuous peak, the count jumps between even numbers where, however, the count of the large even number is apparently two less than desired; and, neglecting the effect of the double interval length modification circle 800, adjacent what would ordinarily be a natural even-even discontinuous dip the counts of two contiguous intervals apparently differ by the same amount from the counts desired. The effect of circle 700 is to artificially modify the count of the larger of the even numbers comprising the non-natural discontinuous peak, increasing it by 2, so that it actually represents the desired large even number. The effect of circle 800 is to artificially modify by the same amount each of the two contiguous intervals which are adjacent what would ordinarily be a natural even-even discontinuous dip so that they actually represent the desired counts. In FIGURE 23 at the non-natural even-even discontinuous peak the count apparently jumps from 10 to 18; and the effect of circle 700 is to artificially modify what appears to be the count of 18, increasing it by 2 so that it actually represents the desired count of 20. In the converter of FIGURE 23 at what would ordinarily be a natural even-even discontinuous dip the count apparently proceeds 4, 6, 7; and the effect of circle 800 is to artificially modify the two contiguous intervals having apparent counts of 6 and 7, increasing each of them by 8, so that they actually represent the desired counts of 14 and 15. An additional circle, circle 900 in FIGURE 23, having a segment both ends of which are critical, not only controls the transfer point between the two intervals of each of the double interval length spaces (or segments if an inverse form is used) subtending the even-even discontinuous peak and the even-even discontinuous dip, but also causes the modification of the larger of the even numbers subtending the non-natural discontinuous peak and the similar modification of each of the two contiguous intervals which are adjacent what would otherwise be the natural even-even discontinuous dip, and further provides extra reversing brush alternations at the discontinuities, where changes in slope sign occur, to condition the converter for an unambiguous count.

It will be appreciated that the actions of "and" circuits 122 through 125 and of "and" circuits 222 through 225 in combination with respectively associated "or" circuit crystals 136 through 139 and "or" circuit crystals 236 through 239 are those of electronic double-pole double-throw reversing switches. Since the actuations of the reversing switches also cause changes in output representation from the count of 20 to the count of 10 and also from the count of 4 to the count of 14, we desire that the operation be as nearly instantaneous as possible to prevent momentary ambiguities occasioned by response lags. The use of electronic reversing switches decreases the response lag to a fraction of a microsecond.

While in the converter of FIGURE 23 we have shown all intervals to be of equal length of arc so that the double interval length spaces (or segments) subtending the even-even discontinuous peak and the even-even discontinuous dip may readily be seen, it will be appreciated that the converter of FIGURE 23 is adapted to provide a nonlinear count with the corresponding variation in the lengths of the segments and spaces.

As will be apparent to those skilled in the art, the converter of FIGURE 23 is amenable to the superextension of count for interpattern transfer by the provision of an additional circle mounted on a pattern disk reduction geared to rotate with pattern A and provided with a single input signal.

In the converter of FIGURE 23, as in the converter of FIGURE 22, at the ⑳—⑩ transfer point conduction shifts between brushes 210 and 212 in such manner that conduction is transferred from a *leading* brush to a *lagging* brush. The derivation of the complementary input signals to circles 500 and 600 directly from that reversing switch at the output terminals of which appear the two complementary output signals of first circle 100 would cause ambiguities for the output signals of circles 500 and 600, because the ⑩—⑳ transfer point is also a transfer point for circles 500 and 600. In the converter of FIGURE 23, as in the converter of FIGURE 22, at least one stage of cascading is necessary for the essential purpose of preventing ambiguities rather than doubling the tolerances. Despite the cascading, pairs of brushes 510 and 512 and also 610 and 612 are spaced apart only one interval length of arc. While in the converter of FIGURE 23 the pair of complementary input signals to circle 400 could have been derived from that reversing switch at the output terminals of which appear the two complementary output signals of circle 100, the spacing between brushes 410 and 412 would then be only one interval length of arc. We have advantageously shown the two complementary input signals to circle 400 to be derived from that reversing switch at the output terminals of which appear the two complementary output signals of second circle 200. The spacing between brushes 410 and 412 is thus two interval lengths of arc; and the allowable tolerances are thereby doubled, the usual concomitant of cascading.

In the converter of FIGURE 23, as in the converter of FIGURE 22, it is essential that the larger of the even numbers subsending the non-natural discontinuous peak be the modified representation. Because the alternate stepping action between pairs of brushes 510 and 512 and also 610 and 612 is controlled by that reversing switch at the output terminals of which appear the two complementary output signals of second circle 200, it is essential that the transfer points for circel 200 be properly placed so that at the ⑳—⑩ transfer point conduction is shifted between these pairs of brushes in such fashion that conduction is transferred from *lagging* brushes to *leading* brushes. The transfer points of circle 200, and also circle 300, are properly placed only when it is the larger of the even numbers subtending the discontinuous peak that is the modified representation.

In the converter of FIGURE 23, unlike the converter of FIGURE 21, there is a double interval length modification adjacent what would otherwise be a natural even-even discontinuous dip.

*Functions Containing Both a Discontinuity Between Odd Numbers Accompanied by a Change in Slope Sign at the Discontinuity Such as to Constitute a Local Maximum and Also a Discontinuity Between Odd Numbers Accompanied by a Change in Slope Sign at the Discontinuity Such as to Constitute a Local Minimum*

Referring now to FIGURE 24, a source of input excitation voltage, battery 10 has its negative terminal grounded and its positive terminal connected through an input resistor 127 to an input brush 110 disposed to alternately contact the segments and spaces of a first circle 100. A first circle output brush 120 is connected to first circle output terminal 190 and to ground through an input loading resistor 128. Brush 120 is connected to one input terminal of each of "and" circuits 122 and 125. Brush 110 is connected through a neon glow tube 150 to one input terminal of each of "and" circuits 123 and 124. The outputs of "and" circuits 122 and 123 are combined forwardly through an "or" circuit comprising respective crystals 136 and 137. The output of this first "or" circuit is connected forwardly through a crystal 196 to one input brush 210 of a pair of input brushes 210 and 212 disposed to alternately contact the segments and spaces of a second circle 200. The outputs of "and" circuits 124 and 125 are combined forwardly through another "or" circuit comprising respective diodes 138 and 139. The output of this second "or" circuit is connected forwardly through crystal 198 to brush 212. Brushes 210 and 212 are spaced apart a length of arc equal to one interval of circle 100. Second output brush 220 is connected through a loading resistor 230 to ground and through a summing resistor 232 to the input of a one-to-one buffer amplifier 288, the output of which is connected to second circle output terminal 290. Intermeshing with second circle 200 is a third circle 300. Brushes 210 and 212 simultaneously provide complementary input signals to both circles 200 and 300. Third circle output brush 320 is connected to one input terminal of each of "and" circuits 423 and 424. Second circle output brush 220 is connected to one input terminal of each of "and" circuits 422 and 425. The output of the first "or" circuit comprising crystals 136 and 137 is also connected forwardly through a crystal 396 to one input brush 410 of a pair of input brushes 410 and 412 disposed to alternately contact the segments and spaces of a fourth circle 400. The output of the second "or" circuit comprising crystals 138 and 139 is also connected forwardly through a crystal 398 to brush 412. Brushes 410 and 412 are spaced apart a length of arc equal to one interval length of circle 100. Fourth circle output brush 420 is connected through a loading resistor 430 to ground and through a summing resistor 432 to the input of a one-to-one buffer amplifier 488, the output of which is connected to fourth circle output terminal 490. Intermeshing with fourth circle 400 is a fifth circle 500. Input brushes 410 and 412 simultaneously provide complementary input signals to both the fourth and fifth circles 400 and 500. The outputs of "and" circuits 422 and 423 are combined forwardly through a further "or" circuit comprising respective crystals 436 and 437. The output of this third "or" circuit is connected forwardly through a crystal 596 to one input brush 610 of a pair of input brushes 610 and 612 disposed to alternately contact the segments and spaces of a sixth circle 600. The outputs of "and" circuits 424 and 425 are combined forwardly through a still further "or" circuit comprising respective crystals 438 and 439. The output of this fourth "or" circuit is connected forwardly through a crystal 598 to brush 612. Brushes 610 and 612 are spaced apart a length of arc equal to one interval length of circle 100. Sixth circle output brush 620 is connected through a loading resistor 630 to ground and to sixth circle output terminal 690. The output of the third "or" circuit comprising crystals 436 and 437 is also connected forwardly through a crystal 696 to one input brush 710 of a pair of input brushes 710 and 712 disposed to alternately contact the segment and space of a seventh circle 700. The output of the fourth "or" circuit comprising crystals 438 and 439 is also connected forwardly through a crystal 698 to brush 712. Brushes 710 and 712 are spaced apart a length of arc equal to two interval lengths of circle 100, or twice the spacing of the other pairs of brushes. Seventh circle output brush 720 is connected to seventh circle output terminal 790 and to ground through a loading resistor 730. The output of the second "or" circuit comprising crystals 138 and 139 is further connected to a single input brush 810 disposed to alternately contact the segment and space of an eighth circle 800. Eighth circle output brush 820 is connected to the input of an inverting amplifier or trigger circuit 880 and forwardly through a crystal 881 to the input of amplifier 288. The output of trigger circuit 880 is connected backwardly through a crystal 883 to the input of buffer amplifier 488. A fifth circle output brush 520 disposed to always be in electrical contact with the conductive segments of circle 500 is connected to the input of a one-to-one amplifier 988. The output of amplifier 988 is connected to a single input brush 910 disposed to alternately contact the segment and intersegmental space of a ninth circle 900. Ninth circle output brush 920 is connected backwardly through a crystal 983 to the input of buffer amplifier 288. The positive terminal of input excitation battery 10 is also connected through an input resistor 1027 to an input brush 1010 disposed to alternately contact the segment and space of a tenth circle 1000. Tenth circle output brush 1020 is connected to ground through an input loading resistor 1028. Output brush 1020 is also connected to the other input terminal of each of "and" circuits 122, 124, 422, and 424. Input brush 1010 is connected through a neon glow tube 1050 to the other input terminal of each of "and" circuits 123, 125, 423, and 425. Circles 100 through 1000 are concentrically mounted on a non-conductive disk, and the pattern is shown cut radially along line A and developed. Trigger circuit 880 may here have a high output impedance.

In operation of the converter of FIGURE 24 at the ⑪—㉑ transfer point, as shown, first circle input brush 110 lies intermediate, and for a linear count in the middle of, one of the double interval length segments of circle 100 and is hence ineffective to cause a change in output representation. However, at the ⑪—㉑ transfer point, as the brushes move to the left relative to pattern A, brush 1010 contacts one of the critical ends of the segment of circle 1000, causing conduction to shift from the negative terminal of glow tube 1050 to output brush 1020, deactivating "and" circuits 123, 125, 423, and 425, and activating "and" circuits 122, 124, 422, and 424. Conduction shifts from "and" circuit 125 and crystal 139 to "and" circuit 122 and crystal 136 which, in turn, causes conduction to shift from lagging brushes 212 and 412 to leading brushes 210 and 410. Since brushes 210 and 212 contact the same segment of circle 200, output brush 220 continues to carry a signal. Conduction thus shifts at the ⑪—㉑ transfer point from "and" circuit 425 and crystal 439 to "and" circuit 422 and crystal 436 which, in turn, causes conduction to be transferred from lagging brushes 612 and 712 to leading brushes 610 and 710. The transfer of conduction from lagging brushes 412, 612, and 712 to leading brushes 410, 610, and 710, which pairs of brushes symmetrically straddle transfer points of their respective circles, causes a change in the normal output representation from the count of 11 to the count of 23 which is 2 greater than the desired output representation of 21. The transfer of conduction from lagging brush 412 to leading brush 410 causes conduction to shift from output brush 520 to output brush 420; and output brush 520 drops to ground potential. The output of one-to-one amplifier 988 likewise drops to ground potential; and, since input brush 910 contacts the segment of circle 900, output brush 920 is driven to ground, carrying with it the input to buffer amplifier 288 by virtue of the forward current now drawn through crystal 983. The output at terminal 290 is modified from its normal "1" to a "0," decreasing the normal converter output representation of 23 by 2 to the desired output representation of 21 during the ㉑ interval. This extra brush alternation at the ⑪—㉑ transfer point, controlled not by a segment of first circle 100 but rather by one of the critical ends of the segment of circle 1000, not only causes a change in the normal output representation but also controls the modification of the normal to the desired output representation and further conditions the converter for an unambiguous decreasing count. At the ㉑—㉒ transfer point the normal output representation changes from the count of 23 to the count of 22, which is again 2 greater than the desired output representation of 20. Conduction shifts from leading brush 410 to lagging brush 412. Since both brushes contact the same segment of circle 400, output brush 520 continues to rest at ground; and a modification signal continues to appear at output brush 920, again modifying and decreasing by 2 the normal converter output representation of 22 to the desired output representation of 20 during the ㉒ interval. The modification signal controlled by the extra brush alternation at the ㉑—⑪ transfer point then modifies the normal converter output representation during not merely one interval but during two contiguous intervals, there being a double interval length modification of the normal converter output representation. At the ㉠—⑲ transfer point conduction shifts from lagging brush 412 to leading brush 410 which brushes symmetrically straddle transfer points of circles 400 and 500, causing conduction to be transferred from output brush 420 to output brush 520. The normal converter output representation changes from the count of 22 to the count of 19 as desired. When output brush 520 becomes positive, the modification signal formerly appearing at output brush 920 is removed and the desired normal converter output representation of 19 is not adversely modified. Output brush 520 will again drop to ground at the ⑯—⑮ transfer point. Hence, intermediate the ㉠—⑲ and ⑯—⑮ transfer points, intermediate the ⑲, ⑱, ⑰, and ⑯ intervals, preferably in the middle thereof, or adjacent the ⑱—⑰ transfer point, brush 910, carrying a signal, breaks contact with one of the noncritical ends of the segment of circle 900; but this does not affect the converter output representation. The count proceeds conventionally through the ⑲, ⑱, ⑰, ⑯, ⑮, ⑭, and ⑬ intervals with conduction shifting between "and" circuits 122 and 124 and respectively associated "or" circuit crystals 136 and 138 and also between "and" circuits 422 and 424 and respectively associated "or" circuit crystals 436 and 438. At the ⑯—⑮ transfer point output brush 520 drops to ground potential. But since brush 910 now lies well out of engagement with the segment of circle 900 there is no adverse modifying effect. At the ⑭—⑬ transfer point conduction shifts from lagging brush 212 to leading brush 210; and input brush 810 drops to ground potential. Intermediate the ⑬ interval, preferably though not necessarily in the middle thereof, brush 810, carrying no signal, engages one of the noncritical ends of the segment of circle 800; but this produces no modifying effect. At the ⑬—③ transfer point first circle input brush 110 lies in the middle of the other of the double interval length segments of circle 100 and is hence ineffective to cause a change in output representation. However, at the ⑬—③ transfer point tenth circle input brush 1010 breaks contact with the other of the critical ends of the segment of circle 1000, causing conduction to be transferred from output brush 1020 to the negative terminal of glow tube 1050, deactivating "and" circuits 122, 124, 422, and 424, and reactivating "and" circuits 123, 125, 423, and 425. Conduction shifts from "and" circuit 122 and crystal 136 to "and" circuit 125 and crystal 139, causing conduction to be transferred from leading brush 210 to lagging brush 212. Since both brushes 210 and 212 contact the same segment of circle 300, no ambiguities are produced at output terminal 290; and output brush 320 continues to carry a signal. Conduction also shifts from "and" circuit 424 and crystal 438 to "and" circuit 423 and crystal 437, causing conduction to shift from lagging brush 612 to leading brush 610, which brushes symmetrically straddle a transfer point of circle 600, resulting in a change in the normal converter output representation from the count of 13 to the count of 5 which is 2 greater than the desired converter output representation of 3. The shift of conduction from leading brush 210 to lagging brush 212 also causes brush 810 to now carry a signal. Since brush 810 now lies well in engagement with the segment of circle 800, output brush 820 now carries a modification signal which is impressed forwardly through crystal 881 upon the input of buffer amplifier 288, causing the output representation at terminal 490 to be modified from its normal "0" to a "1," increasing the normal converter output representation of 5 by 2 to the count of 7 which is 4 greater than the desired output representation of 3. When brush 820 becomes positive, the output of inverting amplifier 880 drops to ground, carrying with it the input to buffer amplifier 888 by virtue of the forward current now drawn through crystal 883. The output at terminal 490 is modified from its normal "1" to a "0," decreasing the count of 7 by 4 to the desired count of 3 during the ③ interval. This extra brush alternation at the ⑬—③ transfer point, controlled not by a segment of first circle 100 but rather by the other of the critical ends of the segment of circle 1000, not only causes a change in the normal output representation but also modifies the normal to the desired output representation and further conditions the converter for an unambiguous increasing count. At the ③—④ transfer point conduction shifts from lagging brush 212 to leading brush 210; and input brush 810 drops to ground potential, removing the modification signal at output brush 820 and permitting the normal converter output representation of 4 to appear at the output terminals during the ④ interval. Intermediate the ④ interval, preferably though not necessarily in the middle thereof, brush 810 carrying no signal, breaks contact with the other of the noncritical ends of the segment of circle 800. But this does not affect the output representation. At the ④—⑤ transfer point brush 810 again becomes positive. But since input brush 810 now lies well out of engagement with the segment of circle 800, there is no adverse modifying effect. The count proceeds conventionally through the ④, ⑤, ⑥, ⑦, ⑧, ⑨, ⑩, and ⑪ intervals to again arrive at the ⑪—㉑ transfer point with conduction shifting between "and" circuits 125 and 123 and respectively associated "or" circuit crystals 139 and 137 and also between "and" circuits 425 and 423 and respectively associated "or" circuit crystals 439 and 437. At the ⑦—⑧ transfer point conduction shifts from output brush 420 to output brush 520; and brush 910 carries a signal. Intermediate the ⑦—⑧ and ⑪—㉑ transfer points, intermediate the ⑧, ⑨, ⑩, and ⑪ intervals, preferably in the middle thereof, or adjacent the ⑨—⑩ transfer point, input brush 910, carrying a signal contacts the other of the noncritical ends of the segment of circle 900; but this does not affect the normal converter output representation. The operation of the converter of FIGURE 24 for intervals about the ⑬—③ transfer point, comprising a non-natural odd-odd discontinuous dip, is substantially the same as that of the converter of FIGURE 22 about the same transfer point. But it will be noted that the operation of the converter of FIGURE 24 for intervals about the ⑪—㉑ transfer point, ordinarily comprising a natural odd-odd discontinuous peak, is not the same as that of the converter of FIGURE 21 about the same transfer point.

In the converter of FIGURE 24 the necessity of providing a stage of cascading for the essential purpose of eliminating ambiguities adjacent the non-natural ⑬—③ discontinuous dip occasions subsidiary problems for what would ordinarily be the natural ⑪—㉑ discontinuous peak. To prevent ambiguities at the non-natural ⑬—③ discontinuous dip in the converters of FIGURES 22 and 24 it is necessary to derive the two complementary input signals to circle 500 of FIGURE 22 and the corresponding circle 600 of FIGURE 24, which circles provide at their output terminals the count of 8, from the two complementary output signals of circle 200 which appear at the output terminals of an electronic reversing switch. In the converter of FIGURE 21 in the region of the natural ⑪—㉑ discontinuous peak, a space of circle 200 subtends the ⑳ and ㉑ intervals but in the converter of FIGURE 24 no space of circle 200 subtends the ⑳ and ㉑ intervals. This space of circle 200 in the converter of FIGURE 24 has been omitted for an important consideration; because such omitted space would create a transfer point for circle 200 at the ⑪—㉑ transfer point, there would occur a transfer of conduction between output brushes 220 and 320; thus at the ⑪—㉑ transfer point there would occur a reversal of both pairs of input signals to that electronic reversing switch at the output terminals of which appear the two complementary output signals of circle 200; and conduction would not shift between brushes 610 and 612 to a leading brush as desired, but rather the lagging brush would continue to carry a signal. The effect of the omitted space of circle 200 is supplied by the double interval length modification signal at output brush 920 coupled to output terminal 290 in conjunction with the derivation of the input signal at brush 910 from fifth circle output brush 520.

Table 24 shows the normal output representations at terminals 190, 690, and 790 and the normal and modified output representations at terminal 490 and the normal and double length interval modified output representations at terminal 290 and the extra brush reversing alternation, causing modification, at the ⑱—③ transfer point, which constitutes a non-natural odd-odd discontinuous dip, and the extra brush reversing alternation, causing double interval length modification, at the ⑪—㉑ transfer point, which would otherwise constitute a natural odd-odd discontinuous peak, for the converter of FIGURE 24 as pattern A moves under the stationary brushes to successively occupy the intervals ⑱, ⑲, ⑳, ㉑, ⑪, ⑩, ⑨, ⑧, ⑦, ⑥, ⑤, ④, ③, ⑬, ⑭, ⑮, ⑯, ⑰, and ⑱ again.

9, 8, 7, 6, 5, 4, 5, 13, 14, 15, 16, and 17 again. Neglecting the effect of the modification circle 800, as is usual at a non-natural odd-odd discontinuous dip, the count jumps between odd numbers where however the count of the small odd number is apparently 2 greater than desired; and, neglecting the effect of the double interval length modification circle 900, adjacent what would otherwise be a natural odd-odd discontinuous peak the counts of two contiguous intervals apparently differ by the same amount from the counts desired. The effect of circle 800 is to artificially modify the count of the smaller of the odd numbers subtending the non-natural discontinuous dip, decreasing it by 2, so that it actually represents the desired small odd number. The effect of circle 900 is to artificially modify by the same amount each of the two contiguous intervals adjacent what would ordinarily be a natural odd-odd discontinuous peak so that they actually represent the desired counts. In FIGURE 24 at the non-natural discontinuous dip the count apparently jumps from 13 to 5 and the effect of circle 800 is to artificially modify what appears to be the count of 5 decreasing it by 2 so that it actually represents the desired

| Interval | Outputs at Terminal | | | | | Binary Count | Decimal Count |
|---|---|---|---|---|---|---|---|
| | 790 | 690 | 490 | 290 | 190 | | |
| ⑱ | 1 | 0 | 0 | 1 | 0 | 10010 | 18 |
| ⑲ | 1 | 0 | 0 | 1 | 1 | 10011 | 19 |
| ⑳ | 1 | 0 | 1 | 1→0 | 0 | 10100 | 20 |
| ㉑ | 1 | 0 | 1 | 1→0 | 1 | 10101 | 21 |
| ⑪ | 0 | 1 | 0 | 1 | 1 | 01011 | 11 |
| ⑩ | 0 | 1 | 0 | 1 | 0 | 01010 | 10 |
| ⑨ | 0 | 1 | 0 | 0 | 1 | 01001 | 9 |
| ⑧ | 0 | 1 | 0 | 0 | 0 | 01000 | 8 |
| ⑦ | 0 | 0 | 1 | 1 | 1 | 00111 | 7 |
| ⑥ | 0 | 0 | 1 | 1 | 0 | 00110 | 6 |
| ⑤ | 0 | 0 | 1 | 0 | 1 | 00101 | 5 |
| ④ | 0 | 0 | 1 | 0 | 0 | 00100 | 4 |
| ③ | 0 | 0 | 1→0 | 0→1 | 1 | 00011 | 3 |
| ⑬ | 0 | 1 | 1 | 0 | 1 | 01101 | 13 |
| ⑭ | 0 | 1 | 1 | 1 | 0 | 01110 | 14 |
| ⑮ | 0 | 1 | 1 | 1 | 1 | 01111 | 15 |
| ⑯ | 1 | 0 | 0 | 0 | 0 | 10000 | 16 |
| ⑰ | 1 | 0 | 0 | 0 | 1 | 10001 | 17 |
| ⑱ | 1 | 0 | 0 | 1 | 0 | 10010 | 18 |

Table 24

In the converter of FIGURE 24 which embodies the third adaptation of the general method for producing functions containing both natural and non-natural discontinuities accompanied by changes in slope sign, neglecting the effect of the modification circles 800 and 900 the count apparently proceeds 17, 18, 19, 22, 23, 11, 10, count of 3. In the converter of FIGURE 24 at what would otherwise be a natural odd-odd discontinuous peak the count apparently proceeds 11, 23, 22; and the effect of circle 900 is to artificially modify the two contiguous intervals having apparent counts of 23 and 22, decreasing each of them by 2, so that they actually represent the desired counts of 21 and 20. An additional circle, circle 1000 in FIGURE 24, having a segment both ends of which are critical, not only controls the transfer point between the two intervals of each of the double interval length segments (or spaces if an inverse form is used) subtending the odd-odd discontinuous peak and the odd-odd discontinuous dip, but also causes the modification of the smaller of the odd numbers subtending the non-natural discontinuous dip and the similar modification of each of the two contiguous intervals adjacent what would ordinarily be the natural odd-odd discontinuous peak, and further provides extra brush reversing alternations at the discontinuities, where changes in slope sign occur, to condition the converter for an unambiguous count.

It will be appreciated that the actions of "and" circuits 122 through 125 and also 422 through 425 in combination with respectively associated "or" circuit crystals 136 through 139 and also 436 through 439 are those of electronic double-pole double-throw reversing switches. Since the actuations of the reversing switches also cause changes in output representation from the count of 21 to the count of 11 and also from the count of 3 to the count of 13, we desire that the operation be as nearly instantaneous as possible to prevent momentary ambiguities occasioned by response lags. The use of electronic reversing switches decreases the response lag to a fraction of a microsecond.

While in the converter of FIGURE 24 we have shown all intervals to be of equal length of arc so that the double interval length segments (or spaces) subtending the odd-odd discontinuous peak and the odd-odd discontinuous dip may readily be seen, it will be appreciated that the converter of FIGURE 24 is adapted to provide a nonlinear count with corresponding variation in the lengths of the segments and spaces.

As will be apparent to those skilled in the art the converter of FIGURE 24 is also amenable to the superextension of count for interpattern transfer by the provision of an additional circle mounted on a pattern disk reduction geared to rotate with pattern A and provided with a single input signal.

In the converter of FIGURE 24, as in the converter of FIGURE 22, at the ③—⑬ transfer point conduction shifts between brushes 210 and 212 in such manner that conduction is transferred from a *leading* brush to a *lagging* brush. The derivation of the complementary input signals to circle 600 directly from that reversing switch at the output terminals of which appear the two complementary output signals of first circle 100 would cause an ambiguity for the output signal of circle 600, because the ③—⑬ transfer point is also a transfer point for circle 600. In the converter of FIGURE 24, as in the converter of FIGURE 22, at least one stage of cascading is necessary for the essential purpose of preventing ambiguities rather than doubling the tolerances. Despite the cascading, brushes 610 and 612 are spaced apart only one interval length of arc.

While in the converter of FIGURE 24 the pair of complementary input signals to circle 700 are shown derived from that reversing switch at the output terminals of which appear the two complementary output signals of circle 200, it will be appreciated by those skilled in the art that the two complementary input signals to brushes 710 and 712 may with equal advantage be derived instead from the two complementary output signals of circle 400 at brushes 420 and 520, because the necessary two-to-one segment and space relationship required for cascading is present for circles 400 and 700 and permits of doubling the tolerances by doubling the arc length spacing between brushes 710 and 712.

In the converter of FIGURE 24, as in the converter of FIGURE 22, it is essential that the smaller of the odd numbers subtending the non-natural discontinuous dip be the modified representation. Because the alternate stepping action between brushes 610 and 612 is controlled by that reversing switch at the output terminals of which appear the two complementary output signals of second circle 200, it is essential that the transfer points for circle 200 be properly placed so that at the ③—⑬ transfer point conduction is shifted between these brushes in such manner that conduction is transferred from a *lagging* brush to a *leading* brush. The transfer points of circle 200, and also of circle 300, are properly placed only when it is the smaller of the odd numbers subtending the discontinuous dip that is the modified representation.

In the converter of FIGURE 24, unlike the converter of FIGURE 21, there is double interval length modification adjacent what would otherwise be a natural odd-odd discontinuous peak.

*Functions Containing Discontinuities Between Non-Adjacent Odd and Even Numbers Accompanied by Changes in Slope Sign at the Discontinuities*

Referring now to FIGURE 25, a source of input excitation voltage, battery 10, has its negative terminal grounded and its positive terminal connected through an input resistor 127 to an input brush 110 disposed to alternately contact the segments and spaces of a first circle 100. First circle output brush 120 is connected through an input loading resistor 128 to ground and through a summing resistor 132 to the input of a one-to-one buffer amplifier 188, the output of which is connected to first circle output terminal 190. Output brush 120 is connected to one input terminal of each of "and" circuits 123 and 124. Input brush 110 is connected through a neon glow tube 150 to one input terminal of each of "and" circuits 122 and 125. The output terminals of "and" circuits 122 and 123 are combined forwardly through a first "or" circuit comprising respective crystals 136 and 137, the output of which is connected forwardly through a crystal 196 to one input brush 210 of a pair of input brushes 210 and 212 disposed to alternately contact the segments and spaces of a second circle 200. The outputs of "and" circuits 124 and 125 are combined forwardly through a second "or" circuit, comprising respective crystals 138 and 139, the output of which is connected forwardly through a crystal 198 to brush 212. Brushes 210 and 212 are spaced apart a length of arc equal to one interval length of circle 100. Second circle output brush 220 is connected to second circle output terminal 290 and to ground through a loading resistor 230. The output of first "or" circuit comprising crystals 136 and 137 is also connected forwardly through a crystal 296 to one input brush 310 of a pair of input brushes 310 and 312 disposed to alternately contact the segments and spaces of a third circle 300. The output of the second "or" circuit comprising crystals 138 and 139 is also connected forwardly through a crystal 298 to brush 312. Brushes 310 and 312 have the same spacing as brushes 210 and 212. Intermeshing with third circle 300 is a fourth circle 400, brushes 310 and 312 simultaneously providing complementary input signals to both the third and fourth circles. Third circle output brush 320 is connected through a loading resistor 330 to ground and through a summing resistor 332 to the input of a one-to-one buffer amplifier 388, the output of which is connected to third circle output terminal 390. The output of the first "or" circuit comprising crystals 136 and 137 is further connected forwardly through a crystal 496 to one input brush 510 of a pair of input brushes 510 and 512 disposed to alternately contact the segments and spaces of a fifth circle 500. The output of second "or" circuit comprising crystals 138 and 139 is further connected forwardly through a crystal 498 to brush 512. Brushes 510 and 512 have the same spacing as that of brushes 310 and 312 and brushes 210 and 212. Fifth circle output brush 520 is connected to fifth circle output terminal 590 and to ground through a loading resistor 530. Third circle output brush 320 is also connected forwardly through a crystal 596 to one input brush 610 of a pair of input brushes 610 and 612 disposed to alternately contact the conductive segment and non-conductive intersegmental space of a sixth circle 600. Fourth circle output brush 420 is connected forwardly through a crystal 598 to brush 612. Brushes 610 and 612 are spaced apart a length of arc equal to two interval lengths of circle 100. Sixth circle output brush 620 is connected to sixth circle output terminal 690 and to ground through a loading resistor 630. The positive terminal of input excitation battery 10 is also connected through an input resistor 727 to an input brush 710 disposed to alternately contact the segment and the space of a seventh circle 700. Seventh circle output brush 720 is connected through an input loading resistor 728 to ground and is connected forwardly through a crystal 782 to terminal 290 and forwardly through a crystal 781 to the input of amplifier 188. Brush 710 is connected to one terminal of a neon glow tube 750. The other terminal of glow tube 750, the negative terminal thereof, is connected backwardly through a crystal 783 to the input of amplifier 388. The negative terminal of glow tube 750 is also connected through a loading resistor 733 to the negative terminal of another battery 12 the positive terminal of which is grounded. Partially intermeshing with seventh circle 700 is an eighth circle 800, brush 710 simultaneously providing a single input signal to both the seventh and eighth circles 700 and 800. Eighth circle output brush 820 is connected to one terminal of a neon glow tube 850. The other terminal of glow tube 850, the negative terminal thereof, is connected to the input of an inverting amplifier or trigger circuit 880 and forwardly through a crystal 881 to second circle output terminal 290. The output of trigger circuit 880 is connected backwardly through a crystal 883 to the input of amplifier 188. The positive terminal of input excitation voltage battery 10 is further connected through a neon glow tube 950 to an input brush 910 disposed to alternately contact the segment and space of a ninth circle 900. Ninth circle output brush 920 is connected to the other input terminal of each of "and" circuits 122 and 124. Brush 920 is also connected to the input of an inverting amplifier or trigger circuit 980. The output of trigger circuit 980 is connected to the other input terminal of each of "and" circuits 123 and 125. Output brush 720 is also connected forwardly through a crystal 739 to the input of inverting amplifier 980. The negative terminal of glow tube 850 is also connected forwardly through a crystal 839 to the input of inverting amplifier 980. Circles 100 through 900 are concentrically mounted on a nonconductive disk, and the pattern is cut radially along line A and developed. Inverting amplifier 880 may here have a high output impedance.

Each of "and" circuits 123 and 125 may comprise an n-p-n transistor, one input terminal being connected to the collector and the other input terminal being connected through a high impedance value resistor to the base and the output terminal being connected to the emitter. If the output of trigger circuit 980 is impressed upon that input terminal of each of "and" circuits 123 and 125 which is connected through the high impedance resistor to the base, then trigger circuit 980 may also have a high output impedance. But if the output of trigger circuit 980 is impressed upon that input terminal of either "and" circuit 123 or 125 which is connected to the collector, then trigger circuit 980 should have a low output impedance, as, for example, by clamping the positive output swing of trigger circuit 980, by means of a diode, to a source of positive potential equal to substantially half that of excitation battery 10.

Assuming that battery 12 supplies a negative potential equal to half the positive potential of battery 10 and that input resistor 727 and input loading resistor 728 have substantially equal resistance values which are small compared with those of loading resistors 230 and 733 and with summing resistor 332 and further assuming that glow tube 750 sustains a voltage drop of half the potential of battery 10, then loading resistor 733 should have a resistance value slightly less than that of summing resistor 332 so that, neglecting any current through glow tube 750, the negative terminal of the glow tube would, during the ③ interval, rest slightly below ground potential, permitting the glow tube to regulate and pass sufficient current through loading resistor 733 to bring the negative terminal of the glow tube up to ground potential.

In operation of the converter of FIGURE 25 in the ㉑ interval adjacent the ㉑—⑩ transfer point, as shown, as the brushes move to the right relative to the pattern, at the ㉑—⑩ transfer point, first circle input brush 110 lies within the triple interval length segment of first circle 100 and is hence ineffective to control a change in output representation. However, at the ㉑—⑩ transfer point, input brush 710 contacts one of the critical ends of the segment of circle 800, causing eighth circle output brush 820 to rise to a potential substantially equal to that of input excitation battery 10, and causing the negative terminal of glow tube 850 to rise to a potential substantially half that of excitation battery 10. When the negative terminal of glow tube 850 becomes positive, a signal is impressed forwardly through crystal 839 upon the input of inverting amplifier 980, causing its output to drop to ground potential. The transfer of conduction from the output of trigger circuit 980 to brush 920 causes "and" circuits 123 and 125 to become deactivated and causes "and" circuits 122 and 124 to become activated. Conduction shifts from "and" circuit 123 and "or" circuit crystal 137 to "and" circuit 124 and "or" circuit 138, causing conduction to shift from lagging brushes 210, 310, and 510 to leading brushes 212, 312, and 512. Pairs of brushes 310 and 312 and also 510 and 512 symmetrically straddle transfer points of circles 300 and 400 and also 500 respectively. The transfer of conduction from brush 310 to brush 312 causes conduction to shift from third circle output brush 320 to fourth circle output brush 420. Conduction is thereby transferred from lagging brush 610 to leading brush 612, which brushes symmetrically straddle a transfer point of sixth circle 600. Thus far the output representation changes from the count of 21 to the count of 9 which is 1 less than the desired output representation of 10. The positive signal at the negative terminal of glow tube 850 is impressed forwardly through crystal 881, causing the output at terminal 290 to be modified from its normal "0" to a "1," increasing the normal converter output representation of 9 by 2 to the count of 11 which is 1 greater than the desired output representation of 10. When the negative terminal of glow tube 850 becomes positive, the output of inverting amplifier 880 drops to ground potential, carrying with it the input of buffer amplifier 188 by virtue of the forward current now drawn through crystal 883, causing the output at terminal 190 to be modified from its normal "1" to a "0," and decreasing the count of 11 by 1 to the desired output representation of 10 during the ⑩ interval. Thus the ㉑—⑩ transfer point is controlled neither by a segment of first circle 100 nor by the segment of ninth circle 900 but rather by one of the critical ends of the segment of circle 800; and the segment of circle 800 not only causes an extra brush reversing alternation, both changing the normal output representation and conditioning the converter for an unambiguous decreasing count, but also causes the modification of the normal to the desired output representation. Intermediate the ⑩ interval, preferably though not necessarily in the middle thereof, ninth circle input brush 910 contacts one of the non-critical ends of the segment of circle 900, thereby ensuring that the input of inverting amplifier 980 is positive. The input of inverting amplifier 980 is now positive for two reasons either of which is sufficient; firstly because brush 710 contacts the segment of circle 800 causing a positive signal at the negative terminal of glow tube 850 which is coupled forwardly through crystal 839, and secondly because brush 910 contacts the segment of circle 900 causing a positive signal at output brush 920. At the ⑩—⑨ transfer point first circle input brush 110 again lies intermediate the triple interval length segment of first circle 100 and is hence again ineffective to cause a change in output representation. However, at the ⑩—⑨ transfer point brush 710 breaks contact with the other of the critical ends of the segment of circle 860, removing the modification signal formerly appearing at the negative terminal of glow tube 850, thereby permitting the normal converter output representation of 9 to appear at output terminals 190 through 690 during the ⑨ interval. The modification signal formerly appearing at the negative terminal of glow tube 850 is no longer coupled through crystal 839; but since ninth circle input brush 910 now lies well in engagement with the segment of circle 900, output brush 920 continues positive and the output of inverting amplifier 980 continues to rest at ground. It is seen then that during the second half of the ⑩ interval there is an overlapping of brush alternation signals at the input of inverting amplifier 980. Glow tube 950 introduces a voltage drop so that the positive signal at the input of inverting amplifier 980 is the same whether due to either signal acting alone or whether due to the overlapping of both signals. At the ⑩—⑨ transfer point no brush alternation is permitted to occur. The count proceeds conventionally through the ⑨, ⑧, ⑦, ⑥, ⑤, and ④ intervals with conduction shifting between "and" circuits 122 and 124 and between respectively associated "or" circuit crystals 136 and 138. At the ④—③ transfer point first circle input brush 110 lies intermediate the triple interval length space of circle 100 and is hence ineffective to cause a change in output representation. However, at the ④—③ transfer point brush 710 contacts one of the critical ends of the segment of circle 700 causing output brush 720 to become positive and causing the negative terminal of glow tube 750 to drop to ground potential. The normal converter output representation is still 4 which is 1 greater than the desired output representation of 3. The positive signal at seventh circle output brush 720 is coupled forwardly through crystals 782 and 781 causing the outputs at terminals 290 and 190 to be modified from their normal "0's" to "1's," increasing the normal count of 4 by 3 to the count of 7 which is 4 greater than the desired output representation of 3. But the negative terminal of glow tube 750 in dropping to ground potential carries with it the input of buffer amplifier 388 by virtue of the forward current which now flows through crystal 783, causing the output at terminal 390 to be modified from its normal "1" to a "0," and decreasing the count of 7 by 4 to the desired output representation of 3 during the ③ interval. The positive signal at seventh circle output brush 720 is coupled forwardly through crystal 739, thereby ensuring that the input of inverting amplifier 980 remains positive. The input of inverting amplifier 980 is now positive for two reasons, either of which is sufficient; firstly because brush 710 contacts the segment of circle 700 causing a positive signal at output brush 720 which is coupled forwardly through crystal 739, and secondly because brush 910 contacts the segment of circle 900 causing a positive signal at output brush 920. Intermediate the ③ interval, preferably, though not necessarily, in the middle thereof, ninth circle input brush 910 breaks contact with the other of the noncritical ends of the segment of circle 900. But the input of inverting amplifier 980 continues positive because brush 710 still contacts the segment of circle 700, still causing a signal at output brush 720 which is coupled forwardly through crystal 739. It is seen then that during the first half of the ③ interval there is an overlapping of brush alternation signals at the input of inverting amplifier 980. Thus intermediate the ③ interval no brush alternation is permitted to occur. At the ③—② transfer point first circle input brush 110 again lies intermediate the triple interval length space of circle 100 and is hence again ineffective to cause a change in output representation. However, at the ③—② transfer point, input brush 710 breaks contact with the other of the critical ends of the segment of circle 700, permitting seventh circle output brush 720 to drop to ground and removing all modification signals. Since a signal is no longer coupled through crystal 739 and since brush 910 now lies well out of engagement with the segment of circle 900, the input of inverting amplifier 980 drops to ground potential and its output becomes positive. This transfer of conduction from the input of inverting amplifier 980 to the output of inverting amplifier 980, deactivating "and" circuits 122 and 124 and reactivating "and" circuits 123 and 125, causes conduction to be shifted from "and" circuit 122 and "or" circuit crystal 136 to "and" circuit 125 and "or" circuit crystal 139. Conduction then shifts from lagging brushes 210, 310, and 510 to leading brushes 212, 312, and 512. Since brushes 510 and 512 symmetrically straddle a transfer point of circle 500 and since leading brush 212 lies well in engagement with the segment of circle 200, the normal converter output representation changes to the count of 14. Because of the removal of all modification signals when brush 710 breaks contact with the segment of circle 700, the normal converter output representation of 14 is permitted to appear at the output terminals during the ① interval. Thus the ③—② transfer point is controlled neither by the segment of first circle 100 nor by the segment of ninth circle 900 but rather by one of the critical ends of the segment of circle 700; and the segment of circle 700 not only causes an extra brush reversing alternation, both changing the normal output representation and conditioning the converter for an unambiguous increasing count, but also causes the modification of the normal to the desired output representation. We have shown the left-hand end of that segment of circle 200 subtending the ⑮ and ⑭ intervals to be placed at the mid-point of the ③ interval; but the left-hand end of said segment may be placed anywhere in the ③ interval without introducing ambiguity and without reducing the tolerances. It may be noted that were the left-hand end of said segment of circle 200 to be placed to the left of the mid-point of the ③ interval, as, for example, at the ④—③ transfer point, then during the second half of the ③ interval there would occur at output terminal 290 an overlapping of two signals; the first being the modification signal at seventh circle output brush 720 coupled through crystal 782, and the second being a signal at output brush 220 by reason that lagging brush 210, carrying a signal, would, somewhere adjacent the mid-point of the ③ interval, engage the left-hand end of said segment of circle 200. The count proceeds conventionally through the ⑪, ⑫, ⑬, ⑰, ⑱, ⑲, ⑳, and ㉑ intervals with conduction shifting between "and" circuits 123 and 125 and between respectively associated "or" circuit crystals 137 and 139. It is seen then that the brush reversing signal is controlled from the ⑫—⑪ transfer point to the mid-point of the ⑩ interval by circle 800, from the mid-point of the ⑩ interval to the ⑩—⑨ transfer point by overlapping signals from circles 800 and 900, from the ⑩—⑨ transfer point to the ④—③ transfer point by circle 900, from the ④—③ transfer point to the mid-point of the ③ interval by overlapping signals from circles 700 and 900, and from the mid-point of the ③ interval to the ③—② transfer point by circle 700.

Table 25 shows the normal output representations at terminals 590 and 690 and the normal and modified output representations at terminals 190, 290, and 390 and the modification controlling signal from circle 800 during the ⑩ interval which also controls an extra conditioning brush reversing alternation at the ⑩—⑨ transfer point, constituting a discontinuous peak between nonadjacent odd and even numbers, and the modification controlling signal from circle 700 during the ③ interval which also controls an extra conditioning brush reversing alternation at the ③—② transfer point, constituting a discontinuous dip between nonadjacent odd and even numbers, and the brush reversing alternation signal of circle 900, which overlaps that of circle 800 during a portion of the ⑩ interval and overlaps that of circle 700 during a portion of the ③ interval, for the converter of FIGURE 25 as pattern A moves under the stationary brushes to successively occupy the intervals ⑱, ⑲, ⑳, ㉑, ⑩, ⑨, ⑧, ⑦, ⑥, ⑤, ④, ③, ⑭, ⑮, ⑯, ⑰, and ⑱ again.

tending the discontinuous dip is of triple interval length such that the count of one of the even numbers is apparently of double interval length. The effect of circle 800 is to artificially modify the middle interval of the triple interval length segment subtending the discontinuous peak, which middle interval is a portion of what appears to be the double interval length odd number, altering the count by 1 so as to actually represent the desired even number. The effect of circle 700 is to artificially

| Interval | Outputs at Terminal | | | | | Binary Count | Decimal Count |
|---|---|---|---|---|---|---|---|
| | 690 | 590 | 390 | 290 | 190 | | |
| ⑱ | 1 | 0 | 0 | 1 | 0 | 10010 | 18 |
| ⑲ | 1 | 0 | 0 | 1 | 1 | 10011 | 19 |
| ⑳ | 1 | 0 | 1 | 0 | 0 | 10100 | 20 |
| ㉑ | 1 | 0 | 1 | 0 | 1 | 10101 | 21 |
| ⑩ | 0 | 1 | 0 | 0→1 | 1→0 | 01010 | 10 |
| ⑨ | 0 | 1 | 0 | 0 | 1 | 01001 | 9 |
| ⑧ | 0 | 1 | 0 | 0 | 0 | 01000 | 8 |
| ⑦ | 0 | 0 | 1 | 1 | 1 | 00111 | 7 |
| ⑥ | 0 | 0 | 1 | 1 | 0 | 00110 | 6 |
| ⑤ | 0 | 0 | 1 | 0 | 1 | 00101 | 5 |
| ④ | 0 | 0 | 1 | 0 | 0 | 00100 | 4 |
| ③ | 0 | 0 | 1→0 | 0→1 | 0→1 | 00011 | 3 |
| ⑭ | 0 | 1 | 1 | 1 | 0 | 01110 | 14 |
| ⑮ | 0 | 1 | 1 | 1 | 1 | 01111 | 15 |
| ⑯ | 1 | 0 | 0 | 0 | 0 | 10000 | 16 |
| ⑰ | 1 | 0 | 0 | 0 | 1 | 10001 | 17 |
| ⑱ | 1 | 0 | 0 | 1 | 0 | 10010 | 18 |

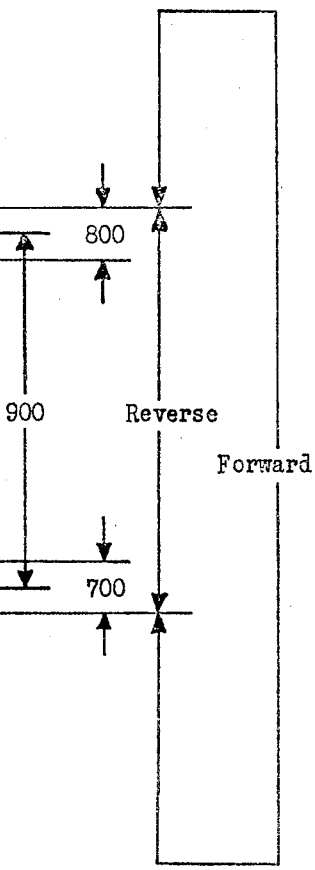

Table 25

In the converter of FIGURE 25 which embodies the first method of the first adaptation of the general method for producing functions containing a discontinuity between nonadjacent odd and even numbers accompanied by a change in slope sign at the discontinunity such as to constitute a local minimum and which also embodies the second method of the first adaptation of the general method for producing functions containing a discontinuity between nonadjacent odd and even numbers accompanied by a change in slope sign at the discontinuity such as to constitute a local maximum, neglecting the modification effect of circles 700 and 800 and considering only their brush reversing alternation effect, the count apparently proceeds 18, 19, 20, 21, 9, 9, 8, 7, 6, 5, 4, 4, 14, 15, 16, 17, and 18 again. Neglecting only the modification effect of circles 700 and 800 but considering their brush reversing alternation effect, then the count apparently contains a natural odd-odd discontinuous peak where, however, the segment subtending the discontinuous peak is of triple interval length such that the count of one of the odd numbers is apparently of double interval length; and the count apparently also contains a natural even-even discontinuous dip where, however, the space sub- modify the middle interval of the triple interval length space subtending the discontinuous dip, which middle interval is a portion of what appears to be the double interval length even number, altering the count by 1 so as to actually represent the desired odd number. In FIGURE 25 at the discontinuous peak the count apparently jumps from 21 to a double interval length count of 9; and the effect of circle 800 is to artificially modify that portion of what appears to be the double interval length count of 9 adjacent the count of 21, altering the apparent representation by 1 so as to actually represent the desired count of 10. In FIGURE 25 at the discontinuous dip the count apparently jumps from 14 to a double interval length count of 4; and the effect of circle 700 is to artificially modify that portion of what appears to be the double interval length count of 4 adjacent the count of 14, altering the apparent representation by 1 so as to actually represent the desired count of 3. The two critical ends of the segment of circle 800 are positioned intermediate the triple interval length segment (or space, if an inverse form is used) subtending what appears to be a natural discontinuous peak, one of the critical ends of the segment of circle 800 controlling by modification the transfer point between the two portions of what appears to be the double interval length odd number and the other of the critical ends of the segment of the modification circle 800 also controlling an extra brush reversing alternation determining the transfer point between the two counts comprising the discontinuous peak and conditioning the converter for an unambiguous count. The two critical ends of the segment of circle 700 are positioned intermediate the triple interval legnth space (or segment, if an inverse form is used) subtending what appears to be a natural discontinuous dip, one of the critical ends of the segment of circle 700 controlling by modification the transfer point between the two portions of what appears to be the double interval length even number and the other of the critical ends of the segment of the modification circle 700 also controlling an extra brush reversing altrenation determining the transfer point between the two counts comprising the discontinuous dip and conditioning the converter for an unambiguous count. An additional circle, circle 900, having a segment neither end of which is critical, has one noncritical end positioned intermediate the middle interval of the triple interval length segment subtending the discontinuous peak and the other of its noncritical ends positioned intermediate the middle interval of the triple interval length space subtending the discontinuous dip and provides a brush reversing alternation signal which overlaps that of circle 800 during a portion of the middle interval of the triple interval length segment and overlaps that of circle 700 during a portion of the middle interval of the triple interval length space.

While in the converter of FIGURE 25 we have shown all intervals to be of equal length of arc so that the triple interval segment (or space) subtending the discontinuous peak and the triple interval length space (or segment) subtending the discontinuous dip may readily be seen, it will be appreciated that the converter of FIGURE 25 is adapted to provide a nonlinear count with corresponding variation in the lengths of the segments and spaces.

As will be apparent to those skilled in the art, the converter of FIGURE 25 is also amenable to the superextension of count for interpattern transfer by the provision of an additional circle mounted on a pattern disk reduction geared to rotate with pattern A and provided with a single input signal.

The action of "and" circuits 122 through 125 in combination with respectively associated "or" circuit crystals 136 through 139 is that of an electronic double-pole double-throw reversing switch. Since the actuations of the reversing switch help to cause a change in output representation from the count of 21 to the count of 10 and also from the count of 14 to the count of 3, we desire that the operation be as nearly instantaneous as possible to prevent momentary ambiguities occasioned by response lags. The use of an electronic reversing switch decreases the response lag to a minimum. It will be noted that since the necessary two-to-one segment and space relationship for cascading exists for circles 300 and 600, the two complementary inputs to the sixth circle 600 are derived from the two complementary outputs of circle 300 at output brushes 320 and 420, thus doubling the brush tolerances for circle 600, the usual benefit of cascading.

The converter of FIGURE 25, as the converters of FIGURES 13 and 14, has a triple interval length segment and a triple interval length space; but the converter of FIGURE 25 has an electronic reversing switch helping to cause a change in output representation while those of FIGURES 13 and 14 do not. Suppose in FIGURE 25 that crystals 739 and 839 were omitted and that there were no connection between brush 920 and either brush 720 or the negative terminal of glow tube 850. It will be appreciated that under the supposed circumstances no brush alternation signal would occur at either the ㉑—⑩ or the ③—⑭ transfer point, rather extra brush alternations would occur somewhere intermediate the ⑩ and ③ intervals as determined by the noncritical ends of the segment of circle 900. Under the supposed circumstances, the "brute force" modification methods of FIGURES 13 and 14 must be used to provide the necessary change in output representation at terminals 490, 590, and 690 at the ㉑—⑩ transfer point and at terminal 590 at the ⑭—③ transfer point. The more elegant method, the method shown in FIGURE 25, is to cause a brush alternation signal to occur precisely at the ㉑—⑩ transfer point so that the desired change in output representation occurs at terminals 490, 590, and 690 without the necessity of modification and to also cause a brush alternation signal to occur precisely at the ⑭—③ transfer point so that the desired change in output representation occurs at terminal 590 without the necessity of modification. In the converters of FIGURES 13 and 14 and under the supposed circumstances in the converter of FIGURE 25 were crystals 739 and 839 omitted, then there would occur an overlapping of normal and modification signals at the output terminals. In the converter of FIGURE 25, as shown, while there is no overlapping of signals at the output terminals, yet there is an overlapping of the brush alternation signals of circles 700 and 800 with that of circle 900 during a portion of the middle intervals of the triple interval length segment and space.

In FIGURE 25 the discontinuous peak is subtended by a triple interval length segment for the ㉑, ⑩, and ⑨ intervals and the discontinuous dip is subtended by a triple interval length space for the ④, ③, and ⑭ intervals. As has been previously explained, this disposition of the triple interval length segment and the triple interval length space leads to a natural discontinuous peak and a natural discontinuous dip as in the converter of FIGURE 21. Suppose in FIGURE 25 that the discontinuous peak were subtended by a triple interval length space for the ⑳, ㉑, and ⑩ intervals and that the discontinuous dip were subtended by a triple interval length segment for the ③, ⑭, and ⑮ intervals. This disposition of a triple interval length space subtending the discontinuous peak and of a triple interval length segment subtending the discontinuous dip would lead to a non-natural discontinuous peak and a non-natural dip as in the converter of FIGURE 22. While the count of the converter of FIGURE 25 may be produced by such supposed disposition of a triple interval length space and a triple interval length segment, yet, as will be appreciated by those skilled in the art, such supposed disposition in leading to a non-natural discontinuous peak and a non-natural discontinuous dip would cause unnecessary additional complications including the necessity of providing a stage of cascading merely for the purpose of eliminating ambiguities as in the converter of FIGURE 22.

Referring now to FIGURE 26, a source of input excitation voltage, such as battery 10, has its negative terminal grounded and its positive terminal connected through an input resistor 127 to an input brush 110 stationarily disposed to alternately contact the conductive segments and nonconductive spaces of a first circle 100. First circle output brush 120 disposed to always be in electrical contact with the conductive segments of circle 100 is connected through an input loading resistor 128 to ground and through a summing resistor 132 to the input of a one-to-one buffer amplifier, such as cathode or emitter follower 188, the output of which is connected to first circle output terminal 190. Brush 120 is connected to one input terminal of each of "and" circuits 122 and 125. Brush 110 is connected through a neon glow tube 150 to one input terminal of each of "and" circuits 123 and 124. The outputs of "and" circuits 122 and 123 are combined forwardly through respective crystals 136 and 137, comprising an "or" circuit, the output of which is connected forwardly through a diode rectifier or crystal 196 to one input brush 210 of a pair of input brushes 210 and 212 disposed to alternately contact the segments and spaces of a second circle 200. The outputs of "and" circuits 124 and 125 are combined forwardly through respective crystals 138 and 139, comprising an "or" circuit, the output of which is connected forwardly through a crystal 198 to brush 212. Brushes 210 and 212 are spaced apart a length of arc equal to one interval length of circle 100. Second circle output brush 220 is connected through a loading resistor 230 to ground and through a summing resistor 232 to the input of a one-to-one buffer amplifier 288, the output of which is connected to second circle output terminal 290. Output brush 220 is further connected to one input terminal of each of "and" circuits 222 and 225. Intermeshing with second circle 200 is a third circle 300, the segments of circle 300 occupying the spaces of circle 200 and the spaces of circle 300 being occupied by the segments of circle 200. Brushes 210 and 212 simultaneously supply complementary input signals to both circles 200 and 300. Third circle output brush 320 is connected to one input terminal of each of "and" circuits 223 and 224. The outputs of "and" circuits 222 and 223 are combined forwardly through respective crystals 236 and 237, comprising an "or" circuit, the output of which is connected forwardly through a crystal 396 to one input brush 410 of a pair of input brushes 410 and 412 disposed to alternately contact the segment and intersegmental space of a fourth circle 400. The outputs of "and" circuits 224 and 225 are combined forwardly through respective crystals 238 and 239, comprising an "or" circuit, the output of which is connected forwardly through a crystal 398 to brush 412. Brushes 410 and 412 are spaced apart a length of arc equal to two interval lengths of circle 100. Fourth circle output brush 420 is connected to fourth circle output terminal 490 and through a loading resistor 430 to ground. The output of the "or" circuit comprising crystals 136 and 137 is further connected forwardly through a crystal 496 to one input brush 510 of a pair of input brushes 510 and 512, disposed to alternately contact the segments and spaces of a fifth circle 500. The output of the "or" circuit comprising crystals 138 and 139 is further connected forwardly through a crystal 498 to brush 512. Brushes 510 and 512 are spaced apart a length of arc equal to one interval length of circle 100. Fifth circle output brush 520 is connected to fifth circle output terminal 590 and through a loading resistor 530 to ground. The output of the "or" circuit comprising crystals 236 and 237 is further connected forwardly through a crystal 596 to one input brush 610 of a pair of input brushes 610 and 612 disposed to alternately contact the conductive segment and nonconductive space of a sixth circle 600. The output of the "or" circuit comprising crystals 238 and 239 is further connected forwardly through a crystal 598 to brush 612. Brushes 610 and 612 are spaced apart a length of arc equal to two interval lengths of circle 100. Sixth circle output brush 620 is connected to sixth circle output terminal 690 and through a loading resistor 630 to ground. The positive terminal of input excitation voltage battery 10 is also connected through an input resistor 727 to a single input brush 710 disposed to alternately contact the segment and the space of a seventh circle 700. Seventh circle output brush 720 is connected through an input loading resistor 728 to ground and forwardly through a crystal 781 to the input of buffer amplifier 188. Brush 710 is connected to one terminal of a neon glow tube 750. The other terminal of glow tube 750, the negative terminal thereof, is connected backwardly through a crystal 783 to the input of buffer amplifier 288. The negative terminal of glow tube 750 is also connected through a loading resistor 733 to the negative terminal of another battery 12, the positive terminal of which is grounded. Partially intermeshing with seventh circle 700 is an eighth circle 800, having one segment and one space. Brush 710 simultaneously supplies an input signal to both circles 700 and 800. Eighth circle output brush 820 is connected to one terminal of a neon glow tube 850. The other terminal of glow tube 850, the negative terminal thereof, is connected to the input of an inverting amplifier or trigger circuit 880 and forwardly through a crystal 881 to fourth circle output terminal 490. The output of trigger circuit 880 is connected backwardly through a crystal 883 to the input of amplifier 188 and backwardly through a crystal 884 to the input of amplifier 288. The positive terminal of input excitation voltage battery 10 is further connected through a neon glow tube 950 to an input brush 910 disposed to alternately contact the segment and the space of a ninth circle 900. Ninth circle output brush 920 is connected to the other input terminal of each of "and" circuits 122, 124, 222, and 224. Output brush 920 is also connected to the input of an inverting amplifier or trigger circuit 980, the output of which is connected to the other input terminal of each of "and" circuits 123, 125, 223, and 225. Output brush 720 is further connected forwardly through a crystal 739 to brush 920. The negative terminal of glow tube 850 is further connected forwardly through a crystal 839 to brush 920. Circles 100 through 900 are concentrically mounted on a nonconductive disk and the pattern is cut radially along line A and developed. Inverting amplifier 880 may here have a high output impedance.

Each of "and" circuits 123, 125, 223, and 225 may comprise an n-p-n transistor, one input terminal being connected to the collector and the other input terminal being connected through a high impedance value resistor to the base and the output terminal being connected to the emitter. If the output of trigger circuit 980 is impressed upon that input terminal of each of "and" circuits 123, 125, 223, and 225 which is connected through the high impedance resistor to the base, then trigger circuit 980 may also have a high output impedance. But if the output of trigger circuit 980 is impressed upon that input terminal of any of "and" circuits 123, 125, 223, and 225 which is connected to the collector, then trigger circuit 980 should have a low output impedance, as, for example, by clamping the positive output swing of trigger circuit 980, by means of a diode, to a source of positive potential equal to substantially half that of excitation battery 10.

Assuming that bias battery 12 supplies a negative potential equal to half the positive potential of battery 10 and that input resistor 727 and input loading resistor 728 have substantially equal resistance values which are small compared with those of summing resistors 132 and 232 and with loading resistor 733 and further assuming that glow tube 750 sustains a voltage drop of half the potential of battery 10, then loading resistor 733 should have a resistance value slightly less than that of summing resistor 232 so that, neglecting for the moment any current through glow tube 750, the negative terminal of the glow tube would, during the ⑬ interval, rest slightly below ground potential permitting the glow tube to regulate and pass sufficient current through loading resistor 733 to bring the negative terminal of glow tube 750 up to ground potential.

In operation of the converter of FIGURE 26 in the ⑪ interval adjacent the ⑪—⑳ transfer point, as shown, as the brushes move to the left relative to the pattern, at the ⑪—⑳ transfer point first circle input brush 110 lies intermediate the triple interval length segment of first circle 100 and is hence ineffective to control a change in output representation. However, at the ⑪—⑳ transfer point brush 710 contacts one of the critical ends of the segment of circle 800 causing eighth circle output brush 820 to rise to a potential substantially equal to that of input excitation battery 10 and causing the negative terminal of glow tube 850 to rise to a potential substantially half that of battery 10. When the negative terminal of glow tube 850 becomes positive, a signal is impressed forwardly through crystal 839 upon output brush 920 and upon the input of inverting amplifier 980, causing the output of inverting amplifier 980 to drop to ground potential. The transfer of conduction from the output of trigger circuit 980 to output brush 920, deactivating "and" circuits 123, 125, 223, and 225 and activating "and" circuits 122, 124, 222, and 224, causes conduction to shift from "and" circuit 124 and "or" circuit crystal 138 to "and" circuit 123 and "or" circuit crystal 137 and causes conduction to also be transferred from "and" circuit 225 and "or" circuit crystal 239 to "and" circuit 222 and "or" circuit crystal 236. Conduction is thereby shifted from lagging brushes 512 and 612 to leading brushes 510 and 610, which brushes symmetrically straddle transfer points of their respective circles, causing a change in output representation from the count of 11 to the count of 19 which is 1 less than the desired count of 20. The positive signal at the negative terminal of glow tube 850 is impressed forwardly through crystal 881 causing the output at terminal 490 to be modified from its normal "0" to a "1" increasing the normal converter output representation of 19 by 4 to the count of 23 which is 3 greater than the desired output representation of 20. When the negative terminal of glow tube 850 becomes positive, the output of inverting amplifier 880 drops to ground potential carrying with it the inputs of buffer amplifiers 288 and 188 by virtue of the forward currents now drawn through crystals 884 and 883, causing the outputs at terminals 290 and 190 to be modified from their normal "1's" to "0's," decreasing the count of 23 by 3 to the desired output representation of 20 during the ⑳ interval. Thus the ⑪—⑳ transfer point is controlled neither by a segment of first circle 100 nor by the segment of ninth circle 900, but rather by one of the critical ends of the segment of circle 800; and the segment of circle 800 not only causes an extra reversing brush reversing alternation, both changing the normal output representation and conditioning the converter for an unambiguous count, but also causes the modification of the normal to the desired output representation. Intermediate the ⑳ interval, preferably, though not necessarily, in the middle thereof, ninth circle input brush 910 contacts one of the noncritical ends of the segment of circle 900 thereby ensuring that the input of inverting amplifier 980 is positive. The input of inverting amplifier 980 is now positive for two reasons, either of which is sufficient; firstly, because brush 710 contacts the segment of circle 800 causing a positive signal at the negative terminal of glow tube 850 which is coupled forwardly through crystal 839, and secondly because brush 910 contacts the segment of circle 900. At the ⑳—⑲ transfer point first circle input brush 110 again lies intermediate the triple interval length segment of first circle 100 and is hence again ineffective to cause a change in output representation. However, at the ⑳—⑲ transfer point brush 710 breaks contact with the other of the critical ends of the segment of circle 800, removing the modification signal formerly appearing at the negative terminal of glow tube 850, thereby permitting the normal converter output representation of 19 to appear at output terminals 190 through 690 during the ⑲ interval. The signal formerly appearing at the negative terminal of glow tube 850 is no longer coupled through crystal 839; but since ninth circle input brush 910 now lies well in engagement with the segment of circle 900, output brush 920 continues positive and the output of inverting amplifier 980 continues at ground potential. It is seen then that during the second half of the ⑳ interval there is an overlapping of brush alternation signals at the input of inverting amplifier 980. Glow tube 950 introduces a voltage drop so that the positive signal at the input of inverting amplifier 980 is constant whether due to either signal acting alone or whether due to the overlapping of both signals. At the ⑳—⑲ transfer point then no brush alternation is suffered to occur. The count proceeds conventionally through the ⑲, ⑱, ⑰, ⑯, ⑮, and ⑭ intervals with conduction shifting between "and" circuits 122 and 124 and respectively associated "or" circuit crystals 136 and 138 and also between "and" circuits 222 and 224 and respectively associated "or" circuit crystals 236 and 238. At the ⑭—⑬ transfer point first circle input brush 110 lies intermediate the triple interval length space of first circle 100 and is hence ineffective to cause a change in output representation. However, at the ⑭—⑬ transfer point input brush 710 contacts one of the critical ends of the segment of circle 700 causing output brush 720 to become positive and causing the negative terminal of glow tube 750 to drop to ground potential. The normal converter output representation is still 14, which is 1 greater than the desired output representation of 13. The positive signal at seventh circle output brush 720 is impressed forwardly through crystal 781 causing the output at terminal 190 to be modified from its normal "0" to a "1" increasing the normal count of 14 to the count of 15 which is 2 greater than the desired output representation of 13. But the negative terminal of glow tube 750 in dropping to ground potential carries with it the input of buffer amplifier 288 by virtue of the forward current now drawn through crystal 783, modifying the output at terminal 290 from its normal "1" to a "0," and decreasing the count of 15 by 2 to the desired output representation of 13 during the ⑬ interval. The positive signal at seventh circle output brush 720 is coupled forwardly through crystal 739, thereby ensuring that the input of inverting amplifier 980 remains positive. The input of inverting amplifier 980 is now positive for two reasons either of which is sufficient; firstly because brush 710 contacts the segment of circle 700 causing a positive signal at output brush 720 which is coupled forwardly through crystal 739, and secondly because brush 910 contacts the segment of circle 900 causing a positive signal at output brush 920. Intermediate the ⑬ interval, preferably, though not necessarily, in the middle thereof, ninth circle input brush 910 breaks contact with the other of the noncritical ends of the segment of circle 900. But the input of inverting amplifier 980 continues positive because brush 710 still contacts the segment of circle 700, still causing a signal at output brush 720 which is coupled forwardly through crystal 739. It is seen then that during the first half of the ⑬ interval there is an overlapping of brush alternation signals at the input of inverting amplifier 980. Thus intermediate the ⑬ interval no brush alternation is suffered to occur. At the ⑬—④ transfer point first circle input brush 110 again lies intermediate the triple interval length space of circle 100 and is hence again ineffective to cause a change in output representation. However, at the ⑬—④ transfer point input brush 710 breaks contact with the other of the critical ends of the segment of circle 700, permitting seventh circle output brush 720 to drop to ground and removing all modification signals. Since a signal is no longer coupled through crystal 739 and since brush 910 now lies well out of engagement with the segment of circle 900, the input of inverting amplifier 980 drops to ground potential and its output becomes positive. This transfer of conduction from the input to the output of inverting amplifier 980, deactivating "and" circuits 122, 124, 222, and 224 and reactivating "and" circuits 123, 125, 223, and 225, causes conduction to be shifted from "and" circuit 124 and "or" circuit crystal 138 to "and" circuit 123 and "or" circuit crystal 137. Conduction is then transferred from lagging brushes 212 and 512 to leading brushes 210 and 510, which brushes symmetrically straddle transfer points of their respective circles, causing an unambiguous change in output representation to the count of 4 as desired. Because of the removal of all modification signals when brush 710 breaks contact with the segment of circle 700, the normal converter output representation of 4 is permitted to appear at the output terminals during the ④ interval. Thus the ⑬—④ transfer point is controlled neither by a segment of first circle 100 nor by the segment of ninth circle 900 but rather by the other of the critical ends of the segment of circle 700; and the segment of circle 700 not only causes an extra brush reversing alternation, both changing the normal output representation and conditioning the converter for an unambiguous increasing count, but also controls the modification of the normal to the desired output representation. The count proceeds conventionally through the ④, ⑤, ⑥, ⑦, ⑧, ⑨, ⑩, and ⑪ intervals with conduction shifting between "and" circuits 123 and 125 and between respectively associated "or" circuit crystals 137 and 139 and also between "and" circuits 223 and 225 and between respectively associated "or" circuit crystals 237 and 239. It is seen then that the brush reversing signal is controlled from the ⑪—⑳ transfer point to the mid-point of the ⑳ interval by circle 800, from the mid-point of the ⑳ interval to the ⑳—⑲ transfer point by overlapping signals from circles 800 and 900, from the ⑳—⑲ transfer point to the ⑭—⑮ transfer point by circle 900, from the ⑭—⑬ transfer point to the mid-point of the ⑬ interval by overlapping signals from circles 700 and 900, and from the mid-point of the ⑬ interval to the ⑬—④ transfer point by circle 700.

Table 26 shows the normal output representations at terminals 590 and 690 and the normal and modified representations at terminals 190, 290, and 490 and the modification controlling signal of circle 800 during the ⑳ interval which also controls an extra conditioning brush reversing alternation at the ⑳—⑪ transfer point, constituting a discontinuous peak between nonadjacent odd and even numbers, and the modification controlling signal of circle 700 during the ⑬ interval which also controls an extra conditioning brush reversing alternation at the ⑬—④ transfer point, constituting a discontinuous dip between nonadjacent odd and even numbers, and the brush reversing alternation signal of circle 900, which overlaps that of circle 800 during a portion of the ⑳ interval and overlaps that of circle 700 during a portion of the ⑬ interval, for the converter of FIGURE 26 as pattern A moves under the stationary brushes to successively occupy the intervals ⑱, ⑲, ⑳, ⑪, ⑩, ⑨, ⑧, ⑦, ⑥, ⑤, ④, ⑬, ⑭, ⑮, ⑯, ⑰, and ⑱ again.

| Interval | Outputs at Terminal | | | | | Binary Count | Decimal Count |
|---|---|---|---|---|---|---|---|
| | 690 | 590 | 490 | 290 | 190 | | |
| ⑦ | 0 | 0 | 1 | 1 | 1 | 00111 | 7 |
| ⑥ | 0 | 0 | 1 | 1 | 0 | 00110 | 6 |
| ⑤ | 0 | 0 | 1 | 0 | 1 | 00101 | 5 |
| ④ | 0 | 0 | 1 | 0 | 0 | 00100 | 4 |
| ⑬ | 0 | 1 | 1 | 1→0 | 0→1 | 01101 | 13 |
| ⑭ | 0 | 1 | 1 | 1 | 0 | 01110 | 14 |
| ⑮ | 0 | 1 | 1 | 1 | 1 | 01111 | 15 |
| ⑯ | 1 | 0 | 0 | 0 | 0 | 10000 | 16 |
| ⑰ | 1 | 0 | 0 | 0 | 1 | 10001 | 17 |
| ⑱ | 1 | 0 | 0 | 1 | 0 | 10010 | 18 |
| ⑲ | 1 | 0 | 0 | 1 | 1 | 10011 | 19 |
| ⑳ | 1 | 0 | 0→1 | 1→0 | 1→0 | 10100 | 20 |
| ⑪ | 0 | 1 | 0 | 1 | 1 | 01011 | 11 |
| ⑩ | 0 | 1 | 0 | 1 | 0 | 01010 | 10 |
| ⑨ | 0 | 1 | 0 | 0 | 1 | 01001 | 9 |
| ⑧ | 0 | 1 | 0 | 0 | 0 | 01000 | 8 |
| ⑦ | 0 | 0 | 1 | 1 | 1 | 00111 | 7 |

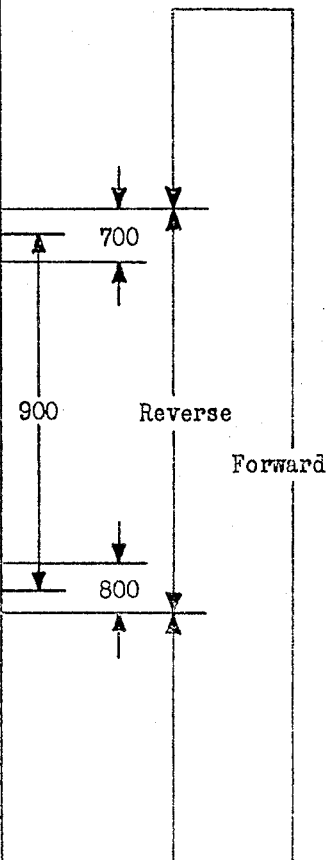

Table 26

In the converter of FIGURE 26 which, as the converter of FIGURE 25, embodies the first method of the first adaptation of the general method for producing functions containing a discontinuity between nonadjacent odd and even numbers accompanied by a change in slope sign such as to constitute a local minimum and also embodies the second method of the first adaptation of the general method for producing functions containing a discontinuity between nonadjacent odd and even numbers accompanied by a change in slope sign at the discontinuity such as to constitute a local maximum, neglecting the modification effect of circles 700 and 800 and considering only their brush reversing alternation effect, the count apparently proceeds 18, 19, 19, 11, 10, 9, 8, 7, 6, 5, 4, 14, 14, 15, 16, 17, and 18 again. Neglecting only the modification effect of circles 700 and 800 but considering their brush reversing alternation effect, then the count apparently contains a natural odd-odd discontinuous peak where, however, the segment subtending the discontinuous peak is of triple interval length such that the count of one of the odd numbers is apparently of double interval length; and the count apparently also contains a natural even-even discontinuous dip where, however, the space subtending the discontinuous dip is of triple interval length such that the count of one of the even numbers is apparently of double interval length. The effect of circle 800 is to artificially modify the middle interval of the triple interval length segment subtending the discontinuous peak, which middle interval is a portion of what appears to be the double interval length odd number, altering the count by 1 so as to actually represent the desired even number. The effect of circle 700 is to artificially modify the middle interval of the triple interval length space subtending the discontinuous dip, which middle interval is a portion of what appears to be the double interval length even number, altering the count by 1 so as to actually represent the desired odd number. In FIGURE 26 at the discontinuous peak the count apparently jumps from 11 to a double interval length count of 19; and the effect of circle 800 is to artificially modify that portion of what appears to be the double interval length count of 19 adjacent the count of 11, altering the apparent representation by 1 so as to actually represent the desired count of 20. In FIGURE 26 at the discontinuous dip the count apparently jumps from 4 to a double interval length count of 14; and the effect of circle 700 is to artificially modify that portion of what appears to be the double interval length count of 14 adjacent the count of 4, altering the apparent representation by 1 so as to actually represent the desired count of 13. The two critical ends of the segment of circle 800 are positioned intermediate the triple interval length segment (or space, if an inverse form is used) subtending what appears to be a natural discontinuous peak, one of the critical ends of the segment of circle 800 controlling by modification the transfer point between the two portions of what appears to be the double interval length odd number and the other of the critical ends of the segment of the modification circle 800 also controlling an extra brush reversing alternation determining the transfer point between the two counts comprising the discontinuous peak and conditioning the converter for an unambiguous count. The two critical ends of the segment of circle 700 are positioned intermediate the triple interval length space (or segment, if an inverse form is used) subtending what appears to be a natural discontinuous dip, one of the critical ends of the segment of circle 700 controlling by modification the transfer point between the two portions of what appears to be the double interval length even number and the other of the critical ends of the segment of the modification circle 700 also controlling an extra brush reversing alternation determining the transfer point between the two counts comprising the discontinuous dip and conditioning the converter for an unambiguous count. An additional circle, circle 900, having a segment neither end of which is critical, has one noncritical end positioned intermediate the middle interval of the triple interval length segment subtending the discontinuous peak and the other of its noncritical ends positioned intermediate the middle interval of the triple interval length space subtending the discontinuous dip and provides a brush reversing alternation signal which overlaps that of circle 800 during a portion of the middle interval of the triple interval length segment and overlaps that of circle 700 during a portion of the middle interval of the triple interval length space.

While in the converter of FIGURE 26 we have shown all intervals to be of equal length of arc so that the triple interval length segment (or space) subtending the discontinuous peak and the triple interval length space (or segment) subtending the discontinuous dip may readily be seen, it will be appreciated that the converter of FIGURE 26 is also adapted to provide a nonlinear count with corresponding variations in the lengths of the segments and spaces.

As will be apparent to those skilled in the art, the converter of FIGURE 26 is also amenable to the super-extension of count for interpattern transfer by the provision of an additional circle mounted on a pattern disk reduction geared to rotate with pattern A and provided with but a single input signal.

The actions of "and" circuits 122 through 125 and also 222 through 225 in combination with respectively associated "or" circuit crystals 136 through 139 and also 236 through 239 are those of electronic double-pole double-throw reversing switches. Since the actuations of the reversing switches help cause changes in output representation from the count of 11 to the count of 20, and also from the count of 4 to the count of 13, we desire that the operation be as fast as possible to prevent momentary ambiguities occasioned by response lags. The use of electronic reversing switches decreases the response lags to a minimum. It will be noted that the two complementary input signals to the fourth and sixth circles 400 and 600 are derived from that electronic reversing switch at the output terminals of which appear the two complementary output signals of circle 200; and the spacing for pairs of brushes 410 and 412 and also 610 and 612 is two interval lengths thus doubling the tolerances. It will be appreciated that the pairs of complementary input signals to circles 400 and 600 in the converter of FIGURE 26 may not, as in the converter of FIGURE 25, be derived simply from the output signals at brushes 220 and 320, because there is not the required even number of segments and spaces of circle 200 subtending the segment of circle 400 and because there is no transfer point of circle 200 at the ⑳—⑪ transfer point at which occurs a transfer point of circle 600. As the brushes move to the left at the ⑪—⑳ transfer point conduction is shifted from lagging brush 612 to leading brush 610 because of the actuation of that reversing switch at the output terminals of which appear the two complementary output signals of second circle 200. Since at the ⑪—⑳ transfer point brushes 612 and 610 symmetrically straddle a transfer point of circle 600, an unambiguous change in output representation occurs at terminal 690. Thus that electronic reversing switch comprising "or" circuit crystals 236 through 239 and "and" circuits 222 through 225 cures the defect that there is no transfer of circle 200 at the ⑳—⑪ transfer point where occurs a transfer point of circle 600. At the ⑯—⑮ transfer point conduction shifts from lagging brushes 412 and 612 to leading brushes 410 and 610, which brushes symmetrically straddle transfer points of their respective circles, causing an unambiguous change in output representation at terminals 490 and 690. At the ⑬—④ transfer point conduction shifts from lagging brush 212 to leading brush 210, which brushes symmetrically straddle transfer points of circles 200 and 300, causing conduction to be transferred from second circle output brush 220 to third circle output brush 320. At the same time, at the ⑬—④ transfer point conduction is shifted from brush 920 to the output of inverting amplifier 980. Thus at the ⑬—④ transfer point conduction is shifted not only from brush 920 to the output of inverting amplifier 980, actuating that reversing switch at the output terminals of which appear the two complementary output signals of circle 200, but also from brush 220 to brush 320. Conduction is then transferred from "and" circuit 222 and "or" circuit crystal 236 to "and" circuit 223 and "or" circuit crystal 237; but leading brushes 410 and 610 continue to carry signals. Thus at the ⑬—④ transfer point there is no transfer of conduction from leading brushes 410 and 610 to lagging brushes 412 and 612, rather leading brushes 410 and 610 continue positive. Thus that electronic reversing switch comprising "or" circuit crystals 236 through 239 and "and" circuits 222 through 225 also cures the defect that there is not the required even number of segments and spaces of circle 200 subtending the segment of circle 400. At the ⑦—⑧ transfer point, conduction shifts from lagging brush 412 to leading brush 410, which brushes symmetrically straddle a transfer point of circle 400, producing an unambiguous change in output representation at terminal 490.

The converter of FIGURE 26, as the converters of FIGURES 13 and 14 and 25, has a triple interval length segment and a triple interval length space; but the converter of FIGURE 26, as the converter of FIGURE 25, has an electronic reversing switch helping to cause a change in output representation while those of FIGURES 13 and 14 do not. Suppose in the converter of FIGURE 26, as was supposed in the converter of FIGURE 25, that crystals 739 and 839 were omitted and that there were no connection between brush 920 and either brush 720 or the negative terminal of glow tube 850. It will be appreciated that under the supposed circumstances no brush alternation signal would occur at either of the ⑪—⑳ and ⑬—④ transfer points, rather extra brush alternations would occur somewhere intermediate the ⑳ and ⑬ intervals as determined by the noncritical ends of the segment of circle 900. Under the supposed circumstances the brute-force modification methods of FIGURES 13 and 14 must be used to provide the necessary change in output representation at terminals 590 and 690 at the ⑪—⑳ transfer point and at terminals 290 and 590 at the ⑬—① transfer point. The more elegant method, the method shown in the converter of FIGURE 26, is to cause a brush alternation signal to occur precisely at the ⑪—⑳ transfer point so that the desired change in output representation occurs at terminals 590 and 690 without the necessity of modification and to also cause a brush alternation signal to occur precisely at the ⑬—④ transfer point so that the desired change in output representation occurs at terminals 290 and 590 without the necessity of modification. In the converters of FIGURES 13 and 14 and under the supposed circumstances in the converter of FIGURE 26 were crystals 739 and 839 omitted, then there would occur an overlapping of normal and modification signals at the output terminals. In the converter of FIGURE 26, as shown, while there is no overlapping of signals at the output terminals yet there is an overlapping of the brush alternation signals of circles 700 and 800 with that of circle 900 during a portion of the middle interval of the triple interval length segment and of the triple interval length space.

In FIGURE 26 the discontinuous peak is subtended by a triple interval length segment for the ⑪, ⑳, and ⑲ intervals and the discontinuous dip is subtended by a triple interval length space for the ⑭, ⑬, and ④ intervals. As has been previously explained, this disposition of the triple interval length segment and the triple interval length space leads to a natural discontinuous peak and a natural discontinuous dip as in the converter of FIGURE 21. Suppose in FIGURE 26 that the discontinuous peak were subtended by a triple interval length space for the ⑳, ⑪, and ⑲ intervals and that the discontinuous dip were subtended by a triple interval length segment for the ⑬, ④, and ⑤ intervals. This disposition of a triple interval length segment subtending the discontinuous dip and of a triple interval length space subtending the discontinuous peak would lead to a non-natural discontinuous peak and a non-natural discontinuous dip as in the converter of FIGURE 22. While the count of the converter of FIGURE 26 may be produced by such supposed disposition of a triple interval length space and a triple interval length segment, yet, as will be appreciated by those skilled in the art, such supposed disposition in leading to a non-natural discontinuous peak and a non-natural discontinuous dip would cause unnecessary additional complications including the necessity of providing an extra stage of electronic reversing switch cascading merely for the purpose of eliminating ambiguities as in the converter of FIGURE 22.

In the converters of FIGURES 25 and 26, as has just been explained, there occurs an overlapping of brush alternation signals at the junctions of crystals 739 with crystals 839 during a portion of the middle intervals of the triple interval length segments and spaces. In the converters of FIGURES 13 and 14, as has been previously explained, there occurs an overlapping of superextension signals at the junctions of crystals 539 with crystals 339 and 439 respectively during a portion of the middle interval of the triple interval length segment and space.

*Functions Containing Intermediate Discontinuities of a Non-Recycling Nature*

Suppose it is desired to produce a count proceeding 0, 1, 2, 0, 1, 2, 3, 1, 2, 3, 4, 5, 6, 7, 8, 9, 4, 5, 6, 7, 8, 9, 3, 4, 5, 6, 7, 8, 9, 10, 4, 5, 6, 7, 8, 9, 10, 3, 4, 5, 8, 9, 10, 16, 17, 18, 21, 22, 23, 29, 30, 31, and 0 again.

The count adjacent the 9–4 discontinuity thus proceeds 4, 5, 6, 7, 8, 9, 4, 5, 6, 7, 8, 9. This discontinuity is a natural discontinuity of a recycling nature between a large odd and a nonadjacent small even number. The solution of such natural recycling discontinuity is taught by Schaefer et al. and is further shown in the converters of FIGURES 7 and 8.

The count adjacent the 9–3 discontinuity thus proceeds 4, 5, 6, 7, 8, 9, 3, 4, 5, 6, 7, 8, 9. The solution of this recycling discontinuity between odd numbers is shown in the converters of FIGURES 9 and 10.

The count adjacent the 10–4 discontinuity thus proceeds 4, 5, 6, 7, 8, 9, 10, 4, 5, 6, 7, 8, 9, 10. The solution of this recycling discontinuity between even numbers is shown in the converters of FIGURES 11 and 12.

The count adjacent the 10–3 discontinuity thus proceeds 4, 5, 6, 7, 8, 9, 10, 3, 4, 5. This discontinuity is a non-natural discontinuity of a recycling nature between a large even and a non-adjacent small odd number. The solution of such non-natural recycling discontinuity is shown in the converters of FIGURES 13 and 14.

The count adjacent the 5–8 discontinuity thus proceeds 3, 4, 5, 8, 9, 10. The discontinuity is an intermediate discontinuity of a non-recycling nature. It will be noted that for simple discontinuities both of recycling and non-recycling natures there is no change in slope sign on either side of the discontinuity. However, for discontinuities of a recycling nature the sense of a discontinuous jump is such that the count is multiple-valued and tends to repeat itself, while for intermediate discontinuities of a non-recycling nature the sense of a discontinuous jump is such that the count is monotonic and does not tend to repeat itself. As a consequence of this difference between recycling and non-recycling discontinuities in the sense of the discontinuous jump, the only distinction between recycling and non-recycling discontinuities is that an even number in a recycling discontinuity is equivalent to an odd number in a non-recycling discontinuity and that an odd number in a recycling discontinuity is equivalent to an even number in a non-recycling discontinuity. While a natural recycling discontinuity consists of a jump between a large odd and a nonadjacent small even number, a natural non-recycling discontinuity consists of a jump between a large even and a nonadjacent small odd number. Thus the 5–8 discontinuity is a natural discontinuity of a non-recycling nature. The solution of such natural non-recycling discontinuity may be had in the manner taught by Schaefer et al. and further shown in the converters of FIGURES 7 and 8. Thus a count proceeding 4, 5, 8, 9, and 4 again contains both a natural recycling discontinuity and a natural non-recycling discontinuity and may be produced entirely in the manner taught by Schaefer et al. and further shown in the converters of FIGURES 7 and 8.

The count adjacent the 10–16 discontinuity proceeds 8, 9, 10, 16, 17, 18. The solution of this non-recycling discontinuity between even numbers may be had by the first and second methods shown in the converters of FIGURES 9 and 10, since, a recycling discontinuity between odd numbers is equivalent to a non-recycling discontinuity between even numbers. Thus a count proceeding 7, 8, 9, 10, 16, 17, 18, 19, and 7 again contains both a recycling and a non-recycling discontinuity and may be produced entirely by the first and second methods shown in the converters of FIGURES 8 and 10.

The count adjacent the 23–29 discontinuity proceeds 21, 22, 23, 29, 30, 31. The solution of this non-recycling discontinuity between odd numbers may be had by the first and second methods shown in the converters of the FIGURES 11 and 12, since a recycling discontinuity between even numbers is equivalent to a non-recycling discontinuity between odd numbers. Thus a count proceeding 20, 21, 22, 23, 29, 30, 31, 32, and 20 again contains both a recycling and a non-recycling discontinuity and may be produced entirely by the first and second methods shown in the converters of FIGURES 11 and 12.

The count adjacent the 18–21 discontinuity proceeds 16, 17, 18, 21, 22, 23. This discontinuity is an intermediate discontinuity of a non-recycling nature. While a non-natural recycling discontinuity consists of a jump between a large even and a non-adjacent small odd number, a non-natural non-recycling discontinuity consists of a jump between a large odd and a nonadjacent small even number. Thus the 18–21 discontinuity is a non-natural discontinuity of a non-recycling nature. The solution of such non-natural non-recycling discontinuity may be had by the adaptation of the first and second methods shown in the converters of FIGURES 13 and 14. Thus a count proceeding 13, 14, 15, 16, 17, 18, 21, 22, 23, 24, 25, 26, and 13 again contains both a non-natural recycling discontinuity and a non-natural non-recycling discontinuity and may be produced entirely by the adaptation of the first and second methods shown in the converters of FIGURES 13 and 14.

The count adjacent the 31–0 discontinuity proceeds 29, 30, 31, 0, 1, 2. This discontinuity is an external recycling discontinuity between the number 0 and a number which is 1 less than an integral power of the number 2. The solution of such external recycling discontinuous jump from the number 0 to a number which is 1 less than an integral power of the number 2 is taught by Jack B. Speller and will be further shown in the converters of FIGURES 29 and 30.

The count adjacent the 2–0 discontinuity proceeds 0, 1, 2, 0, 1, 2. The solution of this recycling discontinuity between even numbers is shown in the converters of FIGURES 1 through 6 and may further be had by the first and second methods shown in the converters of FIGURES 11 and 12.

The count adjacent the 3–1 discontinuity proceeds 1, 2, 3, 1, 2, 3. The solution of this recycling discontinuity between odd numbers may be had by the first and second methods shown in the converters of FIGURES 9 and 10.

Suppose it is desired to produce by the first method a count which proceeds 1, 2, 3, and 1 again. The arrangement of segments and spaces for a converter to produce such function by the first method is precisely as shown in FIGURE 1, but a few alterations in the connections are required. The junction of output terminal 290 and loading resistor 230 rather than being connected to output brush 220 must instead be connected to the junction of input brush 210 and the negative terminal of glow tube 150. The junction of output brush 120 and input loading resistor 128 rather than being directly connected to output terminal 190 must instead be connected forwardly through a first crystal (which would have the reference character 139) to output terminal 190. Output brush 220 rather than being connected to the junction of output terminal 290 and loading resistor 230 must instead be connected forwardly through a second crystal (which would have the reference character 281) to output terminal 190. A high impedance loading resistor (which would have the reference character 130) must be connected between ground and the junction of output terminal 190 and the cathodes of the first crystal (139) and the second crystal (281). With these alterations for the converter of FIGURE 1 the ② interval will now become a ③ interval, the ⓪ interval will now become a ② interval, and the ① interval will remain a ① interval. Having thus renumbered the intervals, the altered converter of FIGURE 1 is now shown in the ① interval adjacent the ①—③ transfer point. For the altered converter of FIGURE 1, during the ① interval output terminal 190 will carry a signal representing a "1," while output terminal 290 will rest at ground representing a "0"; during the ② interval output terminal 190 will rest at ground representing a "0," while output terminal 290 will carry a signal representing a "1"; and during the ③ interval both output terminals 190 and 290 will carry signals representing "1's." For the altered converter of FIGURE 1, intermediate the ① interval brush 210 will make or break contact with the noncritical end of the segment of circle 200, but this will not affect the output of "1" which will continue to exist at output terminal 190. For the altered converter of FIGURE 1 at the ①—③ transfer point there will be no change in the "1" which will continue to appear at output terminal 190; but during the ① interval it will be the output signal at brush 120 that will cause the "1" at output terminal 190, while during the ③ interval it will be the modification signal at output brush 220 which will cause the "1" at output terminal 190. At the ②—③ transfer point brush 210 will make or break contact with the critical end of the segment of circle 200. In the altered converter of FIGURE 1, which embodies the first method, omitting from consideration for the moment circle 200, the pattern appears to provide a nonlinear count alternating between 1 and 2, where the count of 2 is apparently of double interval length; and the effect of circle 200 is to modify one of the intervals of what appears to be the double interval length count of 2 into the desired count of 3. In the altered converter of FIGURE 1 the purpose of providing the first crystal (139) between the junction of output brush 120 and input loading resistor 128 and the junction of the high impedance loading resistor (130), the second crystal (281), and output terminal 190 is to prevent the modification signal at output brush 220 during the ③ interval from seeing the low impedance of input loading resistor 128. The purpose of providing the second crystal (281) is to prevent the signal at output terminal 190 during the ① interval from being impressed upon output terminal 290 and creating an ambiguity at the midpoint of the ① interval where brush 210 contacts the non-critical end of the segment of circle 200.

Suppose it is desired to produce by the second method a count which proceeds 1, 2, 3, and 1 again. The arrangement of segments and spaces for a converter to produce such function by the second method is precisely as shown in FIGURE 2, but a few alterations in the connections are required. Loading resistor 130 is not required and may be eliminated. The negative terminal of glow tube 150 rather than being connected to output terminal 190 must instead be connected to the junction of output terminal 290 and loading resistor 230. Output brush 220 rather than being directly connected to the junction of output terminal 290 and loading resistor 230 must instead be connected forwardly through a crystal (which would have the reference character 281) to the junction of output terminal 290, loading resistor 230, and the negative terminal of glow tube 150. Output terminal 190 rather than any of the connections shown must instead be connected to the junction of input brush 210, output brush 120, and input loading resistor 128. With these alterations for the converter of FIGURE 2 the ① interval will now become a ② interval, the ② interval will now become a ③ interval, and the ⓪ interval will now become a ① interval. Having thus renumbered the intervals, the altered converter of FIGURE 2 is now shown in the ② interval adjacent the ②—③ transfer point. For the altered converter of FIGURE 2 during the ① interval only output terminal 190 will carry a signal representing a "1," during the ② interval only output terminal 290 will carry a signal representing a "1," and during the ③ interval both output terminals 190 and 290 will carry signals representing "1's." For the altered converter of FIGURE 2 intermediate the ② interval brush 210 will make or break contact with the noncritical end of the segment of circle 200, but this will not affect the output of "1" which will continue at output terminal 290. For the altered converter of FIGURE 2 at the ②—③ transfer point there will be no change in the "1" which will continue to appear at output terminal 290; but during the ③ interval it will be the positive signal at the negative terminal of glow tube 150 that will cause the "1" at output terminal 290, while during the ③ interval it will be the modification signal at output brush 220 which will cause the "1" at output terminal 290. At the ③—① transfer point brush 210 will make or break contact with the critical end of the segment of circle 200. In the altered converter of FIGURE 2, which embodies the second method, omitting from consideration for the moment circle 200, the pattern appears to provide a nonlinear count alternating between 1 and 2, where the count of 1 is apparently of double interval length; and the effect of circle 200 is to modify one of the intervals of what appears to be the double interval length count of 1 into the desired count of 3. In the altered converter of FIGURE 2 the purpose of providing the crystal (281) between output brush 220 and the junction of output terminal 290, loading resistor 230, and the negative terminal of glow tube 150 is to prevent the signal representing a "1" at output terminal 290 during the ② interval from being impressed upon output terminal 190 and creating an ambiguity at the mid-point of the ② interval where brush 210 contacts the noncritical end of the segment of circle 200.

*Recycling Discontinuities for the Special Case of a Jump of Two Counts and Binary-Coded Ternary Counts by a Third Method*

For the special case where a recycling discontinuous jump is exactly two counts, as a jump between successive even numbers or a jump between successive odd numbers, there is a third method.

Suppose it is desired to produce by the third method a count which proceeds 0, 1, 2, and 0 again. This count contains a recycling discontinuity for the special case of a jump of exactly two counts between successive even numbers. The arrangement of segments and spaces for a converter to produce such function by the third method is precisely as shown in FIGURE 3, but a few alterations in the connections are required. The voltage produced by input excitation battery 10 must be doubled, as may be indicated schematically by a battery consisting of two cells rather than only one cell as shown. The positive terminal of battery 10, rather than being directly connected to input brush 110, must instead be connected through a low impedance input resistor (which would have the reference character 127) to input brush 110. Loading resistor 130 may be eliminated, and a low impedance input loading resistor (which would have the reference character 128) must be substituted with the same connections in its place. The junction of output terminal 290 and loading resistor 230 rather than being connected to the junction of output brush 220 and the input of inverting amplifier 280 must instead be connected through a neon glow tube (which would have the reference character 150) to the junction of input brush 110 and the input resistor (127). With these alterations for the converter of FIGURE 3, the ⓪ interval will now become a ② interval, the ② interval will now become a ⓪ interval, and the ① interval will remain a ① interval, so that the count now increases from right to left rather than from left to right. Having thus renumbered the intervals, the altered converter of FIGURE 3 is now shown at the ①—⓪ transfer point. For the altered converter of FIGURE 3, as is shown in Table 3-4, during the ① interval output terminal 190 will carry a signal representing a "1," while output terminal 290 will rest at ground representing a "0"; during the ② interval output terminal 190 will rest at ground representing a "0," while output terminal 290 will carry a signal representing a "1"; and during the ⓪ interval both output terminal 190 and 290 will rest at ground representing "0's." For the altered converter of FIGURE 3, intermediate the ② interval brush 210 will make or break contact with the noncritical end of the segment of circle 200, but this will not affect the output of "0" which will continue to exist at output terminal 190. For the altered converter of FIGURE 3, during the ⓪ interval it will be the modification signal at output brush 220 causing the output of inverting amplifier 280 to drop to ground which will produce the "0" at output terminal 190. At the ⓪—① transfer point brush 210 will make or break contact with the critical end of the segment of circle 200. In the altered converter of FIGURE 3, which embodies the third method, omitting from consideration for the moment circle 200, the pattern appears to provide a nonlinear count alternating between 1 and 2, where the count of 1 is of double interval length; and the effect of second circle 200 is to modify one of the intervals of what appears to be the double interval length count of 1 into the desired count of 0.

Suppose it is desired to produce by the third method an internally cyclic count in the ternary code which proceeds 0, 1, 2, 3, 4, 5, 6, 7, 8, and 0 again. This count in the ternary code contains internal recycling discontinuities for the special case of jumps of exactly two counts between the successive even numbers 2 and 0. The arrangement of segments and spaces of circles 100 through 300 for a converter to produce such function by the third method is precisely as shown in FIGURE 6, but an alteration in the connections is required. The junction of output terminal 290 and loading resistor 230 rather than being connected to the junction of output brush 220 and the input of inverting amplifier 280 must instead be connected to the negative terminal of glow tube 150. With this alteration for the converter of FIGURE 6, the ⑧ interval will now become a ⓪ interval, the ⑦ interval a ① interval, the ⑥ interval a ② interval, the ⑤ interval a ③ interval, the ④ interval will remain a ④ interval, the ③ interval will now become a ⑤ interval, the ② interval a ⑥ interval, the ① interval a ⑦ interval, and the ⓪ interval will now become an ⑧ interval, so that the count now increases from right to left rather than from left to right. Having thus renumbered the intervals the altered converter of FIGURE 6 is now shown at the ①—③ transfer point. However, an alteration is required in the disposition of circles 400 and 500. Circles 400 and 500 must be so redisposed that the segment of circle 400 and the space of circle 500 subtend the renumbered ⑧, ⑦, and ⑥ intervals. The operation of the altered converter of FIGURE 6 for circles 100 and 200 will be identical to that of the altered converter of FIGURE 3. The outputs at terminals 190 through 490 will be as shown in Table 6. The internal recycling transfer points in the altered converter of FIGURE 6, as in the converter of FIGURE 6, are controlled by the segments of first circle 100; and hence the two complementary input signals to circles 300 through 500 in the altered converter of FIGURE 6, as in the converter of FIGURE 6, are derived from the two complementary output signals of first circle 100. The operation of the altered converter of FIGURE 6 for circles 300 through 500 will be identical to that of the converter of FIGURE 6.

Suppose it is desired to produce by the third method a count which proceeds 1, 2, 3, and 1 again. This count contains a recycling discontinuity for the special case of a jump of exactly two counts between successive odd numbers. The arrangement of segments and spaces for a converter to produce such function by the third method is precisely as shown in FIGURE 4, but a few alterations in the connections are required. Buffer amplifier 188 and summing resistor 132 are no longer required components and may be eliminated. The ungrounded end of loading resistor 130 must be directly connected to output terminal 190 so that all connections to the junction of input brush 210 and the negative terminal of glow tube 150 are eliminated. The junction of output brush 120 and input loading resistor 128 must be connected forwardly through a crystal (which would have the reference character 139) to the junction of output terminal 190 and loading resistor 130. The junction of output brush 220 and the input of inverting amplifier 289 rather than being connected to the ungrounded terminal of loading resistor 230 must instead be connected forwardly through a second crystal (which would have the reference character 281) to the junction of output terminal 190, loading resistor 130, and the cathode of the first crystal (139). The anode of crystal 283 rather than any of the connections shown must instead be connected to the ungrounded terminal of loading resistor 230. The ungrounded terminal of loading resistor 230 rather than being directly connected to output terminal 290 must instead be connected to the input of a buffer amplifier (which would have the reference character 288). The output of this buffer amplifier (288) must be directly connected to output terminal 290. The junction of the anode of crystal 283, the input of the buffer amplifier (288), and the ungrounded terminal of loading resistor 230 must also be connected through a voltage dividing resistor (which would have the reference character 231) to the positive terminal of input excitation battery 10. With these alterations for the converter of FIGURE 4 the ⓪ interval will now become a ③ interval, the ① interval will now become a ② interval, and the ② interval will now become a ① interval. Having thus renumbered the intervals, the altered converter of FIGURE 4 is now shown at the ①—② transfer point. For the altered converter of FIGURE 4, during the ① interval only output terminal 190 will carry a signal representing a "1," during the ② interval only output terminal 290 will carry a signal representing a "1," and during the ③ interval both output terminal 190 and 290 will carry signals representing "1's." For the altered converter of FIGURE 4, intermediate the ③ interval brush 210 will make or break contact with the noncritical end of the segment of circle 200, but this will affect neither of the "1's" which will continue to exist at output terminal 190 and 290. For the altered converter of FIGURE 4, during the ① interval, it will be the modification signal at output brush 220 which will produce the "1" at output terminal 190; and it will further be the modification signal at output brush 220 causing the output of inverting amplifier 280 to drop to ground which will produce the "0" at output terminal 290. At the ①—② transfer point brush 210 will make or break contact with the critical end of the segment of circle 200. In the altered converter of FIGURE 4, which embodies the third method, omitting from consideration for the moment both circle 200 and the input excitation voltage signal produced at the junction of the voltage dividing resistor (231) and loading resistor 230, the pattern appears to provide a nonlinear count alternating between 1 and 0, where the count of 0 is of double interval length. In the altered converter of FIGURE 4, omitting from consideration for the moment circle 200, but considering the input excitation voltage signal at the junction of loading resistor 230 and the voltage dividing resistor (231), the pattern now apears to provide a nonlinear count alternating between 3 and 2, where the count of 2 is of double interval length. Thus the input excitation voltage signal appearing at output terminal 290 apparently increases the count of all intervals by 2. In the altered converter of FIGURE 4, the effect of circle 200 is to modify one of the intervals of what appears to be the double interval length count of 2 into the desired count of 1. The output signal at terminal 290 thus consists of a constant input excitation voltage signal which however is subjected to modification. We shall again show in the converter of FIGURE 30 an output terminal signal consisting of a constant input excitation voltage signal subjected however to modification.

It will be appreciated that the altered converters of FIGURES 1 through 4 are adapted to provide a nonlinear count with corresponding variation in the lengths of arc subtended by the segments and spaces. It will be further appreciated that in the altered converter of FIGURE 6, if only one pattern disk is used and hence interdisk cascading not required, then, the count may if desired be made nonlinear; but if two or more pattern disks are used to increase the count geometricaly by a factor and hence interdisk cascading is required, then the count must of necessity be linear.

As will be appreciated by those skilled in the art, the arrangement of segments and spaces for an inverse form of a converter to produce by the first method a count proceeding 1, 2, 3, and 1 again is precisely as shown in FIGURE 2; the arrangement of segments and spaces for an inverse form of a converter to produce by the second method a count proceeding 1, 2, 3, and 1 again is precisely as shown in FIGURE 1; the arrangement of segments and spaces for an inverse form of a converter to produce by the third method a count proceeding 1, 2, 3, and 1 again is precisely as shown in FIGURE 3; and the arrangement of segments and spaces for an inverse form of a converter to produce by the third method a count proceeding 0, 1, 2, and 0 again is precisely as shown in FIGURE 4; but a few alterations in connections, with corresponding renumbering of intervals, must be made in the manner just described.

*Intermediate Nonrecycling Discontinuities by the Method of Interpattern Transfer*

Intermediate non-recycling discontinuities may also be produced by the method of interpattern transfer.

Suppose in FIGURE 11 that the superextended count is 15 rather than 11 as shown. This would require the elimination of crystal 784. The elimination of crystal 784 causes the count during the superextended interval to be increased by 4, thereby increasing the superextended representation from 11 to 15. Now if in FIGURE 11 as thus altered the count of pattern X proceeds 15, 16, 17, 18, 19, and 15 again with the interval of the count of 15 subjected to superextension such as to selectively represent the count of 4, then we may produce an externally cyclic count proceeding 4, 5, 6, 7, 8, 9, 10, 15, 16, 17, 18, 19, and 4 again, having a natural recycling discontinuity between the large odd and nonadjacent small even numbers 19 and 4 respectively and having a non-natural non-recycling discontinuity between the large odd and nonadjacent small even numbers 15 and 10 respectively. Suppose in FIGURE 12 that the superextended count is 19 rather than 3 as shown. This would require that seventh circle output brush 720 be directly connected to an additional output terminal, which terminal would have the reference character 590. A "1" at such output terminal, 590, would represent a count of 16, thus causing the count during the superextended interval to be increased by 16, and thereby increasing the superextended representation from 3 to 19. Now if in FIGURE 12 as thus altered, the count of pattern X again proceeds 15, 16, 17, 18, 19, and 15 again but with the interval of the count of 19 subjected to superextension such as to selectively represent the count of 10, then we may produce an externally cyclic count again proceeding 4, 5, 6, 7, 8, 9, 10, 15, 16, 17, 18, 19, and 4 again, having a natural recycling discontinuity between the large odd and nonadjacent small even numbers 19 and 4 respectively and having a non-natural non-recycling discontinuity between the large odd and nonadjacent small even numbers 15

145 and 10 respectively. For each of FIGURES 11 and 12 as thus altered, the count of pattern A contains only a recycling discontinuity between even numbers; and the count of pattern X contains only a recycling discontinuity between odd numbers. Thus we have produced a non-natural non-recycling discontinuity by interpattern transfer between patterns embodying only the first or second methods and containing only a double interval length segment or a double interval length space. As has been previously explained, if a non-natural non-recycling discontinuity is produced by but a single pattern, then the pattern must embody the adaptation of the first method or the adaptation of the second method and must contain a triple interval length segment or a triple interval length space. For converters of limited rotation which produce non-cyclic, aperiodic functions, there is no limitation on the rotation of any pattern disk; and all functions, including intermediate non-recycling discontinuities, may be produced by interpattern transfer between patterns containing only a simple discontinuity. However, for cyclic, periodic functions, the method of interpattern transfer between patterns containing only simple discontinuities is workable only if the non-recycling discontinuities are so spaced apart that the separation distance is integrally divisible into the period, because of the limitation that the rotation of each pattern be integrally divisible into the period.

Nonrecycling and Recycling Non-Natural Discontinuities by a Method Alternative to FIGURES 13 and 14

Non-natural discontinuities both of a nonrecycling nature and of a recycling nature may also be produced by an alternative method in a manner which is, perhaps, simpler than the adaptation of the first and second methods of FIGURES 13 and 14.

Suppose it is desired to produce by the alternative method a count proceeding 7, 8, 9, 10, 5, 6, and 7 again, having a non-natural recycling discontinuity between the large even number 10 and the small odd number 5. The arrangement of segments and spaces for a converter to produce such count by the alternative method is shown in FIGURE 7, but a few alterations are required. An additional circle must be mounted on pattern A. The segment of this additional circle must subtend the entire ④ interval and half of each of the ⑨ and ⑤ intervals. Thus the two noncritical transfer points of the additional circle are placed at the midpoints of the ⑨ and ⑤ intervals, respectively. The single input brush to the additional circle must be connected to the negative terminal of glow tube 550. The output signal of the additional circle is used to modify the normal output representation of 4 into the desired count of 10. Hence the output signal of the additional circle must modify the output at terminal 390 from its normal "1" to a "0" and must modify the outputs at terminals 290 and 490 from their normal "0's" to "1's." In FIGURE 7 the input of inverting amplifier 680, rather than being connected to output brush 620, must instead be connected to the output brush of the additional circle. Finally, crystal 684 must be eliminated so that, during what will now be the modified ⑩ interval, the normal output representation of "0" will be permitted to appear at terminal 190.

Suppose it is desired to produce by the alternative method a count proceeding 6, 7, 8, 3, 4, 5, and 6 again, having a non-natural recycling discontinuity between the large even number 8 and the small odd number 3. The arrangement of segments and spaces for a converter to produce such count by the alternative method is shown in FIGURE 8, but a few alterations are required. An additional circle must be mounted on pattern A. The segment of this additional circle must subtend the entire ⑨ interval and half of each of the ⑧ and ④ intervals. Thus the two noncritical transfer points of the additional circle are placed at the midpoints of the ⑧ and ④ intervals, respectively. The single input brush to the additional circle must be connected to output brush 120. The output signal of the additional circle is used to modify the normal output representation of 9 into the desired count of 3. Hence the output signal of the additional circle must modify the output at terminal 490 from its normal "1" to a "0" and must modify the output at terminal 290 from its normal "0" to a "1." In FIGURE 8 the input of inverting amplifier 680, rather than being connected to output brush 620, must instead be connected to the output brush of the additional circle. Finally, crystal 684 must be eliminated so that, during what now will be the modified ③ interval, the normal output representation of "1" will be permitted to appear at terminal 190.

It will be appreciated that the alternative method may also be used to produce non-natural discontinuities of a nonrecycling nature.

In the alternative method for producing non-natural discontinuities, first circle 100 does not contain a triple-interval-length segment or space as in the adaptation of the first and second methods of FIGURES 13 and 14. Rather, in the alternative method of producing non-natural discontinuities, we use a converter which apparently provides a count containing a natural discontinuity, where each segment and space subtends only one count; and an additional circle, having two noncritical transfer points, modifies one of the two counts comprising what appears to be the natural discontinuity into a different count, thereby to create the desired non-natural discontinuity. The segment of the additional circle subtends the interval to be modified and half of each of the two adjacent intervals. It will be noted that the alternative method for producing non-natural discontinuities is similar to the first special method of FIGURES 15 and 16, since the additional circle which must be provided in FIGURES 7 and 8 is equivalent to circles 200 of FIGURES 15 and 16. Furthermore, the same principle applies for circles 700 in FIGURES 22 and 23 and for circles 800 in FIGURES 22 and 24, since these circles also have two noncritical transfer points; and the single input signal to these circles is obtained from first circle 100.

Cyclic Converters for Periodic, Repetitive Functions, and More Particularly for the Sine Function Referring now to FIGURE 27, we have shown a stepwise incremental approximation to the absolute value of the sine function, which has a maximum value of 1, where the number of steps or increments is 8 and the resolution or incremental change is $2^{-3}$ or 1/8.

For a digital representation of a continuous nonlinear function the steps or increments in the value of the function are all equal, each successive increment being represented by a change of 1 for the least significant digit of the representation, while the arguments at which occur such incremental changes in the value of the function vary in a nonlinear mode as determined by the transfer points between segments and spaces of a converter pattern.

Obviously any incremental or digital approximation to a continuous function has some inherent error. There are many methods of selecting the points of incremental change of the function to minimize this error so that it is not objectionable.

One manner of selecting the points of incremental change in the function is by the method of least squares. The error criterion of the method of least squares will be satisfied if the point of incremental change occurs at that value of the argument corresponding to half the incremental change of the function, so that the maximum positive error and the maximum negative error in each interval are equal to each other and to half the incremental change. Suppose that the point of incremental change is slightly displaced such that, for example, the maximum negative error is slightly greater than the maximum positive error. The integral of the square of the errors over an interval will be diminished for that portion of the summation due the square of the positive errors and will be augmented for that portion of the summation due to the square of the negative errors. But upon general considerations it will be appreciated that diminution in the summation will be more than counteracted by the augmentation of the summation, and that the integral of the square of the errors over an interval will be a minimum only if the maximum positive error and the maximum negative error are equal.

Another manner of selecting the points of incremental change in the function is the error criterion that the average error over an interval be zero. If $y$ is the value of the function to be represented, and $\theta$ is the argument of the function, which is related by some constant of proportionality to the shaft rotation of a converter, and $r$ is the desired resolution or incremental change in the stepwise approximation to the value $y$ of the function, which is equal to a change of 1 for the least significant digit of the representation of the function, and $k$ is an integer equal to the number of equal steps or increments $r$ by which the value $y$ of the function is displaced from 0, which if expressed in terms of the resolution $r$ is equal to the digital representation of the function, and $\theta_s$ is the value of the argument $\theta$ for a point of incremental change as determined by the least squares error criterion that the maximum positive and negative errors in each interval are equal to each other and to half the incremental change $r$, and $\theta_0$ is the value of the argument $\theta$ for a point of incremental change as determined by the error criterion that the average error over an interval be zero;

then in general, $$y = f(\theta)$$
$$\theta = F(y)$$
$$y_k = kr$$
$$y_{k-1} = kr - r$$

where $r$ is a constant such that for all values of $k$ for functions at least piecewise continuous $$r = y_k - y_{k-1}$$

and, $$\theta_k = F(kr)$$
$$\theta_{k-1} = F(kr - r)$$

and, $$\theta_s = F(kr - r/2)$$

$$\theta_0 = kF(kr) - (k-1)F(kr-r) - \frac{1}{r}\int_{\theta_{k-1}=F(kr-r)}^{\theta_k=F(kr)} f(\theta)d\theta$$

$$= \frac{1}{r}\int_{y_{k-1}=kr-r}^{y_k=kr} f(y)dy$$

and, more particularly for the sine function, where $$f(\theta) = \sin \theta$$
$$F(y) = \sin^{-1} y$$

then, for the sine function $$y = \sin \theta$$
$$\theta = \sin^{-1} y$$

and, $$\theta_s = \sin^{-1}(kr - r/2)$$

$$\theta_0 = k\sin^{-1} kr - (k-1)\sin^{-1}(kr-r) + \frac{1}{r}\cos\sin^{-1}kr$$
$$- \frac{1}{r}\cos\sin^{-1}(kr-r)$$
$$= k\sin^{-1} kr - (k-1)\sin^{-1}(kr-r) + \frac{1}{r}\sqrt{1-(kr)^2}$$
$$- \frac{1}{r}\sqrt{1-(kr-r)^2}$$

where $\theta_0$ is expressed in radians.

Table 27 shows the locations in degrees, minutes, and seconds of the transfer points for the sine function approximated in eight steps or increments, where the corresponding resolution is $2^{-3}$ or 1/8, for the arguments $\theta_s$ as determined by the least squares error criterion that the maximum positive and negative errors in each interval be equal to one another and to half the incremental change $r$ and for the arguments $\theta_0$ as determined by the zero average error criterion that the integral of the error over an inteval be zero; and further shows the difference $\theta_0 - \theta_s$ between the points of incremental change for these two error criteria.

| Transfer Point | k | kr - r/2 | Least Squares $\theta_s$ | Zero Average Error $\theta_0$ | $\theta_0 - \theta_s$ |
|---|---|---|---|---|---|
| (0) - (1/8) | 1 | 1/16 | 3°35' 0" | 3°35' 9" | 9" |
| (1/8) - (1/4) | 2 | 3/16 | 10°48'25" | 10°48'50" | 25" |
| (1/4) - (3/8) | 3 | 5/16 | 18°12'36" | 18°13'27" | 51" |
| (3/8) - (1/2) | 4 | 7/16 | 25°56'40" | 25°58' 0" | 1'20" |
| (1/2) - (5/8) | 5 | 9/16 | 34°13'44" | 34°16' 0" | 2'16" |
| (5/8) - (3/4) | 6 | 11/16 | 43°25'57" | 43°30' 0" | 4' 3" |
| (3/4) - (7/8) | 7 | 13/16 | 54°20'27" | 54°29'51" | 9'24" |
| (7/8) - (1) | 8 | 15/16 | 69°38' 9" | 70°46'45" | 1°8'36" |

$$r = 2^{-3} = 1/8$$

Table 27

FIGURE 27 is so aligned with FIGURE 28 that vertical construction lines, not shown, from the points of incremental change in the value of the function correspond to transfer points between segments and spaces of a converter pattern.

Referring now to FIGURE 28, a source of input excitation voltage, battery 10, has its negative terminal grounded and its positive terminal connected through an input resistor 127 to an input brush 110, disposed to alternately contact the conductive segments and nonconductive intersegmental spaces of a first circle 100. A first circle output brush 120, stationarily disposed to always be in electrical contact with the segments of first circle 100, is connected to first circle output terminal 190 and to ground through an input loading resistor 128. First circle output brush 120 is connected to relay contacts 661 and 665. First circle input brush 110 is connected through a neon glow tube 150 to relay contacts 664 and 662. Relay armatures 663 and 666 normally engage relay contacts 661 and 664 respectively. The relay contact and armature circuit comprising the components 661 through 666 is connected as a double-pole double-throw reversing switch. Armature 663 is connected forwardly through a crystal 196 to one input brush 210 of a pair of input brushes 210 and 212 stationarily disposed to alternately contact the segments and spaces of a second circle 200. Armature 666 is connected forwardly through a crystal 198 to brush 212. Second circle output brush 220 is connected to second circle output terminal 290 and to ground through a loading resistor 230. Intermeshing with second circle 200 is a third circle 300, the segments of circle 300 occupying the intersegmental spaces of circle 200 and the intersegmental spaces of circle 300 being occupied by the segments of circle 200. Brushes 210 and 212 simultaneously provide complementary input signals to both the second circle 200 and the third circle 300. Third circle output brush 320 is connected to relay contacts 764 and 762. Second circle output brush 220 is also connected to relay contacts 761 and 765. Relay armatures 763 and 766 normally engage relay contacts 761 and 764 respectively. The relay contact and armature circuit comprising the components 761 through 766 is connected as a double-pole double-throw reversing switch. Armature 763 is connected forwardly through a crystal 296 to one input brush 410 of a pair of input brushes 410 and 412 stationarily disposed to alternately contact the conductive segments and nonconductive intersegmental spaces of a fourth circle 400. Armature 766 is connected forwardly through a crystal 298 to brush 412. Fourth circle output brush 420 is connected to fourth circle output terminal 490 and to ground through a loading resistor 430. Partially intermeshing with the fourth circle 400 is a fifth circle 500, which has only one segment occupying one of the intersegmental spaces of circle 400. Brushes 210 and 212 simultaneously supply complementary input signals to both circles 400 and 500. Fifth circle output brush 520 is connected to fifth circle output terminal 590 and to ground through a loading resistor 530. The positive terminal of input excitation voltage battery 10 is also connected through an input resistor 627 to an input brush 610, stationarily disposed to alternately contact the equal segment and space of a sixth circle 600. Sixth circle output brush 620 is connected to one terminal of a relay actuating winding 660, the other terminal of which is grounded. Relay actuating winding 660 simultaneously operates relay armatures 663, 666, 763, and 766. Circles 100 through 600 are concentrically mounted on a first pattern disk A which is shown cut along line A and developed. Line A corresponds to the 0, 180, and 360 degree points of the sine function. Upon a second disk B—C, reduction geared to rotate with pattern disk A such that for one revolution of disk B—C pattern disk A rotates through two revolutions, is mounted a seventh circle 700. Line B corresponds to the 0 and 360 degree points of the sine function; and line C corresponds to the 180 degree point of the sine function. Sixth circle output brush 620 is connected forwardly through a crystal 696 to one input brush 710 of a pair of input brushes 710 and 712, stationarily disposed to alternately contact the equal segment and space of the seventh circle 700. Sixth circle input brush 610 is connected through a neon glow tube 650 to brush 712. Brushes 710 and 712 are spaced apart half the length of arc subtended by the equal segment or space of circle 700. Seventh circle output brush 720 is connected to ground through a loading resistor 730 and to the positive terminal of a battery 714, the negative terminal of which is connected to seventh circle output terminal 790.

Brushes 210 and 212 are spaced apart a length of arc equal to that subtended by the segment representing the ①/⑧ interval. The ①/⑧ interval is not in this case the minimum interval since the ⓞ interval is slightly smaller. However, none of the transfer points of circles 200 and 300 coincide with those transfer points of first circle 100 which define the ⓞ interval. Hence in this case brushes 210 and 212 have a spacing which is only slightly larger than the minimum length of the ⓞ interval and which is much less than the maximum length of the ① interval. Brushes 410 and 412 are spaced apart a length of arc equal to the ①/④ plus the ③/⑧ interval, which for circles 200 and 300 is the minimum length of a segment or space.

The resistance value of relay actuating winding 660 should preferably be equal to the resistance value of input resistor 627, since winding 660 in addition to controlling the relay armatures also acts as a low impedance input loading resistor upon the low impedance input resistor 627 so that complementary output signals are produced at output brush 620 and the negative terminal of glow tube 650.

The output signal at terminal 790 appends the plus or minus sign to the sine function. The purpose of battery 714 is more didactic than functional, battery 714 being provided so that a positive sign of the function is associated with a positive voltage at output terminal 790 and a negative sign of the function is associated with a negative voltage at output terminal 790. Accordingly the negative voltage supplied by battery 714 may be one-quarter the positive voltage of input excitation battery 10, which is shown schematically by providing four cells for battery 10 and one cell for battery 714.

In operation of the converter of FIGURE 28 the output signal at terminal 190 represents the least significant digit of the binary count, which changes in increments of 1/8 or $2^{-3}$. The output at terminal 290 represents 1/4 or $2^{-2}$; the output at terminal 490 represents 1/2 or $2^{-1}$; the output at terminal 590 represents 1 or $2^0$; and as explained before the plus or minus sign appears at output terminal 790. The converter is shown intermediate the ① interval at 90° where the value of the sine function is +1. As the brushes move to the right, brush 610 contacts one of the noncritical ends of the segment of circle 600, energizing relay actuating winding 660, drawing armatures 663 and 666 from their normal engagement with respective contacts 661 and 664 into engagement with respective contacts 662 and 665, drawing armatures 763 and 766 from their normal engagement with respective contacts 761 and 764 into engagement with respective contacts 762 and 765, and thereby causing conduction to shift from leading brushes 212 and 412 to lagging brushes 210 and 410. No change in output representation occurs however, since brushes 210 and 212 contact the same segment of circle 300 and since brushes 410 and 412 contact the same segment of circle 500. This extra brush reversing alternation at 90°, controlled not by first circle 100 but rather by one of the non-critical ends of circle 600, conditions the converter for an unambiguous decreasing count in the second quadrant of the sine function. The energization of relay actuating winding 660 adjacent 90° also causes conduction to shift from leading brush 712 to lagging brush 710; but, since both brushes contact the segment of circle 700, the voltage at output terminal 790 continues positive indicating that the sign of the function continues positive. It will be noted that no crystal need be provided between the negative terminal of glow tube 650 and brush 712, since the impedance of the glow tube is essentially infinite so long as its firing voltage is not exceeded. As the brushes continue to move to the right, the count proceeds conventionally through the remaining half of the ① interval, through the ⑦/⑧, ③/④, ⑤/⑧, ①/②, ③/⑧, ①/④, and ①/⑧ intervals, and through half the ⓞ interval to produce the value of the sine function in the second quadrant between 90° and 180° where the sign of the function is positive as indicated by a positive voltage at output terminal 790. At 180° intermediate the ⓞ interval, brush 610 breaks contact with the other of the noncritical ends of the segment of circle 600, deenergizing relay actuating winding 660, permitting armatures 663 and 666 to disengage respective contacts 662 and 665 and return to normal engagement with respective contacts 661 and 664, permitting armatures 763 and 766 to disengage respective contacts 762 and 765 and return to normal engagement with respective contacts 761 and 764, and thereby causing conduction to shift from lagging brushes 210 and 410 to leading brushes 212 and 412. No change in output representation occurs, however, since brushes 210 and 212 contact the same segment of circle 300 and since brushes 410 and 412 both lie within intersegmental spaces of circles 400 and 500. This extra brush reversing alternation at 180°, controlled not by first circle 100 but rather by the other of the noncritical ends of the segment of circle 600, conditions the converter for an unambiguous count in the third quadrant where the absolute value of the sine function is increasing. The de-energization of relay actuating winding 660 adjacent 180° also causes conduction to shift from lagging brush 710 to leading brush 712, which brushes symmetrically straddle a transfer point of the seventh circle 700, permitting output brush 720 to drop to ground and causing the voltage at output terminal 790 to become negative and thereby indicate that the sign of the function becomes negative. The count proceeds conventionally through the remaining half of the ⓪ interval, through the ①/⑧, ①/④, ③/⑧, ①/②, ⑤/⑧, ③/④, and ⑦/⑧ intervals, and through half the ① interval to produce the value of the sine function in the third quadrant between 180° and 270° where the sign of the function is negative as indicated by a negative voltage at output terminal 790. At 270° intermediate and ① interval, brush 610 again contacts a noncritical end of the segment of circle 600, energizing relay actuating winding 660, actuating the two reversing switches comprising the components 661 through 666 and 761 through 766, and causing conduction to shift from the leading brushes 212 and 412 to the lagging brushes 210 and 410. However, no change in output representation occurs. This extra brush alteration at 270° conditions the converter for an unambiguous count in the fourth quadrant where the absolute value of the sine function is decreasing. The energization of winding 660 adjacent 270° causes conduction to shift from leading brush 712 to lagging brush 710; but, since both brushes 710 and 712 lie within the intersegmental space on the lower half of circle 700, the voltage at output terminal 790 continues negative indicating that the sign of the function continues negative. Thus far we have described the operation for a complete revolution of pattern disk A and for half a revolution of pattern disk B—C. The count proceeds conventionally to produce the value of the sine function in the fourth quadrant between 270° and 0° where the sign of the function is negative as indicated by a negative voltage at output terminal 790. Intermediate the ⓪ interval at 0° brush 610 again breaks contact with a noncritical end of the segment of circle 600, de-energizing relay winding 660, de-actuating the two reversing switches comprising the components 661 through 666 and 761 through 766, and causing conduction to shift from lagging brushes 210 and 410 to leading brushes 212 and 412. However no change in output representation occurs. This extra brush reversing alternation at 0° conditions the converter for an unambiguous increasing count in the first quadrant of the sine function. The de-energization of winding 660 adjacent 0° causes conduction to shift from lagging brush 710 to leading brush 712, which brushes symmetrically straddle a transfer point of circle 700, causing the voltage at output terminal 790 to become positive and thereby indicate that the sign of the function becomes positive. The count proceeds conventionally to produce the value of the sine function in the first quadrant between 0° and 90° where the sign of the function is positive as indicated by a positive voltage at output terminal 790. Intermediate the ① interval at 90° again pattern disk B—C has completed one full revolution, and pattern disk A has completed two revolutions.

Table 28, Col. 153, shows the digital outputs at terminals 190, 290, 490, and 590 and the sign outputs at terminal 790 and the extra conditioning brush reversing alternations intermediate the ⓪ intervals corresponding to 0°, 180°, and 360° and intermediate the ① intervals corresponding to 90° and 270° for the converter of FIGURE 28 in producing the sine function as pattern disk A and reduction-geared pattern disk B—C move under the stationary brushes to successively occupy the intervals.

Pattern disk A produces the absolute value of the sine function, and the reduction-geared pattern disk B—C appends the sign of the function. Were circle 700, pattern disk B—C, and the two-to-one reduction gearing associated with pattern disk B—C omitted, then the converter of FIGURE 28 would produce the output wave form of a resistance-loaded full-wave rectifier, having a dip or minimum at the count of $0 \times 2^{-3} = 0$ and a peak or maximum at the count of $8 \times 2^{-3} = 1$. The local minimum is natural since it occurs at the even number $$0 \times 2^{-3} = 0/8 = 0$$

The local maximum is non-natural since it occurs at the even number $8 \times 2^{-3} = 8/8 = 1$. As has been previously explained, for our purposes the count must be expressed in terms of the resolution $r$ to determine whether a particular count is an odd or an even number. In FIGURE 28, the resolution $r$ is $2^{-3} = 1/8$; and thus for our purposes the count of 1 is an even number and not an odd number in this instance. But the interval of the non-natural even peak at the even count $8/8 = 1$ is greater than double the length of the ①/⑧ interval. As explained in conjunction with FIGURE 18, where a non-natural even peak or odd dip is at least of double interval length, then such simple change in slope sign may be produced by the general method and does not require the use of the first adaptation of the general method as in FIGURE 20. The converter of FIGURE 28 embodies the general method as in the converters of FIGURES 18 and 19, since for the sine function the non-natural even peak for the ⑧/⑧ or ① interval exceeds the requirement that it be double the length of the ①/⑧ interval. In FIGURE 28, as in FIGURES 18 through 20, the actuations of the reversing switches in conditioning the converter for an unambiguous count do not however cause changes in output representation. Hence an appreciable reversing switch response lag tolerance exists, enabling a high counting rate before a momentary ambiguity will occur. While in the converter of FIGURE 28 we have shown the reversing switches to be actuated by an electromechanical relay, it will be appreciated that purely electronic reversing switches may be used to decrease the response lag and permit of a still higher counting rate.

*Multiple-Pattern Cyclic Converters by the Method of Superextension of Count*

Referring now to FIGURE 29, we have provided the sine function on two patterns. Pattern A is shown cut radially along line A and developed, and provides the absolute value of the sine function in the first and third quadrants between 0° and 90° and between 180° and 270° respectively, where the absolute value of the sine function is increasing. Pattern B is shown cut radially along line B and developed, and provides the absolute value of the sine function in the second and fourth quadrants between 90° and 180° and between 270° and 360° respectively, where the absolute value of the sine function is decreasing. Each of patterns A and B then cover ranges of 90° corresponding to quadrants of the sine function. Patterns A and B may be identical and may be mounted on opposite sides of the same disk so that as the count of pattern A is increasing the count of pattern B is decreasing. By providing a plurality of patterns, we may either increase the resolution while holding the diameter of the converter constant or we may reduce the diameter of the converter while holding the resolution constant, and yet provide the same tolerances. In FIGURE 29 we have again shown the sine function approximated in eight equal increments, again yielding a resolution of $2^{-3}$ or 1/8. Accordingly the diameter of the converter of FIGURE 29 may be made half that of the converter of FIGURE 28 without reducing the tolerances. Referring again to FIGURE 29, a source of input excitation voltage, battery 10, has its negative terminal ground and its positive terminal connected to a relay

| Interval | Outputs at Terminal 790 | 590 | 490 | 290 | 190 | Binary Count | Decimal Count | |
|---|---|---|---|---|---|---|---|---|
| (1/4) | + | 0 | 0 | 1 | 0 | +0.010 | +0.250 | Forward |
| (3/8) | + | 0 | 0 | 1 | 1 | +0.011 | +0.375 | |
| (1/2) | + | 0 | 1 | 0 | 0 | +0.100 | +0.500 | |
| (5/8) | + | 0 | 1 | 0 | 1 | +0.101 | +0.625 | |
| (3/4) | + | 0 | 1 | 1 | 0 | +0.110 | +0.750 | |
| (7/8) | + | 0 | 1 | 1 | 1 | +0.111 | +0.875 | |
| (1) | + | 1 | 0 | 0 | 0 | +1.000 | +1.000 | |
| (1) | + | 1 | 0 | 0 | 0 | +1.000 | +1.000 | Reverse |
| (7/8) | + | 0 | 1 | 1 | 1 | +0.111 | +0.875 | |
| (3/4) | + | 0 | 1 | 1 | 0 | +0.110 | +0.750 | |
| (5/8) | + | 0 | 1 | 0 | 1 | +0.101 | +0.625 | |
| (1/2) | + | 0 | 1 | 0 | 0 | +0.100 | +0.500 | |
| (3/8) | + | 0 | 0 | 1 | 1 | +0.011 | +0.375 | |
| (1/4) | + | 0 | 0 | 1 | 0 | +0.010 | +0.250 | |
| (1/8) | + | 0 | 0 | 0 | 1 | +0.001 | +0.125 | |
| (0) | +/− | 0 | 0 | 0 | 0 | +0.000 / −0.000 | +0.000 / −0.000 | |
| (1/8) | − | 0 | 0 | 0 | 1 | −0.001 | −0.125 | Forward |
| (1/4) | − | 0 | 0 | 1 | 0 | −0.010 | −0.250 | |
| (3/8) | − | 0 | 0 | 1 | 1 | −0.011 | −0.375 | |
| (1/2) | − | 0 | 1 | 0 | 0 | −0.100 | −0.500 | |
| (5/8) | − | 0 | 1 | 0 | 1 | −0.101 | −0.625 | |
| (3/4) | − | 0 | 1 | 1 | 0 | −0.110 | −0.750 | |
| (7/8) | − | 0 | 1 | 1 | 1 | −0.111 | −0.875 | |
| (1) | − | 1 | 0 | 0 | 0 | −1.000 | −1.000 | |
| (1) | − | 1 | 0 | 0 | 0 | −1.000 | −1.000 | Reverse |
| (7/8) | − | 0 | 1 | 1 | 1 | −0.111 | −0.875 | |
| (3/4) | − | 0 | 1 | 1 | 0 | −0.110 | −0.750 | |
| (5/8) | − | 0 | 1 | 0 | 1 | −0.101 | −0.625 | |
| (1/2) | − | 0 | 1 | 0 | 0 | −0.100 | −0.500 | |
| (3/8) | − | 0 | 0 | 1 | 1 | −0.011 | −0.375 | |
| (1/4) | − | 0 | 0 | 1 | 0 | −0.010 | −0.250 | |
| (1/8) | − | 0 | 0 | 0 | 1 | −0.001 | −0.125 | |
| (0) | −/+ | 0 | 0 | 0 | 0 | −0.000 / +0.000 | −0.000 / +0.000 | |
| (1/8) | + | 0 | 0 | 0 | 1 | +0.001 | +0.125 | |
| (1/4) | + | 0 | 0 | 1 | 0 | +0.010 | +0.250 | |

Table 28 armature 873 which normally engages one relay contact 871 of a pair of double-throw relay contacts 871 and 872. Contact 871 supplies input excitation voltage to pattern A; and contact 872 supplies input excitation voltage to pattern B. The following description applies to circles 100 through 500 of both patterns A and B. The relay contact is connected through an input resistor 127 to an input brush 110 stationarily disposed to alternately contact the segments and spaces of a first circle 100. First circle output brush 120 is connected through an input loading resistor 128 to ground. First circle input brush 110 is connected to one terminal of a neon glow tube 150. The other terminal of glow tube 150, the negative terminal thereof, is connected forwardly through a crystal 196 to one input brush 210 of a pair of input brushes 210 and 212 disposed to alternately contact the segments and spaces of a second circle 200. First circle output brush 120 is connected forwardly through a crystal 198 to brush 212. Brushes 210 and 212 are spaced apart a length of arc equal to that subtended by the space representing the (1/8) interval, which is the minimum interval length. Intermeshing with second circle 200 is a third circle 300, the segments of circle 300 occupying the spaces of circle 200 and the spaces of circle 300 being occupied by the segments of circle 200. Brushes 210 and 212 simultaneously supply complementary input signals to both circles 200 and 300. Third circle output brush 320 is connected forwardly through a crystal 296 to one input brush 410 of a pair of input brushes 410 and 412 disposed to alternately contact the segment and space of a fourth circle 400. Second circle output brush 220 is connected forwardly to a crystal 298 to brush 412. Brushes 410 and 412 are spaced apart a length of arc equal to the (1/4) plus the (3/8) intervals, which is the minimum length of a segment or space of either circle 200 or circle 300. Intermeshing with circle 400 is a fifth circle 500, the segment of circle 500 occupying the space of circle 400 and the space of circle 500 being occupied by the segment of circle 400. Brushes 410 and 412 simultaneously supply complementary input signals to both circles 400 and 500. The negative terminal of glow tube 150 is further connected forwardly through a crystal 139 to the first circle output terminal 190, which is grounded through a loading resistor 130. Output brush 320 is connected forwardly through a crystal 339 to the third circle output terminal 390, which is grounded through a loading resistor 330. Fifth circle output brush 520 is directly connected to the fifth circle output terminal 590, which is grounded through a loading resistor 530. Fourth circle output brush 420 is connected directly to a seventh circle input brush 710. A sixth circle, circle 600, is mounted only on pattern B. The positive terminal of input excitation battery 10 is connected through an input resistor 627 to an input brush 610 disposed to alternately contact the equal segment and space of the sixth circle 600 mounted only on pattern B. Sixth circle output brush 620 is connected to ground through an input loading resistor 628. Circles 100 through 500 of pattern A are concentrically mounted on one side of pattern disk A—B; and circles 100 through 600 of pattern B are concentrically mounted on the opposite side of pattern disk A—B. Reduction geared to rotate with pattern disk A—B, which mounts on opposite sides patterns A and B, is a second pattern disk C concentrically mounting circles 700 through 1000 such that for one revolution of pattern disk C pattern disk A—B rotates through four revolutions. Pattern C is shown cut radially along line C and developed. Seventh circle input brush 710 is disposed to alternately contact the segments and spaces of circle 700. Seventh circle output brush 720 is connected to seventh circle output terminal 790, which is grounded through a loading resistor 730. Sixth circle output brush 620 is further connected forwardly through a crystal 696 to one input brush 810 of a pair of input brushes 810 and 812 disposed to alternately contact the equal segments and spaces of eighth circle 800. Sixth circle input brush 610 of pattern B is connected through a neon glow tube 650 to brush 812. Brushes 810 and 812 are spaced apart a length of arc equal to half the length of any segment or space of circle 800. Intermeshing with circle 800 is a ninth circle 900, brushes 810 and 812 simultaneously supplying complementary input signals to both circles 800 and 900. Eighth circle output brush 820 is connected to the input of a one-to-one buffer amplifier 888. The output of buffer amplifier 888 is connected to one terminal of a winding 870 which actuates relay armature 873. The other terminal of relay actuating winding 870 is grounded. Output brush 820 is connected forwardly through a crystal 896 to one input brush 1010 of a pair of input brushes 1010 and 1012 disposed to alternately contact the equal segment and space of circle 1000. Output brush 920 is connected forwardly through a crystal 898 to brush 1012. Brushes 1010 and 1012 are spaced apart a length of arc equal to half the length of the segment or space of tenth circle 1000. Tenth circle output brush 1020 is connected to ground through a loading resistor 1030 and to the positive terminal of a battery 1014, the negative terminal of which is connected to tenth circle output terminal 1090.

The output signal at terminal 1090 appends the plus or minus sign to the sine function. The purpose of battery 1014 is more didactic than functional, battery 1014 being provided so that a positive sign of the function is associated with a positive voltage at output terminal 1090 and a negative sign of the function is associated with a negative voltage at output terminal 1090. Accordingly, the negative voltage supplied by battery 1014 may be one-quarter the positive voltage of input excitation battery 10 as is shown schematically by providing four cells for battery 10 and one cell for battery 1014.

In operation of the converter of FIGURE 29, the output signal at terminal 190 represents the least significant digit of the binary count which changes in increments of 1/8 or $2^{-3}$. The output signal at terminal 390 represents 1/4 or $2^{-2}$; the output at terminal 590 represents 1/2 or $2^{-1}$; the output at terminal 790 represents 1 or $2^0$; and as has been explained before the plus or minus sign appears at output terminal 1090. The converter is shown in the third quadrant between 180° and 270°, where the sign of the function is negative, at the (1/2) — (5/8) transfer point. As the brushes move to the right, the count proceeds conventionally on pattern A through the negative (5/8), (3/4), and (7/8) intervals. Intermediate the negative (3/8)—(1/2) and (7/8)—① transfer points, intermediate the (1/2), (5/8), (3/4), and (7/8) intervals, preferably in the middle thereof, or intermediate the (5/4) interval, seventh circle input brush 710 contacts one of the noncritical ends of one of the segments of circle 700. But since output brush 420A and input brush 710 rest at ground, this does not affect the output of "0" at terminal 790. At the negative (7/8)—① transfer point the normal output representation changes from the count of 7/8 to the count of 0. This normal count of 0 must be modified into the desired output representation of 1 during the superextended ① interval. At the negative (7/8)—① transfer point conduction shifts from lagging brush 410A to leading brush 412A, which brushes symmetrically straddle transfer points of circles 400A and 500A, causing output brush 420A and seventh circle input brush 710 to carry a signal. Since brush 710 now lies well in engagement with a segment of circle 700, a superextension signal appears at output brush 720, causing the output signal at terminal 790 to be modified from its normal "0" to a "1," increasing the normal output representation of 0 by 8/8 or 1 to the desired count of 1 during the superextended ① interval. At 270° intermediate the ① interval, sixth circle input brush 610 breaks contact with one of the noncritical ends of the segment of circle 600 causing conduction to shift from lagging brush 810 to leading brush 812, which brushes symmetrically straddle transfer points of circles 800 and 900, causing output brush 820 to carry a signal, which, through buffer amplifier 888, energizes relay actuating winding 870. Relay armature 873 is drawn from its normal engagement with relay contact 871 into engagement with relay contact 872, removing input excitation voltage from pattern A and applying input excitation voltage to pattern B. The energization of winding 870 causes interpattern transfer from pattern A to pattern B; but no change in output representation occurs, because at 270° the count of −1 is produced by superextension of both patterns A and B. A "1" continues at output terminal 790 because of the superextension signal which now appears at output brush 420B and is applied to input brush 710. As the brushes continue to move to the right in the fourth quadrant between 270° and 360°, at the negative ①—(7/8) transfer point conduction shifts from lagging brush 412B to leading brush 410B, which brushes symmetrically straddle transfer points of circles 400B and 500B, removing the superextension signal formerly appearing at output brush 420B and input brush 710. The normal output representation of 7/8 is thus permitted to appear because of the removal of the superextension signal, allowing the output at terminal 790 to drop to ground and represent a "0." Thus adjacent 270°, half the negative ① interval is produced by superextension of pattern A; and the remaining half of the negative ① interval is produced by superextension of pattern B. The count proceeds conventionally on pattern B in the fourth quadrant through the negative ⟨7/8⟩, ⟨3/4⟩, ⟨1/2⟩, ⟨3/8⟩, ⟨1/4⟩, and ⟨1/8⟩ intervals and through half the ⓪ interval. Output brush 420B and input brush 710 again become positive at the ⟨1/2⟩—⟨3/8⟩ transfer point. Hence in the fourth quadrant intermediate the ①—⟨7/8⟩ and ⟨1/2⟩—⟨3/8⟩ transfer points, intermediate the ⟨7/8⟩, ⟨3/4⟩, ⟨5/8⟩, and ⟨1/2⟩ intervals, preferably in the middle thereof, or intermediate the ⟨3/4⟩ interval, brush 710, carrying no signal breaks contact with the other of the noncritical ends of one of the segments of circle 700; but this does not affect the output of "0" which continues to appear at terminal 790. In the fourth quadrant at the negative ⟨1/2⟩—⟨3/8⟩ transfer point output brush 420B again becomes positive; but since brush 710 now lies well out of engagement with any segment of circle 700, this cannot adversely affect the output of "0" at terminal 790. At 360° intermediate the ⓪ interval, brush 610 again breaks contact with one of the noncritical ends of the segment of circle 600, causing conduction to shift from lagging brush 810 to leading brush 812, which brushes symmetrically straddle transfer points of circles 800 and 900, and causing conduction to shift from lagging brush 1010 to leading brush 1012, which brushes symmetrically straddle a transfer point of circle 1000. Output brush 820 drops to ground, de-energizing relay winding 870, permitting armature 873 to disengage relay contact 872 and return to its normal engagement with relay contact 871, removing input excitation voltage from pattern B, and reapplying input excitation voltage to pattern A. Thus at 360° or 0° the de-energization of winding 870 causes interpattern transfer from pattern B back to pattern A; but no change in output representation occurs, because at 0° the count of 0 is produced normally by both patterns A and B. The transfer of conduction to leading brush 1012 causes output brush 1020 to become positive with the result that the output voltage at terminal 1090 which formerly was negative becomes positive, thereby indicating that the sign of the function which formerly was negative also becomes positive. Of course the count of +0 is the same as the count of −0; and hence we repeat that at 360° or 0° no change in output representation occurs because of the interpattern transfer from pattern B back to pattern A. Thus adjacent 0° or 360°, half the ⓪ interval is produced normally by pattern B; and, as the brushes continue to move to the right in the first quadrant between 0° and 90°, the remaining half of the ⓪ interval is produced normally by pattern A. The count proceeds conventionally on pattern A in the first quadrant through the positive ⟨1/8⟩, ⟨1/4⟩, ⟨3/8⟩, and ⟨1/2⟩ intervals, to arrive at the positive ⟨1/2⟩—⟨5/8⟩ transfer point in the first quadrant where pattern disk A—B has completed two revolutions and pattern disk C has completed half a revolution. The count now proceeds precisely as described before except for the sign at output terminal 1090. The count proceeds conventionally in the first quadrant through the positive ⟨5/8⟩, ⟨3/4⟩ and ⟨7/8⟩ intervals. It will be noted that no crystal need be provided either between the negative terminal of glow tube 650 and input brush 812 or between output brush 920 and input brush 1012; since glow tube 650 provides the essentially infinite impedance of backwardly biased crystals so long as its firing voltage is not exceeded. Hence in the converter of FIGURE 29, crystal 898 between output brush 920 and input brush 1012 is not a required component and may be eliminated. At the positive ⟨3/8⟩—⟨1/2⟩ transfer point in the first quadrant conduction shifts from lagging brush 410A to leading brush 412A permitting output brush 420A and input brush 710 to drop to ground potential. Output brush 420A and input brush 710 will again become positive at the ⟨7/8⟩—① transfer point. Hence in the first quadrant intermediate the ⟨3/8⟩—⟨1/2⟩ and ⟨7/8⟩—① transfer points, intermediate the ⟨1/2⟩, ⟨5/8⟩, ⟨3/4⟩ and ⟨7/8⟩ intervals, preferably in the middle thereof, or intermediate the ⟨3/4⟩ interval, input brush 710, carrying no signal, contacts one of the noncritical ends of the other of the segments of circle 700; but this does not affect the output of "0" at terminal 790. At the ⟨7/8⟩—① transfer point conduction shifts from lagging brush 410A to leading brush 412A, which brushes symmetrically straddle transfer points of circles 400 and 500, causing output brush 420A and input brush 710 to become positive as has just been indicated. The normal converter output representation changes from the count of 7/8 to the count of 0; but this normal output representation of 0 must be superextended by modification into the desired output representation of 1. Since brush 710 now lies well in engagement with the other of the segments of circle 700, the signal now appearing at input brush 710 produces a superextension signal at output brush 720 and output terminal 790, increasing the normal output representation of 0 by 8/8 or 1 to the desired superextended output representation of 1 during the ① interval. At 90° input brush 610 still again breaks contact with one of the noncritical ends of the segment of circle 600, causing conduction to shift from lagging brush 810 to leading brush 812, which brushes symmetrically straddle a transfer point of circle 800. Output brush 820 now carries a signal, which, through buffer amplifier 888, again energizes relay actuating winding 870, drawing armature 873 from its normal engagement with contact 871 into engagement with relay contact 872, removing input excitation voltage from pattern A, and reapplying input excitation voltage to pattern B. The energization of winding 870 causes interpattern transfer from pattern A back to pattern B; but no change in output representation occurs because at 90° the count of +1 is produced by superextension of both patterns A and B. A "1" continues at output terminal 790 because of the superextension signal which now appears at output brush 420B and is applied to input brush 710. As the brushes continue to move to the right in the second quadrant between 90° and 180°, at the positive ①—⟨7/8⟩ transfer point conduction shifts from lagging brush 412B to leading brush 410B, removing the superextension signal formerly appearing at output brush 420B and input brush 710. The normal output representation of 7/8 is thus permitted to appear because of the removal of the modifying superextension signal, allowing the output at terminal 790 to drop to ground and represent a "0." Thus adjacent 90° half the positive ① interval is produced by superextension of pattern A; and the remaining half of the positive ① interval is produced by superextension of pattern B. The count proceeds conventionally on pattern B in the second quadrant through the positive (7/8), (3/4), (1/2), (3/8), (1/4) and (1/8) intervals and through half the ⊚ interval. Output brush 420B and input brush 710 again become positive at the (1/2)—(3/8) transfer point. Hence in the second quadrant intermediate the ①—(7/8) and (1/2)—(3/8) transfer points, intermediate the (7/8), (3/4), (5/8) and (1/2) intervals, preferably in the middle thereof, or intermediate the (3/4) interval, brush 710, carrying no signal, breaks contact with the other of the noncritical ends of the other of the segments of the circle 700, but this does not affect the output of "0" which continues to appear at terminal 790. At the positive (1/2)—(3/8) transfer point in the second quadrant output brush 420B and input brush 710 again become positive; but since brush 710 now lies well out of engagement with any segment of circle 700, this cannot affect the output of "0" at terminal 790. At 180° intermediate the ⊚ interval, brush 610 still again breaks contact with one of the noncritical ends of the segment of circle 600, causing conduction to shift from lagging brush 810 to leading brush 812 which, in turn, causes conduction to shift from lagging brush 1010 to leading brush 1012. Output brushes 820 and 1020 drop to ground. Since no signal appears at output brush 820, relay winding 870 becomes de-energized, permitting armature 873 to disengage contact 872 and return to normal engagement with contact 871, removing input excitation voltage from pattern B, and reapplying input excitation voltage to pattern A. Thus at 180° the de-energization of winding 870 causes interpattern transfer from pattern B back to pattern A; but no change in output representation occurs because at 180° the count of 0 is produced normally by both patterns A and B. When output brush 1020 drops to ground, the voltage at output terminal 1090, which formerly was positive, becomes negative, thereby indicating that the sign of the function, which formerly was positive, also becomes negative. Of course the count of −0 is the same as the count of +0; and hence we repeat that at 180° no change in output representation occurs because of such interpattern transfer from pattern B to pattern A. Thus adjacent 180°, half the ⊚ interval is produced normally by pattern B; and, as the brushes continue to move to the right in the third quadrant between 180° and 270°, the remaining half of the ⊚ interval is produced normally by pattern A. The count proceeds conventionally on pattern A in the third quadrant through the negative (7/8), (1/4), (5/8) and (1/2) intervals to again arrive at the negative (1/2)—(3/8) transfer point in the third quadrant where pattern disk A—B has completed four revolutions and pattern disk C has completed one revolution.

It will be appreciated that the converter of FIGURE 29 is an inverse form, since, for first circles 100 of patterns A and B, segments have been replaced by spaces, and spaces by segments, with corresponding replacement of the complementary output by the bit output and of the bit output by the complementary output, so that spaces correspond to odd numbers and segments correspond to even numbers in contradistinction to the converter of FIGURE 28 where spaces correspond to even numbers and segments to odd numbers. Such matters, however, are entirely discretionary.

Table 29, Col. 161, shows the normal digital outputs at terminals 190, 390, and 590 and the modified digital outputs at terminal 790 and the sign outputs at terminal 1090 and interpattern transfer between patterns A and B intermediate the ⊚ intervals corresponding to 0°, 180°, and 360° and intermediate the superextended ① intervals corresponding to 90° and 270° for the converter of FIGURE 29 in providing the sine function as pattern disk A—B and reduction-geared pattern disk C move under the stationary brushes to successively occupy the various intervals.

Patterns A and B in conjunction with superextension circle 700 of reduction-geared pattern disk C, produce the absolute value of the sine function; and circle 1000 of pattern disk C appends the sign of the function. Were circle 1000 omitted, then the converter of FIGURE 29 would produce the output wave form of a resistance-loaded full-wave rectifier; and pattern disk C may then be reduction-geared by a two-to-one ratio such that one revolution of pattern disk C produces only two revolutions of pattern disk A—B; and circles 700 through 900 would then comprise only that portion subtended either between 0° and 180° or between 180° and 360°. In the converter of FIGURE 29, while circles 700 through 900 may be mounted on a pattern disk other than pattern disk C such that two revolutions of this other pattern disk produce one revolution of pattern disk C and four revolutions of pattern disk A—B with the corresponding alteration that circles 700 through 900 comprise only that portion subtended either between 0° and 180° or between 180° and 360°, yet the additional complexity would not justify the resulting doubling of tolerances for circles 700 through 900 since the tolerances for these circles are already sufficiently large.

In producing the sine function in the natural binary code on two patterns the count of each pattern, neglecting superextension, will contain a simple recycling discontinuity between zero and a number which is one less than an integral power of the number 2, when expressed in terms of the resolution $r$. For such recycling discontinuity between 0 and $(2^n-1)r$ the solution is had in the manner taught by Speller; and cascading, with resultant successive doubling of arc length tolerances, may be used for all the circles 100 through 500, as is shown in FIGURE 29.

It will be appreciated that the converter of FIGURE 29 is a complete showing of the two-pattern converters shown in FIGURES 7 through 14. Pattern B in the converter of FIGURE 29 is equivalent to pattern A of FIGURES 7 through 14 since in FIGURE 29 the circle controlling interpattern switching, circle 600, is mounted on pattern B and since in the converters of FIGURES 7 through 14 the circle controlling interpattern switching is mounted on pattern A. Correspondingly pattern A of FIGURE 29 is equivalent to patterns X of FIGURES 7 through 14. As indicated in FIGURES 7 through 14, corresponding output signals of patterns A and X are connected in parallel to the output terminals with such blocking crystals as may be required to prevent the unwanted cross-feeding of spurious signals to the unenergized pattern. In the converter of FIGURE 29 the first circle output signals of patterns A and B appearing at the negative terminals of glow tubes 150 are connected in parallel through blocking crystals 139 to output terminal 190; the third circle output signals of patterns A and B appearing at output brushes 320 are connected in parallel through blocking crystals 339 to output terminal 390; the fifth circle output signals of patterns A and B appearing at output brushes 520 are connected in parallel directly to output terminal 590, no blocking crystals being required; and the fourth circle output signals appearing at output brushes 420 are connected in parallel directly to the superextension circle input brush 710, no blocking crystals being required. Output brushes 420 and output brushes 520 of patterns A and B of the converter of FIGURE 29 may be connected in parallel without blocking crystals because crystals 296 and crystals 298 prevent the spurious impression of signals from circles 400 and 500 upon preceding circles and because there are no

| Interval | + | 1090 | 790 | 590 | 390 | 190 | Binary Count | Decimal Count | Pattern |
|---|---|---|---|---|---|---|---|---|---|
| ①/4 | + | 0 | 0 | 0 | 1 | 0 | +0.010 | +0.250 | |
| ③/8 | + | 0 | 0 | 0 | 1 | 1 | +0.011 | +0.375 | |
| ①/2 | + | 0 | 0 | 1 | 0 | 0 | +0.100 | +0.500 | Pattern A |
| ⑤/8 | + | 0 | 0 | 1 | 0 | 1 | +0.101 | +0.625 | |
| ③/4 | + | 0 | 0 | 1 | 1 | 0 | +0.110 | +0.750 | |
| ⑦/8 | + | 0 | 0 | 1 | 1 | 1 | +0.111 | +0.875 | |
| ① | + | 0→1 / 0→1 | 0 | 0 | 0 | 0 | +1.000 | +1.000 | |
| ⑦/8 | + | 0 | 0 | 1 | 1 | 1 | +0.111 | +0.875 | |
| ③/4 | + | 0 | 0 | 1 | 1 | 0 | +0.110 | +0.750 | |
| ⑤/8 | + | 0 | 0 | 1 | 0 | 1 | +0.101 | +0.625 | |
| ①/2 | + | 0 | 0 | 1 | 0 | 0 | +0.100 | +0.500 | Pattern B |
| ③/8 | + | 0 | 0 | 0 | 1 | 1 | +0.011 | +0.375 | |
| ①/4 | + | 0 | 0 | 0 | 1 | 0 | +0.010 | +0.250 | |
| ①/8 | + | 0 | 0 | 0 | 0 | 1 | +0.001 | +0.125 | |
| ⓪ | ± / − | 0 | 0 | 0 | 0 | 0 | +0.000 / −0.000 | +0.000 / −0.000 | |
| ①/8 | − | 0 | 0 | 0 | 0 | 1 | −0.001 | −0.125 | |
| ①/4 | − | 0 | 0 | 0 | 1 | 0 | −0.010 | −0.250 | |
| ③/8 | − | 0 | 0 | 0 | 1 | 1 | −0.011 | −0.375 | |
| ①/2 | − | 0 | 0 | 1 | 0 | 0 | −0.100 | −0.500 | Pattern A |
| ⑤/8 | − | 0 | 0 | 1 | 0 | 1 | −0.101 | −0.625 | |
| ③/4 | − | 0 | 0 | 1 | 1 | 0 | −0.110 | −0.750 | |
| ⑦/8 | − | 0 | 0 | 1 | 1 | 1 | −0.111 | −0.875 | |
| ① | − | 0→1 / 0→1 | 0 | 0 | 0 | 0 | −1.000 | −1.000 | |
| ⑦/8 | − | 0 | 0 | 1 | 1 | 1 | −0.111 | −0.875 | |
| ③/4 | − | 0 | 0 | 1 | 1 | 0 | −0.110 | −0.750 | |
| ⑤/8 | − | 0 | 0 | 1 | 0 | 1 | −0.101 | −0.625 | |
| ①/2 | − | 0 | 0 | 1 | 0 | 0 | −0.100 | −0.500 | Pattern B |
| ③/8 | − | 0 | 0 | 0 | 1 | 1 | −0.011 | −0.375 | |
| ①/4 | − | 0 | 0 | 0 | 1 | 0 | −0.010 | −0.250 | |
| ①/8 | − | 0 | 0 | 0 | 0 | 1 | −0.001 | −0.125 | |
| ⓪ | − / + | 0 | 0 | 0 | 0 | 0 | −0.000 / +0.000 | −0.000 / +0.000 | |
| ①/8 | + | 0 | 0 | 0 | 0 | 1 | +0.001 | +0.125 | |
| ①/4 | + | 0 | 0 | 0 | 1 | 0 | +0.010 | +0.250 | |

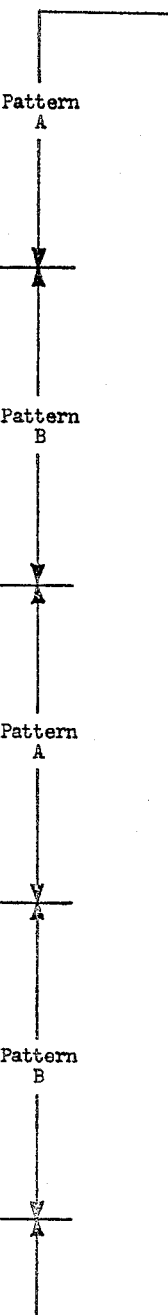

Table 29 subsequent circles which receive complementary output signals from circles 400 and 500.

As has been previously indicated crystal 898 is not a required component in FIGURE 29 and may be omitted. However, crystal 898 will be needed in conjunction with the converter of FIGURE 29a and is hence shown here. It will be noted that circle 600 of pattern B controls interpattern switching, but through circle 800 of pattern disk C. As explained in conjunction with the converters of FIGURES 7 and 14, while it is possible to control interpattern switching directly from circle 800 by means of a single input signal derived directly from the input excitation voltage, the tolerances are maximized by controlling interpattern switching from circle 600 on reduction-geared pattern B so that two complementary input signals are applied to circle 800 thereby to increase the resulting tolerances by a factor of four because of the four-to-one reduction gearing between patterns B and C.

In FIGURE 29, as in FIGURES 7 through 14, interpattern switching need not be instantaneous since the same output representation is provided unchanged. Hence an appreciable response lag tolerance exists for interpattern switching, enabling a high counting rate before a momentary ambiguity will occur at the next transfer point. While in the converter of FIGURE 29 we have shown interpattern switching to be accomplished by an electromechanical relay, it will be appreciated that purely electronic switching devices may be used to decrease the response lag and permit of a still higher counting rate.

It can be seen in FIGURE 29 that the segment (or space if an inverse form is not used) which alternately represents the counts of 0 and 1 subtends a length of arc exactly equal to half the ⓪ interval plus half the ① interval; and interpattern transfer occurs precisely at the midpoints of the ⓪ and ① intervals. For the sine function produced on two patterns each subtending 90° where interpattern transfer is caused to occur at the 0°, 90°, 180°, and 270° points, then because of the symmetry of slope about such points, interpattern transfer will occur precisely at the midpoints of the ⓪ and ① intervals. But where interpattern transfer is caused to occur at, for example, 45°, 135°, 225°, and 315°, then because of the lack of slope symmetry, interpattern transfer will not occur at the midpoints of the intervals concerned, and the segment or space which alternately represents two counts will not subtend half the sum of the lengths of arc of the intervals alternately represented.

Referring now to FIGURE 30, we have provided the sine function on four patterns. Pattern A is shown cut radially along line A and developed, and provides the absolute value of the sine function between 0° and 30° and also between 180° and 210°, where the absolute value of the sine function is increasing. Pattern B is shown cut radially along line B and developed, and provides the absolute value of the sine function between 30° and 90° and also between 210° and 270°, where the absolute value of the sine function is increasing. Pattern C is shown cut radially along line C and developed, and provides the absolute value of the sine function between 90° and 150° and also between 270° and 330°, where the absolute value of the sine function is decreasing. Pattern D is shown cut radially along line D and developed, and provides the absolute value of the sine function between 150° and 180° and also between 330° and 360°, where the absolute value of the sine function is decreasing. Each of patterns A and D then cover ranges of 30°. Patterns A and D may be substantially identical and may be mounted on opposite sides of the same disk so that as the count of pattern A is increasing the count of pattern D is decreasing. Each of patterns B and C then cover ranges of 60°. Patterns B and C may be exactly identical and may be mounted on opposite sides of another disk so that as the count of pattern B is increasing the count of pattern C is decreasing. In FIGURE 30 we have again shown the sine function approximated in eight equal increments, again yielding a resolution of $2^{-3}$ or 1/8. Since increasing the number of patterns permits of either an increase in resolution while holding the disk diameter constant or a reduction in disk diameter while holding the resolution constant, the diameter of the disks of the converter of FIGURE 30 may be less than the diameter of the disk of the converter of FIGURE 29 without reducing the tolerances. Refering again to FIGURE 30, a source of input excitation voltage, battery 10, has its negative terminal grounded and its positive terminal connected to a relay armature 973, which normally engages one relay contact 971 of a pair of double-throw relay contacts 971 and 972. Contact 971 is connected to one armature 773 of a pair of double-pole double-throw relay armatures 773 and 776. Armature 773 normally engages one contact 771 of its pair of contacts 771 and 772. Relay armature 776 normally engages contact 774 of its pair of contacts 774 and 775. Contact 972 is connected to relay armature 776. Contact 771 supplies input excitation voltage to pattern A; contact 772 supplies input excitation voltage to pattern B; contact 774 supplies input excitation voltage to pattern C; and contact 775 supplies input excitation voltage to pattern D. The following description applies to circles 100 through 300 of paterns A through D. The relay contact (771, 772, 774, and 775) is connected through an input resistor 127 to an input brush 110 stationarily disposed to alternately contact the segments and spaces of a first circle 100. First circle output brush 120 is connected through an input loading resistor 128 to ground. First circle input brush 110 is also connected to one terminal of a neon glow tube 150. The other terminal of glow tube 150, the negative terminal thereof, is connected forwardly through a crystal 196 to one input brush 210 of a pair of input brushes 210 and 212 disposed to alternately contact the segment and space of a second circle 200. First circle output brush 120 is connected forwardly through a crystal 198 to brush 212. Intermeshing with second circle 200 is a third circle 300, the segment of circle 300 occupying the space of circle 200 and the space of circle 300 being occupied by the segment of circle 200. Brushes 210 and 212 simultaneously supply complementary input signals to both circles 200 and 300. The negative terminal of glow tube 150, for each of patterns A through D, is connected forwardly through a crystal 139 to a common first circle output terminal 190, which is grounded through a loading resistor 130. Third circle output brush 320, for each of patterns A through D, is connected directly to a common third circle output terminal 390, which is grounded through a loading resistor 330. A fifth circle, circle 500, may be mounted on either of patterns A and D, and is here shown mounted only on pattern D. The positive terminal of input excitation battery 10 is connected through an input resistor 527 to an input brush 510 disposed to alternately contact the equal segment and space of the fifth circle 500 mounted only on pattern D. Fifth circle output brush 520 is connected to ground through an input loading resistor 528. Circles 100 through 300 of pattern A are concentrically mounted on one side of pattern disk A—D; and circles 100, 200, 300 and 500 of pattern D are concentrically mounted on the opposite side of pattern disk A—D. A fourth circle, circle 400 may be mounted on either of patterns B and C, and is here shown mounted only on pattern C. The second circle output brushes 220 of patterns A and D are both connected directly to an input brush 410 disposed to alternately contact the segment and space of circle 400 mounted only on pattern C. Circles 100 through 300 of pattern B are concentrically mounted on one side of pattern disk B—C; and circles 100 through 400 of pattern C are concentrically mounted on the opposite side of pattern disk B—C. Pattern disks A—D and B—C are reduction geared such that one revolution of pattern disk B—C produces two revolutions of pattern disk A—D. A third pattern disk E, concentrically mounting circles 600 through 1100, is reduction-geared to rotate with patterns A—D and B—C, such that one revolution of pattern disk E produces six revolutions of pattern disk B—C and twelve revolutions of pattern disk A—D. Pattern E is shown cut radially along line E and developed. Second circle output brushes 220 of patterns B and C are each connected directly to an input brush 610 disposed to alternately contact the segments and spaces of the sixth circle 600. Fourth circle output brush 420 is connected to the input of a buffer amplifier 488 the output of which is connected to fourth circle output terminal 490. Contacts 772 and 774, which supply input excitation voltage to patterns B and C, are each connected forwardly through crystals 439 to one terminal of a voltage-dividing resistor 431. The other terminal of voltage-dividing resistor 431 is connected to the input of buffer amplifier 488. The input of buffer amplifier 488 is also connected to ground through a loading resistor 430. Complementary input brushes 210 and 212 of each of patterns A and D are spaced apart a length of arc equal to the minimum interval length of circles 100 of patterns A and D, and are hence spaced apart a length of arc equal to that subtended by the (1/8) interval. Complementary input brushes 210 and 212 of patterns B and C are accordingly spaced apart a length of arc equal to that subtended by the (5/8) interval. Sixth circle output brush 620 is connected to sixth circle output terminal 690, which is grounded through a loading resistor 630. Output brush 620 is also connected to the input of an inverting amplifier 680 the output of which is connected backwardly through a crystal 683 to the input of buffer amplifier 488. Fifth circle output brush 520 is connected forwardly through a crystal 596 to one input brush 710 of a pair of input brushes 710 and 712 disposed to alternately contact the segments and spaces of the seventh circle 700. Fifth circle input brush 510 is connected serially first through a neon glow tube 550, then forwardly through a crystal 598 to brush 712. Brushes 710 and 712 are spaced apart a length of arc subtending a 15° central angle. Fully intermeshing with seventh circle 700 is an eighth circle 800. Brushes 710 and 712 simultaneously supply complementary input signals to both circles 700 and 800. Seventh circle output brush 720 is connected to the input of a buffer amplifier 788 the output of which is connected through a relay actuating winding 770 to ground. Relay winding 770 controls double-pole double-throw relay armatures 773 and 776. Output brush 720 is further connected forwardly through a crystal 796 to one input brush 910 of a pair of input brushes 910 and 912 disposed to alternately contact the equal segments and spaces of the ninth circle 900. Eighth circle output brush 820 is connected to input brush 912. Fully intermeshing with circle 900 is the tenth circle 1000. Brushes 910 and 912 simultaneously supply complementary input signals to both circles 900 and 1000. Brushes 910 and 912 are spaced apart a length of arc subtending a central angle of 30°. Ninth circle output brush 920 is connected to the input of a buffer amplifier 988, the output of which is connected through a relay actuating winding 970 to ground. Relay winding 970 controls single-pole double-throw relay armature 973. Output brush 920 is further connected forwardly through a crystal 996 to one input brush 1110 of a pair of input brushes 1110 and 1112 disposed to alternately contact the equal segment and space of the eleventh circle 1100. Tenth circle output brush 1020 is connected forwardly through a crystal 998 to brush 1112. Brushes 1110 and 1112 are spaced apart a length of arc subtending a central angle of 90°. Eleventh circle output brush 1120 is connected to the positive terminal of a bias battery 1114, the negative terminal of which is connected to eleventh circle output terminal 1190. Eleventh circle output brush 1120 is grounded through a loading resistor 1130.

The output at terminal 1190 appends the plus or minus sign to the sine function. The negative voltage supplied by battery 1114 may be one-quarter the positive voltage of input excitation battery 10 so that a positive output voltage at terminal 1190 indicates a positive sign and a negative voltage indicates a negative sign of the function.

Inverting amplifier 680 may here have a high output impedance since it operates only into the constant high impedance seen at the input of buffer amplifier 488.

Voltage dividing resistor 431 and loading resistor 430 should have equal resistance values which are high compared with the value of low impedance input and input loading resistors 127 and 128 respectively. With equal resistance values for resistors 431 and 430, when input excitation voltage is supplied to either of contacts 772 or 774, the input of buffer amplifier 488, neglecting for the moment crystal 683, will be at a potential substantially half that of input excitation battery 10.

In operation fo the converter of FIGURE 30, the output at terminal 190 represents the least significant digit of a binary count changing in increments of 1/8, or $2^{-3}$. An output signal at terminal 390 represents 1/4 or $2^{-2}$; an output at terminal 490 represents 1/2 or $2^{-1}$; an output at terminal 690 represents 1 or $2^0$; and as has been previously explained, the plus or minus sign appears at output terminal 1190. The converter is shown between 180° and 210°, where the sign of the function is negative at the (1/8)—(1/4) transfer point. As the brushes move to the right the count proceeds conventionally on pattern A through the negative (1/4) and (3/8) intervals. Intermediate these intervals, preferably though not necessarily in the middle thereof, input brush 410 engages one of the noncritical ends of the segment of circle 400; but, since output brush 220A rests at ground, this does not affect the output of "0" at output terminal 490. At the negative (3/8)—(1/2) transfer point the count of pattern A normally changes from 3/8 to 0. It is desired that the count of 0 be superextended to the count of one-half. At the (3/8)—(1/2) transfer point output brush 220A becomes positive; and since brush 410 now lies well in engagement with the segment of circle 400, output brush 420 now carries a signal which, through amplifier 488, produces a "1" at output terminal 490, increasing the normal count of 0 by 1/4 to the count of of one-quarter as is desired during the (1/4) interval. At 210° input brush 510 breaks contact with the segment of circle 500 causing conduction to shift from input brush 710 to input brush 712. Since at 210° brush 712 contacts a segment of circle 700, output brush 720 carries a signal which, through amplifier 788, energizes relay winding 770, drawing armature 773 from its normal engagement with relay contact 771 into engagement with contact 772, removing input excitation voltage from pattern A and applying input excitation voltage to pattern B. When input excitation voltage is removed from pattern A, no signal is applied from brush 220 to brush 410 and then to brush 420 from pattern A. However, the positive voltage now appearing at contact 772 is impressed forwardly through crystal 439B upon resistor 431, thereby producing a "1" at output terminal 490 to continue the count of one-half begun on pattern A. The count proceeds conventionally from 210° through the remainder of the negative (1/2) interval and through the negative (5/8), (3/4), and (7/8) intervals. Intermediate the (5/8)—(3/4) and (7/8)—① transfer points, intermediate the (3/4) and (7/8) intervals, preferably though not necessarily in the middle thereof, brush 610, carrying no signal, engages one of the noncritical ends of one of the segments of circle 600, but this affects neither the "0" at output terminal 690 nor the "1" at output terminal 490. At the (7/8)—① transfer point, conduction shifts to leading brush 212B causing input brush 610 to now carry a signal. Since brush 610 now lies well in engagement with one of the segments of circle 600, output brush 620 likewise becomes positive. During the ① interval the normal output representation, including the signal coupled through crystal 439B, is the count of one-half. It is desired that this count be modified or superextended to the count of 1 during the ① interval. When output brush 620 becomes positive the output of inverting amplifier 680 drops to ground, carrying with it the input of buffer amplifier 488 by virtue of the forward current now drawn through crystal 683. The output at terminal 490 is hence modified from a "1" to a "0," reducing the count of one-half by one-half to the count of 0. The positive signal at brush 620 is impressed on output terminal 690, modifying its representation from a "0" to a "1" to thereby produce the desired count of 1 during the ① interval. Adjacent 270° input brush 510 again breaks contact with one of the noncritical ends of the segment of circle 500, causing conduction to shift from lagging brush 710 to leading brush 712. Brushes 710 and 712 symmetrically straddle transfer points of circles 700 and 800 thereby causing conduction to shift to leading brush 912 which contacts one of the segments of circle 900. Output brush 920 now carries a signal which, through amplifier 988, energizes relay winding 970. Armature 973 is drawn from its normal engagement with contact 971 into engagement with contact 972. The transfer of conduction to leading brush 712 permits output brush 720 to drop to ground, thereby de-energizing relay winding 770. Armature 776 disengages contact 775 and returns to normal engagement with contact 774, thus transferring the input excitation voltage at 270° from pattern B to pattern C. At this point brush 610 is at the midpoint of one of the segments of circle 600. Since output brush 220 and input brush 610 are now positive, output brush 620 continues positive, modifying the output at terminal 690 to a "1" and modifying the output at terminal 490 to a "0," so that the desired output representation of 1 continues during the remaining half of the (1) interval. At the negative (1)—(7/8) transfer point conduction shifts to leading brush 210C thereby permitting output brush 220, input brush 610 and output brush 620 to drop to ground. The removal of the modification or superextension signal at output brush 620 permits output terminal 690 to revert to a "0"; and permits the output of inverting amplifier 680 to become positive. Since no forward current now flows through crystal 683, the input excitation voltage appearing at contact 774 and coupled now through crystal 439C causes a "1" at output terminal 490. Thus the normal count of 7/8 is permitted to appear at the output terminals during the (7/8) interval. The count proceeds conventionally through the negative (7/8), (3/4), and (5/8) intervals, and through a portion of the (1/2) interval to the 330° point coincident with line C, where brush 410 lies at the midpoint of the segment of circle 400. At 330° input brush 510 again breaks contact with the same noncritical end of the segment of circle 500 causing conduction to shift to leading brush 712. Output brush 720 becomes positive, energizing relay winding 770. Armature 776 is drawn from its normal engagement with contact 774 into engagement with contact 775, removing input excitation voltage from pattern C and applying input excitation voltage to pattern D. At this point the normal output representation of pattern D is the count of 0, which we desire modified to the count of 1/2. Since output brush 220D now carries a signal and since brush 410 lies at the midpoint of the segment of circle 400, output brush 420 carries a signal which, through amplifier 488, modifies the output at terminal 490 from its normal "0" to a "1." Thus the normal count of 0 is increased by 1/2 to the desired count of 1/2 during the (1/2) interval. The count of 1/2 begun on pattern C is continued on pattern D. At the negative (1/2)—(3/8) transfer point conduction shifts to leading brush 210D. Output brush 220 and input brush 410 drop to ground; and the modification signal appearing at output brush 420 is removed. The normal converter output representation of 3/8 is permitted to appear at the output terminals during the (3/8) interval. The count proceeds conventionally through the negative (3/8), (1/4), and (1/8) intervals and through a portion of the (0) interval to arrive at the 0° point. Meanwhile, however, intermediate the negative (1/2)—(3/8) and (1/4)—(1/8) transfer points, intermediate the negative (3/8) and (1/4) intervals, preferably though not necessarily in the middle thereof, brush 410, carrying no signal, breaks contact with the other of the noncritical ends of the segment of circle 400; but this does not affect the output of "0" at output terminal 490. At the negative (1/4)—(1/8) transfer point brush 410 again becomes positive; but since brush 410 now lies well out of engagement with the segment of circle 400, an output of "0" continues at terminal 490. At 0° brush 510 again breaks contact with the same noncritical end of the segment of circle 500 causing conduction to shift from lagging brush 710 to leading brush 712, which brushes symmetrically straddle transfer points of circles 700 and 800. This causes conduction to shift from lagging brush 910 to leading brush 912, which brushes symmetrically straddle transfer points of circles 900 and 1000; and this, in turn, causes conduction to shift from lagging brush 1110 to leading brush 1112. The transfer of conduction to leading brush 912 permits output brush 920 to drop to ground, de-energizing relay winding 970. Armature 973 disengages contact 972 and returns to its normal engagement with contact 971. The transfer of conduction to leading brush 712 allows output brush 720 to drop to ground, de-energizing relay winding 770. Armature 773 disengages contact 772 and returns to its normal engagement with contact 771. Input excitation voltage is thereby removed from contact 775 and pattern D and reapplied to contact 771 and pattern A. The transfer of conduction to leading brush 1112 causes output brush 1120 to become positive. This, in turn, causes the output at terminal 1190 to change from a negative voltage to a positive voltage, indicating that the sign has changed from negative to positive. The count proceeds conventionally on pattern A through the remaining half of the (0) interval and through the positive (1/8) interval to arrive at the (1/8)—(1/4) transfer point where pattern E has completed half a revolution. As pattern E is rotated through its remaining half revolution, the outputs at terminals 190, 390, 490, and 690 are reproduced exactly as for the preceding half revolution which we have described in detail. However the output at terminal 1190 will remain positive, indicating a positive sign of the function, until the 180° point, where the output at terminal 1190 will become negative indicating that the sign of the function has changed from positive to negative. Interpattern transfer will occur from pattern A to pattern B at 30°, from pattern B to pattern C at 90°, from pattern C to pattern D at 150°, and from pattern D to pattern A again at 180°. The superextension of patterns B and C adjacent 90° to produce both halves of the (1) interval is effected by means of the other segment of circle 600. One noncritical end of this other segment of circle 600 is placed intermediate the positive (3/4) and (7/8) intervals which are located between 0° and 90°; and the other noncritical end of this other segment of circle 600 is placed intermediate the positive (7/8) and (3/4) intervals which are located between 90° and 180°. Adjacent 30°, circle 400 superextends the count of pattern A so that the normal count of 0 is modified to the desired output representation of 1/2 during that portion of the (1/2) interval which is supplied by pattern A. Adjacent 150°, circle 400 superextends the count of pattern D so that the normal count of 0 is modified to the desired output representation of 1/2 during that portion of the (1/2) interval which is supplied by pattern D. No change in output representation occurs due to interpattern transfer, since the same count is represented on adjacent patterns. For interpattern transfer at 0°, the output at terminal 1190 changes from negative to positive; but the count of −0 is the same as the count of +0. For interpattern transfer at 180°, the output at terminal 1190 changes from positive to negative; but the count of +0 is the same as the count of −0. Hence for interpattern transfer at 0°, 180° and 360° again, no substantial change in output representation occurs since patterns A and D both represent the same counts.

It will be appreciated that the converter of FIGURE 30 is also an inverse form, since, for first circles 100 of patterns A through D, segments have been replaced by spaces, and spaces by segments, with corresponding inversion of the bit and complementary outputs, so that spaces corresponding to odd numbers, and segments to even numbers.

Table 30 shows the normal digital outputs at terminals 190 and 390 and the normal and modified digital outputs at terminal 490 and the modified digital outputs at terminal 690 and the sign outputs at terminal 1190 and the interpattern transfer between patterns A and B intermediate the ①/② intervals corresponding to 30° and 210° and the interpattern transfer between patterns B and C at the midpoints of the ① intervals corresponding to 90° and 270° and interpattern transfer between patterns C and D intermediate the ①/② intervals corresponding to 150° and 330° and interpattern transfer between patterns D and A at the midpoints of the ⓪ intervals corresponding to 0°, 180° and 360° for the converter of FIGURE 30 in providing the sine function as pattern disk A—D and reduction-geared pattern disk B—C and further reduction-geared pattern disk E move under the stationary brushes to successively occupy the various intervals.

| Interval | 1190 | 690 | 490 | 390 | 190 | Binary Count | Decimal Count |
|---|---|---|---|---|---|---|---|
| ①/④ | + | 0 | 0 | 1 | 0 | +0.010 | +0.250 |
| ③/⑧ | + | 0 | 0 | 1 | 1 | +0.011 | +0.375 |
| ①/② | + | 0 / 0 | 0→1 / 1 | 0 | 0 | +0.100 | +0.500 |
| ⑤/⑧ | + | 0 | 1 | 0 | 1 | +0.101 | +0.625 |
| ③/④ | + | 0 | 1 | 1 | 0 | +0.110 | +0.750 |
| ⑦/⑧ | + | 0 | 1 | 1 | 1 | +0.111 | +0.875 |
| ① | + | 0→1 / 0→1 | 1→0 / 1→0 | 0 | 0 | +1.000 | +1.000 |
| ⑦/⑧ | + | 0 | 1 | 1 | 1 | +0.111 | +0.875 |
| ③/④ | + | 0 | 1 | 1 | 0 | +0.110 | +0.750 |
| ⑤/⑧ | + | 0 | 1 | 0 | 1 | +0.101 | +0.625 |
| ①/② | + | 0 / 0 | 1 / 0→1 | 0 | 0 | +0.100 | +0.500 |
| ③/⑧ | + | 0 | 0 | 1 | 1 | +0.011 | +0.375 |
| ①/④ | + | 0 | 0 | 1 | 0 | +0.010 | +0.250 |
| ①/⑧ | + | 0 | 0 | 0 | 1 | +0.001 | +0.125 |
| ⓪ | + / − | 0 / 0 | 0 / 0 | 0 / 0 | 0 / 0 | +0.000 / −0.000 | +0.000 / −0.000 |
| ①/⑧ | − | 0 | 0 | 0 | 1 | −0.001 | −0.125 |
| ①/④ | − | 0 | 0 | 1 | 0 | −0.010 | −0.250 |
| ③/⑧ | − | 0 | 0 | 1 | 1 | −0.011 | −0.375 |
| ①/② | − | 0 / 0 | 0→1 / 1 | 0 | 0 | −0.100 | −0.500 |
| ⑤/⑧ | − | 0 | 1 | 0 | 1 | −0.101 | −0.625 |
| ③/④ | − | 0 | 1 | 1 | 0 | −0.110 | −0.750 |
| ⑦/⑧ | − | 0 | 1 | 1 | 1 | −0.111 | −0.875 |
| ① | − | 0→1 / 0→1 | 1→0 / 1→0 | 0 | 0 | −1.000 | −1.000 |
| ⑦/⑧ | − | 0 | 1 | 1 | 1 | −0.111 | −0.875 |
| ③/④ | − | 0 | 1 | 1 | 0 | −0.110 | −0.750 |
| ⑤/⑧ | − | 0 | 1 | 0 | 1 | −0.101 | −0.625 |
| ①/② | − | 0 / 0 | 1 / 0→1 | 0 | 0 | −0.100 | −0.500 |
| ③/⑧ | − | 0 | 0 | 1 | 1 | −0.011 | −0.375 |
| ①/④ | − | 0 | 0 | 1 | 0 | −0.010 | −0.250 |
| ①/⑧ | − | 0 | 0 | 0 | 1 | −0.001 | −0.125 |
| ⓪ | − / + | 0 / 0 | 0 / 0 | 0 / 0 | 0 / 0 | −0.000 / +0.000 | −0.000 / +0.000 |
| ①/⑧ | + | 0 | 0 | 0 | 1 | +0.001 | +0.125 |
| ①/④ | + | 0 | 0 | 1 | 0 | +0.010 | +0.250 |

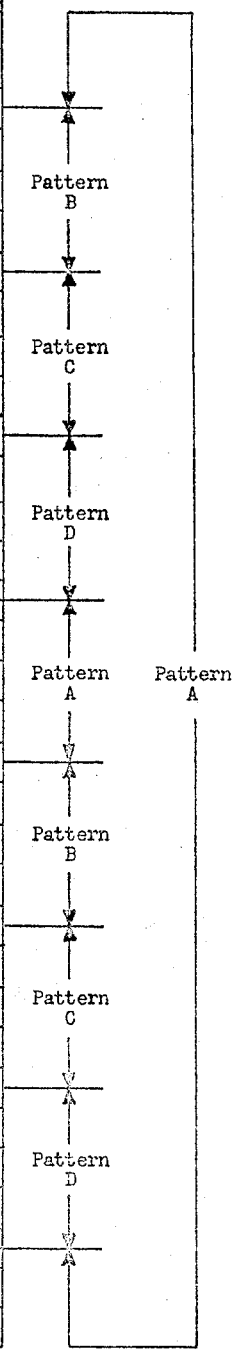

Table 30

Patterns A through D in conjunction with superextension circle 400 of pattern C and superextension circle 600 of pattern E produce the absolute value of the sine function; and circle 1100 of pattern disk E appends the sign of the function. Were circle 1100 omitted, then the converter of FIGURE 30 would produce the output wave form of a resistance-loaded full-wave rectifier; and then pattern disk E would be reduction-geared by such ratio that one revolution of pattern E produces three revolutions of pattern disk B—C and six revolutions of pattern disk A—D; and then circles 600 through 1000 would then comprise only that portion subtended either between 0° and 180° or between 180° and 360°. In the converter of FIGURE 30, while circles 600 through 1000 may be mounted on a pattern disk other than pattern disk E such that two revolutions of this other pattern disk produces one revolution of pattern disk E and six revolutions of pattern disk B—C and twelve revolutions of pattern disk A—D with the corresponding alteration that circles 600 through 1000 comprise only that portion subtended either between 0° and 180° or between 180° and 360°, yet the additional complexity would not justify the resultant doubling of tolerances for circles 600 through 1000, since the tolerances for these circles are already sufficiently large.

In the converter of FIGURE 30 corresponding outputs of patterns A through D are connected in parallel to the output terminals with such blocking crystals as may be required to prevent the unwanted cross-feeding of spurious signals to the unenergized patterns, as was indicated for FIGURES 7 through 14 and shown in FIGURE 29. In the converter of FIGURE 30 the first circle output signals of patterns A through D appearing at the negative terminal of glow tubes 150 are connected in parallel through blocking crystals 139 to output terminal 190; the third circle output signals of patterns A through D appearing at output brushes 320 are connected in parallel directly to output terminal 390, no blocking crystals being required; and the second circle signals of patterns B and C appearing at output brushes 220B and 220C are connected in parallel directly to superextension circle input brush 610, no blocking crystals being required; and the second circle output signals of patterns A and D appearing at output brushes 220A and 220D are connected in parallel directly to the superextension circle input brush 410, no blocking crystals being required; and contacts 772 and 774 supplying input excitation voltage to patterns B and C are connected in parallel through blocking crystals 439 to produce output signals at terminal 490. Output brushes 320 of patterns A through D may be connected in parallel without blocking crystals and output brushes 220B and 220C may be connected in parallel without blocking crystals and output brushes 220A and 220D may be connected in parallel without blocking crystals because crystals 196 and crystals 198 prevent the spurious impression of signals from circles 200 and 300 upon preceding circles and because there are no subsequent circles which receive complementary output signals from circles 200 and 300. Blocking crystals 439 prevent the input excitation voltage at either contact 772 or contact 774, only one of which is energized at a time, from being applied to the other contact and simultaneously exciting both patterns B and C.

It will be noted that no crystal need be provided either between the negative terminal of glow tube 550 and input brush 712 or between output brush 820 and input brush 912 or between output brush 1020 and input brush 1112, since glow tube 550 provides the essentially infinite impedance of a backwardly biased crystal so long as its firing voltage is not exceeded. Hence in the converter of FIGURE 30, crystal 598 between the negative terminal of glow tube 550 and input brush 712 and crystal 998 between output brush 1020 and input brush 1112, are not required components and may be eliminated. However, crystals 598 and 998 will be needed in conjunction with the converter of FIGURE 30a and are hence shown here.

Interpattern switching is controlled from circle 500 of pattern D, but by way of circle 700 of pattern disk E. As explained in conjunction with the converters of FIGURES 7 through 14 and 29, while it is possible to control interpattern switching directly from circle 700 by means of a single input signal derived directly from the input excitation voltage, the tolerances will be maximized by controlling interpattern switching from circle 500 on reduction-geared pattern D so that two complementary input signals are applied to circle 700 thereby to increase the tolerances by a factor of twelve because of the twelve-to-one reduction gearing between pattern disks E and A—D.

In the converter of FIGURE 30 again, interpattern switching need not be instantaneous since the same output representation is provided unchanged. Appreciable response lag tolerances for interpattern transfer exist, enabling high counting rates before producing momentary ambiguities at the next transfer points. It will be appreciated that purely electronic switching devices, rather than electromechanical relays, may be used where the desired counting rates are so high that the response lag of relays might create an ambiguity in the converter of FIGURE 30.

The segment (or space if an inverse form is not used) of each of patterns A and D alternately representing the counts of 0 and 1/2 subtends a length of arc which is not exactly equal to half the sum of the ⓪ and ①/② intervals; an the segment (or space if an inverse form is not used) of each of patterns B and C alternately representing the counts of 1/2 and 1 subtends a length of arc which is not exactly equal to half the sum of the ①/② and ① intervals. And interpattern transfer between patterns A and B and between patterns C and D does not occur precisely at the midpoints of the ①/② intervals. For interpattern transfer at 30°, 150°, 210°, and 330° the value of the sine function is exactly 1/2. If the slope of the function about these points were constant or if the function exhibited slope symmetry about these points, then interpattern transfer would occur precisely at the midpoints of the ①/② intervals. However, at these points the slope of the sine function is not constant, nor is there slope symmetry. But since at these points the value of the sine function may be represented exactly in the binary code, interpattern transfer will occur closely adjacent the midpoints of the ①/② intervals.

In the converter of FIGURE 30 circle 400, providing superextension for patterns A and D, is shown mounted on pattern disk B—C. It will be appreciated that circle 400, rather than being mounted on pattern disk B—C, could instead be mounted on pattern disk E with the concomitant alteration that circle 400 would then comprise four segments adjacent the 30°, 150°, 210°, and 330° points, respectively. But the tolerances are increased by a factor of six when circle 400 is mounted on pattern disk B—C, as shown, because of the six-to-one reduction gearing between pattern disks E and B—C.

In the converter of FIGURE 30 the sine function is produced on four patterns; and, because of the particular selection of the points for interpattern transfer, the count of each pattern will, neglecting superextension, contain a simple recycling discontinuity between 0 and a number which is 1 less than an integral power of the number 2, when expressed in terms of the resolution $r$. For such recycling discontinuity between 0 and $(2^n-1)r$ the solution may be had in the manner taught by Speller; and cascading, with resultant successive doubling of arc length tolerances, may be used for all the circles 100 through 300. For a four-patterned sine converter, the successive cascading of Speller to maximize the tolerances may be used only for the particular interpattern transfer points 0°, 30°, 90°, 150°, 180°, 210°, 270°, 330°, and 360° or 0°, again.

The count of patterns B and C, neglecting superextension and omitting from consideration for the moment the input excitation voltage coupled through crystals 439 to produce a "1" at output terminal 490, proceeds 0, 1/8, 1/4, 3/8, and 0, again. The count of patterns B and C, neglecting superextension but considering the input excitation voltage coupled through crystals 439 to produce a "1" at output terminal 490, proceeds 1/2, 5/8, 3/4, 7/8, and 1/2, again. Accordingly the effect of the input excitation voltage coupled through crystals 439 to produce a "1" at output terminal 490 is to increase the count of all intervals by the constant addend 1/2. However for patterns B and C the ①/② interval must be selectively superextended to represent the count of 1. The superextension signal at output brush 620 causes inverting amplifier 680, through crystal 683, to modify the "1" at output terminal 490 to a "0" during the ① interval. Hence the output signal at terminal 490, when either of patterns B and C receive input excitation voltage, consists of a constant input excitation voltage signal, through one of crystals 439, which however is subjected to modification. It will be recalled that in the altered converter of FIGURE 4, which produced by the third method a count proceeding 1, 2, 3, and 1, again, that the output signal at terminal 290 likewise consisted of a constant input excitation voltage signal subjected however to modification. In the converter of FIGURE 30, a "1" is produced when either of patterns B or C is energized. A "1" appears at output terminal 490 for all intervals except the artificially produced ① interval. Accordingly in the converter of FIGURE 30 it is not necessary to provide a circle for either of patterns B and C to produce this "1" at output terminal 490; rather this "1" may be derived simply from the input excitation voltage at contacts 772 and 774 coupled through crystals 439. It is only because the counts of patterns B and C are increased by the constant addend 1/2 by virtue of the "1" at output terminal 490 that the successive cascading of Speller is possible.

In a broad sense modification and superextension in producing artificial representations may be considered as the process of a selective addition or subtraction during certain intervals to change the normal count into the desired count. In performing this selective "addition" or "subtraction," we need not use the conventional circuitry for performing these arithmetical operations, but instead may alter, affect, or modify the normal outputs at the proper output terminals. It will be appreciated that many complicated functions may be resolved as the sum or difference or as the product of simpler functions. For such complicated functions which may be resolved into the sum, difference, or product of simpler functions, the independent outputs of a plurality of converters geared together, each producing a simpler function, may, through suitable circuitry for performing arithmetical operations, be added, subtracted, or multiplied together to produce the complicated function.

FIGURE 31 shows the mechanical arrangement for the converter of FIGURE 30. A cylindrical housing 40 is provided with circular end plates 41 and 42. Disk A—D, which is of the highest periodicity, is mounted upon a shaft 43, which is journaled in bearings 44 and 45. Bearing 44 is carried by end plate 41; and bearing 45 is carried by a support 6, which is secured to housing 40. Disk A—D is conveniently made of a plastic material which acts as a nonconductive insulator. Patterns A and D, which are mounted on opposite sides of disk A—D, may conveniently be formed of silver photoetched upon the surfaces of disk A—D. Disk A—D is secured to shaft 43 by any convenient means, not shown. Brush carrying member 47 positions the brushes which contact pattern A; and brush carrying member 48 positions the brushes which contact pattern D. Brush carrying members 47 and 48 are secured to housing 40. Fixed to shaft 43 is a pinion 49 meshing with a gear 50, which is fixed to a countershaft 51. Countershaft 51 is journaled in bearings 52 and 53 carried respectively by supporting member 46 and another supporting member 54. Also fixed to countershaft 51 is an idler gear 55, which meshes with another idler gear 56. Gear 56 is secured to a shaft 57, upon which is mounted disk B—C. Shaft 57 is journaled in bearings 58 and 59, carried respectively by supporting member 54 and a third supporting member 60. It is desired that the speed reduction between shafts 43 and 57, respectively carrying disks A—D and B—C, be two-to-one. Accordingly, pinion 49 has half the pitch diameter of gear 50; and idler gears 55 and 56 have equal pitch diameters. Patterns B and C, are photoetched on opposite surfaces of disk B—C. A brush supporting member 61 positions the stationary brushes which contact pattern C; and a brush supporting member 62 positions the stationary brushes which contact pattern B. Brush supporting members 61 and 62 are secured to housing 40. Affixed to shaft 57 is a pinion 63, meshing with a gear 64, carried by another countershaft 65. Countershaft 65 is journaled in bearings 66 and 67, mounted respectively on the third supporting member 60 and a fourth supporting member 68. Secured to countershaft 65 is a pinion 69 meshing with a gear 70. Gear 70 is secured to a shaft 71, upon which is mounted disk E. Shaft 71 is journaled in bearings 72 and 73, carried respectively by the fourth supporting member 68 and the second end plate 42. Disk E carries only one pattern, pattern E, which is photoetched on one side. A brush supporting member 74, which is secured to housing 40, positions the stationary brushes which contact pattern E. It is desired that there be a six-to-one speed reduction between shafts 71 and 57 carrying disks E and B—C, respectively. Accordingly, the pitch diameter of pinion 63 is half that of gear 64; and the pitch diameter of pinion 69 is one-third that of gear 70. Brush 210A, mounted on brush supporting member 47, is not visible, since it lies behind brush 212A; and brush 212D, mounted on brush supporting member 48, is not visible, since it lies behind brush 210D. Brush 210C, mounted on brush supporting member 61, is not visible, since it lies behind brush 212C; and brush 212B, mounted on brush supporting member 62, is not visible, since it lies behind brush 210B. Brushes 710, 910, and 1110 conceal brushes 712, 912, and 1112, which are also mounted on brush supporting member 74. Gears 49, 50, 55, 56, 63, 64, 69, and 70 are shown as being helical to provide for smooth high-speed operation. However, spur gears might serve equally well. The total speed reduction between shafts 43 and 71 is then twelve-to-one, which is the product of the intermediate speed reductions of two-to-one and six-to-one. Each revolution of shaft 43 and disk A—D represents 30°; and each revolution of shaft 71 and disk E represents 360°. Each revolution of the intermediate shaft and disk B—C represents 60°.

FIGURE 32 shows the artwork of pattern C, which pattern is mounted on shaft 57, and the locations of the stationary brushes positioned by supporting member 61. The relationship between the brushes and the pattern in FIGURE 32 is the same as in FIGURE 30. Brush 210 lies in a clearance gap between adjacent segments of circles 200 and 300. The clearance gap must be sufficiently large so that brush 210 does not simultaneously contact segments of both circles 200 and 300 and thereby short-circuit the two circles, as explained in Speller. The clearance gap must be sufficiently large so that brush 210, in passing from a segment of circle 200 to a segment of circle 300, at no time contacts segments of both circles. It can be seen that the large segment of circle 100 must selectively represent the count of 1 and the count of 1/2. The total length of arc subtended by the large segment of circle 100 is not exactly half the sum of the lengths of arc subtended by the ① and the ½ intervals, as has been previously explained. The length of arc subtended by that portion of the large segment of circle 100 located between the ⑦/⑧—① transfer point and line C is exactly equal to half the length of the ① interval; but the length of arc subtended by that portion of the large segment of circle 100 located between line C and the ½—⑤/⑧ transfer point is slightly greater than half the length of the ½ interval. The other half of the ① interval is accommodated on pattern B; and the other portion of the ½ interval is accommodated on pattern D. At the ⑤/⑧—½ transfer point the output representation shifts to the count of 1/2, which is continued up to line C, where should occur interpattern transfer to pattern D. But it will be appreciated that the output representation of 1/2 would be continued from line C up to the ①—⑦/⑧ transfer point, if interpattern transfer did not occur at line C. This apparent tolerance for interpattern switching is, however, much greater than the actual tolerance, since interpattern transfer to pattern D must occur within such other portion of the ½ interval so that the count may be changed from 1/2 to 3/8 at the ½—③/⑧ transfer point of pattern D. At the ⑦/⑧—① transfer point, the count changes to 1, which is continued up to line C, where should occur interpattern transfer to pattern B. However, it will be appreciated that if interpattern transfer does not occur precisely at line C, the count of 1 will be continued from line C up to the ½—⑤/⑧ transfer point, thus allowing a tolerance for interpattern switching.

In FIGURE 32 it will be noted that our usual convention of indicating the noncritical ends of segments by sloping lines has not been followed. The artwork of pattern C is shown with all segments having vertical ends as would be preferred in practice.

*Multiple-Pattern Cyclic Converters by the Method of Abbreviation of Patterns*

Referring now to FIGURE 33, the tolerances for interpattern switching are secured, not by the method of superextension of count, but rather by the use of abbreviated patterns. An abbreviated pattern comprises an active portion used in generating the desired counts and an inactive portion, constituting the abbreviated portion, which supplies the necessary tolerances for interpattern switching. For a cyclic converter the rotation of each pattern must in general be integrally divisible into the period. In a cyclic converter where interpattern switching is accomplished by the use of an abbreviated pattern, there is also the additional requirement that the active portion of each pattern be integrally divisible into the period. In FIGURE 33 we have provided the sine function on three patterns. Pattern B is shown cut radially along line B and developed, and provides the absolute value of the sine function between 45° and 135° and also between 225° and 315°. Pattern B is completely active and has no inactive or abbreviated portion. Pattern A is shown cut radially along line A and developed and provides the absolute value of the sine function between 0° and 45° and also between 180° and 225°, where the absolute value of the sine function is increasing. Pattern C is shown cut radially along line C and developed, and provides the absolute value of the sine function between 135° and 180° and also between 315° and 360° or 0° again, where the absolute value of the sine function is decreasing. Patterns A and C may be identical and may be mounted on opposite sides of the same disk A—C so that as the count of pattern A is increasing the count of pattern C is decreasing. We have met the requirement that the rotations of patterns A and C be integrally divisible into the period by providing such reduction gearing that each revolution of pattern disk A—C represents 60°. But the active lengths of patterns A and C cover only 45°; and this meets the requirement for an abbreviated pattern cyclic converter that the length of the active portion must be integrally divisible into the period. As a consequence the inactive or abbreviated portion of patterns A and C cover 15° to permit of a tolerance for interpattern switching. In FIGURE 33 we have again shown the sine function approximated in eight equal increments, yielding a resolution of $2^{-3}$ or 1/8. Since increasing the number of patterns permits of either an increase in resolution while holding the disk diameter constant or a reduction in disk diameter while holding the resolution constant, the diameter of the disks of the converter of FIGURE 33 may be less than the diameter of the disk of the converter of FIGURE 29, but larger than the diameter of the disks of the converter of FIGURE 30, without reducing the tolerances. In FIGURE 33 a source of input excitation voltage, battery 10, having the negative terminal grounded, has its positive terminal connected to a relay armature 673 which normally engages one contact 671 of a pair of double-throw relay contacts 671 and 672. Contact 671 supplies input excitation voltage to pattern B. Contact 672 is connected to a relay armature 573 which normally engages contact 571 of a pair of double-throw relay contacts 571 and 572. Contact 572 supplies input excitation voltage to pattern A; and contact 571 supplies input excitation voltage to pattern C.

The following description applies to circles 100 through 400 of patterns A and C. The relay contact (571 and 572) is connected through an input resistor 127 to an input brush 110 disposed to alternately contact the segments and spaces of a first circle 100. First circle output brush 120 is connected to ground through an input loading rsistor 128. First circle output brush 120 is also connected forwardly through a crystal 196 to one input brush 210 of a pair of input brushes 210 and 212 disposed to alternately contact the segments and spaces of the second circle 200. First circle input brush 110 is connected through a neon glow tube 150 to brush 212. Brushes 210 and 212 of patterns A and C are spaced apart a length of arc equal to that subtended by the ⅛ interval. Fully intermeshing with circle 200 is a third circle 300, brushes 210 and 212 simultaneously supplying complementary input signals to both circles 200 and 300. Second circle output brush 220 is connected forwardly through a crystal 296 to one input brush 410 of a pair of input brushes 410 and 412 disposed to alternately contact the segment and space of a fourth circle 400. Third circle output brush 320 is connected to brush 412. Brushes 410 and 412 are spaced apart a length of arc equal to the segment of circle 200 or the space of circle 300 which subtend the ¼ and ③/⑧ intervals. The following description applies to circles 100, 200, 300, and 500 of pattern B. Relay contact 671 is connected through an input resistor 127 to an input brush 110 disposed to alternately contact the segments and spaces of a first circle 100. First circle output brush 120 is connected to ground through an input loading resistor 128. First circle output brush 120 is also connected to relay contacts 561 and 565. First circle input brush 110 is connected through a neon glow tube 150 to relay contacts 564 and 562. A pair of double-pole double-throw relay armatures 563 and 566 are connected as a reversing switch and normally engage contacts 561 and 564 respectively, and are adapted to be drawn into engagement with relay contacts 562 and 565 respectively. Armature 563 is connected forwardly through a crystal 196 to one input brush 210 of a pair of input brushes 210 and 212 disposed to alternately contact the segment and space of a second circle 200. Armature 566 is connected forwardly through a crystal 199 to brush 212. Brushes 210 and 212 are spaced apart a length of arc equal to that subtended by the 7/8 interval. Fully intermeshing with second circle 200 is a third circle 300, brushes 210 and 212 simultaneously supplying complementary input signals to both circles 200 and 300. The positive terminal of input excitation battery 10 is connected through an input resistor 527 to an input brush 510 disposed to alternately contact the equal segment and space of the fifth circle 500 which is mounted only on pattern B. Fifth circle output brush 520 is connected through a relay actuating winding 560—570 to ground. Relay winding 560—570 not only controls double-pole double-throw reversing switch armatures 563 and 566 but also controls armature 573. For each of patterns A through C first circle output brush 120 is connected forwardly through a crystal 139 to a common first circle output terminal 190 which is grounded through a loading resistor 130. For each of patterns A through C second circle output brush 220 is connected forwardly through a crystal 239 to a common second circle output terminal 290 which is grounded through a loading resistor 230. Fourth circle output brush 420 of each of patterns A and C is connected directly to a common fourth circle output terminal 490 which is grounded through a loading resistor 430. Second circle output brush 220B of pattern B is connected forwardly through a crystal 439 to output terminal 490. Third circle output brush 320B of pattern B is connected to an output terminal 390 which is grounded through a loading resistor 330. Circles 100 through 400 of patterns A and C are concentrically mounted on opposite sides of a pattern disk A—C; and circles 100, 200, 300 and 500 of pattern B are concentrically mounted on one side of a pattern disk B. Pattern disks A—C and B are reduction geared such that two revolutions of pattern disk B produce three revolutions of pattern disk A—C. A third pattern disk D, concentrically mounting circles 600 and 700, is reduction geared to rotate with patterns A—C and B such that one revolution of pattern disk D produces four revolutions of pattern disk B and six revolutions of pattern disk A—C. Pattern D is shown cut radially along line D and developed. Fifth circle input brush 510 is connected to one terminal of a glow tube 500. The other terminal of glow tube 550, the negative terminal thereof, is connected forwardly through a crystal 598 to one input brush 612 of a pair of input brushes 612 and 610 disposed to alternately contact the segments and spaces of this sixth circle 600. Fifth circle output brush 520 is connected forwardly through a crystal 596 to input brush 610. Brushes 610 and 612 are spaced apart a length of arc subtending a central angle of 45°. The negative terminal of glow tube 550 is connected forwardly through a crystal 696 to one input brush 710 of a pair of input brushes 710 and 712 disposed to alternately contact the equal segment and space of this seventh circle 700. Fifth circle output brush 520 is connected forwardly through a crystal 698 to brush 712. Brushes 710 and 712 are likewise spaced apart a length of arc subtending a central angle of 45°. Sixth circle output brush 620 is connected to the input of a buffer amplifier 688, the output of which is connected through a relay actuating winding 670 to ground. Relay winding 670 controls relay armature 673. Seventh circle output brush 720 is connected to the positive terminal of a bias battery 714 the negative terminal of which is connected to seventh circle output terminal 790. Output brush 720 is grounded through a loading resistor 730.

The output at terminal 790 appends the plus or minus sign to the sine function. The negative voltage supplied by bias battery 714 may be one-quarter the positive voltage of input excitation battery 10 so that a positive output voltage at terminal 790 indicates a positive sign and a negative voltage indicates a negative sign of the function.

Relay actuating winding 560—570 preferably should have a resistance value equal to that of input resistor 527, since winding 560—570 in addition to controlling relay armatures 563, 566, and 573 also acts as a low impedance input loading resistor upon the low impedance input resistor 527 so that complementary output signals are produced at output brush 520 and the negative terminal of glow tube 550.

In operation of the converter of FIGURE 33, the output at terminal 190 represents the least significant digit of a binary count changing in increments of 1/8 or $2^{-3}$. An output signal at terminal 290 represents 1/4 or $2^{-2}$; an output at terminal 490 represents 1/2 or $2^{-1}$; an output at terminal 390 represents 1 or $2^0$; and, as previously indicated, the plus or minus sign appears at output terminal 790. The converter is shown adjacent 90°, where the count is +1. Pattern B receives input excitation voltage from contact 671 between 45° and 135° as previously explained. At the 90° point, input brush 110B lies in the middle of the double interval length ① interval; and input brush 510 engages one of the noncritical ends of the segment of circle 500. Relay winding 560—570 becomes energized, drawing armatures 563 and 566 from their normal engagement with contacts 561 and 564 into engagement with contacts 562 and 565, respectively. Conduction is shifted from leading brush 212B to lagging brush 210B. This extra brush alternation at 90° intermediate the double interval length ① interval conditions pattern B for an unambiguous decreasing count from 90° to 135°. The count proceeds conventionally through the remainder of the ① interval, through the 7/8 interval, and through that portion of the 3/4 interval which is provided on pattern B. At 135° input brush 510 breaks contact with the other of the noncritical ends of the segment of circle 500 causing conduction to shift from lagging brush 610 to leading brush 612, which brushes symmetrically straddle a transfer point of circle 600. Relay actuating winding 670 becomes energized, drawing armature 673 from its normal engagement with contact 671 into engagement with contact 672. Relay winding 560—570 becomes de-energized permitting armature 573 to disengage contact 572 and return to its normal engagement with contact 571. Thus at 135° input excitation voltage is removed from pattern B and applied to pattern C. The count of 3/4 begun on pattern B is continued on pattern C. The count proceeds conventionally on pattern C through the remaining portion of the 3/4 interval, through the 5/8, 1/2, 3/8, 1/4 and 1/8 intervals, and through half of the ⓪ interval. At 180° input brush 510 engages a noncritical end of the segment of circle 500 causing conduction to shift from lagging brush 710 to leading brush 712, which brushes symmetrically straddle a transfer point of circle 700. Output brush 720 drops to ground; and the output at terminal 790 changes from a positive voltage to a negative voltage, indicating that the sign of the function has changed from positive to negative. Relay winding 560—570 becomes energized, drawing armature 573 from its normal engagement with contact 571 into engagement with contact 572. Thus at 180° input excitation voltage is removed from pattern C and applied to pattern A. The count of 0 begun on pattern C is continued on pattern A. The count proceeds conventionally on pattern A through the remaining half of the ⓪ interval, through the negative 1/8, 1/4, 3/8, 1/2 and 5/8 intervals, and through a portion of the negative 3/4 interval. At 225° fifth circle input brush 510 breaks contact with a noncritical end of the segment of circle 500, causing conduction to shift from lagging brush 610 to leading brush 612, which brushes symmetrically straddle a transfer point of circle 600. Winding 670 becomes de-energized, permitting armature 673 to disengage contact 672 and return to its normal engagement with contact 671. Thus at 225° input excitation voltage is removed from pattern A and applied to pattern B. At the same time winding 560—570 becomes de-energized, permitting armatures 563 and 566 to disengage contact 562 and 565 and return to their normal engagement with contacts 561 and 566 respectively. Conduction is shifted from lagging brush 210B to leading brush 212B. This extra brush alternation at 225° conditions pattern B for an unambiguous increasing count from 225° to 270°. The count proceeds conventionally through the remaining portion of the negative (3/4) interval, through the (7/8) interval and through half of the double interval length ① interval to arrive at the 270° point, where pattern D has completed half a revolution. As pattern D is rotated through its remaining half revolution from 270° back to 90° again, the outputs at terminals 190, 290, 490 and 390 are reproduced exactly as for the preceding half revolution. However, the output at terminal 790 will remain negative indicating a negative sign of the function until the 360° or 0° point, where the output at terminal 790 will become positive indicating that the sign of the function has changed from negative to positive. At 270° relay winding 560—570 will again produce an extra brush alternation from leading brush 212B to lagging brush 210B in order to condition pattern B for an unambiguous decreasing count. Interpattern transfer will occur from pattern B to pattern C at 315°, from pattern C to pattern A at 360° or 0°, and from pattern A to pattern B at 45°. Also at 45° relay winding 560—570 will be de-energized, causing conduction to shift from lagging brush 210B to leading brush 212B, and produce an extra brush alternation to condition pattern B for an unambiguous increasing count. No change in output representation occurs due to interpattern transfer since the same count is provided by adjacent patterns. For interpattern transfer, whether by the superextension of count or by the abbreviation of patterns, the same output representation is provided unchanged. For interpattern transfer at 0°, 180°, and 360° or 0° again, the output changes from negative to positive or from positive to negative; but the count of +0 is the same as the count of −0.

It will be appreciated that the converter of FIGURE 33 is not an inverse form since spaces correspond to even numbers and segments correspond to odd numbers according to our usual convention.

Table 33, Col. 181, shows the normal digital outputs at terminals 190, 290, 490, and 390 and the sign outputs at terminal 790 and interpattern transfer between patterns A and C at the midpoints of the ⓪ intervals corresponding to 0°, 180°, and 360° or 0° again and interpattern transfer between patterns A and B intermediate the (3/4) intervals corresponding to 45° and 225° and interpattern transfer between patterns B and C intermediate the (3/4) intervals corresponding to 135° and 315° and the extra conditioning brush reversing alternation for pattern B at the midpoint of the double interval length ① intervals corresponding to 90° and 270° where a change in slope sign occurs for the converter of FIGURE 33 in providing the sine function as pattern disk A—C and reduction-geared pattern disk B and further reduction-geared pattern disk D move under the stationary brushes to successively occupy the various intervals.

Patterns A through C in conjunction with interpattern switching circle 600 of pattern D produce the absolute value of the sine function; and circle 700 of pattern disk D appends the sign of the function. Were circle 700 omitted, then the converter of FIGURE 30 would produce the output wave form of a resistance-loaded full-wave rectifier; then pattern disk D would be reduction geared by such ratio that one revolution of pattern D produces two revolutions of pattern disk B and three revolutions of pattern disk A—C; and then circle 600 would comprise only that portion subtended either between 0° and 180° or between 180° and 360°. In the converter of FIGURE 33, while circle 600 may be mounted on a pattern disk other than pattern disk D such that two revolutions of this other pattern disk produce one revolution of disk D and four revolutions of disk B and six revolutions of disk A—C with the corresponding alteration that circle 600 comprise only that portion subtended either between 0° and 180° or between 180° and 360°, yet the additional complexity would not justify the resultant doubling of tolerances for circle 600, since the tolerances for circle 600 are already sufficiently large.

In the converter of FIGURE 33 corresponding outputs of patterns A through C are connected in parallel to the output terminals with such blocking crystals as may be required to prevent the unwanted cross-feeding of spurious signals to the unenergized patterns, as was indicated for FIGURES 7 through 14 and shown in FIGURES 29 and 30. In the converter of FIGURE 33 the first circle output signals of patterns A through C appearing at output brushes 120 are connected in parallel through blocking crystals 139 to output terminal 190; the second circle output signals of patterns A through C appearing at output brushes 220 are connected in parallel through blocking crystals 239 to output terminal 290; the fourth circle output signals of patterns A and C are connected in parallel directly to output terminal 490, no blocking crystals being required; and output brush 220B of pattern B is connected in parallel to output terminal 490, but through a blocking crystal 439. Output brushes 420A and 420C may be connected in parallel without blocking crystals because crystals 296 prevent the spurious impression of signals from circles 400 upon preceding circles and because there are no subsequent circles which receive signals from circles 400. Blocking crystals 439 prevents a "1" at output terminal 490 from either brush 420A or 420C from also creating an erroneous "1" at output terminal 290. Similarly blocking crystals 239B prevents a "1" at output terminal 290 from either brush 220A or 220C from also creating an erroneous "1" at output terminal 490.

It will be noted that for each of patterns A and C no crystal need be provided either between the negative terminal of glow tube 150 and input brush 212 or between output brush 320 and input brush 412, since glow tube 150 provides essentially infinite impedance so long as its breakdown voltage is not exceeded.

Interpattern switching is shown controlled from circle 500 of pattern B, but by way of circle 600 of pattern D. As explained in conjunction with the converters of FIGURES 7 through 14, 29, and 30, while it is possible to control interpattern switching directly from circle 600 by means of a single input signal derived directly from the input excitation voltage, the tolerances will be increased by a factor of four when controlling interpattern switching from circle 500 on reduction-geared pattern B so that two complementary input signals are applied to circle 600, because of the four-to-one reduction gearing between pattern disks B and D. If desired, the tolerances for interpattern switching may be further increased by a factor of two by providing an additional circle having one segment and one space of equal lengths, mounting this additional circle on an additional pattern disk reduction geared such that one revolution of pattern disk B produces two revolutions of this additional disk, obtaining two complementary output signals from this additional circle, and coupling the two complementary outputs of this additional circle either to circle 500 or to circle 600. If the two complementary outputs of this additional

| Interval | Outputs at Terminal | | | | | Binary Count | Decimal Count |
|---|---|---|---|---|---|---|---|
| | 790 | 390 | 490 | 290 | 190 | | |
| 1/8 | + | 0 | 0 | 0 | 1 | +0.001 | +0.125 |
| 1/4 | + | 0 | 0 | 1 | 0 | +0.010 | +0.250 |
| 3/8 | + | 0 | 0 | 1 | 1 | +0.011 | +0.375 |
| 1/2 | + | 0 | 1 | 0 | 0 | +0.100 | +0.500 |
| 5/8 | + | 0 | 1 | 0 | 1 | +0.101 | +0.625 |
| 3/4 | + | 0 / 0 | 1 / 1 | 1 / 1 | 0 / 0 | +0.110 | +0.750 |
| 7/8 | + | 0 | 1 | 1 | 1 | +0.111 | +0.875 |
| 1 | + | 1 | 0 | 0 | 0 | +1.000 | +1.000 |
| 1 | + | 1 | 0 | 0 | 0 | +1.000 | +1.000 |
| 7/8 | + | 0 | 1 | 1 | 1 | +0.111 | +0.875 |
| 3/4 | + | 0 / 0 | 1 / 1 | 1 / 1 | 0 / 0 | +0.110 | +0.750 |
| 5/8 | + | 0 | 1 | 0 | 1 | +0.101 | +0.625 |
| 1/2 | + | 0 | 1 | 0 | 0 | +0.100 | +0.500 |
| 3/8 | + | 0 | 0 | 1 | 1 | +0.011 | +0.375 |
| 1/4 | + | 0 | 0 | 1 | 0 | +0.010 | +0.250 |
| 1/8 | + | 0 | 0 | 0 | 1 | +0.001 | +0.125 |
| 0 | + / − | 0 / 0 | 0 / 0 | 0 / 0 | 0 / 0 | +0.000 / −0.000 | +0.000 / −0.000 |
| 1/8 | − | 0 | 0 | 0 | 1 | −0.001 | −0.125 |
| 1/4 | − | 0 | 0 | 1 | 0 | −0.010 | −0.250 |
| 3/8 | − | 0 | 0 | 1 | 1 | −0.011 | −0.375 |
| 1/2 | − | 0 | 1 | 0 | 0 | −0.100 | −0.500 |
| 5/8 | − | 0 | 1 | 0 | 1 | −0.101 | −0.625 |
| 3/4 | − | 0 / 0 | 1 / 1 | 1 / 1 | 0 / 0 | −0.110 | −0.750 |
| 7/8 | − | 0 | 1 | 1 | 1 | −0.111 | −0.875 |
| 1 | − | 1 | 0 | 0 | 0 | −1.000 | −1.000 |
| 1 | − | 1 | 0 | 0 | 0 | −1.000 | −1.000 |
| 7/8 | − | 0 | 1 | 1 | 1 | −0.111 | −0.875 |
| 3/4 | − | 0 / 0 | 1 / 1 | 1 / 1 | 0 / 0 | −0.110 | −0.750 |
| 5/8 | − | 0 | 1 | 0 | 1 | −0.101 | −0.625 |
| 1/2 | − | 0 | 1 | 0 | 0 | −0.100 | −0.500 |
| 3/8 | − | 0 | 0 | 1 | 1 | −0.011 | −0.375 |
| 1/4 | − | 0 | 0 | 1 | 0 | −0.010 | −0.250 |
| 1/8 | − | 0 | 0 | 0 | 1 | −0.001 | −0.125 |
| 0 | − / + | 0 / 0 | 0 / 0 | 0 / 0 | 0 / 0 | −0.000 / +0.000 | −0.000 / +0.000 |
| 1/8 | + | 0 | 0 | 0 | 1 | +0.001 | +0.125 |

Table 33

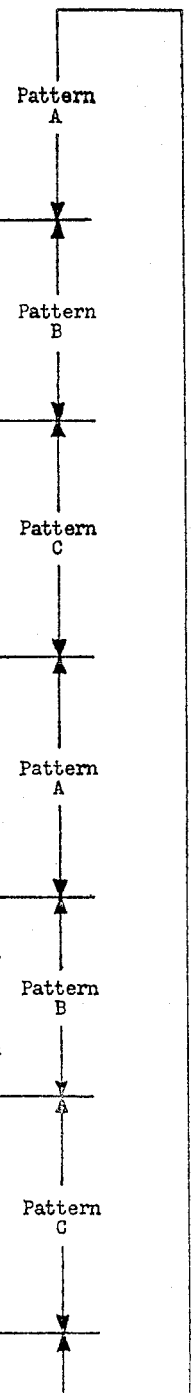

circle are coupled to circle 500, then circle 500 would be provided with two input brushes spaced apart a length of arc equal to half the length of the segment or of the space of circle 500. If the two complementary output signals of this additional circle are coupled directly to circle 600, then input brushes 610 and 612 would be spaced apart a length of arc subtending a central angle of 22.5°.

Since the value of the sine at 45° and 135° is the same, it is not necessary for interpattern transfer that the count of pattern B be here superextended or that disk B have an abbreviated pattern. Accordingly both pattern B and the rotation of disk B cover 90° of the sine function.

Over the range from 45° to 135° and from 225° to 315°, for a converter having a resolution $r$ of 1/8, the output representation of pattern B will be always equal to or greater than the count of 3/4; and we may simultaneously supply outputs to terminals 290 and 490 from second circle output brush 220B. Hence it is not necessary to provide a circle for pattern B equivalent to circles 400 of patterns A and C.

The count of pattern B has a change in slope sign at the midpoint of the double interval length ① interval, corresponding to 90° and 270°, which constitutes a peak or local maximum. The count of pattern B also has, neglecting interpattern transfer to either pattern A or pattern C, a dip or local minimum at the 45°, 135°, 225°, and 315° points, where the value of the sine function is 3/4. For our purposes the count must be expressed in terms of the resolution $r$ to determine whether a particular representation is an odd or an even number. In FIGURE 33 the resolution $r$ is 1/8 or $2^{-3}$; and thus for our purposes the count of 1 is 8/8 or $8 \times 2^{-3}$, which is an even number; and the count of 3/4 is 6/8 or $6 \times 2^{-3}$, which is also an even number. The count of pattern B then contains, neglecting interpattern transfer to either of patterns A or C, a natural even dip and a nonnatural even peak. As explained in conjunction with FIGURES 18 and 28, where a nonnatural even peak is at least of double interval length, then such simple change in slope sign may be produced by the general method and does not require the use of the first adaptation of the general method as in FIGURE 20. Pattern B of FIGURE 33 embodies the general method as in the converter of FIGURE 18, since the nonnatural even peak for the (8/8) or ① interval exceeds the requirement that it be double the length of (7/8) interval.

It will be appreciated that the converters of FIGURES 15, 16, and 17 may be used as a substitute for pattern B of FIGURE 33. In the event of the substitution of one of the converters of FIGURES 15, 16, and 17 for pattern B of FIGURE 33, then such substituted converter must incorporate the slight alteration that complementary outputs are produced for circle 200, in order to obtain an equivalent for the complementary output at brush 320B of FIGURE 33. For FIGURES 15, 16, and 17, a complementary output for circle 200 may be obtained by connecting output brush 220 to the input of an inverting amplifier.

In the converter of FIGURE 33 the tolerances for interpattern switching are obtained by the use of abbreviated patterns, but such switching need not be instantaneous since the same output representation is provided unchanged. Appreciable response lag tolerances for interpattern transfer exist, enabling high counting rates before a momentary ambiguity will occur at a subsequent transfer point. Purely electronic switching devices, rather than electromechanical relays, may be used to further increase the permissible counting rate.

In the converter of FIGURE 33 the change in slope sign for pattern B is obtained by means of an extra conditioning brush reversing alternation. This extra brush alternation conditions the converter for an unambiguous count where a change in slope sign occurs; but the same output representation is provided unchanged. If it is required that the converter of FIGURES 18 or 19 be used for pattern B, then appreciable response lag tolerances for the extra conditioning brush reversing alternation exist, enabling high counting rates before a momentary ambiguity will be produced at a subsequent transfer point. Purely electronic reversing switch devices, rather than electromechanical relays, may be used to provide a higher counting rate. A still higher counting rate may be provided if one of the converters of FIGURES 15, 16, and 17 may be used, since these converters produce a change in slope sign without the necessity for an extra brush reversing alternation.

In the converter of FIGURE 33, pattern B provides the sine function between the 45° and 135° points. The value of the sine function at these points, to three places, is 0.707; but in a converter having a resolution $r$ of 1/8 or 0.125, such value cannot be exactly represented. Accordingly, interpattern transfer from pattern B to patterns A or C does not occur precisely at the midpoints of the (3/4) intervals. The lengths of arc subtended by the portions of pattern B located between the (7/8)—(3/4) transfer points and line B are each considerably more than half the length of any (3/4) interval; and the lengths of arc subtended by the portions of patterns A and C located between the (5/8)—(3/4) transfer points and lines A and C, respectively, are each considerably less than half the length of any (3/4) interval. In all of the converters thus far considered, with the exception of the converter of FIGURE 33, interpattern transfer has occurred at points which may be precisely represented in the binary code; and interpattern transfer has occurred either precisely at or closely adjacent the midpoint of an interval. In the converter of FIGURE 33, although interpattern transfer at the 45° and 135° points occurs far removed from the midpoints of the (3/4) intervals, yet no difficulties arise because such interpattern transfer is accomplished by the abbreviation of patterns. Interpattern transfer by the use of abbreviated patterns may be accomplished without difficulty even if interpattern transfer coincides with a transfer point of the function. However, for interpattern transfer by the superextension of count, difficulties do arise if interpattern transfer occurs coincident with or closely adjacent a transfer point of the function.

Suppose it is desired to produce a three-pattern sine converter having interpattern switching at the 45° and 135° points and a resolution $r$ of $2^{-7}$ or 1/128. The value of the sine function at these points, to seven places, is 0.7071068. Since 90/128=0.7031250 and since 91/128=0.7109375, it can be seen that 90/128 differs from such value of the sine function by a negative error of .0039818 and that 91/128 differs from such value of the sine function by a positive error of .0038307. Regardless of whether the error criterion is least squares or zero average error, the (90/128)—(91/128) transfer points of the function occur either at or closely adjacent the 45° and 135° points, since at these points the positive and negative errors are substantially equal. Hence in a three-pattern sine converter with a resolution $r$ of 1/128, interpattern switching at the 45° and 135° points is substantially coincident with the (90/128)—(91/128) transfer points of the function. As indicated in the preceding paragraph, difficulties will arise if interpattern transfer is accomplished by the superextension of count. The count of each of patterns A and C will proceed 0/128, 1/128, 2/128, . . . , 88/128, 89/128, 90/128, and 0/128 again. The count of pattern B will proceed 91/128, 92/128, 93/128, . . . , 126/128, 127/128, 128/128, 127/128, 126/128, . . . , 93/128, 92/128, and 91/128 again, with a change in slope sine at the counts of 128/128 and 91/128. Assume for the moment that the counts of neither of patterns A or C is superextended. If interpattern transfer adjacent 45° from pattern A to pattern B occurs prematurely, then no ambiguity will occur since the count of 90/128 of pattern A will change to the count of 91/128 of pattern B. This premature interpattern switching will cause a slight displacement of the true transfer point but this error is not serious. If interpattern transfer adjacent 45° from pattern A to pattern B occurs tardily, then an ambiguity will occur since the count of 90/128 will change to the count of 0/128 on pattern A before changing to 91/128 on pattern B. In order to eliminate this serious ambiguity error, the counts of patterns A and C must be superextended such that the count of 0/128 selectively represents the count of 91/128. However, this single superextension of count is not sufficient where interpattern switching occurs substantially coincident with a transfer of the function. If interpattern transfer adjacent 0° between patterns A and C occurs either prematurely or tardily, an ambiguity will be produced since the count will proceed 0/128, 90/128, and 0/128. In order to eliminate this additional ambiguity, each of patterns A and C must be superextended such that the count of 90/128 selectively represents the count of 0/128. As a consequence, the difficulties arising where interpattern switching is coincident with a transfer point may be overcome by doubly superextending patterns A and C such that the two adjacent intervals (the (90/128) and (0/128) intervals) alternately and selectively represent different counts (the counts of 0/128 and 91/128, respectively). Whereas a singly-superextended pattern is adapted to rotate through slightly more than one revolution, a doubly-superextended pattern is adapted to rotate through considerably more than one revolution. Double superextension is one method by which we may overcome the difficulties arising from the coincidence of interpattern switching with a transfer point of the function.

Referring now to FIGURE 33a, we have shown a fragmentary view of pattern A of the converter of FIGURE 33 on an enlarged scale about the inactive or abbreviated portion between the 45° and 0° points. We here wish to show the precise locations of the transfer points between segments and spaces to maximize the tolerances afforded by the abbreviated pattern and have therefore not followed our usual convention of showing the noncritical ends of segments by sloping lines. Also to more clearly show the precise locations of the transfer points of circle 200A, we have omitted intermeshing circle 300A. The effect of circle 300A may be produced by coupling the output at brush 220A to the input of an inverting amplifier. Since each revolution of pattern A represents 60° of the sine function, the 0° point corresponds also to 60°; and the abbreviated portion between 45° and 0° or 60° represents 15° of the sine function. We now wish to determine the proper placements of the transfer points of circles 200 and 400 at lines $m$ and $n$, respectively, within the inactive portion of pattern A to maximize the tolerances. As shown in Table 27, the (0)—(1/8) transfer point is substantially at 3.6°; the (1/8)—(1/4) transfer point is substantially at 10.8°; the (3/8)—(1/2) transfer point is substantially at 26.0°; the (5/8)—(3/4) transfer point is substantially at 43.4°; and the (3/4)—(7/8) transfer point is substantially at 54.4°.

The (1/8) interval extends through the difference between 10.8° and 3.6°. This difference is 7.2° and is the spacing between brushes 210 and 212. The (1/4) and (3/8) intervals extend through the difference between 26.0° and 10.8°. This difference is 15.2° and is the spacing between brushes 410 and 412. At the (1/8)—(0) transfer point conduction shifts from brush 210 to brush 212. Since brushes 210 and 212 are spaced apart by 7.2° and symmetrically straddle the 3.6° point corresponding to the (1/8)—(0) transfer point, brush 210 lies at the 0° point and brush 212 lies at the 7.2° point. The spacing between brush 212 and the segment of circle 200 corresponding to the (1/8)—(1/4) transfer point is 3.6°. We desire that the transfer point of circle 200 at line $m$ within the inactive portion of pattern A be positioned to afford an equal tolerance relative to brush 210. We may afford a tolerance of 3.6° between brush 210 and the transfer point of circle 200 at line $m$ within the inactive portion by positioning such transfer point at 56.4°. Since at the (1/8)—(0) transfer point conduction shifts from brush 210 to brush 212, brush 210 is required to couple a signal no closer than 3.6° from the line $m$ transfer point of circle 200. Interpattern transfer from pattern A to pattern B should occur adjacent the 0° point. A tolerance of 3.6° is permissible on either side of the 0° point for this interpattern switching so that the (0)—(1/8) transfer point of pattern C will not be displaced from its true position. Adjacent 0° as the brushes move to the left, the apparent tolerance for tardy interpattern switching is 7.2° before lagging brush 212 will contact the line $m$ transfer point of circle 200 within the inactive portion at 56.4°. But this apparent tolerance for tardy interpattern switching is twice as great as the actual tolerance of 3.6° since pattern C must produce the (0)—(1/8) transfer point. Interpattern switching from pattern A to pattern B should occur adjacent the 45° point. Since the (5/8)—(3/4) transfer point is at 43.4° as the brushes move to the right, switching to pattern B adjacent 45° must not occur more prematurely than 1.6°, since otherwise the true (5/8)—(3/4) transfer point would be slightly shifted. At the 45° position brush 212 carrying a signal lies at the 48.6° position. Since the line $m$ transfer point of circle 200 within the inactive or abbreviated portion is at 56.4°, the tolerance for tardy interpattern switching as the brushes move to the right is 7.8° before brush 212 will break contact and create an ambiguity. The (3/4)—(7/8) transfer point being at 54.4° which is 9.4° greater than 45°, the limitation on tardy interpattern switching is imposed by the 54.4° transfer point of circle 200 at line $m$ rather than by the necessity of creating the (3/4)—(7/8) transfer point on pattern B. Let us now determine the optimum location of the transfer point of circle 400 within the abbreviated portion of the pattern. At the (1/4)—(1/8) transfer point, as the brushes move to the left, conduction shifts from leading brush 410 to lagging brush 412. Since brushes 410 and 412 symmetrically straddle the 10.8° point with a spacing of 15.2°, brush 410 lies at 7.6° less than the 10.8° point or at the 3.2° point. At the (5/8)—(3/4) transfer point at 43.4°, as the brushes move to the right, conduction shifts from leading brush 412 to lagging brush 410. Brush 412 lies at 7.6° greater than the 43.4° point or at the 51.0° point. The line $n$ transfer point of circle 400 is placed intermediate the 3.2° and 51.0° points or at 57.1° position. Since the separation between these 3.2° and 51.0° points is 12.2°, the closest to this 57.1° line $n$ transfer point of circle 400 that either of brushes 410 or 412 will be required to couple a signal will be 6.1°. This tolerance is slightly less than the 7.6° tolerance for the remaining transfer points of circle 400; but nevertheless, the cascading has certainly increased the 3.6° tolerance existing for circle 200. Line $m$ corresponds to the 56.4° placement of the transfer point of circle 200 within the inactive or abbreviated portion of the pattern; and line $n$ corresponds to the 57.1° placement of the transfer point of circle 400 within the inactive or abbreviated portion of the pattern. It can be seen that these transfer points are not coincident but instead differ in position by 0.7° in order that the tolerances for the abbreviated pattern be maximized.

It will be appreciated that the locations in degrees of the sine function do not represent the locations in terms of central angles relative to pattern disk A. Each revolution of pattern disk A represents 360° of the central angle which is 60° of the sine function. Accordingly, the positions indicated in terms of the sine function must be multiplied by a factor of six in order to determine the locations of transfer points of pattern A in terms of central angles.

As a general rule superextension of count is preferable to the abbreviation of patterns. For superextension of count, a pattern disk is adapted to rotate through at least a full rotation, whereas for an abbreviated pattern, an appreciable portion must be inactive to permit of sufficient tolerances for interpattern switching. But an abbreviated pattern may be used with advantage where interpattern switching is substantially coincident with a transfer point of the function, since the elimination of ambiguity would otherwise require the double superextension of count. In effect, the double superextension of count is equivalent to the abbreviation of patterns.

Resolvers for Simultaneously Producing the Sine and Cosine Functions

Referring now to FIGURE 29a, which should be read in conjunction with FIGURE 29, the positive terminal of input battery 10 is coupled directly to input resistors 127A and 127B. Relay armature 873 and relay contacts 871 and 872 are no longer required components and may be eliminated. Relay actuating winding 870 controls instead a plurality of double pole double throw reversing switches indicated generally by the reference numerals 841, 843, 845, and 847. The negative terminals of glow tubes 150 are connected directly to the inputs of reversing switch 841. Crystals 139 are no longer required components and may be eliminated. One output of reversing switch 841 is connected to the first circle sine output terminal 190; and the other output of reversing switch 841 is connected to a first circle cosine output terminal 191. Output brushes 320 are connected directly to the inputs of reversing switch 843. Crystals 339 are no longer required components and may be eliminated. One output of reversing switch 843 is connected to the third circle sine output terminal 390; and the other output of reversing switch 843 is connected to a third circle cosine output terminal 391. Fifth circle output brushes 520, rather than being connected directly to output terminal 590, are instead connected directly to the inputs of reversing switch 845. One output of reversing switch 845 is connected to the fifth circle sine output terminal 590; and the other output of reversing switch 845 is connected to a fifth circle cosine output terminal 591. Output brushes 420, rather than being connected directly to input brush 710, are instead connected to the inputs of reversing switch 847. One output of reversing switch 847 is connected to the input brush 710; and the other output of reversing switch 847 is connected to an additional input brush 711. Input brush 711 is disposed to alternately contact the segments and spaces of an additional circle 701, which is mounted on pattern disk C. Circle 701 is identical to circle 700 except that the two circles are phase shifted by 90° such that the midpoints of the segments of circle 701 coincide with 180° and 0° or 360°. An additional output brush 721 of circle 701 is connected to a seventh circle cosine output terminal 791. An additional circle 1001 is mounted on pattern disk C. Circle 1001 is identical to circle 1000 except that the two circles are phase shifted by 90° such that the transfer points of circle 1001 coincide with the 90° and 270° points. Output brush 820 is connected forwardly through a crystal 899 to one input brush 1013 of a pair of input brushes 1013 and 1011 disposed to alternately contact the equal segment and space of circle 1001. Ninth circle output brush 920 is connected forwardly through a crystal 897 to input brush 1011. Input brush 1011 is radially aligned with brush 1010; and input brush 1013 is radially aligned with brush 1012. Consequently complementary input brushes 1011 and 1013 subtend a central angle of 90° as do brushes 1010 and 1012. An output brush 1021 of circle 1001 is connected to the positive terminal of a bias battery 1015. The negative terminal of battery 1015 is connected to cosine output terminal 1091 at which appears the sign of the cosine function. When relay winding 870 is not energized, the outputs of circles 100, 300, 500, and 700 of pattern A are coupled through respective reversing switches 841, 843, 845, and 847 to output terminal 190, output terminal 390, output terminal 590, and input brush 710, respectively; and the outputs of circles 100, 300, 500, and 700 of pattern B are coupled through respective reversing switches 841, 843, 845, and 847 to output terminal 191, output terminal 391, output terminal 591, and input brush 711, respectively. When relay actuating winding 870 is energized, reversing switch 841 causes output terminal 190 to be connected to the negative terminal of glow tube 150B and causes output terminal 191 to be connected to the negative terminal of glow tube 150A; reversing switch 843 causes terminal 390 to be connected to brush 320B and causes terminal 391 to be connected to brush 320A; reversing switch 845 causes terminal 590 to be connected to brush 520B and causes terminal 591 to be connected to brush 520A; and reversing switch 847 causes input brush 710 to be connected to output brush 420B and causes input brush 711 to be connected to output brush 420A.

While in the converter of FIGURE 29 crystal 898 is not a required component and may be eliminated, yet in the resolver of FIGURE 29a crystal 898 must be used to prevent a short-circuiting of signals between brushes 1010, 1011, 1012, and 1013.

In operation of the resolver of FIGURE 29a the outputs at terminals 190, 390, 590, and 790 provide the absolute of the sine function; and the output at terminal 1090 appends the sign of the sine function. The outputs at terminal 191, 391, 591, and 791 provide the absolute value of the cosine function; and the output at terminal 1091 appends the sign of the cosine function. In order that a positive voltage at output terminal 1091 may represent a positive sign and that a negative voltage may indicate a negative sign of the cosine function, bias battery 1015, as bias battery 1014, may provide a negative bias of one-quarter the voltage of input excitation battery 10. The resolver is shown between 180° and 270° where relay winding 870 is not energized and pattern A provides the sine function while pattern B provides the cosine function. Between 270° and 360° relay winding 870 is energized; and pattern B provides the sine function while pattern A provides the cosine function. Between 0° and 90° relay winding 870 is not energized; and pattern A provides the sine function while pattern B provides the cosine function. Between 90° and 180° relay winding 870 is energized; and pattern B provides the sine function while pattern A provides the cosine function. Patterns A and B constantly receive input excitation voltage; but corresponding outputs are alternately reversed to provide the sine and the cosine functions. At 90° and 270° input brush 710 of sine superextension circle 700 is shifted from brush 420A to brush 420B; but no change in output representation occurs. At 0°, 180°, and 360° or 0° again, input brush 711 of cosine superextension circle 701 is shifted from brush 420B to brush 420A; but again no change in output representation occurs.

Table 29a shows the switching between patterns A and B in the four quadrants to provide a resolver producing both the sine and cosine functions simultaneously.

189

| Quadrant of Arguments θ | Pattern Providing Sin θ | Pattern Providing Cos θ |
|---|---|---|
| 0°- 90° | A | B |
| 90°-180° | B | A |
| 180°-270° | A | B |
| 270°-360° | B | A |
| 0°- 90° | A | B |

Table 29a

Since interpattern reversing between patterns A and B in the four quadrants causes no change in output representation, appreciable response lag tolerances exist for relay winding 870 in actuating reversing switches 841, 843, 845, and 847. If the desired counting rate is so high that a momentary ambiguity may be produced at a subsequent transfer point, then purely electronic reversing switches may be used. In all of the converters thus far considered, with the exception of the resolver of FIGURE 29a, interpattern transfer has been accomplished by switching the input excitation voltage between patterns and combining in parallel corresponding outputs through isolation crystals, where such crystals are required. In the resolver of FIGURE 29a, both patterns constantly receive input voltage; and interpattern reversing is accomplished by the appropriate selection of one of each two corresponding outputs. In the previous converters interpattern transfer is accomplished solely by switching the input excitation voltage, while in the resolver of FIGURE 29a interpattern transfer is accomplished solely by switching between corresponding outputs.

It will be appreciated that to provide a resolver producing both the sine and cosine functions simultaneously, the converter must have a minimum of two patterns; and two patterns must simultaneously receive input excitation voltage.

Referring now to FIGURE 30a, which should be read in conjunction with FIGURE 30, we have shown a four-pattern resolver for simultaneously producing both the sine and cosine functions.

The positive terminal of input battery 10 is connected directly to armatures 773 and 776. Relay armature 973 and relay contacts 971 and 972 are no longer required components and may be eliminated. Relay actuating winding 970 instead controls a plurality of double-pole double-throw reversing switches indicated generally by the reference numerals 904, 941, 943, 944, and 946. Relay contacts 772 and 774 are connected directly to the inputs of reversing switch 940. Crystals 439 are no longer required and may be eliminated. One output of reversing switch 940 is connected to one terminal of the voltage dividing resistor 431; and the other output of reversing switch 940 is connected to one terminal of an additional voltage dividing resistor 432. The cathodes of crystals 139A and 139B are connected to one input of reversing switch 941; and the cathodes of crystals 139C and 139D are connected to the other input of switch 941. One output of switch 941 is connected to the first circle sine output terminal 190; and the other output of switch 941 is connected to a first circle cosine output terminal 191. Output brushes 320A and 320B are connected to one input of reversing switch 943; and output brushes 320C and 320D are connected to the other input of switch 943. One output of reversing switch 943 is connected to the third circle sine output terminal 390; and the other

190 output of switch 943 is connected to a third circle cosine output terminal 391. Output brush 220A is connected to an input brush 410C disposed to alternately contact the segment and space of a circle 400C mounted on pattern C. Output brush 220D is connected to an input brush 410B disposed to alternately contact the segment and space of a circle 400B mounted on pattern B. Circle 400C of FIGURE 30a is identical to circle 400 of FIGURE 30 except for a shifting in alignment such that the midpoint of the space of circle 400C in FIGURE 30a coincides with line C. In FIGURE 30 the midpoint of the segment of circle 400 coincides with line C. The additional circle 400B in FIGURE 30a is identical to circle 400C and is mounted on pattern B such that the midpoint of its space coincides with line B. Output brushes 420B and 420C of circles 400B and 400C of FIGURE 30a are connected to the inputs of reversing switch 944. One output of switch 944 is connected to the input of amplifier 488, the output of which is connected to fourth circle sine output terminal 490; and the other output of switch 944 is connected to the input of an additional amplifier 489, the output of which is connected to a fourth circle cosine output terminal 491. The terminal of voltage dividing resistor 431 remote from switch 940 is connected to the input of amplifier 488; and the terminal of voltage dividing resistor 432 remote from switch 940 is connected to the input of amplifier 489. The input of amplifier 488 is grounded through a loading resistor 430; and the input of amplifier 489 through an additional loading resistor 429. Output brushes 220B and 220C are connected to the inputs of reversing switch 946. One output of switch 946 is connected to sixth circle input brush 610. The other output of reversing switch 946 is connected to an additional input brush 611 disposed to alternately contact the segments and spaces of an additional circle 601 mounted on pattern E. Circle 601 is identical to circle 600 except that the two circles are phase shifted by 90° such that the midpoints of the segments of circle 601 correspond to 180° and 0° or 360°. An output brush 621 of circle 601 is connected to a sixth circle cosine output terminal 691. Output brush 620 of sixth circle 600 is again connected to the sixth circle sine output terminal 690. Output brush 620 is again connected to the input of an inverting amplifier 680, which may have a high output impedance. The output of inverting amplifier 680 is again connected backwardly through the crystal 683 to the input of amplifier 488. Output brush 621 is connected to the input of an additional inverting amplifier 685, which may also have a high output impedance. The output of inverting amplifier 685 is connected backwardly through an additional crystal 684 to the input of amplifier 489. An alteration is required in the disposition of the segments and spaces of intermeshing circles 700 and 800 of pattern E. In FIGURE 30a circle 700 comprises a space between 90° and 120° and also between 270° and 300° and a segment between 120° and 180° and also between 300° and 360°; and circle 800 comprises a segment between 90° and 120° and also between 270° and 300° and a space between 120° and 180° and also between 300° and 360°. Output brush 720 of circle 700 is again coupled to the input of amplifier 788 the output of which is again connected through relay winding 770 to ground. In FIGURE 30a, however, winding 770 controls only relay armature 773. Output brush 820 is connected forwardly through an additional crystal 597 to one additional input brush 711 of a pair of additional input brushes 711 and 713 disposed to alternately contact the segments and spaces of an additional circle 701 mounted on pattern disk E. Circle 701 comprises a segment between 60° and 90° and also between 150° and 180° and further between 240° and 270° and finally between 330° and 360°. Complementary input brushes 711 and 713, as brushes 710 and 712, are spaced apart a central angle of 15°. The negative terminal of glow tube 550 is connected forwardly through an additional crystal 599 to input brush 713. An additional output brush 721 of circle 701 is connected to the input of an additional buffer amplifier 789. The output of amplifier 789 is connected through an additional relay actuating winding 777 to ground. Relay winding 777 controls relay armature 776. Output brush 920 is connected forwardly through an additional crystal 999 to one input brush 1113 of a pair of additional input brushes 1113 and 1111 disposed to alternately contact the equal segment and space of an additional circle 1101 mounted on pattern E. Output brush 1020 is connected forwardly through an additional crystal 997 to input brush 1111. Circle 1101 is identical to circle 1100 except that the two circles are phase shifted by 90° such that the transfer points of circle 1101 correspond to 90° and 270°. Input brush 1111 is radially aligned with input brush 1110; and input brush 1113 is radially aligned with input brush 1112. Accordingly, brushes 1111 and 1113, as brushes 1110 and 1112, are spaced a length of arc subtending a central angle of 90°. An output brush 1121 of circle 1101 is connected to the positive terminal of a bias battery 1115. The negative terminal of battery 1115 is connected to cosine output terminal 1191, at which appears the sign of the cosine function. When relay winding 770 is not energized, armature 773 normally engages relay contact 771; and when relay winding 777 is not energized, armature 776 normally engages relay contact 774. When relay actuating winding 970 is not energized, the paralleled outputs of circles 100 and 300 of patterns A and B are coupled through respective reversing switches 941 and 943 to sine output terminals 190 and 390 respectively; the paralleled outputs of circles 100 and 300 of patterns B and C are coupled through respective reversing switches 941 and 943 to cosine output terminals 191 and 391 respectively; the output of second circle 200A is coupled to circle 400C and thence through reversing switch 944 to sine output terminal 490; the output of second circle 200D is coupled to circle 400B and thence through reversing switch 944 to cosine output terminal 491; the output of circle 200B is coupled through reversing switch 946 to sine superextension input brush 610; the output of circle 200C is coupled through reversing switch 946 to cosine superextension input brush 611; contact 772 is coupled through reversing switch 940 to sine output terminal 490; and contact 774 is coupled through reversing switch 940 to cosine output terminal 491. When relay actuating winding 970 is energized, the paralleled outputs of circles 100 and 300 of patterns A and B are coupled through respective reversing switches 941 and 943 to cosine output terminals 191 and 391, respectively; the paralleled outputs of circles 100 and 300 of patterns C and D are coupled through respective reversing switches 941 and 943 to sine output terminals 190 and 390, respectively; the output of second circles 200A and 200D are coupled to respective circles 400C and 400B and thence through reversing switch 944 to output terminals 491 and 490, respectively; the outputs of circles 200B and 200C are coupled through reversing switch 946 to input brushes 611 and 610, respectively; and contacts 772 and 774 are coupled through reversing switch 940 to output terminals 491 and 490, respectively.

While in the converter of FIGURE 30 crystals 598 and 998 are not required components and may be eliminated, yet in the resolver of FIGURE 30a crystal 598 must be used to prevent a short-circuiting of signals between brushes 710, 711, 712, and 713; and crystal 998 must be used to prevent a short-circuiting of signals between brushes 1110, 1111, 1112, and 1113.

In operation of the resolver of FIGURE 30a the outputs at terminals 190, 390, 490, and 690 provide the absolute value of the sine function; and the output at terminal 1190 appends the sign of the function. The outputs at terminals 191, 391, 491, and 691 provide the absolute value of the cosine function; and the output at terminal 1191 appends the sign of the function. In order that a positive voltage at output terminal 1191 may indicate a positive sign and that a negative voltage may indicate a negative sign of the cosine function, bias battery 1115, as bias battery 1114, supplies a negative voltage equal to one-quarter that of input excitation battery 10. The resolver is shown between 180° and 210° where none of the relay windings 770, 777, or 970 is energized, and where pattern A provides the sine function while pattern C provides the cosine function. Between 210° and 240° only relay winding 770 is energized; and pattern B provides the sine function while pattern C provides the cosine function. Between 240° and 270° both relay windings 770 and 777 are energized; and pattern B provides the sine function while pattern D provides the cosine function. Between 270° and 300° only relay winding 970 is energized; and pattern C provides the sine function while pattern A provides the cosine function. Between 300° and 330° both windings 970 and 770 are energized; and pattern C provides the sine function while pattern B provides the cosine function. Between 330° and 360° all three relay windings 770, 777, and 970 are energized; and pattern D provides the sine function while pattern B provides the cosine function. Between 0° and 30° none of the relay windings 770, 777, and 970 is energized; and pattern A provides the sine function while pattern C provides the cosine function. Between 30° and 60° only winding 770 is energized; and pattern B provides the sine function while pattern C provides the cosine function. Between 60° and 90° both windings 770 and 777 are energized; and pattern B provides the sine function while pattern D provides the cosine function. Between 90° and 120° only relay winding 970 is energized; and pattern C provides the sine function while pattern A provides the cosine function. Between 120° and 150° both relay windings 970 and 770 are energized; and pattern C provides the sine function while pattern B provides the cosine function. Between 150° and 180° all three windings 770, 777, and 970 are energized; and pattern D provides the sine function while pattern B provides the cosine function. Of course, energization of pattern A includes superextension circle 400C; and energization of pattern D includes superextension circle 400B. Input excitation voltage is constantly applied to armature 773, which switches the input excitation voltage between patterns A and B. Input excitation voltage is constantly applied to armature 776, which switches the input excitation voltage between patterns C and D. Input excitation voltage, as a consequence, is always applied to two patterns, one pattern being either pattern A or pattern B and the other pattern being either pattern C or pattern D. Pattern B provides the sine function between 30° and 90°, the cosine function between 120° and 180°, the sine function between 210° and 270°, and the cosine function between 300° and 360°. Pattern C provides the cosine function between 0° and 60°, the sine function between 90° and 150°, the cosine function between 180° and 240°, and the sine function between 270° and 330°. It will be appreciated that each of patterns B and C must produce a function over a complete revolution corresponding to 60° and then must, within 30°, complete an additional revolution so as to be prepared to produce the cofunction over the next revolution corresponding to 60°. Hence each of patterns B and C must within a quadrant of 90° rotate one revolution in 60° and then rotate through another revolution in 30°. This obviously requires nonlinear gearing for patterns B and C.

Table 30a shows the switching among patterns A, B, C, and D and the nonlinear regions of rotation of patterns B and C to provide a resolver producing both the sine and cosine functions simultaneously.

| Region of Arguments θ | Pattern Providing Sin θ | Pattern Providing Cos θ | Pattern Rotating Nonlinearly |
|---|---|---|---|
| 0°– 30° | A | C | B |
| 30°– 60° | B | C | |
| 60°– 90° | B | D | C |
| 90°–120° | C | A | B |
| 120°–150° | C | B | |
| 150°–180° | D | B | C |
| 180°–210° | A | C | B |
| 210°–240° | B | C | |
| 240°–270° | B | D | C |
| 270°–300° | C | A | B |
| 300°–330° | C | B | |
| 330°–360° | D | B | C |
| 0°– 30° | A | C | B |

Table 30a

From Table 30a it can be seen that the rotation of pattern B is nonlinear between 0° and 30°, between 90° and 120°, between 180° and 210°, and between 270° and 300°. Table 30a also shows that the rotation of pattern C is nonlinear between 60° and 90°, between 150° and 180°, between 240° and 270° and between 330° and 360°. In each region where the rotation of pattern B is non linear, the count of pattern A is superextended by circle 400C, mounted on pattern C, which is rotating linearly. In each region where the rotation of pattern C is nonlinear, the count of pattern D is superextended by circle 400B, mounted on pattern B, which is rotating linearly. It can be seen that at the 30°, 120°, 210°, and 300° points, at which occurs interpattern transfer from pattern A to pattern B, pattern C has rotated linearly through 30° from line C; and hence input brush 410C lies substantially at the midpoint of the segment of circle 400C in FIGURE 30a. Thus circle 400C is adapted to superextend the count of pattern A in the regions immediately before these points. It can be seen that at the 60°, 150°, 240°, and 330° points, at which occurs interpattern transfer from pattern C to pattern D, pattern B has linearly rotated through 30° from line B; and hence input brush 410 lies substantially at the midpoint of the segment of circle 400B. Thus circle 400B is adapted to superextend the count of pattern D in the regions immediately subsequent to these points. It can be seen that at 90° and 270°, at which occurs transfer from pattern B to pattern C, input brush 610 to sine superextension circle 600 is switched from output brush 220B of pattern B to output brush 220C of pattern C; but a superextension signal continues at output brush 620, producing a "1" at output terminal 690, and modifying the output at terminal 490 from its normal "1" to a "0." It can be seen that at 0° and 180°, at which occurs transfer from pattern B to pattern C, input brush 611 to cosine superextension circle 601 is switched from output brush 220B of pattern B to output brush 220C of pattern C; but a superextension signal continues at output brush 621, producing a "1" at output terminal 691, and modifying the output at terminal 491 from its normal "1" to a "0." It may further be seen that whenever pattern B is energized from contact 772, reversing switch 940 causes the input voltage at contact 772 to increase the counts of all intervals by the constant addend 1/2, introducing a "1" at either output terminal 490 or output terminal 491 according as pattern B is required to produce the sine or the cosine function. Finally it may be seen that whenever pattern C is energized from contact 774, reversing switch 940 causes the input excitation voltage at contact 774 to increase the counts of all intervals by constant addend 1/2, creating a "1" at either output terminal 491 or output terminal 490 according as pattern C is required to provide the cosine or the sine function.

Since interpattern reversing between the first group of patterns A and B and the second group of patterns C and D causes no change in output representation, appreciable response lag tolerances exist for relay winding 970 in actuating reversing switches 940, 941, 943, 944, and 946, enabling high counting rates before producing a momentary ambiguity at a subsequent transfer point. Since interpattern switching between patterns A and B of the first group and between patterns C and D of the second group causes no change in output representation, appreciable response lag tolerances exist for relay windings 770 and 777 in inactuating armatures 773 and 776, respectively, enabling high counting rates before producing a momentary ambiguity at a subsequent transfer point.

In all of the converters thus far considered, with the exception of the resolvers of FIGURES 29a and 30a, interpattern transfer has been accomplished by switching the input excitation voltage between the patterns and combining in parallel corresponding outputs through isolation crystals, where such crystals are required. In the resolver of FIGURE 29a both patterns constantly receive input excitation voltage; and each pair of corresponding outputs is distributed by a reversing switch to its appropriate sine or cosine output terminal. In the resolver of FIGURE 30a there is not only a switching of input excitation voltage between the two patterns of each pair, corresponding outputs of which are connected in parallel, but there is also a distribution, by means of a reversing switch, of each of the pairs of parallel connected corresponding outputs to the appropriate sine or cosine output terminal. In the resolver of FIGURE 30a interpattern transfer is accomplished both by the switching of input excitation voltage between patterns and by the switching between corresponding outputs.

As can be seen by reference to Table 30a, input excitation voltage is received simultaneously by patterns A and C and then by patterns B and C and then by patterns B and D. Patterns A and B are never simultaneously energized, nor are patterns C and D, nor are patterns A and D. In order to simplify the switching among the patterns to produce both the sine and cosine functions simultaneously so that only one reversing switch need be used for each digit, we must make the best use possible of the simpler expedient of switching input excitation voltage between patterns and connecting corresponding outputs in parallel. Since patterns A and D are never energized simultaneously, it might, at first glance, be thought possible to switch input excitation voltage between patterns A and D and connect corresponding outputs in parallel. However, in such event, corresponding outputs of patterns B and C could not be connected in parallel, since it is required that patterns B and C be energized simultaneously; and the reversing switches actuated by relay winding 970 would become more complicated because of the necessity of selecting among one of three corresponding outputs comprising firstly the parallel connected outputs of patterns A and D and secondly pattern B and thirdly pattern C. The remaining possibility, which yields the simplest solution, as shown, is to connect corresponding outputs of patterns A and B in parallel and to connect corresponding outputs of patterns C and D in parallel with the result that the reversing switches actuated by relay winding 970 need select only between two corresponding outputs.

Referring now to FIGURES 31a and 31b, patterns A and D are mounted, as in FIGURE 31, on opposite sides of pattern disk A—D. Secured to a first shaft are pattern disk A—D and a pinion 76. Secured to a second shaft are a gear 77, a pinion 78, a nonlinear gear 80, and a nonlinear gear 81. Secured to a third shaft are pattern disk E, which as in FIGURE 31 mounts pattern E, and a gear 79. Pinion 76 meshes with gear 77; and pinion 78 meshes with gear 79. The speed reduction between pinion 76 and gear 77 is three-to-one; and the speed reduction between pinion 78 and gear 79 is four-to-one. For each revolution of pattern E and gear 79, pinion 78 and gear 77 and nonlinear gears 80 and 81 will rotate through four revolutions, while pattern disk A—D and pinion 76 will rotate through twelve revolutions. Each revolution of pattern disk E represents 360° of the two cofunctions; each revolution of nonlinear gears 80 and 81 represents 90°; and each revolution of pattern disk A—D represents 30°. Upon a fourth shaft are mounted a gear 84 and a mating nonlinear gear 82. Upon a fifth shaft are mounted a gear 86 and a mating nonlinear gear 83. Upon a sixth shaft are mounted a pinion 85 and pattern disk B, which mounts only pattern B. Upon a seventh shaft are mounted a pinion 87 and pattern disk C, which mounts only pattern C. Nonlinear gear 80 meshes with mating nonlinear gear 82; and nonlinear gear 81 meshes with mating nonlinear gear 83. Gear 84 meshes with pinion 85; and gear 86 meshes with pinion 87. The ratio between nonlinear gears 80 and 82 and also between nonlinear gears 81 and 83 over their linear regions is three-to-four, such that a two-thirds revolution of each of nonlinear gears 80 and 81 produces half a revolution of each of mating nonlinear gears 82 and 83. Over their nonlinear regions a one-third revolution of each of nonlinear gears 80 and 81 produces the remaining half revolution of mating nonlinear gears 82 and 83. The speed reduction between pinion 85 and gear 84 and also between pinion 87 and gear 86 is two-to-one, such that half a revolution of each of mating gears 82 and 83 produces a full revolution of each of pattern disks B and C. In 90° of the two cofunctions corresponding to one revolution of gears 80 and 81, gears 82 and 83 will rotate linearly through a half revolution in 60° and will rotate nonlinearly through the remaining half revolution in 30°. Patterns B and C will then rotate linearly through one revolution in 60° and will rotate nonlinearly through another revolution in 30°. Since a pattern is not energized in the regions of its nonlinear rotation, the nonlinear portions may take any form with special attention only to the fact that accelerations be minimized. The smoothest nonlinear portion will be one in which the speed of mating gears 82 and 83 increases sinusoidally from the linear velocity to a maximum speed of three times the linear velocity and then decreases to the linear velocity again such that the average nonlinear speed will be twice the linear velocity. As can be seen by reference to Table 30a, patterns B and C do not perform nonlinear rotation at the same time. At 85° pattern C is rotating nonlinearly, while pattern B is rotating linearly; and at 95° pattern B is rotating nonlinearly, while pattern C is rotating linearly. The alignment shown in FIGURE 31b is that existing at the 90°, 180°, 270°, and 360° or 0° points; and a clockwise rotation of gears 80 and 81 produces increasing arguments θ. As nonlinear gears 80 and 81 rotate clockwise into the regions following these points, the rotations of mating gear 82 and pattern B become nonlinear while the rotations of mating gear 83 and pattern C become linear. As nonlinear gears 80 and 81 rotate counterclockwise into regions preceding these points, the rotations of mating gear 83 and pattern C become nonlinear while the rotations of mating gear 82 and pattern B become linear.

In each quadrant of 90° patterns B and C each rotate linearly through one revolution in 60° of the cofunctions and then rotate nonlinearly through one revolution in 30° of the cofunctions. Thus each of patterns B and C complete a full cycle of linear and nonlinear rotation in 90° of the cofunctions. This cycle of linear and nonlinear rotation is provided by nonlinear gears 80 and 81 in combination with mating gears 82 and 83. Each revolution of nonlinear gears 80 and 81 represents 90° of the cofunctions; and one period of each of patterns B and C in performing nonlinear and linear rotation is also 90°.

In FIGURE 30a the resolver is shown at substantially the 191° point, which is 11° past the 180° point, where pattern C is rotating linearly and pattern B is rotating nonlinearly and approaching its maximum speed of three times the linear velocity. It can be seen that brush 410C is positioned relative to circle 400C at a point nearly one-quarter revolution removed from line C, whereas brush 410B is positioned relative to circle 400B at a point nearly one-half revolution removed from line B.

It will be appreciated that we do not provide nonlinear functions by the nonlinear rotation of a linear pattern; rather we provide nonlinear functions by the linear rotation of a nonlinear pattern. In the resolver of FIGURE 30a, any pattern rotating nonlinearly receives no input excitation voltage and produces no output representations.

Referring now to FIGURE 33b, which should be read in conjunction with FIGURE 33, we have shown a three-pattern resolver for simultaneously producing both the sine and cosine functions.

The positive terminal of input excitation battery 10 is connected directly to armature 573 and to input resistor 127B of pattern B. Relay armature 673 and relay contacts 671 and 672 are no longer required components and may be eliminated. Relay actuating winding 670 instead controls a plurality of double-pole double-throw reversing switches indicated generally by the reference numerals 641, 642, and 644 and also controls a single-pole double-throw switch indicated generally by the reference numeral 643. The cathodes of crystals 139A and 139C are connected to one input of reversing switch 641; and output brush 120B is connected directly to the other input of switch 641. Crystal 139B is no longer a required component and may be eliminated. One output of switch 641 is connected to first circle sine output terminal 190; and the other output of switch 641 is connected to a first circle cosine output terminal 191. The cathodes of crystals 239A and 239C are connected to one input of reversing switch 642; and output brush 220B is directly connected to the other input of switch 642. Crystal 239B is no longer a required component and may be eliminated. One output of switch 642 is connected to second circle sine output terminal 290; and the other output of switch 642 is connected to a second circle cosine output terminal 291. Output brushes 420A and 420C are connected to one input of reversing switch 644; and output brush 220B is connected directly to the other input of switch 644. Crystal 439 is no longer a required component and may be eliminated. One output of reversing switch 644 is connected to fourth circle sine output terminal 490; and the other output of switch 644 is connected to a fourth circle cosine output terminal 491. Output brush 320B of pattern B is connected to the armature of switch 643. One contact of switch 643 is connected to the third circle sine output terminal 390; and the other contact of switch 643 is connected to a third circle cosine output terminal 391. Pattern D is provided with an additional circle 701 similar to circle 700 but phase shifted by 90° such that the transfer points of circle 701 correspond to 90° and 270°. The negative terminal of glow tube 550 is connected forwardly through a crystal 697 to one input brush 711 of a pair of input brushes 711 and 713 disposed to alternately contact the equal segment and space of circle 701. Output brush 520 is connected forwardly through a crystal 699 to input brush 713. Brushes 711 and 713 are spaced apart a length of arc subtending a central angle of 45°. An output brush 721 of circle 701 is connected to the positive terminal of a bias battery 715. The negative terminal of battery 715 is connected to cosine output terminal 791, at which appears the sign of the cosine function. When relay winding 670 is not energized the parallel-connected outputs of circles 100, 200, and 400 of patterns A and C are connected through respective reversing switches 641, 642, and 644 to cosine output terminals 191, 291, and 491, respectively; and the outputs of circles 100, 200, 400, and 300 of pattern B are connected through respective switches 641, 642, 644, and 643 to sine output terminals 190, 290, 490, and 390, respectively. When relay actuating winding 670 is energized, the parallel-connected outputs of circles 100, 200, and 400 of patterns A and C are connected through respective reversing switches 641, 642, and 644 to sine output terminals 190, 290, and 490, respectively; and the outputs of circles 100, 200, 400, and 300 of pattern B are connected through respective switches 641, 642, 644, and 643 to cosine output terminals 191, 291, 491, and 391, respectively.

In operation of the resolver of FIGURE 33b, the outputs at terminals 190, 290, 490, and 390 provide the absolute value of the sine function; and the output at terminal 790 appends the sign of the function. The outputs at terminals 191, 291, 491, and 391 provide the absolute value of the cosine function, while the output at terminal 791 appends the sign of the cosine function. In order that a positive voltage at output terminal 791 indicate a positive sign and that a negative voltage indicate a negative sign of the cofunction, bias battery 715, as bias battery 714, supplies a negative voltage equal to one-quarter that of input excitation battery 10. The resolver is shown between 45° and 90°, where neither of relay windings 670 or 560—570 is energized, and where pattern B provides the sine function while pattern C provides the cosine function. Between 90° and 135° only relay winding 560—570 is energized; and pattern A provides the cosine function while pattern B again provides the sine function. Between 135° and 180° only relay winding 670 is energized; and pattern C provides the sine function while pattern B provides the cosine function. Between 180° and 225° both relay windings 670 and 560—570 are energized; and pattern A provides the sine function while pattern B again provides the cosine function. Pattern B also provides the sine function between 225° and 315° and the cosine function between 315° and 45°. Pattern C provides the cosine function between 225° and 270° and the sine function between 315° and 360°. Pattern A provides the cosine function between 270° and 315° and the sine function between 0° and 45°. Input excitation voltage is constantly applied to pattern B; and armature 573 switches the input excitation voltage between patterns A and C. Consequently input excitation voltage is always applied to two patterns, one of which is pattern B and the other of which is either of patterns A or C. It will be appreciated that each of patterns A and C must produce a function over three-quarters revolution corresponding to 45° and then must, within 45°, complete either the remaining one-quarter revolution or one and one-quarter revolutions so as to be prepared to produce the cofunction over the next three-quarters revolution corresponding to 45°. Hence each of patterns A and C must, within a quadrant of 90°, rotate three-quarters revolution in 45° and then rotate through either one-quarter revolution or one and one-quarter revolutions in the next 45°. This obviously requires nonlinear gearing for patterns A and C.

Table 33b shows the switching among patterns A, B, and C and the nonlinear regions of rotation of patterns A and C to provide a resolver producing both the sine and cosine functions simultaneously.

| Octant of Arguments θ | Pattern Providing Sin θ | Pattern Providing Cos θ | Pattern Rotating Nonlinearly |
|---|---|---|---|
| 0°– 45° | A | B | C |
| 45°– 90° | B | C | A |
| 90°–135° | B | A | C |
| 135°–180° | C | B | A |
| 180°–225° | A | B | C |
| 225°–270° | B | C | A |
| 270°–315° | B | A | C |
| 315°–360° | C | B | A |
| 0°– 45° | A | B | C |

Table 33b

From Table 33b it can be seen that the rotation of pattern C is nonlinear between 0° and 45°, between 90° and 135°, between 180° and 225°, and between 270° and 315°. Table 33b also shows that the rotation of pattern A is nonlinear between 45° and 90°, between 135° and 180°, between 225° and 270°, and between 315° and 360°.

Interpattern reversing for circles 100, 200, and 400 between pattern B and the group of patterns A and C and the switching of third circle output brush 320B of pattern B cause no changes in output representation; and appreciable response lag tolerances exist for winding 670 in actuating reversing switches 641, 642, and 644 and switch 643, enabling high counting rates before producing a momentary ambiguity at a subsequent transfer point. Also interpattern switching between the group of patterns A and C and the extra conditioning brush reversing alteration for pattern B cause no changes in output representation; and appreciable response lag tolerances exist for relay winding 560—570 in actuating interpattern switching armature 573 and brush reversing armatures 563 and 566, enabling high counting rates before producing a momentary ambiguity at a subsequent transfer point.

In the resolver of FIGURE 33b input excitation voltage is constantly applied to pattern B; but input excitation voltage is switched between patterns A and C. Corresponding outputs of the group of patterns A and C are connected in parallel through blocking crystals, where such crystals are required. A reversing switch for each output of pattern B and the corresponding parallel-connected outputs of patterns A and C distributes the two corresponding outputs to the appropriate sine and cosine output terminals. In the resolver of FIGURE 33b, as in the resolver of FIGURE 30a, not only is there a switching of input excitation voltage between patterns, but also there is a switching between corresponding outputs; and each of the reversing switches actuated by relay winding 670 need select between only two corresponding outputs.

Referring now to FIGURES 33c and 33d, secured to a first shaft are a gear 89 and pattern disk D, which mounts pattern D. Secured to a second shaft are a pinion 88, a first nonlinear gear 90, a second nonlinear gear 91, and pattern disk B, which mounts pattern B. Pinion 88 meshes with gear 89; and the gear reduction is four-to-one, such that one revolution of gear 89 produces four revolutions of pinion 88. Each revolution of pattern D represents 360° of the two cofunctions; and each revolution of pattern B and nonlinear gears 90 and 91 represents 90°. Secured to a third shaft are a mating nonlinear gear 92 and pattern disk A, which mounts only pattern A. Mating gear 92 meshes with nonlinear gear 90. Secured to a fourth shaft are a mating nonlinear gear 93 and pattern disk C, which mounts only pattern C. Mating gear 93 meshes with nonlinear gear 91. We have here shown patterns A and C to rotate linearly through three-quarters revolution in 45° of the cofunctions and then to rotate nonlinearly through the remaining one-quarter revolution in the next 45°; but it will be understood that, through appropriate gearing similar to FIGURE 31a, we could equally well cause patterns A and C to rotate linearly through three-quarters revolution in 45° and then to rotate nonlinearly through one and one-quarter revolutions in the next 45°. The ratio between nonlinear gears 90 and 92, and also between nonlinear gears 91 and 93 over their linear regions is three-to-two, such that one-half revolution of each of nonlinear gears 90 and 91 produces three-quarters revolution of each of mating nonlinear gears 92 and 93. Over their nonlinear regions, a one-half revolution of each of nonlinear gears 90 and 91 produces the remaining one-quarter revolution of each of mating nonlinear gears 92 and 93. In 90° of the two cofunctions corresponding to one revolution of gears 90 and 91, gears 92 and 93 and patterns A and C will rotate linearly through three-quarters revolution in 45° and will rotate nonlinearly through the remaining one-quarter revolution in the next 45°. Since a pattern is not energized in the regions of nonlinear rotation, the nonlinear portions may take any form with special attention only to the fact that accelerations be minimized. The smoothest nonlinear portion will be one in which the speed of mating gears 92 and 93 decreases from the linear velocity to a minimum speed of one-fifth the linear velocity and then increases to the linear velocity again such that the average nonlinear speed will be one-third the linear velocity. As can be seen by reference to Table 33b, patterns A and C do not perform nonlinear rotation at the same time. At 40° pattern C is rotating nonlinearly, while pattern A is rotating linearly; and at 50° pattern A is rotating nonlinearly, while pattern C is rotating linearly. Assuming a counterclockwise rotation of gears 90 and 91 for increasing arguments θ, then the alignment shown in FIGURE 33d is that existing at the 180°, 270°, and 360° or 0° points and also is that existing at the 90° point, as shown in FIGURE 33b. As nonlinear gears 90 and 91 rotate counterclockwise into the regions following these points, the rotation of mating gear 92 and pattern A becomes linear, while the rotation of mating gear 93 and pattern C becomes nonlinear. As gears 90 and 91 rotate clockwise into regions preceding these points, the rotation of mating gear 93 and pattern C becomes linear, while the rotation of mating gear 92 and pattern A becomes nonlinear.

In each quadrant of 90° patterns A and C each rotate linearly through three-quarters revolution in 45° of the cofunctions and then rotate nonlinearly through the remaining one-quarter revolution in the next 45°. Thus each of patterns A and C complete a full cycle or period of linear and nonlinear rotation in 90° of the cofunctions. This cycle of linear and nonlinear rotation is provided by nonlinear gears 90 and 91 in conjunction with mating gears 92 and 93. Each revolution of nonlinear gears 90 and 91 represents 90° of the cofunctions; and one period of each of patterns A and C in performing linear and nonlinear rotation is likewise 90°.

It will again be appreciated that in FIGURE 33b, as in FIGURE 30a, we do not provide nonlinear functions by the nonlinear rotation of a linear pattern; but rather we provide nonlinear functions by the linear rotation of a nonlinear pattern. In the resolver of FIGURE 33b, any pattern rotating nonlinearly receives no input excitation voltage and produces no output representations.

It will be noted that in the resolver of FIGURE 33b the use of nonlinear gearing tends to increase the tolerances for interpattern transfer. It will be recalled in conjunction with FIGURE 33a that, as the brushes move to the right, for tardy interpattern switching at 45° from pattern A to pattern B, leading brush 212, carrying a signal, breaks contact with the 56.4° line m transfer point of circle 200 within 7.8° subsequent to the 45° point.

It will be further recalled that since the (3/4)—(7/8) transfer point is at 54.4°, which is 9.4° greater than 45°, the limitation on tardy interpattern switching is imposed by the line m transfer point of circle 200 rather than by the necessity of creating the (3/4)—(7/8) transfer point. In the resolver of FIGURE 33b, for tardy interpattern switching subsequent to the 45° point, nonlinear gears 90 and 92 cause the speed of pattern A to be reduced below the linear velocity with the result that a 9.4° rotation of gear 90 may produce less than a 7.8° equivalent rotation of pattern A. In such event the tolerance for tardy interpattern switching would be increased from 7.8° to 9.4°; and the limitation on tardy interpattern switching would no longer be the line m transfer point of circle 200 but would instead be the necessity of switching to pattern B in order to create the (3/4)—(7/8) transfer point.

It will be appreciated that a three-pattern sine converter similar to the sine converter of FIGURE 33 may be produced by the superextension of count rather than by the abbreviation of patterns. As previously indicated, if a superextended three-pattern sine converter has a resolution r of 1/128, rather than 1/8, then unambiguous interpattern switching will require the double superextension of count because of the coincidence of interpattern switching at 45° with a transfer point of the sine function. In the case of such superextended three-pattern sine converter similar to the abbreviated pattern sine converter of FIGURE 33, one revolution of each of patterns A and C will represent 45°. Consequently, it will be appreciated that a superextended three-pattern resolver similar to the resolver of FIGURE 33b may be provided without the use of nonlinear gearing for patterns A and C, since 45° is integrally divisible into 90°. In the case of such superextended three-pattern resolver similar to the resolver of FIGURE 33b, in each quadrant of 90° each of patterns A and C will receive input excitation voltage through one revolution corresponding to 45° and then will, through the next revolution corresponding to the remaining 45°, receive no input excitation voltage.

By the use of nonlinear gearing we may remove the former restriction that for an externally cyclic converter the rotation of each pattern disk must be integrally divisible into the period. In the resolver of FIGURE 30a the period for one cycle of linear and nonlinear rotation of patterns B and C is 90°; but in the regions of linear rotation, each revolution of patterns B and C represents 60°; and 60° is not integrally divisible into the period of 90°. In the resolver of FIGURE 33b the period for one cycle of linear and nonlinear rotation of patterns A and C is 90°; but in the regions of linear rotation, each three-quarters revolution of patterns A and C represents 45°, which is a linear rate of 60° per revolution; and 60° is not integrally divisible into the period of 90°. By the use of nonlinear gearing we have removed the restriction that for a cyclic converter the rotation of each pattern must be integrally divisible into the period. However the use of nonlinear gearing for a cyclic converter requires that the rotation of each pair of nonlinear gears be integrally divisible into the period. In the resolver of FIGURE 30a each of gears 80, 81, 82, and 83 rotates through one revolution in 90° of the cofunctions; and 90° is integrally divisible into the period of 180° for the absolute values of the cofunctions. In the resolver of FIGURE 33b each of gears 90, 91, 92, and 93 rotates through one revolution in 90° of the cofunctions; and 90° is integrally divisible into the period of 180° for the absolute values of the cofunctions.

Therefore, with the use of patterns each containing only a simple recycling discontinuity, as in FIGURES 7 through 14, we may produce externally cyclic counts having not only simple changes in slope sign but also discontinuities accompanied by changes in slope sign and also intermediate discontinuities of a nonrecycling nature without the limitation or restriction that such peaks, dips, discontinuous peaks, discontinuous dips, and intermediate nonrecycling discontinuities occur at points having a spacing which is integrally divisible into the period by providing nonlinear gearing for these patterns such that the rotation of each pair of nonlinear gears is integrally divisible into the period.

Hysteresis Functions

Suppose it is desired to produce in rectangular $x$, $y$ coordinates an hysteresis function enclosing an area and proceeding in a series of straight lines through six points from $x_1=1$, $y_1=1$ to $x_2=1$, $y_2=7$ and then to $x_3=3$, $y_3=5$ and then to $x_4=5$, $y_4=9$ and then to $x_5=5$, $y_5=3$ and then to $x_6=3$, $y_6=3$ and finally from $x_6=3$, $y_6=3$ to $x_1=1$, $y_1=1$ again. It will be noted there is only a limited region from which all points of this function are "visible" without crossing the closed curve defining the function. This limited region is bounded by a series of four straight lines through four points from $x_3=3$, $y_3=5$ to $x_a=4$, $y_a=4$ and then to $x_6=3$, $y_6=3$ and then to $x_c=2$, $y_c=3$ and finally from $x_c=2$, $y_c=3$ to $x_3=3$, $y_3=5$ again. The point $x_a$, $y_a$ is the intersection of an extended line through the points $x_2$, $y_2$ and $x_3$, $y_3$ and an extended line through the points $x_1$, $y_1$ and $x_6$, $y_6$. The point $x_c$, $y_c$ is the intersection of an extended line through the points $x_4$, $y_4$ and $x_3$, $y_3$ and an extended line through the points $x_5$, $y_5$ and $x_6$, $y_6$. We generate this hysteresis function in polar $r$, $\theta$ coordinates about some point within this limited region, such as the generating point $x_0=3$, $y_0=4$. Thus we provide a converter producing a function $r=f(\theta)$ such that $r=2$ when $\theta=0°$, corresponding to the distance from generating point $x_0=3$, $y_0=4$ to the point $x=5$, $y=4$, of the hysteresis function, and such that $r=1$ when $\theta=90°$, corresponding to the distance from generating point $x_0=3$, $y_0=4$ to the point $x_3=3$, $y_3=5$ of the hysteresis function, and such that $r=2$ when $\theta=180°$, corresponding to the distance from generating point $x_0=3$, $y_0=4$ to the point $x=1$, $y=4$ of the hysteresis function, and such that $r=1$ when $\theta=270°$, corresponding to the distance from generating point $x_0=3$, $y_0=4$ to the point $x_6=3$, $y_6=3$ of the hysteresis function. We also employ one of the resolvers of FIGURES 29a, 30a, and 33b for simultaneously providing the functions $S=\sin\theta$ and $C=\cos\theta$. Then by means of digital multiplying apparatus we multiply the functions $f(\theta)$ and $C$ to obtain the product $r\cos\theta$ and multiply the functions $f(\theta)$ and $S$ to obtain the product $r\sin\theta$, thereby to transform polar $r$, $\theta$ coordinates into rectangular $x$, $y$ coordinates. Finally by means of digital adding apparatus we add the coordinate $x_0=3$ of the generating point to the product $r\cos\theta$ and add the coordinate $y_0=4$ of the generating point to the product $r\sin\theta$, to obtain the sums $(x_0+r\cos\theta)$ and $(y_0+r\sin\theta)$, thereby to translate axes from the generating point $x_0=3$, $y_0=4$ to the true origin $x=0$, $y=0$.

For the supposed hysteresis function, the closed curve was entirely visible from a single generating point. But it will be appreciated that for more complicated hysteresis functions, it may be necessary to use several different generating points where the entire closed curve is not visible from any single generating point. Thus any hysteresis function may be produced by employing three converters: one for providing the sine and cosine functions, a second for sequentially providing the $x_0$ and $y_0$ coordinates of a plurality of generating points from each of which only certain portions of the hysteresis functions are visible, and the third for providing the function $r=f(\theta)$ for sequentially changing generating points of the function. The sine and cosine functions are again each multiplied by $f(\theta)$ to obtain the products $r\sin\theta$ and $r\cos\theta$; and again the $x_0$ and $y_0$ coordinates of each sequential generating point are added to obtain the sums $(x_0+r\cos\theta)$ and $(y_0+r\sin\theta)$.

As was pointed out in conjunction with the converter of FIGURE 30 and as just described for hysteresis functions, where a complicated function may be expressed as the sum or difference or product or quotient of simpler functions, then the outputs of a plurality of converters geared for common rotation, each producing a simpler function, may be combined through appropriate apparatus for performing arithmetical operations to produce the complicated function. In order to produce the supposed hysteresis function, we used multiplying apparatus for combining each of the sine and cosine outputs of the resolver with the output of the converter providing the $r=f(\theta)$ function; and we used adding apparatus for combining the $x_0$ and $y_0$ coordinates of the generating point with the two outputs of the multiplying apparatus.

Multiple-Pattern Noncyclic Converters of Limited Rotation by the Method of Abbreviation of Patterns Referring now to FIGURE 34, disk A mounts abbreviated pattern A which is shown cut radially along line A and developed; disk B mounts abbreviated pattern B which is shown cut radially along line B and developed; disk C mounts abbreviated pattern C which is shown cut radially along line C and developed; and disk D mounts abbreviated pattern D which is shown cut radially along line D and developed. The active length of pattern A is included between the lefthand limit stop and line $q$; the active length of pattern B, between lines $q$ and $r$; the active length of pattern C, between lines $r$ and $t$; and the active length of pattern D is included between line $t$ and the righthand limit stop. If it be assumed that the length between the left and right limit stops is twenty-eight units, then patterns A, B, C, and D have respective active lengths of eight, four, six, and ten units. Each of patterns A through D is shown having an inactive or abbreviated portion of two units length. Thus one revolution of disks A, B, C, and D respectively represent ten, six, eight, and twelve units. Disk B also mounts a switching circle 500B; and disk C also mounts a switching circle 500C. Pattern disk E, mounting circles 1000, 2000, 3000, 4000, and 5000, has an active length between the left and right limit stops of twenty-eight units and has an inactive or abbreviated portion of two units length. One revolution of disk E thus represents thirty units. Disk E is shown cut radially along line E and developed. Pattern disk A may be geared up from pattern disk E by a ratio of $30/10=3$; pattern disk B may be geared up from pattern disk E by a ratio of $30/6=5$; pattern disk C may be geared up from pattern disk E by a ratio of $30/8=15/4$; and pattern disk D may be geared up from pattern disk E by a ratio of $30/12=5/2$. Alternatively, pattern disk D may be again geared up from pattern disk E by a ratio of $30/12=5/2$; pattern disk A may be geared up from pattern disk D by a ratio of $6/5$, since $6/5\times5/2=3$; pattern disk C may be geared up from pattern disk A by a ratio of $5/4$, since $5/4\times3=15/4$; and pattern disk B may be geared up from pattern disk C by a ratio of $4/3$, since $4/3\times15/4=5$. A source of input excitation voltage, battery 10, has its negative terminal grounded and its positive terminal connected to an input brush 1010, disposed to alternately contact the segments and spaces of circle 1000. Output brush 1020 of circle 1000 is connected forwardly through a crystal 1096 to one input brush 2010 of a pair of input brushes 2010 and 2012, disposed to alternately contact the segment and space of circle 2000. Output brush 1020 is also connected to the input of an inverting amplifier or trigger circuit 1080. The output of trigger circuit 1080 is connected forwardly through a crystal 1098 to input brush 2012. Circle 3000 intermeshes with circle 2000; and brushes 2010 and 2012 simultaneously supply complementary input signals to both circles 2000 and 3000. Output brush 1020 is connected to one input of each of "and" circuits 524B and 524D. The output of inverting amplifier 1080 is connected to one input of "and" circuit 524C. Output brush 3020 of circle 3000 is connected to the other input of "and" circuit 524B. Output brush 2020 of circle 2000 is connected to the other input of each of "and" circuits 524C and 524D. The output of "and" circuit 524B is connected forwardly through a crystal 539B to an input brush 510B, disposed to alternately contact the segment and space of switching circle 500B mounted on pattern disk B. Output brush 520B of circle 500B is connected to the input of an inverting amplifier or trigger circuit 580. The output of "and" circuit 524C is connected forwardly through a crystal 539C to an input brush 510C, disposed to alternately contact the segment and space of switching circle 500C mounted on pattern disk C. Output brush 520C of circle 500C is also connected to the input of inverting amplifier 580. The output of "and" circuit 524D is connected forwardly through a crystal 539D to the input of trigger circuit 580. The input of trigger circuit 580 is connected forwardly through a crystal 596 to one input of input brush 4010 of a pair of input brushes 4010 and 4012, disposed to alternately contact the segment and space of circle 4000. The output of inverting amplifier 580 is connected forwardly through a crystal 598 to input brush 4012. Circle 5000 intermeshes with circle 4000; and input brushes 4010 and 4012 simultaneously supply complementary inputs to both circles 4000 and 5000. The output of trigger circuit 580 is further connected to one input of each of "and" circuits 124A and 124C. The input of trigger circuit 580 is further connected to one input of each of "and" circuits 124B and 124D. Output brush 4020 of circle 4000 is connected to the other input of each of "and" circuits 124C and 124D. Output brush 5020 of circle 5000 is connected to the other input of each of "and" circuits 124A and 124B. The output of "and" circuit 124A is connected to the first circle input brush 110A of pattern A. The output of "and" circuit 124B is connected to the first circle input brush 110B of pattern B. The output of "and" circuit 124C is connected to the first circle input brush 110C of pattern C. The output of "and" circuit 124D is connected to the first circle input brush 110D of pattern D. Corresponding outputs of patterns A through D are connected in parallel with such blocking crystals as may be required to prevent adverse cross-feeding of signals to unenergized patterns as in FIGURES 7 through 14, 29, 29a, 30, 30a, 33, and 33b.

Circles 1000 through 3000 of pattern E provide coarse interpattern switching signals, while circles 4000 and 5000 of pattern E in conjunction with switching circles 500B and 500C provide fine interpattern switching signals. Each of circles 1000 through 5000 has a noncritical transfer point at line E. Each of circles 4000 and 5000 has a noncritical transfer point at line r. Each of circles 1000 through 3000 has a noncritical transfer point at line s. Circle 1000 has further noncritical transfer points at lines p and u. Circle 500B has critical transfer points at lines q and r. Circle 500C has a noncritical transfer point at line r and has a critical transfer point at line t.

In operation of the converter of FIGURE 34 at line r, as shown, where occurs interpattern switching between patterns B and C, input brush 1010 lies well in engagement with a segment of circle 1000, causing output brush 1020 to carry a signal. The signal at output brush 1020 causes output brush 3020 to likewise carry a signal. With both output brushes 1020 and 3020 positive, "and" circuit 524B produces an output signal which is coupled through crystal 539B to input brush 510B. When input brush 510B engages the segment of circle 500B to the left of line r, output brush 520B carries a signal. The signal at output brush 520B causes output brush 5020 to likewise carry a signal. With both output brushes 5020 and 520B positive, "and" circuit 124B causes input excitation voltage to be applied to first circle input brush 110B of pattern B. Considering that all brushes move to the right, input brush 510B breaks contact with the segment of circle 500B at line r, permitting output brush 520B to drop to ground and causing the output of trigger circuit 580 to become positive. At this point input brushes 4010 and 4012 symmetrically straddle transfer points of circles 4000 and 5000, causing conduction to shift from output brush 5020 to output brush 4020. With output brush 4020 and the output of trigger circuit 580 now positive, the output of "and" circuit 124B drops to ground while the output of "and" circuit 124C becomes positive. Thus input excitation voltage is removed from first circle input brush 110B of pattern B and applied to first circle input brush 110C of pattern C. Also adjacent line r, input brush 510C breaks contact with the noncritical end of the segment of circle 500C. But interpattern transfer between patterns B and C is controlled by one critical end of the segment of the circle 500C. Pattern B has a higher periodicity than pattern C. Assuming that patterns B and C have equal diameters, then greater accuracy will be obtained by controlling interpattern switching from circle 500B rather than from circle 500C. The line s transfer point of circle 1000 is so placed that when input brush 1010 is at line s, then input brush 510B is preferably, though not necessarily, at the midpoint of the space of circle 500B. At line s, input brush 1010 breaks contact with a segment of circle 1000, causing conduction to shift from lagging brush 2010 to leading brush 2012, which brushes symmetrically straddle transfer points of circles 2000 and 3000. Conduction is thereby shifted from output brush 3020 to output brush 2020. With output brush 2020 and the output of trigger circuit 1080 now positive, the output of "and" circuit 524B drops to ground while the output of "and" circuit 524C becomes positive, causing input brush 510C to now carry a signal. Since input brush 510C now lies well out of engagement with the segment of circle 500C, the input of trigger circuit 580 will continue to rest at ground. The "and" circuit 124C continues to supply input excitation voltage to first circle input brush 110C of pattern C. Pattern C has a higher periodicity than pattern D. Assuming that patterns C and D have equal diameters, then greater accuracy will be obtained by controlling interpattern switching from circle 500C rather than from an equivalent circle mounted on pattern disk D. At line t, input brush 510C engages the critical end of the segment of circle 500C, causing output brush 520C to become positive and causing the output of trigger circuit 580 to drop to ground. With output brush 4020 and the input of trigger circuit 580 now positive, the output of "and" circuit 124C drops to ground; and the output of "and" circuit 124D becomes positive. Input excitation voltage is removed from first circle input brush 110C of pattern C and applied to first circle input brush 110D of pattern D. The line u transfer point of circle 1000 is so placed that when input brush 1010 is at line r, then input brush 510C is preferably, though not necessarily, at the midpoint of the segment of circle 500C. At line u, input brush 1010 engages a segment of circle 1000, causing conduction to shift to output brush 1020. With output brushes 1020 and 2020 now positive, the output of "and" circuit 524C drops to ground; and the output of "and" circuit 524D becomes positive. The positive output of "and" circuit 524D causes the input of trigger circuit 580 to continue positive. Furthermore, "and" circuit 124D continues to supply input excitation voltage to first circle input brush 110D of pattern D.

Now let us consider that all brushes move to the left of line r. At line q, input brush 510B, carrying a signal, breaks contact with the other critical end of the segment of circle 500B. Output brush 520B drops to ground; and the output of trigger circuit 580 becomes positive. With output brush 5020 and the output of trigger circuit 580 now positive, the output of "and" circuit 124B drops to ground; and the output of "and" circuit 124A becomes up from disk E by a ratio of 30/8=15/4; pattern disk C may be geared up from disk E by a ratio of 30/10=3; and pattern disk D may be geared up from disk E by a ratio of 30/6=5. Alternatively, pattern disk C may be again geared up from disk E by a ratio of 30/10=3; pattern disk B may be geared up from pattern disk C by a ratio of 5/4, since 5/4×3=15/4; pattern disk D may be geared up from pattern disk B by a ratio of 4/3, since 4/3×15/4=5; and pattern disk A may be geared up from pattern disk D by a ratio of 3/2, since 3/2×5=15/2. A source of input excitation voltage, battery 10, has its negative terminal grounded and its positive terminal connected to an input brush 1010, disposed to alternately contact the segments and spaces of circle 1000. Output brush 1020 of circle 1000 is connected forwardly through a crystal 1096 to one input brush 2010 of a pair of input brushes 2010 and 2012, disposed to alternately contact the segment and space of circle 2000. Output brush 1020 is also connected to the input of an inverting amplifier or trigger circuit 1080. The output of trigger circuit 1080 is connected forwardly through a crystal 1098 to input brush 2012. Circle 3000 intermeshes with circle 2000; and brushes 2010 and 2012 simultaneously supply complementary input signals to both circles 2000 and 3000. Output brush 1020 is connected to one input of each of "and" circuits 524B and 524D. The output of inverting amplifier 1080 is connected to one input of each of "and" circuits 524A and 524C. Output brush 3020 of circle 3000 is connected to the other input of each of "and" circuits 524A and 524B. Output brush 2020 of circle 2000 is connected to the other input of each of "and" circuits 524C and 524D. The output of "and" circuit 524A is connected to an input brush 510A, disposed to alternately contact the equal segment and space of switching circle 500A. The output of "and" circuit 524B is connected to an input brush 510B, disposed to alternately contact the equal segment and space of switching circle 500B. The output of "and" circuit 524C is connected to an input brush 510C, disposed to alternately contact the equal segment and space of switching circle 500C. And the output of "and" circuit 524D is connected to an input brush 510D, disposed to alternately contact the equal segment and space of switching circle 500D. Output brushes 520A, 520B, 520C, and 520D of circles 500A through 500D, respectively, are each connected forwardly through respective crystals 539A, 539B, 539C, and 539D to the input of an inverting amplifier or trigger circuit 580. The input of inverting amplifier 580 is connected forwardly through a crystal 596 to one input brush 4010 of a pair of input brushes 4010 and 4012, disposed to alternately contact the segments and spaces of circle 4000. The output of inverting amplifier 580 is connected forwardly through a crystal 598 to input brush 4012. Circle 5000 fully intermeshes with circle 4000; and input brushes 4010 and 4012 simultaneously supply complementary input signals to both circles 4000 and 5000. Output brush 4020 of circle 4000 is connected forwardly through a crystal 4096 to one input brush 6010 of a pair of input brushes 6010 and 6012, disposed to alternately contact the segment and space of circle 6000. Output brush 5020 of circle 5000 is connected forwardly through a crystal 4098 to input brush 6012. Circle 7000 intermeshes with circle 6000; and input brushes 6010 and 6012 simultaneously supply complementary input signals to both circles 6000 and 7000. Output brush 4020 is also connected to one input of each of "and" circuits 124B and 124D. Output brush 5020 is also connected to one input of each of "and" circuits 124A and 124C. Output brush 6020 of circle 6000 is connected to the other input of each of "and" circuits 124C and 124D. Output brush 7020 of circle 7000 is connected to the other input of each of "and" circuits 124A and 124B. The output of "and" circuit 124A is connected to the first circle input brush 110A of pattern A; the output of "and" circuit 124B is connected to the first circle input brush 110B of pattern B; the output of "and" circuit 124C is connected to the first circle input brush 110C of pattern C; and the output of "and" circuit 124D is connected to the first circle input brush 110D of pattern D. The positive terminal of input excitation battery 10 is also connected to a single input brush 8010, disposed to alternately contact the segment and space of circle 8000. Output brush 8020 of circle 8000 is directly connected to the input of inverting amplifier or trigger circuit 580. Corresponding outputs of patterns A through D are connected in parallel with such blocking crystals as may be required to prevent adverse cross-feeding of signals to unenergized patterns as in FIGURES 7 through 14, 29, 29a, 30, 30a, 33, 33b, and 34. Disk E also mounts pattern E, which provides circles for the superextension of count of patterns A through D as shown in FIGURES 7 through 14, 29, 29a, 30, 30a, and 32.

Circles 1000 through 3000 of disk E provide coarse interpattern switching signals, while circles 4000 through 7000 of disk E in conjunction with switching circles 500A through 500D provide fine interpattern switching signals. Each of circles 1000 through 8000 has a noncritical transfer point at line E. Each of circles 4000 through 7000 has a noncritical transfer point at line w. Each of circles 4000 and 5000 has further noncritical transfer points at lines v and x. Each of circles 1000 through 3000 has a noncritical transfer point two units to the right of line w. Circle 1000 has a further noncritical transfer point one unit to the right of line v and still a further noncritical transfer point one and one-half units to the left of line x. Circle 500A has a critical transfer point at line v; circle 500B has a critical transfer point at line w; circle 500C has noncritical transfer points at lines w and x; and circle 500D has a critical transfer point at line x. Circle 8000 has a noncritical transfer point one and one-half units to the left of the righthand limit stop.

In operation of the converter of FIGURE 35, slightly to the left of line w, as shown, input brush 1010 lies well in engagement with a segment of circle 1000, causing output brush 1020 to carry a signal. The signal at output brush 1020 causes output brush 3020 to likewise carry a signal. With both output brushes 1020 and 3020 positive, "and" circuit 524B produces an output signal which is impressed on input brush 510B. Since in the position shown input brush 510B contacts the segment of circle 500B, output brush 520B couples a signal through crystal 539B to the input of inverting amplifier 580. The signal at the input of inverting amplifier 580 causes output brush 4020 to carry a signal, which in turn causes output brush 7020 to likewise carry a signal. With both output brushes 4020 and 7020 positive, "and" circuit 124B causes input excitation voltage to be applied to first circle input brush 110B of pattern B. Considering that all brushes move to the right, input brush 510B breaks contact with the segment of circle 500B at line w, permitting output brush 520B to drop to ground and causing the output of inverting amplifier 580 to become positive. At line w, input brushes 4010 and 4012 and also 6010 and 6012 symmetrically straddle transfer points of circles 4000 and 5000 and also 6000 and 7000, respectively, causing conduction to shift from output brush 4020 to output brush 5020, which in turn causes conduction to shift from output brush 7020 to output brush 6020. With both output brushes 5020 and 6020 positive, the output of "and" circuit 124B drops to ground, while the output of "and" circuit 124C becomes positive. Thus input excitation voltage is removed from first circle input brush 110B of pattern B and applied to first circle input brush 110C of pattern C. Also adjacent line w, input brush 510C breaks contact with a noncritical end of the segment of circle 500C. But interpattern transfer between patterns B and C is controlled by circle 500B and not by circle 500C. Pattern B has a higher periodicity than pattern C. Assuming that patterns B and C have equal diameters, then greater accuracy will be obtained by conpositive. Input excitation voltage is removed from first circle input brush 110B of pattern B and applied to first circle input brush 110A of pattern A. Pattern disk B has a higher periodicity than pattern disk A. Assuming that patterns A and B have equal diameters, then greater accuracy will result if interpattern switching is controlled from circle 500B rather than from an equivalent circle mounted on pattern disk A. The line p transfer point of circle 1000 is so placed that when input brush 1010 is at line p, then input brush 510B is preferably, though not necessarily, at the midpoint of the space of circle 500B. At line p, input brush 1010 breaks contact with a segment of circle 1000, causing output brush 1020 to drop to ground and the output of trigger circuit 1080 to become positive. With output brush 3020 and the output of trigger circuit 1080 positive, none of "and" circuits 524A through 524C is energized; and "and" circuit 124A continues to supply input excitation voltage to first circle input brush 110A of pattern A.

Brushes 2010 and 2012 are spaced apart the minimum length of any segment or space of circle 1000. The segment of circle 1000 between the lines p and s is six units, corresponding to the total length of pattern B. The space of circle 1000 between the lines s and u is also six units in length. Hence brushes 2010 and 2012 are spaced apart a length of six units. Brushes 4010 and 4012 are spaced apart the minimum active length of patterns A through D. Pattern B has the minimum active length of four units. Accordingly, brushes 4010 and 4012 are spaced apart a length of four units.

Pattern E must be abbreviated so that at the righthand limit stop input brush 1010 cannot break contact with a segment of circle 1000. Thus "and" circuit 524D will continue to be energized; and "and" circuit 124D will continue to supply input excitation voltage to first circle input brush 110D of pattern D. Pattern E must also be abbreviated so that at the lefthand limit stop input brush 1010 cannot contact a segment of circle 1000. Thus "and" circuits 524B through 524D will continue unenergized; and "and" circuit 124A will continue to supply input excitation voltage to first circle input brush 110A of pattern A.

It will be noted that, since switching between patterns A and B is controlled by pattern B, no equivalent circle 500A need be mounted on pattern disk A. Similarly, since switching between patterns C and D is controlled by pattern C, no equivalent circle 500D need be mounted on pattern disk D.

If pattern A, which provides the count adjacent the lefthand limit stop, were of greater periodicity than pattern B, then it would be advantageous to control switching between patterns A and B from pattern A. Similarly if pattern D, which provides the count adjacent the righthand limit stop, were of greater periodicity than pattern C, then it would be advantageous to control switching between patterns C and D from pattern D. If patterns A and D were to control interpattern switching, then a circle 500A must be mounted on pattern disk A; and a circle 500D must be mounted on pattern disk D. Circle 500A would have a critical transfer point at line q; and the space of circle 500A would extend from line q to slightly beyond the lefthand limit stop. The line q transfer point of circle 500B would no longer be critical, since the critical transfer point of circle 500A at line q would now control interpattern switching. Circle 500D would have a critical transfer point at line t; and the segment of circle 500D would extend from line t to slightly beyond the righthand limit stop. The line t transfer point of circle 500C would no longer be critical, since the critical transfer point of circle 500D at line t would now control interpattern switching. This slight extension of the space of circle 500A beyond the lefthand limit stop and of the segment of circle 500D beyond the righthand limit stop is necessary so that adjacent the lefthand limit stop input brush 510A would not contact the segment of circle 500A and so that adjacent the righthand limit stop input brush 510D would not break contact with the segment of circle 500D. This slight extension of the segment or space of a fine switching circle beyond a limit stop will be again shown in conjunction with FIGURES 35 and 35a.

Crystals 539B through 539D prevent adverse cross-loading effects among "and" circuits 524B through 524D. As will be shown in conjunction with FIGURE 35, crystal 539B might equally well have been instead inserted between output brush 520B and the input of inverting amplifier 580; and crystal 539C might equally well have been instead inserted between output brush 520C and the input of inverting amplifier 580.

Noncyclic converters are used where the function is desired only between certain predetermined fixed limits. For example, we might desire to provide the tangent function between the limits of ±85°, since the value of the tangent becomes infinite at angles approaching ±90°. For cyclic converters which produce periodic, repetitive functions, it is necessary either that the rotation of each pattern be integrally divisible into the period or that nonlinear gearing be provided such that the rotation of each pair of nonlinear gears is integrally divisible into the period. However, for noncyclic converters of limited rotation, it is neither necessary that the rotation of any pattern be integrally divisible into the distance between the fixed limits nor necessary that nonlinear gearing be used. It will be appreciated that, while it would be possible to control interpattern switching directly from circle 1000 by aligning its transfer points with the interpattern switching points, yet the tolerances would be extremely critical because of the inherent nonlinearity and backlash associated with the reduction gearing between pattern disk E and patterns A through D. To improve the accuracy of interpattern switching, circle 1000 provides only coarse switching signals; and its transfer points are well displaced from the interpattern switching points. The coarse switching signals from circle 1000 are used to control the application of voltage to the input brushes of fine switching circles 500B and 500D, which are mounted directly on patterns B and C, respectively. The fine interpattern switching signals are thus obtained directly from a circle mounted on one of the two patterns involved at each interpattern transfer point.

In proceeding from the lefthand limit stop to the righthand limit stop through the four patterns A through D, the input to inverting amplifier 580 changes polarity four times, once at each interpattern transfer point. Thus the fine interpattern switching signals obtained at the input and output of inverting amplifier 580 are of single frequency, changing polarities only at the interpattern transfer points.

*Multiple-Pattern Noncyclic Converters of Limited Rotation by the Method of Superextension of Count*

Referring now to FIGURES 35 and 35a, disk A mounts superextended pattern A, which is shown cut radially along line A and developed; disk B mounts superextended pattern B, which is shown cut radially along line B and developed; disk C mounts superextended pattern C, which is shown cut radially along line C and developed; and disk D mounts superextended pattern D, which is shown cut radially along line D and developed. If it be assumed that the length between the left and right limit stops is 27.75 units, then patterns A, B, C, and D have respective lengths of four, eight, ten, and six units. Disks A, B, C, and D also mount respective switching circles 500A, 500B, 500C, and 500D. Disk E mounting circles 1000, 2000, 3000, 4000, 5000, 6000, 7000, and 8000, has an active length between the left and right limit stops of 27.75 units and has an inactive or abbreviated portion of 2.25 units. One revolution of disk E thus represents thirty units. Disk E is shown cut radially along line E and developed. Pattern disk A may be geared up from disk E by a ratio of 30/4=15/2; pattern disk B may be geared trolling interpattern switching from circle 500B rather than from circle 500C. The length of pattern B is eight units; and the length of the segment and of the space of circle 500B may each be four units. The noncritical transfer points of circles 1000 through 3000 are placed two units to the right of line *w* so that input brush 510B is preferably, though not necessarily, at the midpoint of the space of circle 500B. Accordingly, two units to the right of line *w*, input brush 1010 breaks contact with a segment of circle 1000, causing conduction to shift from lagging brush 2010 to leading brush 2012, which brushes symmetrically straddle transfer points of circles 2000 and 3000. Conduction is thereby shifted from output brush 3020 to output brush 2020. With output brush 2020 and the output of inverting amplifier 1080 positive, the output of "and" circuit 524B drops to ground, while the output of "and" circuit 524C becomes positive, causing input brush 510C to carry a signal. Since input brush 510C now lies well out of engagement with the segment of circle 500C, the input of trigger circuit 580 continues to rest at ground; and "and" circuit 124C continues to supply input excitation voltage to first circle input brush 110C of pattern C. Midway between lines *w* and *x*, input brush 510C, carrying a signal, contacts the segment of circle 500C, causing conduction to shift from brush 4012 to brush 4010. But since both brushes contact the same segment of circle 5000, output brush 5020 continues positive; and "and" circuit 124C continues to supply input excitation voltage to pattern C. Pattern D has a higher periodicity than pattern C. Assuming that patterns C and D have equal diameters, then greater accuracy will be obtained by controlling interpattern switching from circle 500D rather than from circle 500C. The length of pattern D is six units; and the length of the segment and of the space of circle 500D may each be three units. A noncritical transfer point of circle 1000 is placed one and one-half units to the left of line *x* so that input brush 510D is preferably, though not necessarily, at the midpoint of the segment of circle 500D. Accordingly, one and one-half units to the left of line *x*, input brush 1010 engages a segment of circle 1000, causing conduction to shift to output brush 1020. With both output brushes 1020 and 2020 positive, the output of "and" circuit 524C drops to ground; and the output of "and" circuit 524D becomes positive. Conduction is thus shifted from output brush 520C to output brush 520D. But the input of inverting amplifier 580 continues positive; and "and" circuit 124C continues to supply input excitation voltage to pattern C. At line *x*, input brush 510D breaks contact with the segment of circle 500D, causing conduction to shift from lagging brush 4010 to leading brush 4012, which brushes symmetrically straddle transfer points of circles 4000 and 5000. Conduction is thereby shifted from output brush 5020 to output brush 4020. With both output brushes 4020 and 6020 positive, the output of "and" circuit 124C drops to ground, while the output of "and" circuit 124D becomes positive. Input excitation voltage is thereby removed from pattern C and applied to first circle input brush 110D of pattern D. Also adjacent line *x*, input brush 510C breaks contact with a noncritical end of the segment of circle 500C. But interpattern transfer between patterns C and D is controlled by circle 500D and not by circle 500C. Midway between line *x* and the righthand limit stop, input brush 510D contacts a segment of circle 500D, causing conduction to shift from leading brush 4012 to lagging brush 4010. But since both brushes 4010 and 4012 contact the same segment of circle 4000, output brush 4020 continues positive; and "and" circuit 124D continues to supply input excitation voltage to pattern D.

It is seen that the righthand limit stop corresponds to line D; and hence the count is provided on pattern D throughout a complete revolution. At the righthand limit stop input brush 510D lies at the extreme end of the segment of circle 500D and may break contact therewith.

One and one-half units to the left of the righthand limit stop, where input brush 510D is preferably at the midpoint of the segment of circle 500D, input brush 8010 engages one of the noncritical ends of the segment of circle 8000. From this point one and one-half units to the left of the righthand limit stop up to the righthand limit stop there is an overlapping of signals at the input of inverting amplifier 580. One signal arises by virtue that input brush 510D, carrying a signal, contacts the segment of circle 500D; and the second signal arises by virtue that input brush 8010 contacts the segment of circle 8000. Even if, at the righthand limit stop, input brush 510D does break contact with the segment of circle 500D, yet the input of inverting amplifier 580 continues positive because of the superextension signal now appearing at output brush 8020. Thus circle 500D has been superextended such that the space thereof alternately represents a segment adjacent the righthand limit stop; and a signal is maintained to the input of inverting amplifier 580 so that input excitation voltage continues to be supplied to first circle input brush 110D of pattern D.

Let us now consider that all brushes move to the left from the position shown. Midway between lines *w* and *v*, input brush 510B breaks contact with the segment of a circle 500B, causing conduction to shift from brush 4010 to brush 4012. Since both brushes 4010 and 4012 contact the same segment of circle 4000, output brush 4020 continues positive; and "and" circuit 124B continues to supply input excitation voltage to pattern B. Pattern A has a higher periodicity than pattern B. Assuming that patterns A and B have equal diameters, then greater accuracy will be obtained by controlling interpattern switching from circle 500A rather than from circle 500B. The length of pattern A is four units; and the length of the segment and of the space of circle 500A may each be two units. A noncritical transfer point of circle 1000 is placed one unit to the right of line *v* so that input brush 510A lies preferably at the midpoint of the space of circle 500A. Accordingly, one unit to the right of line *v*, input brush 1010 breaks contact with a segment of circle 1000, causing conduction to shift to the output of inverting amplifier 1080. With output brush 3020 and the output of inverting amplifier 1080 now positive, the output of "and" circuit 524B drops to ground; and the output of "and" circuit 524A becomes positive. But the input of trigger circuit 580 continues to rest at ground; and "and" circuit 124B continues to supply input excitation voltage to pattern B. At line *v*, input brush 510A, carrying a signal, contacts the segment of circle 500A, causing conduction to shift from lagging brush 4012 to leading brush 4010, which brushes symmetrically straddle transfer points of circles 4000 and 5000. Conduction is thereby shifted from output brush 4020 to output brush 5020. With output brushes 5020 and 7020 now positive, the output of "and" circuit 124B drops to ground, while the output of "and" circuit 124A becomes positive. Thus input excitation voltage is removed from pattern B and applied to first circle input brush 110A of pattern A. Also adjacent line *v*, input brush 510B engages the segment of circle 500B. But interpattern transfer between patterns A and B is controlled by circle 500A and not by circle 500B. After pattern disk A has completed half a revolution from line *v*, input brush 510A breaks contact with the segment of circle 500A, causing conduction to shift from brush 4010 to brush 4012. But since both brushes 4010 and 4012 contact the same segment of circle 5000, output brush 5020 continues positive; and "and" circuit 124A continues to supply input excitation voltage to pattern A.

It is seen that the lefthand limit stop intervenes slightly before line A; and hence the count is provided on pattern A for slightly less than a full revolution. The total length between the left and right limit stops is 27.75 units. The sum of the lengths of patterns A through D is twenty-eight units. Thus the distance between the intervening lefthand limit stop and line A is 0.25 unit. This tolerance of 0.25 unit is ample to prevent input brush 510A from contacting the segment of circle 500A. Hence even at the lefthand limit stop, "and" circuit 124A continues to supply input excitation voltage to first circle input brush 110A of pattern A.

Brushes 2010 and 2012 are spaced apart the minimum length of any segment or space of circle 1000. Circle 1000 has a space extending from a point one unit to the right of line $v$ to a point 1.25 units to the left of the lefthand limit stop. The distance between line $v$ and the lefthand limit stop is 3.75 units. Accordingly, this space of circle 1000 has the minimum length of six units. Hence brushes 2010 and 2012 are spaced apart a length of six units. Brushes 4010 and 4012 are spaced apart the minimum length of any segment or space of circles 500A through 500D. The segment and space of circle 500A each have the minimum length of two units. Accordingly, brushes 4010 and 4012 are spaced apart a length of two units. Brushes 6010 and 6012 are spaced apart the minimum length between any two adjacent transfer points of circles 4000 and 5000. The minimum length between adjacent transfer points of circles 4000 and 5000 is five units between lines $v$ and E. Accordingly, brushes 6010 and 6012 are spaced apart a length of five units.

In the position shown, input brush 2012 lies in the clearance gap between adjacent segments of circles 2000 and 3000. As previously explained in conjunction with FIGURES 30 and 32 and as described in Speller, this clearance gap must be sufficiently large so that brush 2012 cannot short-circuit or simultaneously contact segments of both circles 2000 and 3000.

It will be appreciated that, if an interpattern switching point occurs substantially coincident with a transfer point of the function, then pattern E, which is mounted on disk E, must provide circles for the double superextension of count of patterns A through D, as described in conjunction with FIGURES 33, 33a, and 33b; and each of the two intervals adjacent such coincident points must be modified to selectively represent different counts.

Pattern disk E must be abbreviated so that at the righthand limit stop input brush 8010 cannot break contact with the segment of circle 8000 and input brush 1010 cannot break contact with a segment of circle 1000. Thus "and" circuit 124D will continue to supply input excitation voltage to first circle input brush 110D of pattern D. Pattern disk E must also be abbreviated so that at the left hand limit stop input brush 1010 cannot contact the segment of circle 1000 and input brush 8010 cannot contact the segment of circle 8000. Thus "and" circuit 524A will continue to be energized and "and" circuit 124A will continue to supply input excitation voltage to first circle input brush 110A of pattern A.

If pattern A, which provides the count adjacent the lefthand limit, were of lesser periodicity than pattern B, it would be advantageous to control switching between patterns A and B from circle 500B. Similarly if pattern D, which provides the count adjacent the righthand limit stop, were of lesser periodicity than pattern C, it would be advantageous to control switching between patterns C and D from circle 500C. If circle 500C were to control switching between patterns C and D, then the transfer points of circle 500D could be displaced slightly to the right (0.25 unit, for example) so that at the righthand limit stop input brush 510D could not break contact with the segment of circle 500D. If circle 500B were to control interpattern switching between patterns A and B, then the transfer points of circle 500A could be displaced slightly to the left (0.25 unit, for example). Hence even if the lefthand limit stop were moved to the left to correspond to line A and pattern A were to provide the count throughout a whole revolution, yet at this new lefthand limit stop input brush 510A could not contact the segment of circle 500A. Consequently if circles 500A and 500D do not control interpattern switching, then there is no necessity for superextending circle 500D at the righthand limit stop and no necessity for causing the lefthand limit stop to intervene slightly before pattern A has completed a full revolution.

In FIGURE 34 abbreviated patterns A and D do not control interpattern switching; and no problems arose adjacent the limit stops. However, as previously described in conjunction with FIGURE 34, where abbreviated patterns A and D do control interpattern switching, then the respective space and segment of their fine switching circles must be slightly extended beyond the associated limit stop.

In FIGURE 35 superextended patterns A and D do control interpattern switching; and it is necessary either to superextend circles 500A and 500D or to cause the limit stops to intervene slightly before lines A and D. However, as previously described in conjunction with FIGURE 35, where superextended patterns A and D do not control interpattern switching, then the problems arising adjacent the limit stops may be solved by slightly displacing the transfer points of circles 500A and 500D so that the respective space and segment of these fine switching circles extends slightly beyond the associated limit stop.

Crystals 539A through 539D prevent adverse cross-loading effects among "and" circuits 524A through 524D. As shown in conjunction with FIGURE 34, crystals 539A through 539D might equally well have been instead inserted between the outputs of "and" circuits 524A through 524D and input brushes 510A through 510D, respectively.

Noncyclic converters are used where the function is desired only between certain predetermined fixed limits. For example, we might desire to provide the tangent function between the limits of 0° and 85°, since the value of the tangent becomes infinite at angles approaching 90°. For cyclic converters which produce periodic, repetitive functions, it is necessary either that the rotation of each pattern be integrally divisible into the period or that nonlinear gearing be provided such that the rotation of each pair of nonlinear gears is integrally divisible into the period. However, for noncyclic converters of limited rotation, it is neither necessary that the rotation of any pattern be integrally divisible into the distance between the fixed limits nor necessary that nonlinear gearing be used. It will be appreciated that while it would be possible to control interpattern switching directly from circle 1000 by aligning its transfer points with the interpattern switching points, yet the tolerances would be extremely critical because of the inherent nonlinearity and backlash associated with the gearing between disk E and patterns A through D. To improve the accuracy of interpattern switching, circle 1000 provides only coarse switching signals; and its transfer points are well displaced from the interpattern switching points. The coarse switching signals from circle 1000 are used to control the application of voltage to the input brushes of fine switching circles 500A through 500D, which are mounted directly on patterns A through D, respectively. The fine interpattern switching signals are thus obtained directly from a circle mounted on one of the two patterns involved at each interpattern transfer point.

In proceeding from the lefthand limit stop to the righthand limit stop through the four patterns A through D, the input to inverting amplifier 580 changes polarity eight times, once at each interpattern transfer point and once intermediate each interpattern transfer point. Thus the fine interpattern switching signals obtained at the input and output of inverting amplifier 580 are of double frequency, changing polarities not only at the interpattern transfer points but also intermediate the interpattern transfer points. Circles 4000 and 5000 are required to reduce these double frequency fine interpattern switching signals to the single frequency signals required by input excitation "and" circuits 124A through 124D. It will be recalled that in FIGURE 34, the single frequency fine interpattern switching signals required by input excitation "and" circuits 124A through 124D were directly produced at the input and output of inverting amplifier 580.

Referring now more particularly to FIGURE 35a, we have shown pattern A where it is desired to produce the tangent function between a lefthand limit of 0° and some righthand limit which is less than 90°. Since for small angles $\theta$, tan $\theta$ is approximately equal to sin $\theta$, pattern A of FIGURE 35a, which produces the tangent function at 0°, will closely correspond to patterns A and D of FIGURE 30, which produce the sine function at 0°. As was described in conjunction with FIGURE 30, while circle 500 is shown mounted on pattern D, yet it could have been instead mounted with equal advantage on pattern A equivalent to circle 500A of FIGURE 35a. In FIGURE 35a, circle 200A of FIGURE 30 has been eliminated to more clearly show the alignment of transfer points. In FIGURE 35a the effect of circle 200A may be produced by coupling output brush 300A to the input of an inverting amplifier. Also in FIGURE 35a, the ends of all segments are shown vertical as would be preferred in practice. It is seen that between line A and the lefthand limit stop there is a small inactive length or abbreviated portion. We may make this abbreviation arbitrarily small so long as we insure that brush 510A cannot contact the segment of circle 500A. It will be appreciated that if this inactive or abbreviated portion between line A and the lefthand limit stop is very small, then there will be insufficient inactive length to accomplish interpattern switching by the method of the abbreviated pattern as in FIGURES 33, 33a, and 34. Consequently, in FIGURE 35a, pattern A must be superextended by an appropriate circle of pattern E so that the segment between the two spaces respectively representing the 3/8 and 1/8 intervals selectively represents two different counts, the counts of 0 and 1/2.

In FIGURE 35, at the righthand limit stop, both pattern D and circle 500D are superextended; and the count may continue on pattern D through a complete revolution up to the righthand limit stop. In FIGURES 35 and 35a, at the lefthand limit stop, only pattern A is superextended, while circle 500A is abbreviated; and the lefthand limit stop intervenes so that the count is provided on pattern A for less than a complete revolution. This alternative solution adjacent the lefthand limit stop may be termed the semisuperextension of count, since we cannot take full advantage of the superextension of pattern A unless circle 500A is also superextended as in the fully superextended solution for pattern D and circle 500D at the righthand limit stop.

In both FIGURES 34 and 35, we have assumed that all patterns have equal diameters so that the arc lengths per revolution are equal. In FIGURE 34, if the diameter of pattern D were more than 12/8=3/2 times the diameter of pattern C, then it would be advantageous to control switching between patterns C and D from pattern D. Similarly in FIGURE 35, if the diameter of pattern C were more than 12/6=2 times the diameter of pattern D, then it would be advantageous to control switching between patterns C and D from pattern C. Thus it is advantageous to control interpattern switching from that pattern having the greater product of periodicity and diameter.

The tangent function provided in FIGURES 35 and 35a may also be produced by using one of the resolvers of FIGURES 29a, 30a, and 33b to simultaneously supply the functions $S=\sin \theta$ and $C=\cos \theta$. By means of digital dividing apparatus, we divide the function S by the function C to obtain the quotient sin $\theta$/cos $\theta$=tan $\theta$. Similarly we may provide the cotangent function by using digital dividing apparatus to divide the function C by the function S and obtain the quotient cos $\theta$/sin $\theta$=cotan $\theta$.

We may also provide the secant and cosecant functions by using digital dividing apparatus to obtain the quotients 1/cos $\theta$=sec $\theta$ and 1/sin $\theta$=cosec $\theta$.

Summary

It will be seen that we have accomplished the objects of our invention. We may provide converters having simple recycling discontinuities where the function jumps from any one count to any other nonadjacent count. We may provide converters having intermediate discontinuities of a nonrecycling nature where the function jumps from any one count to any other nonadjacent count. We may provide converters having simple changes in slope sign where the function has a local peak or local dip at any count. We may provide converters having discontinuities accompanied by changes in slope sign at the discontinuities where the function contains a discontinuous peak or discontinuous dip between any two nonadjacent counts. We may provide multiple-pattern cyclic converters having nonlinear counts. We may provide multiple-pattern noncyclic converters of limited rotation having nonlinear counts. We may provide converters which produce hysteresis functions. Thus we may provide any desired arbitrary function.

It will be appreciated that we may provide these various functions not only in the pure binary system but also in such even-ordered binary-coded systems as the binary-coded decimal system and further in such odd-ordered binary-coded systems as the binary-coded ternary system and the binary-coded quinary system.

It will be further appreciated that in any pure binary or binary-coded system there are only two polarities or conditions, one representing a "0" and the other representing a "1." We have shown the "1's" and "0's" to be represented by the presence of conductive coupling when a brush contacts a segment and by the absence of conductive coupling when a brush is within an intersegmental space. There are many substitutes, however, for the segments, spaces, and brushes which we have shown. For example, rather than using brushes in conjunction with segments and spaces, we might instead use a source of light and a phototube in conjunction with a pattern comprising translucent and opaque portions. Or the pattern might comprise the presence and absence of a radioactive material in conjunction with means for detecting the presence and absence of ionizing radiations. Or the pattern might comprise the presence and absence of a permanently magnetized material in conjunction with means for detecting the presence and absence of magnetic fields. Or we might instead use capacitive pickoff elements in conjunction with a pattern comprising segments and spaces, as shown in Speller, where "1's" and "0's" are represented by the presence and absence of capacitive coupling.

It will be further appreciated that we may reverse the roles of input and output brushes. For example, in all of the figures, input excitation voltage may be applied to brushes 120; and the first circle outputs may be obtained from brushes 110. Furthermore, when we speak of pairs of spaced *input* brushes 310 and 312, as in FIGURES 5 through 14, and also 210 and 212, as in FIGURES 18 through 33, this may be taken equally well to mean pairs of spaced *output* brushes 310 and 312 and also 210 and 212.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. An arbitrary function analogue-to-digital converter including in combination first means for providing a digital representation of a function within a region having a boundary point of the type comprising a point of change in slope sign and a point of discontinuity other than a recycling discontinuity between a large odd and a small even number and a nonrecycling discontinuity between a large even and a small odd number, second means for providing a signal adjacent said boundary point, and means connecting the first means and the second means.

2. An arbitrary function analogue-to-digital converter including in combination first means for providing a digital representation of a function within two adjacent regions having a common boundary point of the type comprising a point of change in slope sign and a point of discontinuity other than a recycling discontinuity between a large odd and a small even number and a nonrecycling discontinuity between a large even and a small odd number, second means for providing a signal adjacent said common boundary point, and means connecting the first means and the second means.

3. An arbitrary function analogue-to-digital converter including in combination conversion means for providing a digital representation of a function within a bounded region in which the slope sign of the function does not change and in which the function has no discontinuity unless it be of the type comprising a recycling discontinuity between a large odd and a small even number and a nonrecycling discontinuity between a large even and a small odd number, switching means, means connecting the switching means and the conversion means, and means for actuating the switching means adjacent a boundary of said region.

4. An arbitrary function analogue-to-digital converter including in combination conversion means for providing a digital representation of a function within two adjacent regions in each of which the slope sign of the function does not change and in each of which the function has no discontinuity unless it be of the type comprising a recycling discontinuity between a large odd and a small even number and a nonrecycling discontinuity between a large even and a small odd number, switching means, means connecting the switching means and the conversion means, and means for actuating the switching means adjacent the boundary between the two regions.

5. An analogue-to-digital converter for providing a function having a change in slope sign at a certain point thereof including in combination conversion means, a reversing switch, means connecting the conversion means and the reversing switch, and means for actuating the reversing switch adjacent said point.

6. An analogue-to-digital converter for providing a function having a change in slope sign at a certain point thereof including in combination conversion means comprising a row of elements and a pair of spaced sensing devices operatively associated with a row, a reversing switch, means connecting the pair of spaced sensing devices and the reversing switch, and means for actuating the reversing switch adjacent said point.

7. An analogue-to-digital converter for providing a function having a change in slope sign at a discontinuity including in combination conversion means, an electronic reversing switch, means connecting the conversion means and the electronic reversing switch, and means for actuating the electronic reversing switch at the discontinuity.

8. An arbitrary function analogue-to-digital converter including in combination first rotatable conversion means for providing a series of at least three digital counts, second rotatable conversion means, means mechanically connecting the first conversion means and the second conversion means such that the rotation of the second conversion means is of lesser periodicity than the rotation of the first conversion means, and means responsive to the first conversion means and to the second conversion means for causing at least one but not more than two of said counts to selectively represent a different digital count.

9. An arbitrary function analogue-to-digital converter including in combination rotatable conversion means comprising an active portion providing a digital representation of a function within a certain bounded region thereof, the active portion subtending appreciably less than a full revolution of the conversion means, a signal channel, and means for connecting the signal channel and the conversion means within said region and for disconnecting the signal channel and the conversion means at a boundary of said region.

10. An arbitrary function analogue-to-digital converter including in combination rotatable first conversion means comprising an active portion providing a digital representation of a function within a certain region thereof, the active portion subtending appreciably less than a full revolution of the rotatable conversion means, second conversion means for providing a digital representation of the function within an adjacent region thereof, a signal channel, and means for switching the signal channel between the first conversion means and the second conversion means adjacent the boundary between the two regions.

11. An arbitrary function analogue-to-digital converter including in combination first means for providing a digital representation of a function within a certain region thereof, second means for providing a digital representation of the function within an adjacent region thereof, a signal channel, and means for switching the signal channel between the first means and the secod means adjacent the boundary between the two regions.

12. An analogue-to-digital converter for providing an arbitrary function including in combination first means for providing a digital representation of a first function different from said arbitrary function, second means for providing a digital representation of a second function different from said arbitrary function, each of the first and second functions being of the type comprising a periodic function and a function having a constant absolute value and a function having a region of ambiguity, and means responsive to the first means and to the second means for providing the arbitrary function.

13. An analogue-to-digital converter for providing an arbitrary function including in combination first means for providing a digital representation of a first function different from said arbitrary function, second means for providing a digital representation of a second function different from said arbitrary function, each of the first and second functions being of the type comprising a function having a recycling discontinuity and a function having an even number of changes in slope sign and a function having a constant absolute value and a function having a region of ambiguity, and means responsive to the first means and to the second means for providing the arbitrary function.

14. An analogue-to-digital converter for providing an arbitrary function including in combination first means for providing a digital representation of a first function different from said arbitrary function, second means for providing a digital representation of a second function different from said arbitrary function, each of the first and second functions being of the type comprising a function having a recycling discontinuity and a function having an even number of changes in slope sign and a function having a region of ambiguity, and means responsive to the first means and to the second means for providing the arbitrary function.

15. An arbitrary function analogue-to-digital converter including in combination a signal channel, conversion means for providing a digital representation of a function within a certain bounded region thereof, means for connecting the signal channel and the conversion means within said region and for disconnecting the signal channel and the conversion means at a boundary of said region.

16. An arbitrary function analogue-to-digital converter including in combination first means for providing a digital representation of a function within a certain region thereof, second means for providing a digital representation of the function within an adjacent region thereof, a source of input excitation voltage, and means for switching the input excitation voltage between the first means and the second means adjacent the boundary between the two regions.

17. An arbitrary function analogue-to-digital converter including in combination first means for providing digital outputs representing a function within a certain region thereof, second means for providing digital outputs representing the function within an adjacent region thereof, means for connecting in parallel one pair of corresponding outputs of the first means and the second means, a source of input excitation voltage, and means for switching the input excitation voltage between the first means and the second means adjacent the boundary between the two regions.

18. An arbitrary function analogue-to-digital converter including in combination first means for providing digital outputs representing a function within a certain region thereof, second means for providing digital outputs representing the function within an adjacent region thereof, a pair of unilateral impedances, means including the pair of unilateral impedances for connecting in parallel one pair of corresponding outputs of the first means and the second means, a source of input excitation voltage, and means for switching the input excitation voltage between the first means and the second means adjacent the boundary between the two regions.

19. An arbitrary function analogue-to-digital converter including in combination first means for providing digital outputs representing a function within a certain region thereof, second means for providing digital outputs representing the function within an adjacent region thereof, switching means, means connecting the switching means and one pair of corresponding outputs of the first means and the second means, and means for actuating the switching means adjacent the boundary between the two regions.

20. An arbitrary function analogue-to-digital converter including in combination a plurality of conversion means each providing outputs representing digits of various significances, a source of input excitation voltage, means for simultaneously coupling the input excitation voltage to two of the conversion means, a reversing switch, means connecting the reversing switch and one pair of outputs of the two excited conversion means representing digits of corresponding significance, and means for actuating the reversing switch.

21. An arbitrary function analogue-to-digital converter including in combination conversion means having a certain resolution for providing a digital approximation to a function within a region having two boundary points at each of which the digital approximation differs from the true value of the function by appreciably less than one-half the resolution, switching means, means connecting the switching means and the conversion means, and means for actuating the switching means at each of the two boundary points of said region.

22. An analogue-to-digital converter for generating a periodic function including in combination conversion means for providing a digital representation of the function within a bounded region which is integrally divisible into the period of the function, switching means, means connecting the switching means and the conversion means, and means for actuating the switching means adjacent each of the two boundaries of said region.

23. An analogue-to-digital converter for generating a periodic function including in combination rotatable conversion means for providing a digital representation of the function within a certain bounded region thereof, the rotation of said conversion means being integrally divisible into the period of the function, a signal channel, means for connecting the signal channel and the conversion means within said region and for disconnecting the signal channel and the conversion means adjacent each of the two boundaries of said region.

24. An arbitrary function analogue-to-digital converter including in combination rotatable conversion means for providing a digital representation of a function within a certain bounded region thereof, a pair of mating gears each having a linear portion and a nonlinear portion, means mechanically connecting the conversion means and one of the pair of mating gears, the linear portion of each of the pair of mating gears subtending at least said bounded region, switching means, means connecting the switching means and the conversion means, and means for actuating the switching means adjacent each of the two boundaries of said region.

25. An arbitrary function analogue-to-digital converter including in combination first means for providing a digital representation of a function within a first region thereof, rotatable second means for providing a digital representation of the function within a second region thereof, the first region and the second region being adjacent regions having a common boundary point, the first region having a second boundary point, a signal channel, a circle of elements mounted for common rotation with the second means, and means including the circle of elements for connecting the signal channel to the first means at the second boundary point in response to one direction of rotation and for disconnecting the signal channel from the first means at the second boundary point in response to the opposite direction of rotation and for switching the signal channel between the first means and the second means adjacent the common boundary point.

26. An arbitrary function analogue-to-digital converter including in combination first moveable means for providing a digital representation of a function within a first region thereof, second moveable means for providing a digital representation of the function within a second region thereof, third moveable means for providing a digital representation of the function within a third region thereof, the first region and the second region being adjacent regions having a first common boundary point, the second region and the third region being adjacent regions having a second common boundary point, a signal channel, means mounted for common movement with one of the first and second means for providing a first output adjacent the first common boundary point, means responsive to the first output for switching the signal channel between the first means and the second means, means mounted for common movement with one of the second and third means for providing a second output adjacent the second common boundary point, and means responsive to the second output for switching the signal channel between the second means and the third means.

27. An analogue-to-digital converter for providing a function having a discontinuity of the type comprising a recycling discontinuity between two odd numbers and a recycling discontinuity between two even numbers and a nonrecycling discontinuity between two odd numbers and a nonrecycling discontinuity between two even numbers including in combination first conversion means for providing a series of digital counts, the first conversion means comprising a row of elements having ends the positions of which determine transfer points between adjacent digital counts, a first of said elements subtending one of the two digital counts constituting the discontinuity and an adjacent digital count, second conversion means comprising an additional element having an end the position of which determines the transfer point between the two digital counts subtended by said first element, and means connecting the first conversion means and the second conversion means.

28. An analogue-to-digital converter for providing a function having a discontinuity of the type comprising a recycling discontinuity between a large even and a small odd number and a nonrecycling discontinuity between a large odd and a small even number including in combination first conversion means for providing a series of digital counts, the first conversion means comprising a row of elements having ends the positions of which determine transfer points between adjacent digital counts, a first of said elements subtending the two digital counts constituting the discontinuity and an adjacent digital count, second conversion means comprising an additional element having two ends the positions of which determine transfer points for the three digital counts subtended by said first element, and means connecting the first conversion means and the second conversion means.

29. An analogue-to-digital converter for providing a function having a point of change in slope sign of the type comprising a local maximum at an even number and a local minimum at an odd number including in combination first conversion means for providing a series of digital counts, the first conversion means comprising a row of elements having ends the positions of which determine transfer points between adjacent digital counts, one of said elements subtending the digital count constituting the point of change in slope sign and the two adjacent digital counts, second conversion means comprising an additional element having two ends the positions of which determine the transfer points for the digital count constituting the point of change in slope sign, means connecting the first conversion means and the second conversion means, a reversing switch, means connecting the reversing switch and the first conversion means, and means for actuating the reversing switch adjacent the additional element.

30. An analogue-to-digital converter for providing a function having a change in slope sign at a discontinuity of the type comprising a change in slope sign at a discontinuity between two odd numbers and a change in slope sign at a discontinuity between two even numbers including in combination first conversion means for providing a series of digital counts, the first conversion means comprising a row of elements having ends the positions of which determine transfer points between adjacent digital counts, one of said elements subtending the two digital counts constituting the discontinuity, a reversing switch, means connecting the reversing switch and the first conversion means, second conversion means comprising an additional element having an end the position of which determines the transfer point between the two digital counts constituting the discontinuity, and means responsive to the second conversion means for actuating the reversing switch at the discontinuity.

31. An analogue-to-digital converter for providing a function having a change in slope sign at a discontinuity between an odd number and an even number including in combination first conversion means for providing a series of digital counts, the first conversion means comprising a row of elements having ends the positions of which determine transfer points between adjacent digital counts, a first of said elements subtending the two digital counts constituting the discontinuity and an adjacent digital count, second conversion means comprising an additional element having two ends the positions of which determine transfer points for the three digital counts subtended by said first element, means connecting the first conversion means and the second conversion means, a reversing switch, means connecting the reversing switch and the first conversion means, and means for actuating the reversing switch adjacent the additional element.

32. An analogue-to-digital converter for providing a function having a change in slope sign at a discontinuity of the type comprising a change in slope sign constituting a maximum at a discontinuity between a certain one even number and an odd number and a change in slope sign constituting a minimum at a discontinuity between a certain one odd number and an even number including in combination first conversion means for providing a series of digital counts, the first conversion means comprising a row of elements having ends the positions of which determine transfer points between adjacent digital counts, a first of said elements subtending such certain one of the two digital counts constituting the discontinuity and the two adjacent digital counts, second conversion means comprising an additional element having two ends the positions of which determine the transfer points for such certain one of the two digital counts constituting the discontinuity, means connecting the first conversion means and the second conversion means, a reversing switch, means connecting the reversing switch and the first conversion means, and means responsive to the second conversion means for actuating the reversing switch at the discontinuity.

33. An arbitrary function analogue-to-digital converter including in combination first means for providing a digital representation of a function within a certain region thereof, moveable second means for providing a digital representation of the function within an adjacent region thereof, a signal channel, a row of elements mounted for common movement with the second means, and means including the row of elements for switching the signal channel between the first means and the second means adjacent the boundary between the two regions.

34. An arbitrary function analogue-to-digital converter including in combination movable conversion means for providing a first and a second and a third digital count, the first and second counts being adjacent counts, the second and third counts being adjacent counts, an element mounted for common movement with the conversion means and having a first end positioned adjacent the midpoint of the first count and having a second end positioned adjacent the midpoint of the third count, and means including said element for causing the second count to represent a different digital count.

35. An analogue-to-digital converter for providing an hysteresis function including in combination first and second and third means for providing respective digital representations of a first and a second and a third function, the first function being the sine function, the second function being the cosine function, the third function being of the type comprising a periodic function and a function having a constant value, and means responsive to the three function means for providing a pair of parametric functions defining the hysteresis function.

36. An arbitrary function analogue-to-digital converter including in combination first rotatable conversion means for providing a series of at least two digital counts, second rotatable conversion means, means mechanically connecting the first and second means such that one revolution of the first means is accompanied by less than a full revolution of the second means, and means responsive to the first and second conversion means for causing one and only one of said counts to represent selectively a different digital count.

37. An arbitrary function analogue-to-digital converter including in combination movable conversion means for providing a first and a second digital count, an element mounted for common movement with the conversion means and having an end positioned somewhere intermediate the first count, and means including said element for causing only a portion of the first count to represent a different digital count.

38. An arbitrary function analogue-to-digital converter including in combination movable conversion means for providing a first and a second digital count, said counts being adjacent, an element mounted for common movement with the conversion means and having a first end positioned somewhere intermediate the first count and a second end positioned somewhere intermediate the second count, and means including said element for causing that portion of the first count which is adjacent the second count to represent a different digital count.

39. An arbitrary function analogue-to-digital converter including in combination movable conversion means for providing at least one digital count, an element mounted for common movement with the conversion means and having a first and a second end each positioned somewhere intermediate said count, and means including said element for causing an internal portion of said count to represent a different digital count.

References Cited in the file of this patent

UNITED STATES PATENTS

| | | |
|---|---|---|
| 2,813,677 | Scarbrough | Nov. 19, 1957 |
| 2,814,443 | Mills | Nov. 26, 1957 |
| 2,836,356 | Forrest et al. | May 27, 1958 |
| 2,868,449 | Brinster et al. | Jan. 13, 1959 |

OTHER REFERENCES

"Analog-Digital Converter Design" (Electronic Equipment, August 1955), pp. 12, 13.

Bower, G. G.: "Analog-to-Digital Converters" (Control Engineering, April 1957), pp. 107 to 118.

Sink, R. L., and Slocomb, G. M.: "The Sadic, a Precision Analog-Digital Converter" (Trans. of the IRE Professional Group on Instrumentation, June 1953), p. 48 to 54.